United States Patent
Liu et al.

(10) Patent No.: US 12,534,390 B2
(45) Date of Patent: Jan. 27, 2026

(54) METHODS AND SYSTEMS OF NITRATE REMOVAL IN AQUEOUS SYSTEMS FOR IMPROVED PFAS DESTRUCTION

(71) Applicant: Claros Technologies Inc., Minneapolis, MN (US)

(72) Inventors: Zekun Liu, Brooklyn Park, MN (US); Terrance P. Smith, Woodbury, MN (US); Adam Michael Hilbrands, Minneapolis, MN (US); Nathan Ernst Kamm, Minneapolis, MN (US); Joseph Reuel Levine Tirado, Minneapolis, MN (US); Sonja Elise Moons, Minneapolis, MN (US); John Wilfrid Brockgreitens, Minneapolis, MN (US); Andrew Thomas Healy, Minneapolis, MN (US)

(73) Assignee: Claros Technologies Inc., Minneapolis, MN (US)

( * ) Notice: Subject to any disclaimer, the term of this patent is extended or adjusted under 35 U.S.C. 154(b) by 0 days.

(21) Appl. No.: 19/015,905

(22) Filed: Jan. 10, 2025

(65) Prior Publication Data
US 2025/0145503 A1   May 8, 2025

Related U.S. Application Data

(63) Continuation-in-part of application No. 18/771,292, filed on Jul. 12, 2024.
(Continued)

(51) Int. Cl.
*C02F 1/32* (2023.01)
*B01D 61/02* (2006.01)
(Continued)

(52) U.S. Cl.
CPC ............ *C02F 1/325* (2013.01); *B01D 61/025* (2013.01); *B01D 61/08* (2013.01); *B01D 69/02* (2013.01);
(Continued)

(58) Field of Classification Search
CPC .. C02F 1/325; C02F 1/32; C02F 1/441; C02F 2101/36
See application file for complete search history.

(56) References Cited

U.S. PATENT DOCUMENTS

| | | |
|---|---|---|
| 3,050,369 A | 8/1962 | Mills |
| 3,352,641 A | 11/1967 | Nakamura |

(Continued)

FOREIGN PATENT DOCUMENTS

| | | |
|---|---|---|
| CN | 1078090 C | 1/2002 |
| CN | 1680219 A | 10/2005 |

(Continued)

OTHER PUBLICATIONS

Liu, et al. "Pilot-scale field demonstration of a hybrid nanofiltration and UV-sulfite treatment train for groundwater contaminated by per-and polyfluoroalkyl substances (PFASs)." Water Research 205 (2021): 117677 (Year: 2021).*

(Continued)

*Primary Examiner* — Anthony J Zimmer
*Assistant Examiner* — Eric Scott Sherman
(74) *Attorney, Agent, or Firm* — Padda Law Group

(57) ABSTRACT

Methods and systems of PFAS destruction in water containing nitrate. The methods and systems include filtering water containing PFAS and nitrate through a membrane selective for PFAS to obtain a membrane reject containing PFAS and nitrate and a filtrate containing nitrate, forming a treatment solution using the membrane reject including diluting the membrane reject and combining the membrane reject with a (Continued)

photosensitizer, a sulfite salt, and a sufficient amount of base such that the treatment solution has a pH of about 10 or more, and irradiating the treatment solution with UV light in a photoreactor to destroy a portion of the PFAS. Before dilution, a concentration of PFAS in the membrane reject may be between about 3 times and about 20 times greater than before the filtering step. Dilution of the membrane reject may include between about a 3 and about a 20 times dilution.

10 Claims, 33 Drawing Sheets

Related U.S. Application Data

(60) Provisional application No. 63/635,938, filed on Apr. 18, 2024, provisional application No. 63/591,040, filed on Oct. 17, 2023, provisional application No. 63/513,782, filed on Jul. 14, 2023.

(51) Int. Cl.
| | |
|---|---|
| *B01D 61/08* | (2006.01) |
| *B01D 69/02* | (2006.01) |
| *C02F 1/44* | (2023.01) |
| *C02F 1/70* | (2023.01) |
| *C02F 101/16* | (2006.01) |
| *C02F 101/36* | (2006.01) |

(52) U.S. Cl.
CPC ............... *C02F 1/441* (2013.01); *C02F 1/70* (2013.01); *B01D 2311/08* (2013.01); *B01D 2325/14* (2013.01); *B01D 2325/20* (2013.01); *C02F 2101/163* (2013.01); *C02F 2101/36* (2013.01); *C02F 2305/00* (2013.01)

(56) References Cited

U.S. PATENT DOCUMENTS

| | | |
|---|---|---|
| 4,042,673 A | 8/1977 | Strong |
| 4,049,681 A | 9/1977 | Dietrich |
| 4,661,092 A | 4/1987 | Popovich |
| 4,793,931 A | 12/1988 | Stevens |
| 5,258,124 A | 11/1993 | Bolton |
| 5,262,057 A | 11/1993 | Tonelli |
| 5,399,247 A | 3/1995 | Carey |
| 5,417,742 A | 5/1995 | Tamhankar |
| 5,635,258 A | 6/1997 | Chen |
| 5,665,435 A | 9/1997 | Smentkowski |
| 5,684,065 A | 11/1997 | Hiraoka |
| 5,779,763 A | 7/1998 | Pinnau |
| 5,779,863 A | 7/1998 | Ha |
| 5,804,057 A | 9/1998 | Zhou |
| 5,840,998 A | 11/1998 | Mandal |
| 6,025,094 A | 2/2000 | Visco |
| 6,083,387 A | 7/2000 | Leblanc |
| 6,312,502 B1 | 11/2001 | Li |
| 6,376,123 B1 | 4/2002 | Chu |
| 6,383,257 B1 | 5/2002 | McDermott |
| 6,423,236 B1 | 7/2002 | Shiota et al. |
| 6,482,251 B1 | 11/2002 | Kawasaki |
| 6,720,465 B2 | 4/2004 | Braun |
| 6,780,328 B1 | 8/2004 | Zhang |
| 6,838,065 B2 | 1/2005 | Lin |
| 6,875,902 B2 | 4/2005 | Hori |
| 7,011,696 B2 | 3/2006 | Ferrero |
| 7,141,221 B2 | 11/2006 | Irie |
| 7,288,682 B2 | 10/2007 | Tchistiakov |
| 7,308,409 B2 | 12/2007 | Tamata |
| 7,404,907 B2 | 7/2008 | Welcker |
| 7,795,332 B2 | 9/2010 | Hintzer |
| 9,221,695 B2 | 12/2015 | Fath |
| 9,321,039 B2 | 4/2016 | Choi |
| 9,814,919 B2 | 11/2017 | Pancras |
| 9,896,350 B2 | 2/2018 | Gu |
| 9,957,172 B2 | 5/2018 | Niu |
| 10,208,136 B2 | 2/2019 | Veneroni |
| 10,259,730 B2 | 4/2019 | Ball |
| 10,562,801 B2 | 2/2020 | Theodore |
| 10,744,497 B2 | 8/2020 | Zipplies |
| 10,844,285 B1 | 11/2020 | Livingston |
| 10,865,128 B2 | 12/2020 | Ball |
| 10,865,129 B2 | 12/2020 | Licht |
| 10,913,021 B2 | 2/2021 | Xia |
| 10,934,827 B2 | 3/2021 | Laramay |
| 10,964,967 B2 | 3/2021 | Coleman |
| 11,014,999 B2 | 5/2021 | Iyer |
| 11,045,676 B2 | 6/2021 | Lee |
| 11,072,574 B2 | 7/2021 | Gu |
| 11,124,431 B2 | 9/2021 | Cho |
| 11,339,337 B1 | 5/2022 | Newman |
| 11,358,103 B2 | 6/2022 | Phillips |
| 11,401,180 B2 | 8/2022 | Dejarme |
| 11,434,160 B1 | 9/2022 | Ecker |
| 11,447,401 B1 | 9/2022 | Abbasian |
| 11,479,489 B1 | 10/2022 | Greene |
| 11,484,922 B2 | 11/2022 | Brady |
| 11,512,011 B2 | 11/2022 | Huang |
| 11,512,012 B2 | 11/2022 | Chiang |
| 11,518,689 B2 | 12/2022 | Motkuri |
| 11,548,800 B2 | 1/2023 | Franceschi-Hofmann |
| 11,577,111 B2 | 2/2023 | Strathmann |
| 11,579,134 B2 | 2/2023 | Kaltenberg |
| 11,623,884 B1 | 4/2023 | Menon |
| 11,650,138 B2 | 5/2023 | Edmiston |
| 11,660,574 B2 | 5/2023 | Bhattacharyya |
| 11,661,360 B2 | 5/2023 | Parthasarathy |
| 11,679,999 B2 | 6/2023 | Newell |
| 11,680,001 B2 | 6/2023 | Yost |
| 11,757,140 B2 | 9/2023 | Choi |
| 11,760,662 B2 | 9/2023 | Yang |
| 11,780,746 B2 | 10/2023 | Duckworth |
| 11,840,471 B1 | 12/2023 | Puttamraju |
| 11,858,817 B2 | 1/2024 | Pate |
| 11,884,556 B2 | 1/2024 | Chaudhury |
| 11,971,671 B2 | 4/2024 | Lee |
| 12,001,158 B2 | 6/2024 | Kasai |
| 12,005,423 B2 | 6/2024 | Reeve |
| 12,012,343 B2 | 6/2024 | Dejarme |
| 12,037,266 B2 | 7/2024 | Flood |
| 12,091,330 B2 | 9/2024 | Das |
| 12,275,661 B2 | 4/2025 | Hilbrands |
| 2002/0034688 A1 | 3/2002 | Chu |
| 2004/0003993 A1 | 1/2004 | Weres |
| 2004/0251212 A1 | 12/2004 | Ikematsu |
| 2005/0096490 A1 | 5/2005 | Henderson |
| 2005/0161342 A1 | 7/2005 | Carson |
| 2007/0020783 A1 | 1/2007 | Mcfarlane et al. |
| 2007/0119779 A1 | 5/2007 | Muramoto |
| 2009/0145741 A1 | 6/2009 | Yu |
| 2010/0200515 A1 | 8/2010 | Saien |
| 2013/0280154 A1 | 10/2013 | Chung |
| 2015/0021185 A1 | 1/2015 | Park |
| 2018/0119298 A1 | 5/2018 | Mok |
| 2019/0240623 A1 | 8/2019 | Beh |
| 2020/0102231 A1 | 4/2020 | Locke |
| 2020/0179997 A1 | 6/2020 | Ross |
| 2020/0189940 A1 | 6/2020 | Shih |
| 2020/0222885 A1 | 7/2020 | Moon |
| 2020/0239336 A1 | 7/2020 | Lutterbach |
| 2020/0260533 A1 | 8/2020 | Crownover |
| 2020/0339450 A1 | 10/2020 | Franceshi-Hofmann et al. |
| 2020/0399147 A1 | 12/2020 | Yost |
| 2021/0032136 A1 | 2/2021 | Cates |
| 2021/0046567 A1 | 2/2021 | Wild |
| 2021/0047208 A1 | 2/2021 | Douglas |
| 2021/0050624 A1 | 2/2021 | Bao |
| 2021/0206670 A1 | 7/2021 | Zhao |
| 2021/0214241 A1 | 7/2021 | Newell |
| 2021/0308661 A1 | 10/2021 | Hart |
| 2021/0322951 A1 | 10/2021 | Medina |

(56) References Cited

U.S. PATENT DOCUMENTS

| | | |
|---|---|---|
| 2021/0323848 A1 | 10/2021 | Schuelke |
| 2021/0387879 A1 | 12/2021 | Griffiths |
| 2022/0009809 A1 | 1/2022 | Xiao |
| 2022/0041467 A1 | 2/2022 | Dodds |
| 2022/0062843 A1 | 3/2022 | Liang |
| 2022/0119290 A1 | 4/2022 | Fraser et al. |
| 2022/0134254 A1 | 5/2022 | Gottlieb |
| 2022/0176346 A1 | 6/2022 | Gurtowski |
| 2022/0181647 A1 | 6/2022 | Wood |
| 2022/0185703 A1 | 6/2022 | Smith |
| 2022/0212959 A1 | 7/2022 | Ramaswamy |
| 2022/0227643 A1 | 7/2022 | Theodore |
| 2022/0227644 A1 | 7/2022 | Santillan |
| 2022/0227645 A1 | 7/2022 | Yin |
| 2022/0234906 A1 | 7/2022 | Chen |
| 2022/0250956 A1 | 8/2022 | Griffis |
| 2022/0259077 A1 | 8/2022 | Woodard |
| 2022/0305458 A1 | 9/2022 | Leibfarth |
| 2022/0315453 A1 | 10/2022 | Woodard |
| 2022/0336866 A1 | 10/2022 | Li |
| 2022/0354978 A1 | 11/2022 | Candelore |
| 2022/0356080 A1 | 11/2022 | Cybulskis |
| 2022/0363567 A1 | 11/2022 | Bonn |
| 2022/0370982 A1 | 11/2022 | Mcneil |
| 2022/0371920 A1* | 11/2022 | Xiong .............. C02F 1/70 |
| 2022/0401777 A1 | 12/2022 | Li |
| 2022/0402794 A1 | 12/2022 | Chen |
| 2023/0001251 A1 | 1/2023 | Xia |
| 2023/0052342 A1 | 2/2023 | Mclean |
| 2023/0058206 A1 | 2/2023 | Dorian |
| 2023/0113100 A1 | 4/2023 | Jones |
| 2023/0116353 A1 | 4/2023 | Wasas |
| 2023/0173462 A1 | 6/2023 | Han |
| 2023/0228722 A1 | 7/2023 | Pinkard |
| 2023/0249194 A1 | 8/2023 | Lilliestrale |
| 2023/0249993 A1 | 8/2023 | Reed |
| 2023/0373824 A1 | 11/2023 | Scheitlin |
| 2023/0399246 A1 | 12/2023 | Nickelsen |
| 2024/0001340 A1 | 1/2024 | Hart |
| 2024/0010529 A1 | 1/2024 | Dukes |
| 2024/0034654 A1 | 2/2024 | Broderick |
| 2024/0035998 A1 | 2/2024 | Wang |
| 2024/0132388 A1 | 4/2024 | Haneline |
| 2024/0174541 A1 | 5/2024 | Eidem |
| 2024/0190747 A1 | 6/2024 | Mcguire |
| 2024/0261764 A1 | 8/2024 | Legg |
| 2024/0278056 A1 | 8/2024 | Pinkard |
| 2024/0300831 A1 | 9/2024 | Flood |
| 2024/0336496 A1 | 10/2024 | Abbas |
| 2024/0336500 A1 | 10/2024 | Borras |
| 2024/0391797 A1 | 11/2024 | Pinkard |

FOREIGN PATENT DOCUMENTS

| | | |
|---|---|---|
| CN | 100347137 C | 11/2007 |
| CN | 101524583 A | 9/2009 |
| CN | 201454385 U | 5/2010 |
| CN | 101884831 A | 11/2010 |
| CN | 1844069 B | 4/2011 |
| CN | 101659718 B | 5/2011 |
| CN | 101496992 B | 9/2011 |
| CN | 101199884 B | 11/2011 |
| CN | 101992061 B | 7/2012 |
| CN | 101928078 B | 8/2012 |
| CN | 102276012 B | 10/2012 |
| CN | 102351272 B | 1/2013 |
| CN | 102872832 A | 1/2013 |
| CN | 102951754 A | 3/2013 |
| CN | 103183397 A | 7/2013 |
| CN | 203159277 U | 8/2013 |
| CN | 103408103 A | 11/2013 |
| CN | 103058319 B | 6/2014 |
| CN | 103086865 B | 3/2015 |
| CN | 104549179 A | 4/2015 |
| CN | 103936096 B | 5/2015 |
| CN | 104628193 A | 5/2015 |
| CN | 104773884 A | 7/2015 |
| CN | 103170308 B | 8/2015 |
| CN | 104326910 B | 10/2015 |
| CN | 103962137 B | 11/2015 |
| CN | 103073385 B | 1/2016 |
| CN | 103979482 B | 1/2016 |
| CN | 104261519 B | 1/2016 |
| CN | 105271501 A | 1/2016 |
| CN | 104672055 B | 3/2016 |
| CN | 104529031 B | 5/2016 |
| CN | 105540759 A | 5/2016 |
| CN | 105692852 A | 6/2016 |
| CN | 104496141 B | 7/2016 |
| CN | 104512942 B | 8/2016 |
| CN | 104193056 B | 9/2016 |
| CN | 106082389 A | 11/2016 |
| CN | 104672072 B | 1/2017 |
| CN | 104192978 B | 3/2017 |
| CN | 104974968 B | 10/2017 |
| CN | 104974969 B | 10/2017 |
| CN | 105060389 B | 10/2017 |
| CN | 107754824 A | 3/2018 |
| CN | 105906752 B | 5/2018 |
| CN | 107982835 A | 5/2018 |
| CN | 108144572 A | 6/2018 |
| CN | 108187365 A | 6/2018 |
| CN | 108264127 A | 7/2018 |
| CN | 109231353 A | 1/2019 |
| CN | 106219666 B | 3/2019 |
| CN | 109574381 A | 4/2019 |
| CN | 109745962 A | 5/2019 |
| CN | 110127892 A | 8/2019 |
| CN | 110270354 A | 9/2019 |
| CN | 107082856 B | 10/2019 |
| CN | 107200675 B | 10/2019 |
| CN | 110342728 A | 10/2019 |
| CN | 110845299 A | 2/2020 |
| CN | 111013554 A | 4/2020 |
| CN | 210237339 U | 4/2020 |
| CN | 111530510 A | 8/2020 |
| CN | 1115875503 A | 8/2020 |
| CN | 108101735 B | 9/2020 |
| CN | 110646526 B | 9/2020 |
| CN | 111632610 A | 9/2020 |
| CN | 111632611 A | 9/2020 |
| CN | 107416943 B | 10/2020 |
| CN | 111825151 A | 10/2020 |
| CN | 111825255 A | 10/2020 |
| CN | 211645087 U | 10/2020 |
| CN | 112371143 A | 2/2021 |
| CN | 109589971 B | 3/2021 |
| CN | 212741032 U | 3/2021 |
| CN | 112608494 A | 4/2021 |
| CN | 112666303 A | 4/2021 |
| CN | 107986379 B | 5/2021 |
| CN | 112079364 B | 5/2021 |
| CN | 109759116 B | 6/2021 |
| CN | 113044910 A | 6/2021 |
| CN | 111170402 B | 7/2021 |
| CN | 113070102 A | 7/2021 |
| CN | 113072223 A | 7/2021 |
| CN | 113135608 A | 7/2021 |
| CN | 113173609 A | 7/2021 |
| CN | 111252859 B | 8/2021 |
| CN | 113209945 A | 8/2021 |
| CN | 110327853 B | 9/2021 |
| CN | 113351167 A | 9/2021 |
| CN | 113351238 A | 9/2021 |
| CN | 113371780 A | 9/2021 |
| CN | 113376262 A | 9/2021 |
| CN | 113385144 A | 9/2021 |
| CN | 113402013 A | 9/2021 |
| CN | 113563192 A | 10/2021 |
| CN | 113735346 A | 12/2021 |
| CN | 113735397 A | 12/2021 |
| CN | 113772908 A | 12/2021 |
| CN | 113893699 A | 1/2022 |
| CN | 113908816 A | 1/2022 |

(56) References Cited

FOREIGN PATENT DOCUMENTS

| | | | |
|---|---|---|---|
| CN | 110726780 B | 2/2022 |
| CN | 112226256 B | 3/2022 |
| CN | 114100603 A | 3/2022 |
| CN | 114162918 A | 3/2022 |
| CN | 216093609 U | 3/2022 |
| CN | 113294969 B | 4/2022 |
| CN | 216513176 U | 5/2022 |
| CN | 111170835 B | 6/2022 |
| CN | 112551778 B | 6/2022 |
| CN | 113173621 B | 6/2022 |
| CN | 114620799 A | 6/2022 |
| CN | 114715980 A | 7/2022 |
| CN | 115028249 A | 9/2022 |
| CN | 115093307 A | 9/2022 |
| CN | 115140878 A | 10/2022 |
| CN | 115231649 A | 10/2022 |
| CN | 118139701 A | 10/2022 |
| CN | 111333502 B | 11/2022 |
| CN | 112429800 B | 11/2022 |
| CN | 115259301 A | 11/2022 |
| CN | 115286077 A | 11/2022 |
| CN | 115321635 B | 11/2022 |
| CN | 115386136 A | 11/2022 |
| CN | 115414914 A | 12/2022 |
| CN | 115646446 A | 1/2023 |
| CN | 111841499 B | 2/2023 |
| CN | 114134342 B | 3/2023 |
| CN | 114832777 B | 3/2023 |
| CN | 115739043 A | 3/2023 |
| CN | 115739047 A | 3/2023 |
| CN | 115819831 A | 3/2023 |
| CN | 115845421 A | 3/2023 |
| CN | 114715978 B | 4/2023 |
| CN | 115926158 A | 4/2023 |
| CN | 115926247 A | 4/2023 |
| CN | 115947339 A | 4/2023 |
| CN | 115957635 A | 4/2023 |
| CN | 116002802 A | 4/2023 |
| CN | 116020413 A | 4/2023 |
| CN | 113072192 B | 5/2023 |
| CN | 114307941 B | 5/2023 |
| CN | 115155629 B | 5/2023 |
| CN | 116037191 A | 5/2023 |
| CN | 116143228 A | 5/2023 |
| CN | 116177711 | * 5/2023 | ................ C02F 1/32 |
| CN | 116177711 A | 5/2023 |
| CN | 111569856 B | 6/2023 |
| CN | 113351238 B | 8/2023 |
| CN | 114618443 B | 8/2023 |
| CN | 114715980 B | 8/2023 |
| CN | 114873694 B | 8/2023 |
| CN | 115231649 B | 9/2023 |
| CN | 116573711 B | 10/2023 |
| CN | 116870861 A | 10/2023 |
| CN | 116874034 A | 10/2023 |
| CN | 116920887 A | 10/2023 |
| CN | 116966918 A | 10/2023 |
| CN | 113426430 B | 11/2023 |
| CN | 115321635 B | 11/2023 |
| CN | 116675285 B | 11/2023 |
| CN | 117123208 A | 11/2023 |
| CN | 117181211 A | 12/2023 |
| CN | 117339633 A | 1/2024 |
| CN | 117339634 A | 1/2024 |
| CN | 117550673 A | 2/2024 |
| CN | 115554999 B | 3/2024 |
| CN | 117658829 A | 3/2024 |
| CN | 117682604 A | 3/2024 |
| CN | 117756242 A | 3/2024 |
| CN | 115677454 B | 4/2024 |
| CN | 117619352 B | 4/2024 |
| CN | 117920217 A | 4/2024 |
| CN | 115140878 B | 5/2024 |
| CN | 115926158 B | 5/2024 |
| CN | 118002208 A | 5/2024 |
| CN | 115947339 B | 6/2024 |
| CN | 118150791 A | 6/2024 |
| CN | 118184622 A | 6/2024 |
| CN | 114100603 B | 7/2024 |
| CN | 117105320 B | 7/2024 |
| CN | 117886425 B | 7/2024 |
| CN | 118307121 A | 7/2024 |
| CN | 118373438 A | 7/2024 |
| CN | 118491532 A | 8/2024 |
| CN | 118491540 A | 8/2024 |
| CN | 118598267 A | 9/2024 |
| CN | 118598271 A | 9/2024 |
| DE | 1468451 B1 | 1/1970 |
| DE | 160718 A1 | 2/1984 |
| DE | 10202013017 A1 | 5/2022 |
| EP | 151697 B1 | 11/1988 |
| EP | 744210 A1 | 11/1996 |
| EP | 822170 B1 | 4/2002 |
| EP | 1568730 A1 | 8/2005 |
| EP | 3856399 A1 | 8/2021 |
| EP | 4277723 A1 | 11/2023 |
| EP | 3738674 B1 | 8/2024 |
| EP | 4419228 A1 | 8/2024 |
| GB | 886714 A | 1/1962 |
| JP | S62153244 A | 7/1987 |
| JP | H06220490 A | 8/1994 |
| JP | H0794401 B2 | 10/1995 |
| JP | H08309146 A | 11/1996 |
| JP | H09173773 A | 7/1997 |
| JP | H1143451 A | 2/1999 |
| JP | 2000185212 A | 7/2000 |
| JP | 2001000835 A | 1/2001 |
| JP | 2001062241 A | 3/2001 |
| JP | 2004105956 A | 4/2004 |
| JP | 2004339187 A | 12/2004 |
| JP | 3636617 B2 | 4/2005 |
| JP | 3669400 B2 | 7/2005 |
| JP | 3727551 B2 | 12/2005 |
| JP | 3791137 B2 | 6/2006 |
| JP | 3939542 B2 | 7/2007 |
| JP | 2008221113 A | 9/2008 |
| JP | 2008273863 A | 11/2008 |
| JP | 4188815 B2 | 12/2008 |
| JP | 4304398 B2 | 7/2009 |
| JP | 4485562 B2 | 6/2010 |
| JP | 2010119931 A | 6/2010 |
| JP | 2011110466 A | 6/2011 |
| JP | 5074132 B2 | 11/2012 |
| JP | 5085954 B2 | 11/2012 |
| JP | 5165861 B2 | 3/2013 |
| JP | 5256002 B2 | 8/2013 |
| JP | 2013170129 A | 9/2013 |
| JP | 5468216 B2 | 4/2014 |
| JP | 2014104454 A | 6/2014 |
| JP | 2016036772 A | 3/2016 |
| JP | 6167254 B1 | 7/2017 |
| JP | 2019195758 A | 11/2019 |
| JP | 2020006324 A | 1/2020 |
| JP | 2023026292 A | 2/2023 |
| JP | 2024030815 A | 3/2024 |
| KR | 960041326 A | 12/1996 |
| KR | 100480503 B1 | 4/2005 |
| KR | 100536479 B1 | 12/2005 |
| KR | 100702349 B1 | 4/2007 |
| KR | 100801265 B1 | 2/2008 |
| KR | 20090067670 A | 6/2009 |
| KR | 20100088310 A | 8/2010 |
| KR | 100986675 B1 | 10/2010 |
| KR | 20110065158 A | 6/2011 |
| KR | 101092866 B1 | 12/2011 |
| KR | 101102230 B1 | 1/2012 |
| KR | 101328700 B1 | 11/2013 |
| KR | 20140085674 A | 7/2014 |
| KR | 101488300 B1 | 1/2015 |
| KR | 101552538 B1 | 9/2015 |
| KR | 101573052 B1 | 12/2015 |
| KR | 101638325 B1 | 7/2016 |
| KR | 101665037 B1 | 10/2016 |
| KR | 101811340 B1 | 12/2017 |

(56) References Cited

FOREIGN PATENT DOCUMENTS

| | | |
|---|---|---|
| KR | 101949478 B1 | 2/2019 |
| KR | 102068318 B1 | 1/2020 |
| KR | 20200092068 A | 8/2020 |
| KR | 102164059 B1 | 10/2020 |
| KR | 102229027 B1 | 3/2021 |
| KR | 102248261 B1 | 5/2021 |
| KR | 102284143 B1 | 7/2021 |
| KR | 102377982 B1 | 3/2022 |
| KR | 102432367 B1 | 8/2022 |
| KR | 102476223 B1 | 12/2022 |
| KR | 102485993 B1 | 1/2023 |
| KR | 102497527 B1 | 2/2023 |
| PL | 439336 A1 | 5/2023 |
| RU | 2142261 C1 | 12/1999 |
| RU | 2178779 C2 | 1/2002 |
| RU | 2276596 C1 | 5/2006 |
| TH | 27336 A | 12/1997 |
| TH | 9874 B | 10/2000 |
| WO | 1987002995 A1 | 5/1987 |
| WO | 1993009833 A1 | 5/1993 |
| WO | 1998051403 A1 | 11/1998 |
| WO | 0072959 A1 | 12/2000 |
| WO | 0208492 A1 | 1/2002 |
| WO | 2004024320 A1 | 3/2004 |
| WO | 2016091159 A1 | 6/2016 |
| WO | 2019040979 A1 | 3/2019 |
| WO | 2019102394 A1 | 5/2019 |
| WO | 2019169177 A1 | 9/2019 |
| WO | 2020023993 A1 | 2/2020 |
| WO | 2020041712 A1 | 2/2020 |
| WO | 2020068538 A1 | 4/2020 |
| WO | 2020089192 A1 | 5/2020 |
| WO | 2020113004 A1 | 6/2020 |
| WO | 2020168385 A1 | 8/2020 |
| WO | 2020172132 A1 | 8/2020 |
| WO | 2020180513 A1 | 9/2020 |
| WO | 2020181141 A1 | 9/2020 |
| WO | 2020186795 A1 | 9/2020 |
| WO | 2020206317 A1 | 10/2020 |
| WO | 2020208928 A1 | 10/2020 |
| WO | 2020223396 A1 | 11/2020 |
| WO | 2020243510 A1 | 12/2020 |
| WO | 2020247029 A1 | 12/2020 |
| WO | 2020260487 A1 | 12/2020 |
| WO | 2020260702 A1 | 12/2020 |
| WO | 2021033596 A1 | 2/2021 |
| WO | 2021042175 A1 | 3/2021 |
| WO | 2021084119 A1 | 5/2021 |
| WO | 2021091840 A1 | 5/2021 |
| WO | 2021143433 A1 | 7/2021 |
| WO | 2021151195 A1 | 8/2021 |
| WO | 2021162914 A1 | 8/2021 |
| WO | 2021168462 A1 | 8/2021 |
| WO | 2021195141 A1 | 9/2021 |
| WO | 2021209774 A1 | 10/2021 |
| WO | 2021218570 A1 | 11/2021 |
| WO | 2021239771 A1 | 12/2021 |
| WO | 2021242353 A2 | 12/2021 |
| WO | 2021257131 A1 | 12/2021 |
| WO | 2021257946 A1 | 12/2021 |
| WO | 2022015462 A2 | 1/2022 |
| WO | 2022015832 A1 | 1/2022 |
| WO | 2022018613 A1 | 1/2022 |
| WO | 2022036198 A1 | 2/2022 |
| WO | 2022082041 A1 | 4/2022 |
| WO | 2022109392 A1 | 5/2022 |
| WO | 2022115429 A1 | 6/2022 |
| WO | 2022118524 A1 | 6/2022 |
| WO | 2022140331 A1 | 6/2022 |
| WO | 2022155271 A1 | 7/2022 |
| WO | 2022159661 A1 | 7/2022 |
| WO | 2022167958 A1 | 8/2022 |
| WO | 2022169859 A1 | 8/2022 |
| WO | 2022212165 A1 | 10/2022 |
| WO | 2022217152 A1 | 10/2022 |
| WO | 2022221256 A1 | 10/2022 |
| WO | 2022256863 A1 | 12/2022 |
| WO | 2022271979 A1 | 12/2022 |
| WO | 2023287675 A1 | 1/2023 |
| WO | 2023287893 A1 | 1/2023 |
| WO | 2023018789 A1 | 2/2023 |
| WO | 2023034274 A1 | 3/2023 |
| WO | 2023059656 A1 | 4/2023 |
| WO | 2023065039 A1 | 4/2023 |
| WO | 2023073123 A1 | 5/2023 |
| WO | 2023076688 A1 | 5/2023 |
| WO | 2023229682 A1 | 11/2023 |
| WO | 2025225076 A1 | 10/2025 |

OTHER PUBLICATIONS

English translation of publication CN 111530510A, published Aug. 14, 2020 (Year: 2020), provided by USPTO on May 15, 2025 in U.S. Appl. No. 19/175,661.

English translation of publication CN 111587503A, published Aug. 25, 2020 (Year: 2020), provided by USPTO on May 15, 2025 in U.S. Appl. No. 19/175,661.

Tow, Emily W. et al. "Managing and treating per- and polyfluoroalkyl substances (PFAS) in membrane concentrates," AWWA Water Science, vol. 3, No. 5, Sep. 1, 2021, pp. 1-23, XP093085310.

International Search Report and Written Opinion for PCT Application No. PCT/US2025/011049 mailed May 15, 2025 (12 pages).

International Search Report and Written Opinion for PCT Application No. PCT/US2025/01183 mailed May 19, 2025 (12 pages).

Machine generated translation of JP-2016036772-A provided by USPTO on May 6, 2025 in U.S. Appl. No. 18/771,183 (14 pages).

Gagliano, Erica et al. "Removal of poly- and perfluoroalkyl substances (PFAS) from water by adsorption: Role of PFAS chain length, effect of organic matter and challenges in adsorbent regeneration," Water Research, vol. 171, Mar. 15, 2020, 115381.

McCleaf, Philip et al. "Removal efficiency of multiple poly- and perfluoroalkyl substances (PFASs) in drinking water using granular activated carbon (GAC) and anion exchange (AE) column tests," Water Research, vol. 120, Sep. 1, 2017, pp. 77-87.

Eschauzier, Christian et al. "Impact of Treatment Processes on the Removal of Perfluoroalkyl Acids from the Drinking Water Production Chain," Environmental Science & Technology, vol. 46, Issue 3, Dec. 22, 2011.

Ateia, Mohamed et al. "Rapid Removal of Poly- and Perfluorinated Alkyl Substances by Poly(ethylenimine)-Functionalized Cellulose Microcrystals at Environmentally Relevant Conditions," Environmental Science & Technology Letters, vol. 5, Issue 12, Nov. 7, 2018.

Ren, Zhongfei et al. "Reductive degradation of perfluorooctanoic acid in complex water matrices by using the UV/sulfite process," vol. 205, Oct. 15, 2021, 117676.

Jiang, Linke et al. "Removal of Per- and Polyfluoroalkyl Substances by Electron Beam and Plasma Irradiation: A Mini-Review," Water 2022, 14(11), 1684.

Marquinez-Marquinez, Angelo Noe et al. "Recent advances in the remediation of perfluoroalkylated and polyfluoroalkylated contaminated sites," Environmental Research, vol. 219, Feb. 15, 2023, 115152.

Cardoso, Ines M.F. et al. "Nanomaterial-Based Advanced Oxidation/Reduction Processes for the Degradation of PFAS," Nanomaterials (Basel). May 18, 2023;13(10):1668.

Garg, Anushka et al. "Treatment technologies for removal of per- and polyfluoroalkyl substances (PFAS) in biosolids," Chemical Engineering Journal, vol. 453, Part 2, Feb. 1, 2023, 139964.

Wang, Ri et al. "Evaluating the Removal of Per- and Polyfluoroalkyl Substances from Contaminated Groundwater with Different Adsorbents Using a Suspect Screening Approach," Environmental Science & Technology Letters, vol. 7, Issue 12, Oct. 19, 2020.

Ren, Zhongfei et al. "Combination of adsorption/desorption and photocatalytic reduction processes for PFOA removal from water by using an aminated biosorbent and a UV/sulfite system," Environmental Research vol. 228, Jul. 1, 2023, 115930.

(56) References Cited

OTHER PUBLICATIONS

Fang, Yida et al. "Removal and destruction of perfluoroalkyl ether carboxylic acids (PFECAs) in an anion exchange resin and electrochemical oxidation treatment train," Water Research, vol. 230, Feb. 15, 2023, 119522.

Hao, Shilai et al. "Hydrothermal Alkaline Treatment for Destruction of Per- and Polyfluoroalkyl Substances in Aqueous Film-Forming Foam," Environmental Science & Technology, vol. 55, Issue 5, 3283-3295.

McCleaf, Philip et al. "Foam fractionation removal of multiple per- and polyfluoroalkyl substances from landfill leachate," AWWA Water Science, vol. 3, Issue 5, e1238, Sep. 12, 2021.

Wang, Mingran et al. "Removal of PFASs from water by carbon-based composite photocatalysis with adsorption and catalytic properties: A review," Science of The Total Environment, vol. 836, Aug. 25, 2022, 155652.

Broman, Julia et al. "Destruction of Per- and Polyfluoroalkyl Substances (PFAS) via Lacasse Enzymatic Degradation and Electrochemical Advanced Oxidation," 2021 Waste-management Education Research Conference (WERC), Las Cruces, NM, USA, 2021, pp. 1-10.

Kim, Minjung et al. "Destruction of Per- and Polyfluoroalkyl Substances using UVC and Boron Nitride," 2021 Waste-management Education Research Conference (WERC), Las Cruces, NM, USA, 2021, pp. 1-7.

Saleh, Navid B. et al. "Removal of poly- and per-fluoroalkyl substances from aqueous systems by nano-enabled water treatment strategies," Environmental Science: Water Research & Technology, 2019,5, 198-208.

Su, Shu et al. "Absorption and elimination of per and polyfluoroalkyl substances substitutes in salmonid species after pre-fertilization exposure," Science of The Total Environment, vol. 814, Mar. 25, 2022, 152547.

Ambaye, T.G. et al. "Recent progress and challenges on the removal of per- and poly-fluoroalkyl substances (PFAS) from contaminated soil and water," Environmental Science & Pollution Research, Jun. 27, 2022, vol. 29, pp. 58405-58428.

Riegel, Marcel et al. "Sorptive removal of short-chain perfluoroalkyl substances (PFAS) during drinking water treatment using activated carbon and anion exchanger," Environmental Sciences Europe, 35, Article No. 12, Feb. 15, 2023.

Wang, Pei et al. "Removal of perfluoalkyl acids (PFAAs) through fluorochemical industrial and domestic wastewater treatment plants and bioaccumulation in aquatic plants in river and artificial wetland," Environmental International, vol. 129, Aug. 2019, pp. 76-85.

Yin, Tingru et al. "Perfluoroalkyl and polyfluoroalkyl substances removal in a full-scale tropical constructed wetland system treating landfill leachate," Water Research, vol. 125, Nov. 15, 2017, pp. 418-426.

Xiao, Feng et al. "Thermal Phase Transition and Rapid Degradation of Forever Chemicals (PFAS) in Spent Media Using Induction Heating," ACS ES&T Engineering, Apr. 26, 2023, 3, 9, 1370-1380.

Lewis, Asa J. et al. "Rapid degradation of PFAS in aqueous solutions by reverse vortex flow gliding arc plasma," Environmental Science: Water Research & Technology, Issue 4, 2020.

Zeidabadi, Fatemeh Asadi et al. "Effects of water matrix on per- and poly-fluoroalkyl substances (PFAS) treatment: Physical-separation and degradation processes—A review," Journal of Hazardous Materials Advances, vol. 10, May 2023, 100322.

Parenky, Akshay Chandrashekar et al. "Removal of Perfluorooctanesulfonic Acid in Water by Combining Zerovalent Iron Particles with Common Oxidants," Environmental Engineering Science, vol. 37, No. 7, Jul. 14, 2020.

Isowamwen, Osakpolo et al. "Plasma-Assisted Degradation of Short-Chain Poly- and Perfluoroalkyl Substances (Pfas): Perfluorobutane Sulfonate (Pfbs)," Jul. 16, 2022, 27 pages, Isowamwen, Osakpolo and Li, Rui and Holsen, Thomas and Mededovic Thagard, Selma, Plasma-Assisted Degradation of Short-Chain Poly- and Perfluoroalkyl Substances (Pfas): Perfluorobutane Sulfonate (Pfbs). Available at SSRN: https://ssrn.com/abstract=4161658.

Leung, Shui Cheung Edgar et al. "Emerging technologies for PFOS/PFOA degradation and removal: A review," Science of the Total Environment, vol. 827, Jun. 25, 2022, 153669.

Jin, Tonghui et al. "Membrane-based technologies for per- and poly-fluoroalkyl substances (PFASs) removal from water: Removal mechanisms, applications, challenges and perspectives," Environmental International, vol. 157, Dec. 2021, 106876.

Barisci, Sibel et al. "Occurrence and removal of poly/perfluoroalkyl substances (PFAS) in municipal and industrial wastewater treatment plants," Water Sci Technology, Nov. 9, 2021, 84 (12): 3442-3468.

Araujo, Rafael G. "Detection and Tertiary Treatment Technologies of Poly-and Perfluoroalkyl Substances in Wastewater Treatment Plants," Front. Environ. Sci., Apr. 28, 2022, Sec. Water and Wastewater Management, vol. 10.

Lutze, Holger V. et al. "Degradation of perfluorinated compounds by sulfate radicals—New mechanistic aspects and economical considerations," Water Research, vol. 129, Feb. 1, 2018, pp. 509-519.

Kulkarni, Poonam R. "Process to separate per- and polyfluoroalkyl substances from water using colloidal gas aphrons," Remediation Journalvol. 32, Issue 3 p. 167-176, Apr. 15, 2022.

Liu, Yang et al. "Periodically reversing electrocoagulation technique for efficient removal of short-chain perfluoroalkyl substances from contaminated groundwater around a fluorochemical facility," Chemosphere, vol. 334, Sep. 2023, 138953.

Narimani, Milad et al. "A Detailed Chemical Kinetic Model for the Destruction of Per- and Polyfluoroalkyl Substances (PFAS): Pyrolysis and Incineration of Short-Chain Perfluorinated Carboxylic and Sulfonic Acids," Chemical Engineering and Industrial Chemistry, Dec. 8, 2022, Version 1.

Franke, Vera et al. "Removal of per- and polyfluoroalkyl substances (PFASs) from tap water using heterogeneously catalyzed ozonation," Environ. Sci.: Water Res. Technol., 2019, 5, 1887-1896.

Ramos, Pia et al. "Enhanced removal of per- and polyfluoroalkyl substances in complex matrices by polyDADMAC-coated regenerable granular activated carbon," Environmental Pollution, vol. 294, Feb. 1, 2022, 118603.

De Souza, Naomi Gevaerd et al. "Removal of perfluoroalkyl and polyfluoroalkyl substances in water and water/soil slurry using Fe0-modified reactive activated carbon conjugated with persulfate," Water Environment Research, vol. 94, Issue 1 e1671, Dec. 1, 2021.

Burns, David J. "PFAS removal from groundwaters using Surface-Active Foam Fractionation," Remediation, 1-15.

Rodowa, Alix E. et al. "Pilot scale removal of per- and polyfluoroalkyl substances and precursors from AFFF-impacted groundwater by granular activated carbon," Environmental Science: Water Research & Technology, Issue 4, 2020.

Bamdad, Hanieh et al. "High-Temperature Pyrolysis for Elimination of Per- and Polyfluoroalkyl Substances (PFAS) from Biosolids," Processes 2022, 10, 2187.

Verma, Sanny et al. "Remediation and mineralization processes for per- and polyfluoroalkyl substances (PFAS) in water: A review," Science of The Total Environment, vol. 794, Nov. 10, 2021, 148987.

Wang, Yuhan et al. "Removal of perfluorooctanoic acid by MWCNT-modified carbon-doped titanium dioxide in a peroxymonosulfate/simulated sunlight system," Applied Surface Science, vol. 614, Mar. 30, 2023, 156251.

Ochoa-Herrera, Valeria et al. "Removal of perfluorinated surfactants by sorption onto granular activated carbon, zeolite and sludge," Chemosphere, vol. 72, Issue 10, Aug. 2008, pp. 1588-1593.

Tang, Heqing et al. "Efficient degradation of perfluorooctanoic acid by UV-Fenton process," Chemical Engineering Journal, vol. 184, Mar. 1, 2012, pp. 156-162.

Tan, Xiao et al. "Amphiphilic Perfluoropolyether Copolymers for the Effective Removal of Polyfluoroalkyl Substances from Aqueous Environments," Macromolecules, Mar. 16, 2021, 54, 7, 3447-3457.

Murray, Conner C. "Removal of per- and polyfluoroalkyl substances using super-fine powder activated carbon and ceramic membrane filtration," Journal of Hazardous Materials, vol. 366, Mar. 15, 2019, pp. 160-168.

Patterson, Craig et al. "Effectiveness of point-of-use/point-of-entry systems to remove per- and polyfluoroalkyl substances from drinking water," AWWA Water Science, vol. 1, Issue 2, e1131, Mar. 18, 2019.

(56) References Cited

OTHER PUBLICATIONS

Cui, Junkui et al. "Destruction of Per- and Polyfluoroalkyl Substances (PFAS) with Advanced Reduction Processes (ARPs): A Critical Review," Environmental Science & Technology, vol. 54, Issue 7, Mar. 12, 2020.

Qu, Yan et al. "Photo-reductive defluorination of perfluorooctanoic acid in water," Water Research, vol. 44, Issue 9, May 2010, pp. 2939-2947.

Gu, Yurong et al. "Hydrated electron based decomposition of perfluorooctane sulfonate (PFOS) in the VUV/sulfite system," Science of The Total Environment, vols. 607-608, Dec. 31, 2017, pp. 541-548.

Liu, Zekun et al. "Near-Quantitative Defluorination of Perfluorinated and Fluorotelomer Carboxylates and Sulfonates with Integrated Oxidation and Reduction," Environmental Science & Technology, vol. 55, Issue 10, May 5, 2021.

Tenorio, Raul et al. "Destruction of Per- and Polyfluoroalkyl Substances (PFASs) in Aqueous Film-Forming Foam (AFFF) with UV-Sulfite Photoreductive Treatment," Environmental Science & Technology, vol. 54, Issue 11, Apr. 28, 2020.

Trojanowicz, Marek et al. "Advanced Oxidation/Reduction Processes treatment for aqueous perfluorooctanoate (PFOA) and perfluorooctanesulfonate (PFOS)—A review of recent advances," Chemical Engineering Journal, vol. 336, Mar. 15, 2018, pp. 170-199.

Trojanowicz, Marek et al. "A survey of analytical methods employed for monitoring of Advanced Oxidation/Reduction Processes for decomposition of selected perfluorinated environmental pollutants," Talanta, vol. 177, Jan. 15, 2018, pp. 122-141.

Sun, Zhuyu et al. "Impact of humic acid on the photoreductive degradation of perfluorooctane sulfonate (PFOS) by UV/Iodide process," Water Research, vol. 127, Dec. 15, 2017, pp. 50-58.

Dixit, Fuhar et al. "Removal of legacy PFAS and other fluorotelomers: Optimized regeneration strategies in DOM-rich waters," Water Research, vol. 183, Sep. 15, 2020, 116098.

Hernandez, Erik T. et al. "Proteins as adsorbents for PFAS removal from water," Environmental Science: Water Research & Technology, Issue 6, 2022.

Liu, Na et al. "Efficient adsorptive removal of short-chain perfluoroalkyl acids using reed straw-derived biochar (RESCA)," Science of The Total Environment, vol. 798, Dec. 1, 2021, 149191.

Arslan, Muhammad et al. "Removal of per- and poly-fluoroalkyl substances (PFASs) by wetlands: Prospects on plants, microbes and the interplay," Science of The Total Environment, vol. 800, Dec. 15, 2021, 149570.

Singh, Raj Kamal et al. "Removal of Poly- and Per-Fluorinated Compounds from Ion Exchange Regenerant Still Bottom Samples in a Plasma Reactor," Environmental Science & Technology, vol. 54, Issue 21, Oct. 25, 2020.

Zhang, Weilan et al. "Removal of eight perfluoroalkyl acids from aqueous solutions by aeration and duckweed," Science of The Total Environment, vol. 724, Jul. 1, 2020, 138357.

Lu, Dingnan et al. "Treatment train approaches for the remediation of per- and polyfluoroalkyl substances (PFAS): A critical review," Journal of Hazardous Materials, vol. 386, Mar. 15, 2020, 121963.

Lin, Hui et al. "Electrochemical degradation of perfluorooctanoic acid (PFOA) by Ti/SnO2—Sb, Ti/SnO2—Sb/PbO2 and Ti/SnO2—Sb/MnO2 anodes," Water Research, vol. 46, Issue 7, May 1, 2012, pp. 2281-2289.

Deng, Shubo et al. "Removal of perfluorooctane sulfonate from wastewater by anion exchange resins: Effects of resin properties and solution chemistry," Water Research, vol. 44, Issue 18, Oct. 2010, pp. 5188-5195.

Gao, Yanxin et al. "Adsorptive removal of emerging polyfluoroalky substances F-53B and PFOS by anion-exchange resin: A comparative study," Journal of Hazardous Materials, vol. 323, Part A, Feb. 5, 2017, pp. 550-557.

Chen, Ying-chu et al. "Effects of titanate nanotubes synthesized by a microwave hydrothermal method on photocatalytic decomposition of perfluorooctanoic acid," Water Research, vol. 45, Issue 14, Aug. 2011, pp. 4131-4140.

Du, Ziwen et al. "Removal of perfluorinated carboxylates from washing wastewater of perfluorooctanesulfonyl fluoride using activated carbons and resins," Journal of Hazardous Materials, vol. 286, Apr. 9, 2015, pp. 136-143.

Wang, Jiaxuan et al. "Perfluorooctane sulfonate and perfluorobutane sulfonate removal from water by nanofiltration membrane: The roles of solute concentration, ionic strength, and macromolecular organic foulants," Chemical Engineering Journal, vol. 332, Jan. 15, 2018, pp. 787-797.

Zhang, Jianhua et al. "Study of MOF incorporated dual layer membrane with enhanced removal of ammonia and per-/polyfluoroalkyl substances (PFAS) in landfill leachate treatment," Science of The Total Environment, vol. 806, Part 4, Feb. 1, 2022, 151207.

Hori, Hisao et al. "Photochemical decomposition of environmentally persistent short-chain perfluorocarboxylic acids in water mediated by iron(II)/(III) redox reactions," Chemosphere, vol. 68, Issue 3, Jun. 2007, pp. 572-578.

Qian, Yajie et al. "Perfluorooctanoic Acid Degradation Using UV-Persulfate Process: Modeling of the Degradation and Chlorate Formation," Environmental Science & Technology, vol. 50, Issue 2, Dec. 21, 2015, pp. 772-781.

Ohno, Masaki et al. "Photochemical decomposition of perfluorooctanoic acid mediated by iron in strongly acidic conditions," Journal of Hazardous Materials, vol. 268, Mar. 15, 2014, pp. 150-155.

Wang, Yuan et al. "Ferric ion mediated photochemical decomposition of perfluorooctanoic acid (PFOA) by 254 nm UV light," Journal of Hazardous Materials, vol. 160, Issue 1, Dec. 15, 2008, pp. 181-186.

Wang, Yuan et al. "Effects of pH on photochemical decomposition of perfluorooctanoic acid in different atmospheres by 185 nm vacuum ultraviolet," Journal of Environmental Sciences, vol. 26, Issue 11, Nov. 1, 2014, pp. 2207-2214.

Dillert, Ralf et al. "Light-induced degradation of perfluorocarboxylic acids in the presence of titanium dioxide," Chemosphere, vol. 67, Issue 4, Mar. 2007, pp. 785-792.

Flores, Cintia et al. "Occurrence of perfluorooctane sulfonate (PFOS) and perfluorooctanoate (PFOA) in N.E. Spanish surface waters and their removal in a drinking water treatment plant that combines conventional and advanced treatments in parallel lines," vols. 461-462, Sep. 1, 2013, pp. 618-626.

Singh, Raj Kamal et al. "Breakdown Products from Perfluorinated Alkyl Substances (PFAS) Degradation in a Plasma-Based Water Treatment Process," Environmental Science & Technology, vol. 53, Issue 5, Feb. 15, 2019, pp. 2731-2738.

Kawano, Shintaro "Efficient Removal and Recovery of Perfluorinated Compounds from Water by Surface-tethered β-Cyclodextrins on Polystyrene Particles," CSJ Journals, 2013, vol. 42, No. 4, pp. 392-394.

Li, Zhenmin et al. "Different nanostructured In2O3 for photocatalytic decomposition of perfluorooctanoic acid (PFOA)," Journal of Hazardous Materials, vol. 260, Sep. 15, 2013, pp. 40-46.

Rostvall, Ande et al. "Removal of pharmaceuticals, perfluoroalkyl substances and other micropollutants from wastewater using lignite, Xylit, sand, granular activated carbon (GAC) and GAC+Polonite® in column tests—Role of physicochemical properties," Water Research, vol. 137, Jun. 15, 2018, pp. 97-106.

Jin, Ling et al. "Ferric ion mediated photodecomposition of aqueous perfluorooctane sulfonate (PFOS) under UV irradiation and its mechanism," Journal of Hazardous Materials, vol. 271, Apr. 30, 2014, pp. 9-15.

Lee, Yu-Chi et al. "Microwave-hydrothermal decomposition of perfluorooctanoic acid in water by iron-activated persulfate oxidation," Water Research, vol. 44, Issue 3, Feb. 2010, pp. 886-892.

Buck, Robert C. et al. "Perfluoroalkyl and Polyfluoroalkyl Substances in the Environment: Terminology, Classification, and Origins," Integr Environ Assess Manag. Jul. 25, 2011;7(4):513-541.

(56) References Cited

OTHER PUBLICATIONS

Zhuo, Quiongfang et al. "Degradation of perfluorinated compounds on a boron-doped diamond electrode," Electrochimica Acta, vol. 77, Aug. 30, 2012, pp. 17-22.

Olatunde, Olalekan et al. "Photo enhanced degradation of polyfluoroalkyl and perfluoroalkyl substances," Heliyon. Dec. 1, 2020;6(12):e05614.

Liu, Zekun et al. "Accelerated Degradation of Perfluorosulfonates and Perfluorocarboxylates by UV/Sulfite + Iodide: Reaction Mechanisms and System Efficiencies," Environ Sci Technol. Feb. 28, 2022;56(6):3699-3709.

Fennell, Benjamin D. et al. "Critical Review of UV-Advanced Reduction Processes for the Treatment of Chemical Contaminants in Water," ACS Environmental Au, vol. 2, Issue 3, Feb. 14, 2022, pp. 178-205.

Umar, Muhammad. "Reductive and Oxidative UV Degradation of PFAS—Status, Needs and Future Perspectives," Water, Nov. 11, 2021, 13(22), 3185.

Zeidabadi, Fatemeh Asadi et al. "Electrochemical degradation of PFOA and its common alternatives: Assessment of key parameters, roles of active species, and transformation pathway," Chemosphere, Feb. 2023:315:137743.

Vecitis, Chad D. et al. "Kinetics and mechanism of the sonolytic conversion of the aqueous perfluorinated surfactants, perfluorooctanoate (PFOA), and perfluorooctane sulfonate (PFOS) into inorganic products," J Phys Chem A, May 2008, 8;112(18):4261-70.

Trang, Brittany et al. "Low-temperature mineralization of perfluorocarboxylic acids," Science, Aug. 18, 2022, vol. 377, Issue 6608, pp. 839-845.

Tian, Haoting et al. "Complete Defluorination of Perfluorinated Compounds by Hydrated Electrons Generated from 3-Indole-acetic-acid in Organomodified Montmorillonite," Scientific Reports, Sep. 9, 2016, 6, 32949.

Tian, Haoting et al. "Effects of different factors on photodefluorination of perfluorinated compounds by hydrated electrons in organo-montmorillonite system," Chemosphere, vol. 191, Jan. 2018, pp. 280-287.

Chen, Zhanghao et al. "Effects of different variables on photodestruction of perfluorooctanoic acid in self-assembled micelle system," Science of The Total Environment, vol. 742, Nov. 10, 2020, 140438.

Chen, Zhanghao et al. "Highly Efficient Hydrated Electron Utilization and Reductive Destruction of Perfluoroalkyl Substances Induced by Intermolecular Interaction," Environmental Science & Technology, vol. 55, Issue 6, Feb. 26, 2021, pp. 3996-4006.

Bentel, Michael J. "Degradation of Perfluoroalkyl Ether Carboxylic Acids with Hydrated Electrons: Structure-Reactivity Relationships and Environmental Implications," Environmental Science & Technology, vol. 54, Issue 4, Jan. 30, 2020, pp. 2489-2499.

Javed, Hassan et al. "Discerning the inefficacy of hydroxyl radicals during perfluorooctanoic acid degradation," Chemosphere, vol. 247, May 2020, 125883.

Sun, Zhuyu et al. "UV/Nitrilotriacetic Acid Process as a Novel Strategy for Efficient Photoreductive Degradation of Perfluorooctanesulfonate," Environmental Science & Technology, vol. 52, Issue 5, Feb. 3, 2018, pp. 2953-2962.

Lyu, Xian-Jin et al. "Insights into perfluorooctane sulfonate photodegradation in a catalyst-free aqueous solution," Scientific Reports, Mar. 23, 2015, 5, 9353.

Maza, William A. et al. "Nanosecond Transient Absorption of Hydrated Electrons and Reduction of Linear Perfluoroalkyl Acids and Sulfonates," Environmental Science & Technology Letters, vol. 8, Issue 7, Jun. 8, 2021, pp. 525-530.

Van Hoomissen, Daniel J. et al. "Early Events in the Reductive Dehalogenation of Linear Perfluoroalkyl Substances," Environmental Science & Technology Letters, vol. 6, issue 6, Apr. 10, 2019, pp. 365-371.

Da Silva-Rackov, Celyna K.O. et al. "Degradation of PFOA by hydrogen peroxide and persulfate activated by iron-modified diatomite," Applied Catalysis B: Environmental, vol. 192, Sep. 5, 2016, pp. 253-259.

Panchangam, Sri Chandana et al. "Sonication-assisted photocatalytic decomposition of perfluorooctanoic acid," Chemosphere, vol. 75, Issue 5, May 2009, pp. 654-660.

He, Xu et al. "Highly efficient simultaneous catalytic degradation and defluorination of perfluorooctanoic acid by the H2O2-carbon/MnO2 system generating O2radical dot- and radical dotOH synchronously," Applied Catalysis B: Environmental, vol. 277, Nov. 15, 2020, 119219.

Le, Thi Xuan Huong et al. "Energy-Efficient Electrochemical Oxidation of Perfluoroalkyl Substances Using a Ti4O7 Reactive Electrochemical Membrane Anode," Environmental Science & Technology Letters, vol. 6, Issue 8, Jul. 24, 2019, pp. 504-510.

Liu, Charlie J. et al. "Rejection of per- and polyfluoroalkyl substances (PFASs) in aqueous film-forming foam by high-pressure membranes," Water Research, vol. 188, Jan. 1, 2021, 116546.

Lenka, Swadhina Priyadarshini et al. "A review of the occurrence, transformation, and removal of poly- and perfluoroalkyl substances (PFAS) in wastewater treatment plants," Water Research, vol. 199, Jul. 1, 2021, 117187.

Ross, Ian et al. "A review of emerging technologies for remediation of PFASs," Remediation Journalvol. 28, Issue 2 p. 101-126.

Das, Suman et al. "A Review on Removal and Destruction of Per- and Polyfluoroalkyl Substances (PFAS) by Novel Membranes," Membranes (Basel). Jun. 27, 2022;12(7):662.

Zango, Zakariyya Uba et al. "A review on superior advanced oxidation and photocatalytic degradation techniques for perfluorooctanoic acid (PFOA) elimination from wastewater," Environmental Research, vol. 221, Mar. 15, 2023, 115326.

Bolan, Nanthi et al. "Remediation of poly- and perfluoroalkyl substances (PFAS) contaminated soils—To mobilize or to immobilize or to degrade?" J Hazard Mater. Sep. 9, 2020;401:123892.

Zhu, Jiawen et al. "Juncus sarophorus, a native Australian species, tolerates and accumulates PFOS, PFOA and PFHxS in a glasshouse experiment," Sci Total Environ, Jun. 20, 2022:826:154184.

Guo, Hao et al. "Nanofiltration for drinking water treatment: a review," Nov. 26, 2021, vol. 16, pp. 681-698.

Duinslaeger, Nick et al. "Electrochemical degradation of per- and polyfluoroalkyl substances (PFAS) using low-cost graphene sponge electrodes," Water Research, vol. 213, Apr. 15, 2022, 118148.

Aung, Myat Thandar et al. "Leveraging DOM UV absorbance and fluorescence to accurately predict and monitor short-chain PFAS removal by fixed-bed carbon adsorbers," Water Research, vol. 213, Apr. 15, 2022, 118146.

Santiago, Anaira Roman et al. "Electrochemical remediation of perfluoroalkyl substances from water," Electrochimica Acta, vol. 403, Jan. 20, 2022, 139635.

Liu, Chen et al. "In-situ sequestration of perfluoroalkyl substances using polymer-stabilized ion exchange resin," J Hazard Mater. Jan. 15, 2022:422:126960.

Thoma, Eben D. et al. "Pyrolysis processing of PFAS-impacted biosolids, a pilot study," J Air Waste Manag Assoc. Apr. 2022;72(4):309-318.

Burkhardt, Jonathan B. et al. "Modeling PFAS Removal Using Granular Activated Carbon for Full-Scale System Design," J Environ Eng (New York). 2022;148(3):1-11.

Enyoh, Christian Ebere et al. "Sorption of Per- and Polyfluoroalkyl Substances (PFAS) using Polyethylene (PE) microplastics as adsorbent: Grand Canonical Monte Carlo and Molecular Dynamics (GCMC-MD) studies," May 5, 2022, International Journal of Environmental Analytial Chemistry, vol. 104, Issue 12, pp. 2719-2735.

Xia, Chunjie et al. "Degradation of perfluoroalkyl substances using UV/Fe0 system with and without the presence of oxygen," Environ Technol. Aug. 2023;44(18):2725-2736.

Kulkarni, Poonam R. et al. "Field Demonstration of a Sonolysis Reactor for Treatment of PFAS-Contaminated Groundwater," Journal of Environmental Engineering, vol. 148, Issue 11.

Radi, Adam B. et al. "Per- and Polyfluoroalkyl Substances: Background Information with Focus on Modeling of Fate and Transport of Per- and Polyfluroalkyl Substances in Air Media," Journal of Environmental Engineering, vol. 148, Issue 6.

(56) References Cited

OTHER PUBLICATIONS

Zhang, Cheng et al. "Biological Utility of Fluorinated Compounds: from Materials Design to Molecular Imaging, Therapeutics and Environmental Remediation," Chemical Reviews, vol. 122, Issue 1, Oct. 5, 2021, pp. 167-208.
Duong, Thi Huyen et al. "Lab experiments on hybridization of managed aquifer recharge with river water via sand column, pre-oxidation, and nanofiltration," Chemosphere, vol. 287, Part 3, Jan. 2022, 132350.
Li, Yuna et al. "Occurrence of legacy and emerging poly- and perfluoroalkyl substances in water: A case study in Tianjin (China)," Chemosphere, . Jan. 2022;287(Pt 4):132409.
Zhang, Zhiming et al. "Biodegradation of per- and polyfluoroalkyl substances (PFAS): A review," Bioresource Technology, vol. 344, Part B, Jan. 2022, 126223.
Zhang, Weilan et al. "Hydrothermal liquefaction of sewage sludge—effect of four reagents on relevant parameters related to biocrude and PFAS," Journal of Environmental Chemical Engineering, vol. 10, Issue 1, Feb. 2022, 107092.
Firouzjaei, Mostafa Dadashi et al. "Chemistry, abundance, detection and treatment of per- and polyfluoroalkyl substances in water: a review," Environmental Chemistry Letters, vol. 20, Issue 1, Feb. 2022, pp. 661-679.
Kundu, Samapti et al. "Surface confinement of per-fluoroalkyl substances on an iron-decorated clay-cyclodextrin composite enables rapid oxidation by hydroxyl radicals," Chemical Engineering Journal, vol. 431, Part 2, Mar. 1, 2022, 134187.
Liang, Shangtao et al. "Field demonstration of coupling ion-exchange resin with electrochemical oxidation for enhanced treatment of per- and polyfluoroalkyl substances (PFAS) in groundwater," Chemical Engineering Journal Advances, vol. 9, Mar. 15, 2022, 100216.
Lassalle, John et al. "Degradation of PFOS and PFOA in soil and groundwater samples by high dose Electron Beam Technology," Radiation Physics and Chemistry, vol. 189, Dec. 2021, 109705.
Wang, Yuqin et al. "Selectivity of Per- and Polyfluoroalkyl Substance Sensors and Sorbents in Water," ACS Applied Materials & Interfaces, vol. 13, Issue 51, Dec. 15, 2021, pp. 60789-60814.
Kaiser, Andreas-Marius et al. "Ozone as oxidizing agent for the total oxidizable precursor (TOP) assay and as a preceding step for activated carbon treatments concerning per- and polyfluoroalkyl substance removal," Journal of Environmental Management, vol. 300, Dec. 15, 2021, 113692.
Liu, Yen-Ling et al. "Ion exchange removal and resin regeneration to treat per- and polyfluoroalkyl ether acids and other emerging PFAS in drinking water," Water Research, vol. 207, Dec. 1, 2021, 117781.
He, Haozheng et al. "Environmental occurrence and remediation of emerging organohalides: A review," Environmental Pollution, vol. 290, Dec. 1, 2021, 118060.
Uriakhil, Mohammad Angaar et al. "Per- and poly-fluoroalkyl substance remediation from soil and sorbents: A review of adsorption behaviour and ultrasonic treatment," Chemosphere, vol. 282, Nov. 2021, 131025.
Ateia, Mohamed et al. "Product analysis and insight into the mechanochemical destruction of anionic PFAS with potassium hydroxide," Journal of Hazardous Materials Advances, vol. 3, Nov. 2021, 100014.
Dietz, Rebecca et al. "Regeneration efficiency of strong-base anion exchange resin for perfluoroalkyl and polyfluoroalkyl substances," AWWA Water Science, vol. 3, Issue 6, e1259, Nov. 19, 2021.
Medina, Paola Baldaguez et al. "Emerging investigator series: electrochemically-mediated remediation of GenX using redox-copolymers," Environmental Science: Water Research & Technology, Issue 12, Sep. 30, 2021, pp. 2231-2240.
Palma, Davide et al. "PFAS Degradation in Ultrapure and Groundwater Using Non-Thermal Plasma," Molecules. Feb. 9, 2021;26(4):924.
McIntyre, Hannah et al. "Degradation and Defluorination of Aqueous Perfluorooctane Sulfonate by Silica-Based Granular Media Using Batch Reactors," Journal of Environmental Engineering, 147(11), Nov. 2021.
Eke, Joyner et al. "Dual-Functional Phosphorene Nanocomposite Membranes for the Treatment of Perfluorinated Water: An Investigation of Perfluorooctanoic Acid Removal via Filtration Combined with Ultraviolet Irradiation or Oxygenation," Membranes, vol. 11, Issue 1, 18, Dec. 25, 2020.
Dixit, Fuhar et al. "Performance of the HSDM to predict competitive uptake of PFAS, NOM and inorganic anions by suspended ion exchange processes," Environmental Science: Water Research & Technology, Issue 8, May 4, 2021, pp. 1417-1429.
Ullberg, Malin et al. "Pilot-scale removal of organic micropollutants and natural organic matter from drinking water using ozonation followed by granular activated carbon," Environmental Science: Water Research & Technology, Issue 3, Jan. 22, 2021, pp. 535-548.
Crone, Brian C. et al. "Occurrence of Per- and Polyfluoroalkyl Substances (PFAS) in Source Water and Their Treatment in Drinking Water," Crit Rev Environ Sci Technol. Jun. 2019;49(24):2359-2396.
Lo, S. et al. "Electrochemical Oxidation of Perfluorooctanoic Acid (PFOA) from Aqueous Solution using Non-Active $Ti/SnO_2$—$Sb_2O_5$/$PbO_2$ Anodes," Advances in Wastewater Treatment II, Jun. 20, 2021.
Cao, Huimin et al. "Sonochemical degradation of poly- and perfluoroalkyl substances—A review," Ultrasonics Sonochemistry, vol. 69, Dec. 2020, 105245.
Kim, Kwiyong et al. "Molecular Tuning of Redox-Copolymers for Selective Electrochemical Remediation," Advanced Functional Materials, vol. 30, Issue 52, 2004635, Sep. 16, 2020.
Ahmed, M.B. et al. "Per- and polyfluoroalkyl substances in soil and sediments: Occurrence, fate, remediation and future outlook," Sci Total Environ, Dec. 15, 2020:748:141251.
Kim, Ki Yong et al. "Perfluoroalkyl substances and pharmaceuticals removal in full-scale drinking water treatment plants," Journal of Hazardous Materials, vol. 400, Dec. 5, 2020, 123235.
Robey, Nicole M. et al. "Concentrating Per- and Polyfluoroalkyl Substances (PFAS) in Municipal Solid Waste Landfill Leachate Using Foam Separation," Environmental Science & Technology, vol. 54, Issue 19, Aug. 31, 2020, pp. 12550-12559.
Ching, Casey et al. "β-Cyclodextrin Polymers with Different Cross-Linkers and Ion-Exchange Resins Exhibit Variable Adsorption of Anionic, Zwitterionic, and Nonionic PFASs," Environmental Science & Technology, vol. 54, Issue 19, Sep. 14, 2020, pp. 12693-12702.
Del Moral, Lerys Laura et al. "Comparative removal of Suwannee River natural organic matter and perfluoroalkyl acids by anion exchange: Impact of polymer composition and mobile counterion," Water Research, vol. 178, Jul. 1, 2020, 115846.
Zhang, Weilan et al. "Destruction of Perfluoroalkyl Acids Accumulated in Typha latifolia through Hydrothermal Liquefaction," ACS Sustainable Chemistry & Engineering, vol. 8, Issue 25, Jun. 12, 2020, pp. 9257-9262.
Huang, Po-Jung et al. "Reusable Functionalized Hydrogel Sorbents for Removing Long- and Short-Chain Perfluoroalkyl Acids (PFAAs) and GenX from Aqueous Solution," ACS Omega, vol. 3, Issue 12, Dec. 17, 2018, pp. 17747-17455.
Liu, YingYing et al. "Application of zero-valent iron coupled with biochar for removal of perfluoroalkyl carboxylic and sulfonic acids from water under ambient environmental conditions," Science of The Total Environment, vol. 719, Jun. 1, 2020, 137372.
Meng, Pingping et al. "Role of the air-water interface in removing perfluoroalkyl acids from drinking water by activated carbon treatment," J Hazard Mater, Mar. 15, 2020:386:121981.
Troger, Rikard et al. "A case study of organic micropollutants in a major Swedish water source—Removal efficiency in seven drinking water treatment plants and influence of operational age of granulated active carbon filters," Sci Total Environ, Mar. 1, 2020:706:135680.
Banks, Danny et al. "Selected advanced water treatment technologies for perfluoroalkyl and polyfluoroalkyl substances: A review," Separation and Purification Technology, vol. 231, Jan. 16, 2020, 115929.

(56) References Cited

OTHER PUBLICATIONS

Meegoda, Jay N. et al. "A Review of the Applications, Environmental Release, and Remediation Technologies of Per- and Polyfluoroalkyl Substances," Int J Environ Res Public Health, Nov. 3, 2020;17(21):8117.

Aumeier, Benedikt M. et al. "Is sorption technology fit for the removal of persistent and mobile organic contaminants from water?" Science of The Total Environment, vol. 880, Jul. 1, 2023, 163343.

Kang, Yu-Gyeong et al. "Advanced destruction technologies for PFAS in soils: Progress and challenges," Current Opinion in Environmental Science & Health, vol. 33, Jun. 2023, 100459.

Yang, Bo et al. "Highly efficient electrochemical degradation of perfluorooctanoic acid (PFOA) by F-doped Ti/SnO2 electrode," Journal of Hazardous Materials, vol. 299, Dec. 15, 2015, pp. 417-424.

Gomez-Ruiz, Beatriz et al. "Efficient electrochemical degradation of poly- and perfluoroalkyl substances (PFASs) from the effluents of an industrial wastewater treatment plant," Chemical Engineering Journal, vol. 322, Aug. 15, 2017, pp. 196-204.

Thompson, Jack et al. "Removal of PFOS, PFOA and other perfluoroalkyl acids at water reclamation plants in South East Queensland Australia," Chemosphere, vol. 82, Issue 1, Jan. 2011, pp. 9-17.

Liu, Caihong et al. "Evaluating the efficiency of nanofiltration and reverse osmosis membrane processes for the removal of per- and polyfluoroalkyl substances from water: A critical review," Separation and Purification Technology, vol. 302, Dec. 1, 2022, 122161.

Zhang, Jianhua et al. "Review of influence of critical operation conditions on by-product/intermediate formation during thermal destruction of PFAS in solid/biosolids," Science of The Total Environment, vol. 854, Jan. 1, 2023, 158796.

Hu, Yuning et al. "Hydrochar coupled with iodide for efficient photodegradation of perfluorooctanoic acid and perfluorooctane sulfonic acid under ultraviolet light," Science of The Total Environment, vol. 868, Apr. 10, 2023, 161621.

Dixit, Fuhar et al. "Efficient removal of GenX (HFPO-DA) and other perfluorinated ether acids from drinking and recycled waters using anion exchange resins," Journal of Hazardous Materials, vol. 384, Feb. 15, 2020, 121261.

Guo, Chenxi et al. "Synergistic impact of humic acid on the photo-reductive decomposition of perfluorooctanoic acid," Chemical Engineering Journal, vol. 360, Mar. 15, 2019, pp. 1101-1110.

Chen, J. et al. "Photodegradation of perfluorooctanoic acid in water under irradiation of 254 nm and 185 nm light by use of persulfate," Water Sci Technol, Dec. 1, 2006, 54 (11-12): 317-325.

Bao, Jia et al. "Removal of perfluoroalkanesulfonic acids (PFSAs) from synthetic and natural groundwater by electrocoagulation," Chemosphere, vol. 248, Jun. 2020, 125951.

Zango, Zakariyya Uba et al. "An overview on human exposure, toxicity, solid-phase microextraction and adsorptive removal of perfluoroalkyl carboxylic acids (PFCAs) from water matrices," Environmental Research, vol. 231, Part 2, Aug. 15, 2023, 116102.

Kewalramani, Jitendra A. et al. "Kinetics effects of the power density and initial concentration on the sonochemical degradation of PFOS and PFOA in concentrated waste," Journal of Water Process Engineering, vol. 53, Jul. 2023, 103752.

Huang, Jiye et al. "Efficient degradation of perfluorooctanoic acid (PFOA) by photocatalytic ozonation," Chemical Engineering Journal, vol. 296, Jul. 15, 2016, pp. 329-334.

Zaggia, Alessandro et al. "Use of strong anion exchange resins for the removal of perfluoroalkylated substances from contaminated drinking water in batch and continuous pilot plants," Water Research, vol. 91, Mar. 15, 2016, pp. 137-146.

Yuan, Jie et al. "Evaluating perfluorooctanoic acid (PFOA) and perfluorooctanesulfonic acid (PFOS) removal across granular activated carbon (GAC) filter-adsorbers in drinking water treatment plants," Science of The Total Environment, vol. 838, Part 3, Sep. 10, 2022, 156406.

Belkouteb, Nadine et al. "Removal of per- and polyfluoroalkyl substances (PFASs) in a full-scale drinking water treatment plant: Long-term performance of granular activated carbon (GAC) and influence of flow-rate," Water Research, vol. 182, Sep. 1, 2020, 115913.

Bao, Yixiang et al. "Degradation of PFOA Substitute: GenX (HFPO-DA Ammonium Salt): Oxidation with UV/Persulfate or Reduction with UV/Sulfite?" Environmental Science & Technology, vol. 52, Issue 20, Sep. 12, 2018, pp. 11728-11734.

Deng, Shubo et al. "Removal of perfluorooctanoate from surface water by polyaluminium chloride coagulation," Water Research, vol. 45, Issue 4, Feb. 2011, pp. 1774-1780.

Zhang, Quiaoying et al. "Removal of perfluorooctane sulfonate from aqueous solution by crosslinked chitosan beads: Sorption kinetics and uptake mechanism," Bioresource Technology, vol. 102, Issue 3, Feb. 2011, pp. 2265-2271.

Park, Minkyu et al. "Magnetic ion-exchange (MIEX) resin for perfluorinated alkylsubstance (PFAS) removal in groundwater: Roles of atomic charges for adsorption," Water Research, vol. 181, Aug. 15, 2020, 115897.

Hang, Xiaofeng et al. "Removal and recovery of perfluorooctanoate from wastewater by nanofiltration," Separation and Purification Technology, vol. 145, May 5, 2015, pp. 120-129.

Luo, Qin et al. "Preparation, characterization and performance of poly(m-phenylene isophthalamide)/organically modified montmorillonite nanocomposite membranes in removal of perfluorooctane sulfonate," Journal of Environmental Sciences, vol. 46, Aug. 2016, pp. 126-133.

Yu, Yang et al. "Removal of perfluorooctane sulfonates from water by a hybrid coagulation-nanofiltration process," Chemical Engineering Journal, vol. 289, Apr. 1, 2016, pp. 7-16.

Franke, Vera et al. "The Price of Really Clean Water: Combining Nanofiltration with Granular Activated Carbon and Anion Exchange Resins for the Removal of Per- And Polyfluoralkyl Substances (PFASs) in Drinking Water Production," ACS ES&T Water, vol. 1, Issue 4, Jan. 29, 2021, pp. 782-795.

Li, Yueh-Feng et al. "Perfluorooctanoic acid (PFOA) removal by flotation with cationic surfactants," Chemosphere, vol. 266, Mar. 2021, 128949.

Meng, Pingping et al. "Efficient removal of perfluorooctane sulfonate from aqueous film-forming foam solution by aeration-foam collection," Chemosphere, vol. 203, Jul. 2018, pp. 263-270.

Pinkard, Brian R. "Destruction of PFAS in AFFF-impacted fire training pit water, with a continuous hydrothermal alkaline treatment reactor," Chemosphere, vol. 314, Feb. 2023, 137681.

Brede, Edna et al. "Two-year follow-up biomonitoring pilot study of residents' and controls' PFC plasma levels after PFOA reduction in public water system in Arnsberg, Germany," International Journal of Hygiene and Environmental Health, vol. 213, Issue 3, Jun. 2010, pp. 217-223.

Hara-Yamamura, Hiroe et al. "Rejection of perfluorooctanoic acid (PFOA) and perfluorooctane sulfonate (PFOS) by severely chlorine damaged RO membranes with different salt rejection ratios," Chemical Engineering Journal, vol. 446, Part 5, Oct. 15, 2022, 137398.

Lei, Xiaobo et al. "Removal of perfluorooctanoic acid via polyethyleneimine modified graphene oxide: Effects of water matrices and understanding mechanisms," Chemopshere, vol. 308, Part 2, Dec. 2022, 136379.

Wallace, Joshua S. et al. "Burning Questions: Current Practices and Critical Gaps in Evaluating Removal of Per- and Polyfluoroalkyl Substances (Pfas) During Pyrolysis Treatments of Biosolids," Feb. 24, 2023, 20 pages. Available at SSRN: https://ssrn.com/abstract=4369128.

Kumar, Ravinder et al. "Microbial and thermal treatment techniques for degradation of PFAS in biosolids: A focus on degradation mechanisms and pathways," Journal of Hazardous Materials, vol. 452, Jun. 15, 2023, 131212.

Bao, Yueping et al. "Removal of perfluorooctane sulfonate (PFOS) and perfluorooctanoate (PFOA) from water by coagulation: mechanisms and influencing factors," J Colloid Interface Sci, Nov. 15, 2014;434:59-64.

Smith, Sanne J. et al. "Foam fractionation for removal of per- and polyfluoroalkyl substances: Towards closing the mass balance," Science of The Total Environment, vol. 871, May 1, 2023, 162050.

(56) References Cited

OTHER PUBLICATIONS

Buckley, Thomas et al. "Effect of different co-foaming agents on PFAS removal from the environment by foam fractionation," Water Research, vol. 230, Feb. 15, 2023, 119532.
Abada, Bilal et al. "Photodegradation of fluorotelomer carboxylic 5:3 acid and perfluorooctanoic acid using zinc oxide," Environ Pollut, Dec. 2018;243(Pt A):637-644.
Shang, Enxiang et al. "Photocatalytic degradation of perfluorooctanoic acid over Pb—BiFeO3/rGO catalyst: Kinetics and mechanism," Chemosphere, Nov. 2018:211:34-43.
Chowdhury, Nusrat et al. "Photocatalytic degradation of perfluorooctanoic acid on Pb-doped TiO2 coated with reduced graphene oxide," Water Environ Res, May 2023;95(5):e10871.
Trautmann, A.M. et al. "Electrochemical degradation of perfluoroalkyl and polyfluoroalkyl substances (PFASs) in groundwater," Water Sci Technol, 2015;71(10):1569-75.
Roesch, Philipp et al. "Reductive Defluorination and Mechanochemical Decomposition of Per- and Polyfluoroalkyl Substances (PFASs): From Present Knowledge to Future Remediation Concepts," Int J Environ Res Public Health, Oct. 3, 2020;17(19):7242.
Yuan, Yijin et al. "Nitrate promoted defluorination of perfluorooctanoic acid in UV/sulfite system: Coupling hydrated electron/reactive nitrogen species-mediated reduction and oxidation," Environ Pollut, Nov. 15, 2022:313:120172.
Park, Kyungmin et al. "Photodegradation of perfluorooctanoic acid by graphene oxide-deposited TiO2 nanotube arrays in aqueous phase," J Environ Manage, Jul. 15, 2018:218:333-339.
Liu, Fuqiang et al. "Photodegradation of per- and polyfluoroalkyl substances in water: A review of fundamentals and applications," J Hazard Mater, Oct. 5, 2022;439:129580.
Hori, Hisao et al. "Decomposition of Environmentally Persistent Perfluorooctanoic Acid in Water by Photochemical Approaches," Environmental Science & Technology, vol. 38, Issue 22, Oct. 9, 2004, pp. 6118-6124.
Ohno, Masaki et al. "Effect of pH and Coexisting Species on the Photochemical Decomposition of Perfluorooctanoic Acid by Iron (III) Sulphate," Journal of Water and Environment Technology, vol. 10, No. 2, 2012, pp. 129-140.
Hori, Hisao et al. "Efficient Decomposition of Environmentally Persistent Perfluorocarboxylic Acids by Use of Persulfate as a Photochemical Oxidant," Environmental Science & Technology, vol. 39, Issue 7, Feb. 18, 2005, pp. 2383-2388.
Barisci, Sibel et al. "Removal of polyfluorinated telomer alcohol by Advanced Oxidation Processes (AOPs) in different water matrices and evaluation of degradation mechanisms," Journal of Water Process Engineering, vol. 39, Feb. 2021, 101745.
Liu, Dandan et al. "Perfluorooctanoic acid degradation in the presence of Fe(III) under natural sunlight," Journal of Hazardous Materials, vol. 262, Nov. 15, 2013, pp. 456-463.
Qu, Yan et al. "Effect of initial solution pH on photo-induced reductive decomposition of perfluorooctanoic acid," Chemosphere, vol. 107, Jul. 2014, pp. 218-223.
Gu, Yurong et al. "Efficient Reductive Decomposition of Perfluorooctanesulfonate in a High Photon Flux UV/Sulfite System," Environmental Science & Technology, vol. 50, Issue 19, Sep. 8, 2016, pp. 10554-10561.
Moriwaki, Hiroshi et al. "Sonochemical Decomposition of Perfluorooctane Sulfonate and Perfluorooctanoic Acid," Environmental Science & Technology, vol. 39, Issue 9, Mar. 30, 2005, pp. 3388-3392.
Colosi, Lisa M. et al. "Peroxidase-mediated degradation of perfluorooctanoic acid," Environmental Toxicology and Chemistry, vol. 28, Issue 2, Dec. 9, 2009, p. 264-271.
Appleman, Timothy D. et al. "Nanofiltration and granular activated carbon treatment of perfluoroalkyl acids," Journal of Hazardous Materials, vol. 260, Sep. 15, 2013, pp. 740-746.
Inyang, Mandu et al. "The use of carbon adsorbents for the removal of perfluoroalkyl acids from potable reuse systems," Chemosphere, vol. 184, Oct. 2017, pp. 168-175.
Xiao, Feng et al. "Mechanisms for removal of perfluorooctane sulfonate (PFOS) and perfluorooctanoate (PFOA) from drinking water by conventional and enhanced coagulation," Water Research, vol. 47, Issue 1, Jan. 1, 2013, pp. 49-56.
Yu, Qiang et al. "Selective removal of perfluorooctane sulfonate from aqueous solution using chitosan-based molecularly imprinted polymer adsorbents," Water Research, vol. 42, Issue 12, Jun. 2008, pp. 3089-3097.
Ilango, Aswin Kumar et al. "Surface-modified biopolymers for removing mixtures of per- and polyfluoroalkyl substances from water: Screening and removal mechanisms," Environmental Pollution, vol. 331, Part 1, Aug. 15, 2023, 121865.
Yu, Liang et al. "The addition of iron-carbon enhances the removal of perfluoroalkyl acids (PFAAs) in constructed wetlands," Environmental Pollutions, vol. 327, Jun. 15, 2023, 121534.
Xiao, Jun et al. "The fate and behavior of perfluorooctanoic acid (PFOA) in constructed wetlands: Insights into potential removal and transformation pathway," Science of The Total Environment, vol. 861, Feb. 25, 2023, 160309.
Militao, Iarin Medeiros et al. "PFAS removal from water by adsorption with alginate-encapsulated plant albumin and rice straw-derived biochar," Journal of Water Process Engineering, vol. 53, Jul. 2023, 103616.
Wang, Fei et al. "Removal of perfluoroalkyl sulfonates (PFAS) from aqueous solution using permanently confined micelle arrays (PCMAs)," Separation and Purification Technology, vol. 138, Dec. 10, 2014, pp. 7-12.
Schuricht, Falk et al. "Removal of perfluorinated surfactants from wastewater by adsorption and ion exchange—Influence of material properties, sorption mechanism and modeling," Journal of Environmental Sciences, vol. 54, Apr. 2017, pp. 160-170.
Zheng, Xiaoying et al. "Enhanced removal of organic, nutrients, and PFCs in the iron-carbon micro-electrolysis constructed wetlands: Mechanism and iron cycle," Chemical Engineering Journal, vol. 457, Feb. 1, 2023, 141174.
Shende, Takshak et al. "Chain-length dependent ultrasonic degradation of perfluoroalkyl substances," Chemical Engineering Journal Advances, vol. 15, Aug. 15, 2023, 100509.
Wood, Richard James et al. "Ultrasonic degradation of perfluorooctane sulfonic acid (PFOS) correlated with sonochemical and sonoluminescence characterisation," Ultrasonics Sonochemistry, vol. 68, Nov. 2020, 105196.
Rodriguez-Freire, Lucia et al. "Effect of sound frequency and initial concentration on the sonochemical degradation of perfluorooctane sulfonate (PFOS)," Journal of Hazardous Materials, vol. 300, Dec. 30, 2015, pp. 662-669.
Thi, Lan-Anh Phan et al. "Enhancing decomposition rate of perfluorooctanoic acid by carbonate radical assisted sonochemical treatment," Ultrasonics Sonochemistry, vol. 21, Issue 5, Sep. 2014, pp. 1875-1880.
Lin, Jo-Chen et al. "Enhanced sonochemical degradation of perfluorooctanoic acid by sulfate ions," Ultrasonics Sonochemistry, vol. 22, Jan. 2015, pp. 542-547.
Shende, Takshak et al. "Frequency-dependent sonochemical degradation of perfluoroalkyl substances and numerical analysis of cavity dynamics," Separation and Purification Technology, vol. 261, Apr. 15, 2021, 118250.
Campbell, Tammy et al. "Sonochemical degradation of perfluorinated surfactants: Power and multiple frequency effects," Separation and Purification Technology, vol. 156, Part 3, Dec. 17, 2015, pp. 1019-1027.
Rodriguez-Freire, Lucia et al. "Sonochemical degradation of perfluorinated chemicals in aqueous film-forming foams," Journal of Hazardous Materials, vol. 317, Nov. 5, 2016, pp. 275-283.
Lee, Yu-Chi et al. "Efficient sonochemical degradation of perfluorooctanoic acid using periodate," Ultrasonics Sonochemistry, vol. 31, Jul. 2016, pp. 499-505.
Kalra, Shashank Singh et al. "Sonolytic destruction of Per- and polyfluoroalkyl substances in groundwater, aqueous Film-Forming Foams, and investigation derived waste," Chemical Engineering Journal, vol. 425, Dec. 1, 2021, 131778.

(56) References Cited

OTHER PUBLICATIONS

Verma, Sanny et al. "Recent advances on PFAS degradation via thermal and nonthermal methods," Chemical Engineering Journal Advances, vol. 13, Mar. 15, 2023, 100421.

Qian, Xiuwen et al. "Comparison of eco-improvement on constructed wetlands with nano zero valent iron introduction under different levels of PFOA stress: Perspectives on plant, microbe, and PFOA removal," Science of The Total Environment, vol. 891, Sep. 15, 2023, 164052.

Zhu, Yangmo et al. "Photocatalytic degradation of GenX in water using a new adsorptive photocatalyst," Water Res, Jul. 15, 2022:220:118650.

McBeath, Sean T. et al. "Degradation of perfluorooctane sulfonate via in situ electro-generated ferrate and permanganate oxidants in NOM-rich source waters," Environmental Science: Water Research & Technology, Issue 10, Aug. 5, 2021, pp. 1778-1790.

Dhangar, Kiran et al. "Perfluorooctanesulfonate (PFOS), Its Occurrence, Fate, Transport and Removal in Various Environmental Media: A Review," Contaminants in Drinking and Wastewater Sources, Jun. 30, 2020, pp. 405-436.

Lei, Yong-Jia et al. "Synergistic degradation of PFAS in water and soil by dual-frequency ultrasonic activated persulfate," Chemical Engineering Journal, vol. 388, May 15, 2020, 124215.

Do, Huu-Tuan et al. "Tailoring photocatalysts and elucidating mechanisms of photocatalytic degradation of perfluorocarboxylic acids (PFCAs) in water: a comparative overview," Journal of Chemical Technology & Biotechnology, Jan. 9, 2020, vol. 95, Issue 10, p. 2569-2578.

Albert, Karunya et al. "Diatom-assisted biomicroreactor targeting the complete removal of perfluorinated compounds," Journal of Hazardous Materials, vol. 384, Feb. 15, 2020, 121491.

Wang, Shana et al. "Photocatalytic degradation of perfluorooctanoic acid and perfluorooctane sulfonate in water: A critical review," Chemical Engineering Journal, vol. 328, Nov. 15, 2017, pp. 927-942.

Hao, Feifei et al. "Intensification of sonochemical degradation of ammonium perfluorooctanoate by persulfate oxidant," Ultrasonics Sonochemistry, vol. 21, Issue 2, Mar. 2014, pp. 554-558.

Hori, Hisao et al. "Efficient decomposition of perfluoroether carboxylic acids in water with a combination of persulfate oxidant and ultrasonic irradiation," Journal of Fluorine Chemistry, vol. 141, Sep. 2012, pp. 5-10.

Park, Hyunwoong et al. "Reductive degradation of perfluoroalkyl compounds with aquated electrons generated from iodide photolysis at 254 nm," Photochemical & Photobiological Sciences, Oct. 27, 2020, vol. 10, pp. 1945-1953.

Ateia, Mohamed et al. "Cationic polymer for selective removal of GenX and short-chain PFAS from surface waters and wastewaters at ng/L levels," Water Research, vol. 163, Oct. 15, 2019, 114874.

Badruddoza, Abu Zayed et al. "Environmentally Friendly β-Cyclodextrin-Ionic Liquid Polyurethane-Modified Magnetic Sorbent for the Removal of PFOA, PFOS, and Cr(VI) from Water," ACS Sustainable Chemistry & Engineering, vol. 5, issue 10, Aug. 28, 2017, pp. 9223-9232.

Cheng, Jie et al. "Sonochemical Degradation of Perfluorooctane Sulfonate (PFOS) and Perfluorooctanoate (PFOA) in Landfill Groundwater: Environmental Matrix Effects," Environmental Science & Technology, vol. 42, Issue 21, Sep. 23, 2008, pp. 8057-8063.

Chularueangaksorn, Pattarawan et al. "Regeneration and reusability of anion exchange resin used in perfluorooctane sulfonate removal by batch experiments," Journal of Applied Polymer Science, Apr. 10, 2013, vol. 130, Issue 2, p. 884-890.

Azmi, Luqman Hakim Mohd et al. "Polymer-Assisted Modification of Metal-Organic Framework MIL-96 (Al): Influence on Particle Size, Crystal Morphology and Perfluorooctanoic Acid (PFOA) Removal," May 8, 2020, Version 1, https://doi.org/10.26434/chemrxiv.12262010.v1.

Ji, Woojung et al. "Removal of GenX and Perfluorinated Alkyl Substances from Water by Amine-Functionalized Covalent Organic Frameworks," Journal of the American Chemical Society, vol. 140, Issue 40, Sep. 26, 2018, pp. 12677-12681.

Li, Zhenmin et al. "Synthesis of In2O3 porous nanoplates for photocatalytic decomposition of perfluorooctanoic acid (PFOA)," Catalysis Communications, vol. 43, Jan. 5, 2014, pp. 42-46.

Muruganandham, Manickavachagam et al. "Synthesis, Characterization of α-GaOOH Self-Assembly and Its Application in Removal of Perfluorinated Compounds," Journal of Nanoscience and Nanotechnology, vol. 15, No. 9, Sep. 2015, pp. 6524-6532(9).

Panchangam, Sri Chandana et al. "Decomposition of perfluorocarboxylic acids (PFCAs) by heterogeneous photocatalysis in acidic aqueous medium," Chemosphere, vol. 77, Issue 2, Sep. 2009, pp. 242-248.

Shende, Takshak et al. "Kinetic model for sonolytic degradation of non-volatile surfactants: Perfluoroalkyl substances," Ultrasonics Sonochemistry, vol. 51, Mar. 2019, pp. 359-368.

Sini, Karima et al. "Metal-organic framework sorbents for the removal of perfluorinated compounds in an aqueous environment," New Journal of Chemistry, Issue 22, Sep. 24, 2018, pp. 17889-17894.

Takeuchi, N. et al. "Plasma-liquid interfacial reaction in decomposition of perfluoro surfactants," Journal of Physics D: Applied Physics, Dec. 24, 2013, vol. 47, No. 4, 045203.

Tan, Xianjun et al. "Indium-modified Ga2O3 hierarchical nanosheets as efficient photocatalysts for the degradation of perfluorooctanoic acid," Environ. Sci.: Nano, Jun. 18, 2020,7, 2229-2239.

Raza, Akber et al. "A Machine Learning Approach for Predicting Defluorination of Per- and Polyfluoroalkyl Substances (PFAS) for Their Efficient Treatment and Removal," Environmental Science & Technology Letters, vol. 6, Issue 10, Sep. 9, 2019, pp. 624-629.

Wu, Boran et al. "Rapid Destruction and Defluorination of Perfluorooctanesulfonate by Alkaline Hydrothermal Reaction," Environmental Science & Technology Letters, vol. 6, Issue 10, Sep. 17, 2019, pp. 630-636.

De Souza, Bruno Bezerra et al. "A ReaxFF-based molecular dynamics study of the destruction of PFAS due to ultrasound," Environmental Pollution, vol. 333, Sep. 15, 2023, 122026.

Sahu, Sushant P. et al. "Rapid Degradation and Mineralization of Perfluorooctanoic Acid by a New Petitjeanite Bi3O(OH)(PO4)2 Microparticle Ultraviolet Photocatalyst," Environmental Science & Technology Letters, vol. 5, Issue 8, Aug. 1, 2018, pp. 533-538.

Liu, Jinyong et al. "Reductive Defluorination of Branched Per- and Polyfluoroalkyl Substances with Cobalt Complex Catalysts," Environmental Science & Technology Letters, vol. 5, Issue 5, Mar. 28, 2018, pp. 289-294.

Gu, Yurong et al. "Efficient decomposition of perfluorooctanoic acid by a high photon flux UV/sulfite process: Kinetics and associated toxicity," Chemical Engineering Journal, vol. 326, Oct. 15, 2017, pp. 1125-1133.

Steigerwald, Jessica M. "Novel Perfluorooctanesulfonate-Imprinted Polymer Immobilized on Spent Coffee Grounds Biochar for Selective Removal of Perfluoroalkyl Acids in Synthetic Wastewater," ACS ES&T Engineering, vol. 3, Issue 4, Jan. 30, 2023, pp. 520-532.

Ahmed, Mohammad Boshir et al. "Advanced treatment technologies efficacies and mechanism of per- and poly-fluoroalkyl substances removal from water," Process Safety and Environmental Protection, vol. 136, Apr. 2020, pp. 1-14.

Arvaniti, Olga S. et al. "Reductive degradation of perfluorinated compounds in water using Mg-aminoclay coated nanoscale zero valent iron," Chemical Engineering Journal, vol. 262, Feb. 15, 2015, pp. 133-139.

Hori, Hisao et al. "Iron-induced decomposition of perfluorohexanesulfonate in sub- and supercritical water," Chemosphere, vol. 70, Issue 5, Jan. 2008, pp. 800-806.

Huang, Shan et al. "Defluorination of Perfluorooctanoic Acid (PFOA) and Perfluorooctane Sulfonate (PFOS) by *Acidimicrobium* sp. Strain A6," Environmental Science & Technology, vol. 53, Issue 19, Sep. 18, 2019, pp. 11410-11419.

Khan, M. Yasir et al. "Decomposition kinetics of perfluorinated sulfonic acids," Chemosphere, vol. 238, Jan. 2020, 124615.

Mu, Tianhong et al. "Energy-efficient removal of PFOA and PFOS in water using electrocoagulation with an air-cathode," Chemosphere, vol. 281, Oct. 2021, 130956.

(56) References Cited

OTHER PUBLICATIONS

Oyetade, Oluwaseun A. et al. "A critical review of the occurrence of perfluoroalkyl acids in aqueous environments and their removal by adsorption onto carbon nanotubes," Reviews in Environmental Science and Bio/Technology, Oct. 4, 2018, vol. 17, pp. 603-635.

Qu, Yingzi et al. "Occurrence, removal and emission of per- and polyfluorinated alkyl substances (PFASs) from chrome plating industry: A case study in Southeast China," Emerging Contaminants, vol. 6, 2020, pp. 376-384.

Ruiz-Uriguen, Melany et al. "Biodegradation of PFOA in microbial electrolysis cells by *Acidimicrobiaceae* sp. strain A6," Chemosphere, vol. 292, Apr. 2022, 133506.

Santos, Aurora et al. "Use of Fenton reagent combined with humic acids for the removal of PFOA from contaminated water," Science of the Total Environment, vols. 563-564, Sep. 1, 2016, pp. 657-663.

Sun, Qingbo et al. "Heterogeneous photocatalytic decomposition of per- and poly-fluoroalkyl substances: A review," Critical Reviews in Environmental Science and Technology, vol. 50, Issue 5, Jun. 28, 2019, pp. 523-547.

Thi, Lan-Anh Phan et al. "Photochemical decomposition of perfluorooctanoic acids in aqueous carbonate solution with UV irradiation," Chemical Engineering Journal, vol. 221, Apr. 1, 2013, pp. 258-263.

Tian, Aijun et al. "Enhanced performance of surface modified TiO2 nanotubes for the decomposition of perfluorooctanoic acid," AIP Conference Proceedings, Jan. 6, 2017, 1794, 020029.

Xia, Chunjie et al. "Degradation of per- and polyfluoroalkyl substances (PFAS) in wastewater effluents by photocatalysis for water reuse," Journal of Water Process Engineering, vol. 46, Apr. 2022, 102556.

Chenmin, Xu et al. "Platinum modified indium oxide nanorods with enhanced photocatalytic activity on degradation of perfluorooctanoic acid (PFOA)," Journal of the Taiwan Institute of Chemical Engineers, vol. 80, Nov. 2017, pp. 761-768.

Yu, Jing et al. "Removal of perfluorinated compounds by membrane bioreactor with powdered activated carbon (PAC): Adsorption onto sludge and PAC," Desalination, vol. 334, Issue 1, Feb. 3, 2014, pp. 23-28.

Zhang, Chaojie et al. "Photoinduced Reductive Decomposition of Perfluroctanoic Acid in Water: Effect of Temperature and Ionic Strength," Clean—Soil, Air, Water, Mar. 10, 2014, vol. 43, Issue 2, p. 223-228.

Zhang, Chunhui et al. "Degradation of perfluorinated compounds in wastewater treatment plant effluents by electrochemical oxidation with Nano-ZnO coated electrodes," Journal of Molecular Liquids, vol. 221, Sep. 2016, pp. 1145-1150.

Zhao, Changwei et al. "Perfluorooctane sulfonate removal by nanofiltration membrane the role of calcium ions," Chemical of Engineering Journal, vol. 233, Nov. 2013, pp. 224-232.

Liu, Gaoxi et al. "Novel Fluorinated Nitrogen-Rich Porous Organic Polymer for Efficient Removal of Perfluorooctanoic Acid from Water," Water, vol. 14, Issue 7, Mar. 22, 2022, 1010.

Kim, Tae-Hun et al. "Decomposition of perfluorooctane sulfonate (PFOS) using a hybrid process with electron beam and chemical oxidants," Chemical Engineering Journal, vol. 361, Apr. 1, 2019, pp. 1363-1370.

Kim, Tae-Hun et al. "Profiling the decomposition products of perfluorooctane sulfonate (PFOS) irradiated using an electron beam," Science of The Total Environment, vols. 631-632, Aug. 1, 2018, pp. 1295-1303.

Trojanowicz, Marek et al. "Application of ionizing radiation in decomposition of perfluorooctane sulfonate (PFOS) in aqueous solutions," Chemical Engineering Journal, vol. 379, Jan. 1, 2020, 122303.

Wang, Li et al. "Electron beam treatment for potable water reuse: Removal of bromate and perfluorooctanoic acid," Chemical Engineering Journal, vol. 302, Oct. 15, 2016, pp. 58-68.

Pinkard, Brian R. et al. "Destruction of perfluorooctanesulfonate (PFOS) in a batch supercritical water oxidation reactor," Chemosphere, vol. 279, Sep. 2021, 130834.

Trojanowicz, Marek et al. "Application of ionizing radiation in decomposition of perfluorooctanoate (PFOA) in waters," Chemical Engineering Journal, vol. 357, Feb. 1, 2019, pp. 698-714.

Feng, Mingbao et al. "Degradation of perfluoroheptanoic acid in water by electron beam irradiation," Environmental Chemistry Letters, Feb. 12, 2021, vol. 19, pp. 2689-2694.

Nau-Hix, Chase et al. "Field Demonstration of a Pilot-Scale Plasma Reactor for the Rapid Removal of Poly- and Perfluoroalkyl Substances in Groundwater," ACS ES&T Water, vol. 1, Issue 3, Jan. 15, 2021, pp. 680-687.

Singh, Raj Kamal et al. "Rapid Removal of Poly- and Perfluorinated Compounds from Investigation-Derived Waste (IDW) in a Pilot-Scale Plasma Reactor," Environmental Science & Technology, vol. 53, Issue 19, Sep. 3, 2019, pp. 11375-11382.

Jovicic, Vojislav, et al. "Degradation of Low Concentrated Perfluorinated Compounds (PFCs) from Water Samples Using Non-Thermal Atmospheric Plasma (NTAP)," Energies, May 18, 2018, vol. 11, Issue 5, 1290.

Hayashi, Ryuichi et al. "Decomposition of Perfluorinated Compounds in Water by DC Plasma within Oxygen Bubbles," Electrical Engineering in Japan, Nov. 4, 2014, vol. 190, Issue 3, p. 9-16.

Cheng, Jie et al. "Sonochemical Degradation of Perfluorooctane Sulfonate (PFOS) and Perfluorooctanoate (PFOA) in Groundwater: Kinetic Effects of Matrix Inorganics," Environmental Science & Technology, vol. 44, Issue 1, Dec. 1, 2009, pp. 445-450.

Krause, Max J. "Supercritical Water Oxidation as an Innovative Technology for PFAS Destruction," Journal of Environmental Engineering, vol. 148, Issue 2, Nov. 23, 2021.

Rahman, Mohammad Feisal et al. "Behaviour and fate of perfluoroalkyl and polyfluoroalkyl substances (PFASs) in drinking water treatment: A review," Water Research, vol. 50, Mar. 1, 2014, pp. 318-340.

Kebria, Mohammad Reza Shirzad et al. "Efficient removal of perfluorobutanesulfonic acid from water through a chitosan/ polyethyleneimine xerogel," Chemical Engineering Journal, vol. 466, Jun. 15, 2023, 143236.

Boone, J. Scott et al. "Per- and polyfluoroalkyl substances in source and treated drinking waters of the United States," Science of The Total Environment, vol. 653, Feb. 25, 2019, pp. 359-369.

Alalm, Mohamed Gar et al. "Mechanisms and pathways of PFAS degradation by advanced oxidation and reduction processes: A critical review," Chemical Engineering Journal, vol. 450, Part 4, Dec. 15, 2022, 138352.

Kugler, Alex et al. "Reductive defluorination of Perfluorooctanesulfonic acid (PFOS) by hydrated electrons generated upon UV irradiation of 3-Indole-acetic-acid in 12-Aminolauric-Modified montmorillonite," Water Research, vol. 200, Jul. 15, 2021, 117221.

Espana, Victor Andres Arias et al. "Treatment technologies for aqueous perfluorooctanesulfonate (PFOS) and perfluorooctanoate (PFOA): A critical review with an emphasis on field testing," Environmental Technology & Innovation, vol. 4, Oct. 2015, pp. 168-181.

Schaefer, Charles E. et al. "Electrochemical treatment of perfluorooctanoic acid and perfluorooctane sulfonate: Insights into mechanisms and application to groundwater treatment," Chemical Engineering Journal, vol. 317, Jun. 1, 2017, pp. 424-432.

Deng, Shubo et al. "Highly efficient sorption of perfluorooctane sulfonate and perfluorooctanoate on a quaternized cotton prepared by atom transfer radical polymerization," Chemical Engineering Journal, vols. 193-194, Jun. 15, 2012, pp. 154-160.

Deng, Shubo et al. "Adsorption of perfluorinated compounds on aminated rice husk prepared by atom transfer radical polymerization," Chemosphere, vol. 91, Issue 2, Apr. 2013, pp. 124-130.

Hassan, Masud et al. "Magnetic biochar for removal of perfluorooctane sulphonate (PFOS): Interfacial interaction and adsorption mechanism," Environmental Technology & Innovation, vol. 28, Nov. 2022, 102593.

Sorengard, Mattias et al. "Adsorption behavior of per- and polyfluoroalkyl substances (PFASs) to 44 inorganic and organic sorbents and use of dyes as proxies for PFAS sorption," Journal of Environmental Chemical Engineering, vol. 8, Issue 3, Jun. 2020, 103744.

Kabiri, Shervin et al. "Physical and chemical properties of carbon-based sorbents that affect the removal of per- and polyfluoroalkyl

(56) References Cited

OTHER PUBLICATIONS substances from solution and soil," Science of The Total Environment, vol. 875, Jun. 1, 2023, 162653.

Yuan, Shideng et al. "Contribution of air-water interface in removing PFAS from drinking water: Adsorption, stability, interaction and machine learning studies," Water Research, vol. 236, Jun. 1, 2023, 119947.

Wang, Yifei et al. "Treatment of Per- and Polyfluoroalkyl Substances (Pfas) by Foam Fractionation Coupled with Electrochemical Oxidation," May 9, 2023, 39 pages. https://papers.ssrn.com/sol3/papers.cfm?abstract_id=4443633.

Allred, B. McKay et al. "Physical and Biological Release of Poly- and Perfluoroalkyl Substances (PFASs) from Municipal Solid Waste in Anaerobic Model Landfill Reactors," Environmental Science & Technology, vol. 49, Issue 13, Jun. 9, 2015, pp. 7648-7656.

Hale, Sarah E. et al. "Sorbent amendment as a remediation strategy to reduce PFAS mobility and leaching in a contaminated sandy soil from a Norwegian firefighting training facility," Chemosphere, vol. 171, Mar. 2017, pp. 9-18.

Lakshminarasimman, Narasimman et al. "Removal and formation of perfluoroalkyl substances in Canadian sludge treatment systems—A mass balance approach," Science of The Total Environment, vol. 754, Feb. 1, 2021, 142431.

Turner, Lauren P. et al. "Mechanochemical remediation of perfluorooctanesulfonic acid (PFOS) and perfluorooctanoic acid (PFOA) amended sand and aqueous film-forming foam (AFFF) impacted soil by planetary ball milling," Science of The Total Environment, vol. 765, Apr. 15, 2021, 142722.

Wen, Bei et al. "Behavior of N-ethyl perfluorooctane sulfonamido acetic acid (N-EtFOSAA) in biosolids amended soil-plant microcosms of seven plant species: Accumulation and degradation," Environment, vol. 642, Nov. 15, 2018, pp. 366-373.

Hubert, Michel et al. "Influence of grain size, organic carbon and organic matter residue content on the sorption of per- and polyfluoroalkyl substances in aqueous film forming foam contaminated soils—Implications for remediation using soil washing," Environment, vol. 875, Jun. 1, 2023, 162668.

Dalameh, Sahar et al. "Per- and polyfluoroalkyl substances (PFASs) in water, soil and plants in wetlands and agricultural areas in Kampala, Uganda," Science of The Total Environment, vols. 631-632, Aug. 1, 2018, pp. 660-667.

Wu, Yaoyao et al. "Mechanism insights into the facet-dependent photocatalytic degradation of perfluorooctanoic acid on BiOCl nanosheets," Chemical Engineering Journal, vol. 425, Dec. 1, 2021, 130672.

Brandon, Taymee A. et al. "Electric Field Potentially Enhances the Defluorination of 6:2 Fluorotelomer Alcohol (6:2 Ftoh) in Soil Through Increasing the Relative Abundance of Dechloromonas," Jun. 30, 2022, 20 pages. https://papers.ssrn.com/sol3/papers.cfm?abstract_id=4150590.

Lou, Zimo et al. "Strong hydrophobic affinity and enhanced •OH generation boost energy-efficient electrochemical destruction of perfluorooctanoic acid on robust ceramic/PbO2-PTFE anode," Separation and Purification Technology, vol. 280, Jan. 1, 2022, 119919.

Esfahani, Ehsan Banayan et al. "Fluence-based photo-reductive decomposition of PFAS using vacuum UV (VUV) irradiation: Effects of key parameters and decomposition mechanism," Journal of Environmental Chemical Engineering, vol. 10, Issue 1, Feb. 2022, 107050.

McDonough, Jeffrey T. et al. "Validation of supercritical water oxidation to destroy perfluoroalkyl acids," Remediation Journal, vol. 32, Issue 1-2, Feb. 22, 2022, p. 75-90.

Fan, Xuequi et al. "Determination of total reducible organofluorine in PFAS-impacted aqueous samples based on hydrated electron defluorination," Science of The Total Environment, vol. 829, Jul. 10, 2022, 154548.

Li, Zizi et al. "Recent trends in degradation strategies of PFOA/PFOS substitutes," Chemosphere, vol. 315, Feb. 2023, 137653.

Bowers, Bailey B. et al. "Nontarget analysis and fluorine atom balances of transformation products from UV/sulfite degradation of perfluoroalkyl contaminants," Environmental Science: Processes & Impacts, Jan. 18, 2023, 25, 472-483.

Liu, Fuyu etal. "Recent Advances in the Analytical Techniques for PFASs and Corresponding Intermediates During Their Chemical Decomposition," Chemical Research in Chinese Universities, Apr. 28, 2023, vol. 39, pp. 361-369.

Xiao, Feng et al. "Thermal Decomposition of Anionic, Zwitterionic, and Cationic Polyfluoroalkyl Substances in Aqueous Film-Forming Foams," Environmental Science & Technology, vol. 55, Issue 14, Jul. 8, 2021, pp. 9885-9894.

Gao, Jinyu et al. "Defluorination of Omega-Hydroperfluorocarboxylates (ω-HPFCAs): Distinct Reactivities from Perfluoro and Fluorotelomeric Carboxylates," Environmental Science & Technology, vol. 55, Issue 20, Oct. 7, 2021, pp. 14146-14155.

Xu, Tianyuan et al. "Enhanced photocatalytic degradation of perfluorooctanoic acid using carbon-modified bismuth phosphate composite: Effectiveness, material synergy and roles of carbon," Chemical Engineering Journal, vol. 395, Sep. 1, 2020, 124991.

Zhao, Changwei et al. "Efficient removal of perfluorooctane sulphonate by nanofiltration: Insights into the effect and mechanism of coexisting inorganic ions and humic acid," Journal of Membrane Science, vol. 610, Sep. 1, 2020, 118176.

Zhao, Changwei et al. "Perfluorooctane sulfonate removal by nanofiltration membrane—the effect and interaction of magnesium ion / humic acid," Journal of Membrane Science, vol. 503, Apr. 1, 2016, pp. 31-41.

Rattanaoudom, Romchat et al. "Removal of PFOA by hybrid membrane filtration using PAC and hydrotalcite," Desalination and Water Treatment, vol. 32, Aug. 3, 2012, pp. 262-270.

Kishimoto, Naoyuki et al. "Effects of three additives on the removal of perfluorooctane sulfonate (PFOS) by coagulation using ferric chloride or aluminum sulfate," Water Science & Technology, Mar. 31, 2016, 73 (12): 2971-2977.

Mitchell, Shannon M. et al. "Degradation of Perfluorooctanoic Acid by Reactive Species Generated through Catalyzed H2O2 Propagation Reactions," Environmental Science & Technology Letters, vol. 1, Issue 1, Oct. 18, 2013, pp. 117-121.

Natarajan, Manaswini et al. "Point-of-entry water filter for removal of per- and poly-fluoroalkyl substances and precursors," AWWA Water Science, Nov. 18, 2021, vol. 3, Issue 6, e1257.

Herkert, Nicholas J. et al. "Assessing the Effectiveness of Point-of-Use Residential Drinking Water Filters for Perfluoroalkyl Substances (PFASs)," Environmental Science & Technology Letters, vol. 7, Issue 3, Feb. 5, 2020, pp. 178-184.

Tajdini, Bahareh et al. "Impact of effluent organic matter on perfluoroalkyl acid removal from wastewater effluent by granular activated carbon and alternative adsorbents," Water Research, vol. 241, Aug. 1, 2023, 120105.

Sun, Runze et al. "Sorptive removal of per- and polyfluoroalkyl substances (PFAS) in organic-free water, surface water, and landfill leachate and thermal reactivation of spent sorbents," Journal of Hazardous Materials Advances, vol. 10, May 2023, 100311.

Hayman, Nicholas T. et al. "Water quality impacts on sorbent efficacy for per- and polyfluoroalkyl substances treatment of groundwater," Remediation Journal, Jan. 29, 2023, vol. 33, Issue 2, p. 89-100.

Kassar, Christian et al. "Removal of PFAS from groundwater using weak-base anion exchange resins," AWWA Water Science, Feb. 24, 2023, vol. 5, Issue 1, e1325.

Medina, Ricardo et al. "Pilot-scale comparison of granular activated carbons, ion exchange, and alternative adsorbents for per- and polyfluoroalkyl substances removal," AWWA Water Science, Oct. 6, 2022, vol. 4, Issue 5, e1308.

Najm, Issam et al. "Per- and polyfluoroalkyl substances removal with granular activated carbon and a specialty adsorbent: A case study," AWWVA Water Science, Sep. 23, 2021, vol. 3, Issue 5, e1245.

Bertanza, Giorgio et al. "Long-term investigation on the removal of perfluoroalkyl substances in a full-scale drinking water treatment plant in the Veneto Region, Italy," Science of The Total Environment, vol. 734, Sep. 10, 2020, 139154.

(56) References Cited

OTHER PUBLICATIONS

Bao, Yixiang et al. "Removal of F-53B as PFOS alternative in chrome plating wastewater by UV/Sulfite reduction," Water Research, vol. 163, Oct. 15, 2019, 114907.
Hu, Yi-bo et al. "Autocatalytic degradation of perfluorooctanoic acid in a permanganate-ultrasonic system," Water Research, vol. 140, Sep. 1, 2018, pp. 148-157.
Lee, Yuchi et al. "Decomposition of perfluorooctanoic acid by microwaveactivated persulfate: Effects of temperature, pH, and chloride ions," Frontiers of Environmental Science & Engineering, Nov. 4, 2011, vol. 6, pp. 17-25.
Lin, Jo-Chen et al. "Effect of surfactants on the degradation of perfluorooctanoic acid (PFOA) by ultrasonic (US) treatment," Ultrasonics Sonochemistry, vol. 28, Jan. 2016, pp. 130-135.
Liu, Guoshuai et al. "Electrochemical degradation of perfluorooctanoic acid by macro-porous titanium suboxide anode in the presence of sulfate," Chemical Engineering Journal, vol. 371, Sep. 1, 2019, pp. 7-14.
Matsuya, Yuriko et al. "Relationship Between Reaction Rate of Perfluorocarboxylic Acid Decomposition at a Plasma-Liquid Interface and Adsorbed Amount," Electrical Engineering in Japan, Apr. 21, 2014, vol. 188, Issue 2, p. 1-8.
Nienhauser, Alec B. et al. "Boron-doped diamond electrodes degrade short- and long-chain per- and polyfluorinated alkyl substances in real industrial wastewaters," Journal of Environmental Chemical Engineering, vol. 10, Issue 2, Apr. 2022, 107192.
Ochiai, Tsuyoshi et al. "Efficient electrochemical decomposition of perfluorocarboxylic acids by the use of a boron-doped diamond electrode," Diamond and Related Materials, vol. 20, Issue 2, Feb. 2011, pp. 64-67.
Pramanik, Biplob Kumar et al. "Removal of emerging perfluorooctanoic acid and perfluorooctane sulfonate contaminants from lake water," Environmental Technology, vol. 38, Issue 15, Oct. 11, 2016, pp. 1937-1942.
Song, Zhou et al. "Efficient photocatalytic defluorination of perfluorooctanoic acid over BiOCl nanosheets via a hole direct oxidation mechanism," Chemical Engineering Journal, vol. 317, Jun. 1, 2017, pp. 925-934.
Wang, Lu et al. "Effects of chloride on electrochemical degradation of perfluorooctanesulfonate by Magneli phase Ti4O7 and boron doped diamond anodes," Water Research, vol. 170, Mar. 1, 2020, 115254.
Wang, Bingyu et al. "Covalent triazine-based framework: A promising adsorbent for removal of perfluoroalkyl acids from aqueous solution," Environmental Pollution, vol. 216, Sep. 2016, pp. 884-892.
Yang, Yiqiong et al. "Magnetic ion exchange resin for effective removal of perfluorooctanoate from water: study of a response surface methodology and adsorption performances," Environmental Science and Pollution Research, Aug. 17, 2018, vol. 25, pp. 29267-29278.
Yang, Yiqiong et al. "Insights into the degradation mechanism of perfluorooctanoic acid under visible-light irradiation through fabricating flower-shaped Bi5O7I/ZnO n-n heterojunction microspheres," Chemical Engineering Journal, vol. 420, Part 1, Sep. 15, 2021, 129934.
Yang, Yiqiong et al. "In-situ fabrication of a spherical-shaped Zn—Al hydrotalcite with BiOCl and study on its enhanced photocatalytic mechanism for perfluorooctanoic acid removal performed with a response surface methodology," Journal of Hazardous Materials, vol. 399, Nov. 15, 2020, 123070.
Olvera-Vargas, Hugo et al. "Synergistic degradation of GenX (hexafluoropropylene oxide dimer acid) by pairing graphene-coated Ni-foam and boron doped diamond electrodes," Chemical Engineering Journal, vol. 430, Part 1, Feb. 15, 2022, 132686.
Zhao, Changwei et al. "Study on the effects of cations and anions on the removal of perfluorooctane sulphonate by nanofiltration membrane," Separation and Purification Technology, vol. 202, Aug. 31, 2018, pp. 385-396.
Hosseinzadeh, Ahmad et al. "Machine learning-based modeling and analysis of PFOS removal from contaminated water by nanofiltration process," Separation and Purification Technology, vol. 289, May 15, 2022, 120775.
Rao, Unnati et al. "Structural Dependence of Reductive Defluorination of Linear PFAS Compounds in a UV/Electrochemical System," Environmental Science & Technology, vol. 54, Issue 17, Aug. 12, 2020, pp. 10668-10677.
Su, Yiming et al. "Potential-Driven Electron Transfer Lowers the Dissociation Energy of the C—F Bond and Facilitates Reductive Defluorination of Perfluorooctane Sulfonate (PFOS)," ACS Applied Materials & Interfaces, vol. 11, Issue 37, Aug. 22, 2019, pp. 33913-33922.
Lin, Hui et al. "Efficient Sorption and Removal of Perfluoroalkyl Acids (PFAAs) from Aqueous Solution by Metal Hydroxides Generated in Situ by Electrocoagulation," Environmental Science & Technology, vol. 49, Issue 17, Aug. 5, 2015, pp. 10562-10569.
Li, Shanping et al. "Enhanced degradation of perfluorooctanoic acid using dielectric barrier discharge with La/Ce-doped TiO2," Environ Sci Pollut Res Int, Jun. 2017;24(18):15794-15803.
Zhang, Li-Hong et al. "Photochemical defluorination of aqueous perfluorooctanoic acid (PFOA) by Fe(0)/GAC micro-electrolysis and VUV-Fenton photolysis," Environ Sci Pollut Res Int. Jul. 2016;23(13):13531-42.
Zhang, Kunlun et al. "Destruction of Perfluorooctane Sulfonate (PFOS) and Perfluorooctanoic Acid (PFOA) by Ball Milling," Environmental Science & Technology, vol. 47, Issue 12, May 15, 2013, pp. 6471-6477.
Liu, Jinxia et al. "Microbial degradation of polyfluoroalkyl chemicals in the environment: a review," Environ Int. Nov. 2013:61:98-114.
Bao, Yixiang et al. Degradation of hexafluoropropylene oxide oligomer acids as PFOA alternatives in simulated nanofiltration concentrate: Effect of molecular structure, Chemical Engineering Journal, vol. 382, Feb. 15, 2020, 122866.
Ye, Lanlan et al. "Thin film composite nanofiltration membrane with tannic acid-Fe(III) complexes functionalized CNTs interlayer toward energy efficient remediation of groundwater," Desalination, vol. 552, Apr. 15, 2023, 116438.
Wenjing, Tang et al. "Preparation of hollow-fiber nanofiltration membranes of high performance for effective removal of PFOA and high resistance to BSA fouling," Journal of Environmental Sciences, vol. 122, Dec. 2022, pp. 14-24.
Arvaniti, Olga S. et al. "Review on the occurrence, fate and removal of perfluorinated compounds during wastewater treatment," Science of The Total Environment, vols. 524-525, Aug. 15, 2015, pp. 81-92.
De S. Furtado, Rafaely X. et al. "Biodegradation mechanism of perfluorooctane sulfonic acid (PFOS) in domestic sewage: Specific methanogenic activity, molecular biology, and ecotoxicological aspects," Journal of Water Process Engineering, vol. 51, Feb. 2023, 103453.
Ambaye, Teklit Gebregiorgis et al. "Chapter 7—Application of nanomaterials for the removal of poly- and perfluoroalkyl substances," Green Sustainable Process for Chemical and Environmental Engineering and Science, Applications of Advanced Nanostructured Materials in Wastewater Remediation, 2023, pp. 197-211.
Patch, David et al. "Elucidating degradation mechanisms for a range of per- and polyfluoroalkyl substances (PFAS) via controlled irradiation studies," Science of The Total Environment, vol. 832, Aug. 1, 2022, 154941.
Li, Chenguang et al. "Electrochemical oxidation combined with UV irradiation for synergistic removal of perfluorooctane sulfonate (PFOS) in water," Journal of Hazardous Materials, vol. 436, Aug. 15, 2022, 129091.
Sun, Zhuyu et al. "UV/Fe II NTA as a novel photoreductive system for the degradation of perfluorooctane sulfonate (PFOS) via a photoinduced intramolecular electron transfer mechanism," Chemical Engineering Journal, vol. 427, Jan. 1, 2022, 130923.
Chu, Liquan et al. "Efficient Decomposition of Pfos by Hydrated Electrons: Performance, Mechanism and Carbon Emission Reduction," May 20, 2022, 41 pages, https://papers.ssrn.com/sol3/papers.cfm?abstract_id=4115319.

(56) References Cited

OTHER PUBLICATIONS

Sun, Zhuyu et al. "Vitamin B12 (CoII) initiates the reductive defluorination of branched perfluorooctane sulfonate (br-PFOS) in the presence of sulfide," Chemical Engineering Journal, vol. 423, Nov. 1, 2021, 130149.

Verma, Sanny et al. "Photooxidative decomposition and defluorination of perfluorooctanoic acid (PFOA) using an innovative technology of UV-vis/ZnxCu1-xFe2O4/oxalic acid," Chemosphere, vol. 280, Oct. 2021, 130660.

De S. Furtado, Rafaely X. et al. "Perfluorooctane sulfonic acid (PFOS) degradation by optimized heterogeneous photocatalysis (TiO2/UV) using the response surface methodology (RSM)," Journal of Water Process Engineering, vol. 41, Jun. 2021, 101986.

Gong, Xiao-Bao et al. "Perfluorooctane sulfonate decomposition by a high photon flux UV/SO32—/N2 system: kinetics and influence factors," Water, Air, & Soil Pollution, May 11, 2021, vol. 232, article No. 215.

Wang, Kaixuan et al. "Enhanced decomposition of long-chain perfluorocarboxylic acids (C9-C10) by electrochemical activation of peroxymonosulfate in aqueous solution," Science of The Total Environment, vol. 758, Mar. 1, 2021, 143666.

Takeuchi, Nozomi et al. "Review of plasma-based water treatment technologies for the decomposition of persistent organic compounds," Japanese Journal of Applied Physics, Oct. 16, 2020, vol. 60, No. SA.

Chang, Yueh et al. "Degradation of PFOS by a MnO2/H2O2 process," Environ. Sci.: Water Res. Technol., Oct. 29, 2020,6, 3476-3487.

Li, Fei et al. "Biomimetic degradability of linear perfluorooctanesulfonate (L-PFOS): Degradation products and pathways," Chemosphere, vol. 259, Nov. 2020, 127502.

Liu, Xiaoqing et al. "Photochemical decomposition of perfluorochemicals in contaminated water," Water Research, vol. 186, Nov. 1, 2020, 116311.

Grabda, Mariusz et al. "Removal of PFASs from water with ionic liquids: Quantum-mechanical and experimental studies," 2019 Advances in Science and Engineering Technology International Conferences (ASET), Dubai, United Arab Emirates, 2019, pp. 1-4, doi: 10.1109/ICASET.2019.8714215.

Mudumbi, John Baptist Nzukizi et al. "Recent developments in polyfluoroalkyl compounds research: a focus on human/environmental health impact, suggested substitutes and removal strategies," Environmental Monitoring and Assessment, Jul. 18, 2017, vol. 189, article No. 402.

Guo, Hao et al. "Removal of perfluorooctane sulfonate by a gravity-driven membrane: Filtration performance and regeneration behavior," Separation and Purification Technology, vol. 174, Mar. 1, 2017, pp. 136-144.

Zhang, Kunlun et al. "Mechanochemical destruction of Chinese PFOS alternative F-53B," Chemical Engineering Journal, vol. 286, Feb. 15, 2016, pp. 387-393.

Yamazaki, Eriko et al. "Perfluorinated carboxylic and sulphonic acids in surface water media from the regions of Tibetan Plateau: Indirect evidence on photochemical degradation?" Journal of Environmental Science and Health, Part A, vol. 51, Issue 1, Nov. 5, 2015, pp. 63-69.

Feng, Yong et al. "Mineralization of perfluorooctanesulfonate (PFOS) and perfluorodecanoate (PFDA) from aqueous solution by porous hexagonal boron nitride: adsorption followed by simultaneous thermal decomposition and regeneration," RSC Advances, Issue 114, Nov. 30, 2015, pp. 113773-113780.

Chen, Meng-Jia et al. "Photocatalytic decomposition of perfluorooctanoic acid by transition-metal modified titanium dioxide," Journal of Hazardous Materials, vol. 288, May 15, 2015, pp. 168-175.

Turner, Lauren P. et al. "Elucidating the relationship between PFOA and PFOS destruction, particle size and electron generation in amended media commonly found in soils," Science of The Total Environment, vol. 888, Aug. 25, 2023, 164188.

Bouteh, Ehsan et al. "Semiconductor-hydrophobic material interfaces as a new active site paradigm for photocatalytic degradation of perfluorocarboxylic acids," Journal of Hazardous Materials, vol. 453, Jul. 5, 2023, 131437.

Manz, Katherine E. et al. "Low-temperature persulfate activation by powdered activated carbon for simultaneous destruction of perfluorinated carboxylic acids and 1,4-dioxane," Journal of Hazardous Materials, vol. 442, Jan. 15, 2023, 129966.

Yuan, Yijin et al. "Rapid photochemical decomposition of perfluorooctanoic acid mediated by a comprehensive effect of nitrogen dioxide radicals and Fe3+/Fe2+ redox cycle," Journal of Hazardous Materials, vol. 388, Apr. 15, 2020, 121730.

Lei, Yongjia et al. "A novel enhanced defluorination of perfluorooctanoic acids by surfactant-assisted ultrasound coupling persulfate," Separation and Purification Technology, vol. 317, Jul. 15, 2023, 123906.

Szreder, Tomasz et al. "High energy radiation—Induced cooperative reductive/oxidative mechanism of perfluorooctanoate anion (PFOA) decomposition in aqueous solution," Chemosphere, vol. 295, May 2022, 133920.

Li, Rui et al. "Systematic Study on the Removal of Per- and Polyfluoroalkyl Substances from Contaminated Groundwater Using Metal-Organic Frameworks," Environmental Science & Technology, vol. 55, Issue 22, Oct. 29, 2021, pp. 15162-15171.

Maza, William A. et al. "Degradation of perfluorooctanesulfonate (PFOS) by sub-bandgap irradiation of hydrogen-terminated nanodiamond," Applied Catalysis B: Environmental, vol. 325, May 15, 2023, 122306.

Tian, Shuting et al. "A 'Concentrate-&-Destroy' technology for enhanced removal and destruction of per- and polyfluoroalkyl substances in municipal landfill leachate," Science of The Total Environment, vol. 791, Oct. 15, 2021, 148124.

He, Jianzhou et al. "Enhanced removal of per- and polyfluoroalkyl substances by crosslinked polyaniline polymers," Chemical Engineering Journal, vol. 446, Part 5, Oct. 15, 2022, 137246.

Dixit, Fuhar et al. "Removal of Zwitterionic PFAS by MXenes: Comparisons with Anionic, Nonionic, and PFAS-Specific Resins," Environmental Science & Technology, vol. 56, Issue 10, May 9, 2022, pp. 6212-6222.

Jin, Xin et al. "Supramolecular assemblies of a newly developed indole derivative for selective adsorption and photo-destruction of perfluoroalkyl substances," Water Research, vol. 225, Oct. 15, 2022, 119147.

Yin, Sheng et al. "Design of nanomaterials for the removal of per- and poly-fluoroalkyl substances (PFAS) in water: Strategies, mechanisms, challenges, and opportunities," Science of The Total Environment, vol. 831, Jul. 20, 2022, 154939.

Scheitlin, Christopher G. et al. "Application of Supercritical Water Oxidation to Effectively Destroy Per- and Polyfluoroalkyl Substances in Aqueous Matrices," ACS EST&T Water, vol. 3, Issue 8, May 15, 2023, pp. 2053-2062.

Cantoni, Beatrice et al. "Perfluoroalkyl substances (PFAS) adsorption in drinking water by granular activated carbon: Influence of activated carbon and PFAS characteristics," Science of The Total Environment, vol. 795, Nov. 15, 2021, 148821.

Wang, Wei et al. "Cationic covalent organic framework for efficient removal of PFOA substitutes from aqueous solution," Chemical Engineering Journal, vol. 412, May 15, 2021, 127509.

Manning, Irene M. et al. "Hydrolytically Stable Ionic Fluorogels for High-Performance Remediation of Per- and Polyfluoroalkyl Substances (PFAS) from Natural Water," Angewandte Chemie International Edition, Aug. 9, 2022, vol. 61, Issue 41 e202208150.

Kothawala, D.N. et al. "Influence of dissolved organic matter concentration and composition on the removal efficiency of perfluoroalkyl substances (PFASs) during drinking water treatment," Water Research, May 2017, vol. 121.

Lu, Jingzhao et al. "A review of the occurrence, monitoring, and removal technologies for the remediation of per- and polyfluoroalkyl substances (PFAS) from landfill leachate," Chemosphere, Aug. 2023:332:138824.

Austin, Conrad et al. "Destruction and defluorination of PFAS matrix in continuous-flow supercritical water oxidation reactor: Effect of operating temperature," Chemosphere, vol. 327, Jun. 2023, 138358.

(56) References Cited

OTHER PUBLICATIONS

Merino, Nancy et al. "Degradation and Removal Methods for Perfluoroalkyl and Polyfluoroalkyl Substances in Water," Environmental Engineering Science, vol. 33, No. 9, Sep. 1, 2016.
McCleaf, Philip et al. "Drinking water nanofiltration with concentrate foam fractionation—A novel approach for removal of per- and polyfluoroalkyl substances (PFAS)," Feb. 2023, Water Research 232(1):119688.
Johnson, James K. et al. "Advanced Filtration Membranes for the Removal of Perfluoroalkyl Species from Water," ACS Omega, vol. 4, Issue 5, May 2, 2019, pp. 8001-8006.
Franke, Vera et al. "Efficient removal of per- and polyfluoroalkyl substances (PFASs) in drinking water treatment: nanofiltration combined with active carbon or anion exchange," Environmental Science: Water Research & Technology, Issue 11, Jun. 26, 2019, pp. 1836-1843.
Schaefer, Charles E. et al. "Electrochemical Transformations of Perfluoroalkyl Acid (PFAA) Precursors and PFAAs in Groundwater Impacted with Aqueous Film Forming Foams," Environmental Science & Technology, vol. 52, Issue 18, Aug. 22, 2018, pp. 10689-10697.
Boo, Chanhee et al. "High Performance Nanofiltration Membrane for Effective Removal of Perfluoroalkyl Substances at High Water Recovery," Environmental Science & Technology, vol. 52, Issue 13, May 31, 2018, pp. 7279-7288.
Xu, Bentuo et al. "Photocatalytic removal of perfluoroalkyl substances from water and wastewater: Mechanism, kinetics and controlling factors," Chemosphere, vol. 189, Dec. 2017, pp. 717-729.
Pan, Chang-Gui et al. "Perfluoroalkyl substances (PFASs) in wastewater treatment plants and drinking water treatment plants: Removal efficiency and exposure risk," Water Research, vol. 106, Dec. 1, 2016, pp. 562-570.
Liu, Yang et al. "Removal of perfluorooctanoic acid in simulated and natural waters with different electrode materials by electrocoagulation," Chemosphere, vol. 201, Jun. 2018, pp. 303-309.
Gomez-Ruiz, Beatriz et al. "Photocatalytic degradation and mineralization of perfluorooctanoic acid (PFOA) using a composite $TiO_2$-rGO catalyst," Journal of Hazardous Materials, vol. 344, Feb. 15, 2018, pp. 950-957.
Lin, Angela Yu-Chen et al. "Removal of perfluorooctanoic acid and perfluorooctane sulfonate via ozonation under alkaline condition," Journal of Hazardous Materials, vol. 243, Dec. 2012, pp. 272-277.
Li, Xiaoyun et al. "Efficient Photocatalytic Decomposition of Perfluorooctanoic Acid by Indium Oxide and Its Mechanism," Environmental Science & Technology, vol. 46, Issue 10, Apr. 10, 2012, pp. 5528-5534.
Liu, Yanming et al. "Enhanced Perfluorooctanoic Acid Degradation by Electrochemical Activation of Sulfate Solution on B/N Codoped Diamond," Environ Sci Technol. May 7, 2019;53(9):5195-5201.
Esfahani, Ehsan Banayan et al. "Photo-chemical/catalytic oxidative/reductive decomposition of per- and poly-fluoroalkyl substances (PFAS), decomposition mechanisms and effects of key factors: a review," Environmental Science: Water Research & Technology, Issue 4, Feb. 22, 2022, pp. 698-728.
Jin, Ling et al. "Photochemical decomposition of perfluorooctane sulfonate (PFOS) in an anoxic alkaline solution by 185 nm vacuum ultraviolet," Chemical Engineering Journal, vol. 280, Nov. 15, 2015, pp. 241-247.
Bentel, Michael J. "Enhanced Degradation of Perfluorocarboxylic Acids (PFCAs) by UV/Sulfite Treatment: Reaction Mechanisms and System Efficiencies at pH 12," Environmental Science & Technology Letters, vol. 7, Issue 5, Apr. 23, 2020, pp. 351-357.
Han, Hui-Li et al. "Influencing Factors on the Degradation of PFOS Through VUV-SO32-," Huan Jing Ke Xue. Apr. 8, 2017;38(4):1477-1482.
Yamamoto, Takashi et al. "Photodegradation of Perfluorooctane Sulfonate by UV Irradiation in Water and Alkaline 2-Propanol," Environmental Science & Technology, vol. 41, Issue 16, Jul. 7, 2007, pp. 5660-5665.
Li, Rui et al. "Efficient Removal of Per- and Polyfluoroalkyl Substances from Water with Zirconium-Based Metal-Organic Frameworks," Chemistry of Materials, Apr. 19, 2021, 33, pp. 3276-3285.
Paultre, Claude-Bernard et al. "Computational Study of the Gas-Phase Thermal Degradation of Perfluoroalkyl Carboxylic Acids," The Journal of Physical Chemistry A, vol. 126, Issue 46, Nov. 14, 2022, pp. 8753-8760.
He, Yanlie et al. "Porous adaptive luminescent metallacage for the detection and removal of perfluoroalkyl carboxylic acids," Chem, vol. 9, Issue 1, Jan. 12, 2023, pp. 93-101.
Ji, Bin et al. "Challenges of aqueous per- and polyfluoroalkyl substances (PFASs) and their foreseeable removal strategies," Chemosphere, vol. 250, Jul. 2020, 126316.
Zhang, Yutong et al. "Photochemical degradation of perfluorooctanoic acid under UV irradiation in the presence of Fe (III)-saturated montmorillonite," Science of The Total Environment, vol. 876, Jun. 10, 2023, 162760.
Ateia, Mohamed et al. "Efficient PFAS Removal by Amine-Functionalized Sorbents: Critical Review of the Current Literature," Environ. Sci. Technol. Lett., Nov. 22, 2019, 6, 12, pp. 688-695.
Wan, Hongyi et al. "Gravity-driven electrospun membranes for effective removal of perfluoro-organics from synthetic groundwater," Journal of Membrane Science, vol. 644, Feb. 15, 2022, 120180.
Vakili, Mohammadtaghi et al. "Removal of HFPO-DA (GenX) from aqueous solutions: A mini-review," Chemical Engineering Journal, vol. 424, Nov. 15, 2021, 130266.
Berhanu, Ashenafi et al. "A review of microbial degradation of per- and polyfluoroalkyl substances (PFAS): Biotransformation routes and enzymes," Science of The Total Environment, vol. 859, Part 1, Feb. 10, 2023, 160010.
Tan, Xiao et al. "Efficient Removal of Perfluorinated Chemicals from Contaminated Water Sources Using Magnetic Fluorinated Polymer Sorbents," Angew Chem Int Ed Engl, Dec. 5, 2022;61(49):e202213071. doi: 10.1002/anie.202213071. Epub Nov. 10, 2022.
Biswas, Sohag et al. "Degradation of Per- and Polyfluoroalkyl Substances with Hydrated Electrons: A New Mechanism from First-Principles Calculations," Environ. Sci. Technol. Apr. 28, 2022, 56, 12, 8167-8175.
Tasfaout, Aicha et al. "Molecularly imprinted polymers for per- and polyfluoroalkyl substances enrichment and detection," Talanta, vol. 258, Jun. 1, 2023, 124434.
Ching, Casey et al. "Evaluating the Performance of Novel Cyclodextrin Polymer Granules to Remove Perfluoroalkyl Acids (PFAAs) from Water," ACS EST Engg. Feb. 13, 2023, 3, 5, 661-670.
Singh, Anuradha et al. "Development of novel fluor mop materials for remediation of perfluoroalkyl substances (PFAS) from groundwater," Journal of Hazardous Materials, vol. 448, Apr. 15, 2023, 130853.
Pala, Jasneet et al. "Systematic investigation of PFOS adsorption from water by Metal Organic Frameworks, Activated Carbon, Metal Organic Framework@Activated Carbon, and functionalized Metal Organic Frameworks," Separation and Purification Technology, vol. 309, Mar. 15, 2023, 123025.
Mohamed, Badr A. et al. "Circular economy in wastewater treatment plants: Treatment of contaminants of emerging concerns (CECs) in effluent using sludge-based activated carbon," Journal of Cleaner Production, vol. 389, Feb. 20, 2023, 136095.
Hatinoglu, M. Dilara et al. "Modified linear solvation energy relationships for adsorption of perfluorocarboxylic acids by polystyrene microplastics," Science of The Total Environment, vol. 860, Feb. 20, 2023, 160524.
Karbassiyazdi, Elika et al. "A juxtaposed review on adsorptive removal of PFAS by metal-organic frameworks (MOFs) with carbon-based materials, ion exchange resins, and polymer adsorbents," Chemosphere, vol. 311, Part 1, Jan. 2023, 136933.
Jiang, Tao et al. "Surfactant-Modified Clay for Adsorption of Mixtures of Per- and Polyfluoroalkyl Substances (PFAS) in Aqueous Solutions," ACS Appl. Eng. Mater., 2023, published Oct. 20, 2022, 1, 1, 394-407.

(56) References Cited

OTHER PUBLICATIONS

Karbassiyazdi, Elika et al. "XGBoost model as an efficient machine learning approach for PFAS removal: Effects of material characteristics and operation conditions," Environmental Research, vol. 215, Part 1, Dec. 2022, 114286.
Rodrigo, Prashan M. et al. "Batch and fixed bed sorption of low to moderate concentrations of aqueous per- and poly-fluoroalkyl substances (PFAS) on Douglas fir biochar and its Fe3O4 hybrids," Chemosphere, vol. 308, Part 2, Dec. 2022, 136155.
Chaleshtari, Zahra Abbasian et al. "A Review on Per- and Polyfluoroalkyl Substances (PFAS) Remediation: Separation Mechanisms and Molecular Interactions," ACS EST Water, Nov. 3, 2022, 2, 12, 2258-2272.
Min, Xiaopeng et al. "Enhanced sorption of perfluorooctanoic acid with organically functionalized layered double hydroxide," Chemical Engineering Journal, vol. 446, Part 2, Oct. 15, 2022, 137019.
Yadav, Sudesh et al. "Updated review on emerging technologies for PFAS contaminated water treatment," Chemical Engineering Research and Design, vol. 182, Jun. 2022, pp. 667-700.
Ersan, Gamze et al. "Opportunities for in situ electro-regeneration of organic contaminant-laden carbonaceous adsorbents," Water Research, vol. 232, Apr. 1, 2023, 119718.
Saawarn, Bhavini et al. "Sources, occurrence, and treatment techniques of per- and polyfluoroalkyl substances in aqueous matrices: A comprehensive review," Environmental Research, vol. 214, Part 4, Nov. 2022, 114004.
Pauletto, Paola S. et al. "Activated carbon versus metal-organic frameworks: A review of their PFAS adsorption performance," Journal of Hazardous Materials, vol. 425, Mar. 5, 2022, 127810.
Harris, Justin T. et al. "Rapid Removal of Poly- and Perfluoroalkyl Substances with Quaternized Wood Pulp," ACS EST Water, Jan. 26, 2022, 2, 2, 349-356.
Vu, Chi Tanh et al. "Recent progress in adsorptive removal of per- and poly-fluoroalkyl substances (PFAS) from water/wastewater," Critical Reviews in Environmental Science and Technology, vol. 52, Sep. 15, 2020, pp. 90-129.
Moeini, Mohammadreza et al. "Sustainability assessment of PFAS adsorbents for groundwater remediation," Materials Today Proceedings, vol. 60, Part 3, 2022, pp. 2209-2216.
Mokwena, Pinky et al. "Batch equilibrium studies on the adsorptive capacity of powdered and pelleted maize tassel to remove PFOA and PFOS from aqueous medium," Emerging Contaminants, vol. 8, 2022, pp. 75-82.
Militao, Iarin Medeiros et al. "Removing PFAS from aquatic systems using natural and renewable material-based adsorbents: A review," Journal of Environmental Chemical Engineering, vol. 9, Issue 4, Aug. 2021, 105271.
Yan, Bei et al. "STXM-XANES and computational investigations of adsorption of per- and polyfluoroalkyl substances on modified clay," Water Research, vol. 201, Aug. 1, 2021, 117371.
Qian, Lin et al. "Photodegradation of Perfluorooctanesulfonic Acid on Fe-Zeolites in Water," Environ. Sci. Technol., Dec. 17, 2020, 55, 1, 614-622.
Yang, Anna et al. "Cyclodextrin Polymers with Nitrogen-Containing Tripodal Crosslinkers for Efficient PFAS Adsorption," ACS Materials Lett., Aug. 20, 2020, 2, 9, 1240-1245.
Xu, J. et al. "Enhanced adsorption of perfluorooctanoic acid (PFOA) from water by granular activated carbon supported magnetite nanoparticles," The Science of the Total Environment, Mar. 5, 2020, 723:137757.
Xian, Yanping et al. "Fluorine and nitrogen functionalized magnetic graphene as a novel adsorbent for extraction of perfluoroalkyl and polyfluoroalkyl substances from water and functional beverages followed by HPLC-Orbitrap HRMS determination," Mar. 2020, The Science of The Total Environment 723:138103.
Chen, Zhanghao et al. "Efficient Reductive Destruction of Perfluoroalkyl Substances under Self-Assembled Micelle Confinement," Environ. Sci. Technol., Feb. 16, 2020, 54, 8, 5178-5185.
Kibambe, M.G. et al. "Evaluation of the efficiency of selected wastewater treatment processes in removing selected perfluoroalkyl substances (PFASs)," Journal of Environmental Management, vol. 255, Feb. 1, 2020, 109945.
Wang, Wei et al. "Novel insights into the competitive adsorption behavior and mechanism of per- and polyfluoroalkyl substances on the anion-exchange resin," Journal of Colloid and Interface Science, vol. 557, Dec. 1, 2019, pp. 655-663.
Zhang, Q. et al. "Adsorption of perfluoroalkyl and polyfluoroalkyl substances (PFASs) from aqueous solution—A review," Sci Total Environ, Dec. 1, 2019:694:133606. doi: 10.1016/j.scitotenv.2019.133606. Epub Jul. 30, 2019.
Lazcano, Rooney Kim et al. "Per- and polyfluoroalkyl substances in commercially available biosolid-based products: The effect of treatment processes," Water Environment Research, vol. 91, Issue 12, p. 1669-1677.
Appleman, Timothy D. et al. "Treatment of poly- and perfluoroalkyl substances in U.S. full-scale water treatment systems," Water Research, vol. 51, Mar. 15, 2014, pp. 246-255.
Mojiri, Amin et al. "Occurrence of per- and polyfluoroalkyl substances in aquatic environments and their removal by advanced oxidation processes," Chemosphere, vol. 330, Jul. 2023, 138666.
Mantripragada, Shobha et al. "Addressing Short-Chain PFAS Contamination in Water with Nanofibrous Adsorbent/Filter Material from Electrospinning," Acc Chem Res. Jun. 6, 2023;56(11):1271-1278. doi: 10.1021/acs.accounts.2c00591. Epub Jan. 12, 2023.
Fournie, T. et al. "Smouldering to treat PFAS in sewage sludge," Waste Manag. Jun. 1, 2023:164:219-227. doi: 10.1016/j.wasman.2023.04.008. Epub Apr. 19, 2023.
Wang, Yue et al. "Electroreductive Defluorination of Unsaturated PFAS by a Quaternary Ammonium Surfactant-Modified Cathode via Direct Cathodic Reduction," Environ. Sci. Technol. Apr. 28, 2023, 57, 19, 7578-7589.
Medina, Paola Baldaguez et al. "Investigating the Electrochemically Driven Capture and Release of Long-Chain PFAS by Redox Metallopolymer Sorbents," ACS Appl. Mater. Interfaces, Apr. 28, 2023, 15, 18, 22112-22122.
Santiago, Anaira Roman et al. "Imparting Selective Fluorophilic Interactions in Redox Copolymers for the Electrochemically Mediated Capture of Short-Chain Perfluoroalkyl Substances," Journal of the American Chemical Society, Mar. 21, 2023, vol. 145, Issue 17, pp. 9508-9519.
West, Christopher P. et al. "Molecular Characterization of the Thermal Degradation of Per- and Polyfluoroalkyl Substances in Aqueous Film-Forming Foams via Temperature-Programmed Thermal Desorption-Pyrolysis-Direct Analysis in Real Time-Mass Spectrometry," Environ. Sci. Technol. Lett. Mar. 20, 2023, 10, 4, 308-315.
Ma, Haoqin et al. "Enhancement of perfluorooctanoic acid and perfluorooctane sulphonic acid removal in constructed wetland using iron mineral: Performance and mechanisms," Journal of Hazardous Materials, vol. 447, Apr. 5, 2023, 130819.
Morrison, Anthony L. et al. "Impact of Salinity and Temperature on Removal of PFAS Species from Water by Aeration in the Absence of Additional Surfactants: A Novel Application of Green Chemistry Using Adsorptive Bubble Fractionation," Ind. Eng. Chem. Res. Mar. 23, 2023, 62, 13, 5635-5645.
Lei, Xiaobo et al. "A review of PFAS adsorption from aqueous solutions: Current approaches, engineering applications, challenges, and opportunities," Environmental Pollution, vol. 321, Mar. 15, 2023, 121138.
Zhong, Tingting et al. "Impact of biological activated carbon filtration and backwashing on the behaviour of PFASs in drinking water treatment plants," Journal of Hazardous Materials, vol. 446, Mar. 15, 2023, 130641.
Grimison, Charles et al. "The efficacy of soil washing for the remediation of per- and poly-fluoroalkyl substances (PFASs) in the field," Journal of Hazardous Materials, vol. 445, Mar. 5, 2023, 130441.
Zhang, Mingkun et al. "Aluminum-based electrocoagulation for residual fluoride removal during per- and polyfluoroalkyl substances (PFASs) wastewater treatment," Separation and Purification Technology, vol. 308, Mar. 1, 2023, 122989.

(56) References Cited

OTHER PUBLICATIONS

Krahn, Katinka M. et al. "Sewage sludge biochars as effective PFAS-sorbents," Journal of Hazardous Materials, vol. 445, Mar. 5, 2023, 130449.

Luo, Yunlong et al. "Ultrasound-enhanced Magneli phase Ti4O7 anodic oxidation of per- and polyfluoroalkyl substances (PFAS) towards remediation of aqueous film forming foams (AFFF)," Science of The Total Environment, vol. 862, Mar. 1, 2023, 160836.

Ke, Ze-Wei et al. "Mechanism for the adsorption of Per- and polyfluoroalkyl substances on kaolinite: Molecular dynamics modeling," Applied Clay Science, vol. 232, Feb. 2023, 106804.

Liu, Xuemei et al. "Occurrence and removal of per- and polyfluoroalkyl substances (PFAS) in leachates from incineration plants: A full-scale study," Chemosphere, vol. 313, Feb. 2023, 137456.

Sivagami K., et al. "Electrochemical-based approaches for the treatment of forever chemicals: Removal of perfluoroalkyl and polyfluoroalkyl substances (PFAS) from wastewater," Science of The Total Environment, vol. 861, Feb. 25, 2023, 160440.

Yu, Hao et al. "Sorptive removal of per- and polyfluoroalkyl substances from aqueous solution: Enhanced sorption, challenges and perspectives," Science of The Total Environment, vol. 861, Feb. 25, 2023, 160647.

Chen, Xiaoyi et al. "Two-in-one platform based on conjugated polymer for ultrasensitive ratiometric detection and efficient removal of perfluoroalkyl substances from environmental water," Sci Total Environ. Feb. 20, 2023:860:160467. doi: 10.1016/j.scitotenv.2022.160467. Epub Nov. 25, 2022.

Ji, Bin et al. "Curbing per- and polyfluoroalkyl substances (PFASs): First investigation in a constructed wetland-microbial fuel cell system," Water Research, vol. 230, Feb. 15, 2023, 119530.

Tan, Xianjun et al. "Multiple interactions steered high affinity toward PFAS on ultrathin layered rare-earth hydroxide nanosheets: Remediation performance and molecular-level insights," Dec. 2022, Water Research 230:119558.

Li, Rui et al. "Metal-organic frameworks as platforms for the removal of per- and polyfluoroalkyl substances from contaminated waters," Oct. 2022, Matter 5(10):3161-3193.

Wang, Zhengyang et al. "Enhancement of per- and polyfluoroalkyl substances removal from water by pyrogenic carbons: Tailoring carbon surface chemistry and pore properties," Water Research, vol. 229, Feb. 1, 2023, 119467.

Vo, Phong H.N. et al. "Foam fractionation of per- and polyfluoroalkyl substances (PFASs) in landfill leachate using different cosurfactants," Chemosphere, vol. 310, Jan. 2023, 136869.

Wang, Yifei et al. "Removing per- and polyfluoroalkyl substances (PFAS) in water by foam fractionation," Chemosphere, vol. 311, Part 2, Jan. 2023, 137004.

Hitzelberger, Michael et al. "PFOS Mass Flux Reduction/Mass Removal: Impacts of a Lower-Permeability Sand Lens within Otherwise Homogeneous Systems," Environ. Sci. Technol. Sep. 20, 2022, 56, 19, 13675-13685.

Hajalifard, Zeinab et al. "The efficacious of AOP-based processes in concert with electrocoagulation in abatement of CECs from water/wastewater," npj Clean Water vol. 6, Article No. 30, Apr. 11, 2023.

Weber, Nathan H. et al. "Thermal Mineralization of Perfluorooctanesulfonic Acid (PFOS) to HF, CO2, and SO2," Ind. Eng. Chem. Res., Jan. 4, 2023, 62, 2, 881-892.

Pritchard, James Conrad et al. "Black Carbon-Amended Engineered Media Filters for Improved Treatment of Stormwater Runoff," ACS Environ Au. Sep. 28, 2022;3(1):34-46.

Kavusi, Elaheh et al. "Critical review on phytoremediation of polyfluoroalkyl substances from environmental matrices: Need for global concern," Environmental Research, vol. 217, Jan. 15, 2023, 114844.

Ordonez, Diana et al. "Continuous fixed-bed column adsorption of perfluorooctane sulfonic acid (PFOS) and perfluorooctanoic acid (PFOA) from canal water using zero-valent Iron-based filtration media," Separation and Purification Technology, vol. 299, Oct. 15, 2022, 121800.

McNamara, Patrick et al. "Pyrolysis transports, and transforms, PFAS from biosolids to py-liquid," Environ. Sci.: Water Res. Technol., Dec. 16, 2022,9, 386-395.

Parker, Bethany A. et al. "Evaluation of sorbents and matrix effects for treating heavy metals and per- and polyfluoroalkyl substances as co-contaminants in stormwater," Environ. Sci.: Water Res. Technol., Apr. 28, 2023,9, 3281-3289.

Smaili, Hajar et al. "Adsorption as a remediation technology for short-chain per- and polyfluoroalkyl substances (PFAS) from water—a critical review," Environ. Sci.: Water Res. Technol., Dec. 8, 2022,9, 344-362.

Ji, Yangyuan et al. "Electric Field-Assisted Nanofiltration for PFOA Removal with Exceptional Flux, Selectivity, and Destruction," Environ. Sci. Technol. Jan. 19, 2023, 57, 47, 18519-18528.

Lewis, Asa J. et al. "Influence of microbial weathering on the partitioning of per- and polyfluoroalkyl substances (PFAS) in biosolids," Environ. Sci.: Processes Impacts, Dec. 28, 2022,25, 415-431.

Ortiz, Inmaculada et al. "Membrane-assisted Photocatalytic Degradation of Perfluorooctanoic Acid," Journal of Membrane Science and Research, 9, 2, Accepted Mar. 29, 2023.

Zhang, Man et al. "Poly- and Perfluoroalkyl Substances (PFAS) in Landfills: Occurrence, Transformation and Treatment," Waste Management, vol. 155, Jan. 1, 2023, pp. 162-178.

Lang, Johnsie R. et al. "Characterization of per- and polyfluoroalkyl substances on fire suppression system piping and optimization of removal methods," Chemosphere, vol. 308, Part 2, Dec. 2022, 136254.

Ma, Jun et al. "MXene (Ti3T2CX)-reinforced thin-film polyamide nanofiltration membrane for short-chain perfluorinated compounds removal," Process Safety and Environmental Protection, vol. 168, Dec. 2022, pp. 275-284.

Chen, Ruya et al. "Performance of in-service granular activated carbon for perfluoroalkyl substances removal under changing water quality conditions," Science of The Total Environment, vol. 848, Nov. 20, 2022, 157723.

Johnson, James K. et al. "Removing forever chemicals via amphiphilic functionalized membranes," Clean Water, 5, Article No. 55, Oct. 4, 2022.

Kassar, Christian et al. "Removal of perfluoroalkyl acids and common drinking water contaminants by weak-base anion exchange resins: Impacts of solution pH and resin properties," Water Research X, vol. 17, Article 100159, Dec. 1, 2022.

Liu, Yang et al. "Simultaneous removal of multiple PFAS from contaminated groundwater around a fluorochemical facility by the periodically reversing electrocoagulation technique," Chemosphere, vol. 307, Part 2, Nov. 2022, 135874.

Zhi, Yue et al. "Removing emerging perfluoroalkyl ether acids and fluorotelomer sulfonates from water by nanofiltration membranes: Insights into performance and underlying mechanisms," Separation and Purification Technology, vol. 298, Oct. 1, 2022, 121648.

Kewalramani, Jitendra A. et al. "Coupled high and low-frequency ultrasound remediation of PFAS-contaminated soils," Ultrasonics Sonochemistry, vol. 88, Aug. 2022, 106063.

Huang, Junlong et al. "Facile Synthesis of a Fluorinated-Squaramide Covalent Organic Framework for the Highly Efficient and Broad-Spectrum Removal of Per- and Polyfluoroalkyl Pollutants," Angewandte Chemie International Editionvol. 61, Issue 31, e202206749, May 22, 2022.

Veciana, Mersabel et al. "Electrochemical oxidation processes for PFAS removal from contaminated water and wastewater: fundamentals, gaps and opportunities towards practical implementation," Journal of Hazardous Materials, vol. 434, Jul. 15, 2022, 128886.

Urtiaga, Ane et al. "Electrochemical treatment of municipal landfill leachates and implications for poly- and perfluoroalkyl substances (PFAS) removal," Journal of Environmental Chemical Engineering, vol. 10, Issue 3, Jun. 2022, 107900.

Wang, Tianlin et al. "Humic Acid Modified Selective Nanofiltration Membrane for Efficient Separation of PFASs and Mineral Salts," ACS EST Water, May 20, 2022, 2, 6, 1152-1160.

Le, Tin et al. "Functionalized-MXene Thin-Film Nanocomposite Hollow Fiber Membranes for Enhanced PFAS Removal from Water," ACS Appl. Mater. Interfaces, May 24, 2022, 14, 22, 25397-25408.

(56) References Cited

OTHER PUBLICATIONS

Grabda, Mariusz et al. "Removal of Perfluorooctanoic Acid from Water Using a Hydrophobic Ionic Liquid Selected Using the Conductor-like Screening Model for Realistic Solvents," Environ. Sci. Technol., Apr. 29, 2022, 56, 10, 6445-6454.

Smith, Sanne J. et al. "Pilot-Scale Continuous Foam Fractionation for the Removal of Per- and Polyfluoroalkyl Substances (PFAS) from Landfill Leachate," ACS EST Water, May 4, 2022, 2, 5, 841-851.

Mayakaduwage, Sonia et al. "Phytoremediation prospects of per- and polyfluoroalkyl substances: A review," Environmental Research, vol. 212, Part B, Sep. 2022, 113311.

Ellis, Anderson C. et al. "Pilot study comparison of regenerable and emerging single-use anion exchange resins for treatment of groundwater contaminated by per- and polyfluoroalkyl substances (PFASs)," Water Res. Sep. 1, 2022:223:119019. doi: 10.1016/j.watres.2022.119019. Epub Aug. 23, 2022.

Zhang, Weilan et al. "Changing bioavailability of per- and polyfluoroalkyl substances (PFAS) to plant in biosolids amended soil through stabilization or mobilization," Environmental Pollution, vol. 308, Sep. 1, 2022, 119724.

Wang, Yifei et al. "Assessing explicit models of per- and polyfluoroalkyl substances adsorption on anion exchange resins by rapid small-scale column tests," Chemosphere, vol. 300, Aug. 2022, 134547.

Yang, Shih-Hung et al. "Fate and Transformation of 6:2 Fluorotelomer Sulfonic Acid Affected by Plant, Nutrient, Bioaugmentation, and Soil Microbiome Interactions," Environ. Sci. Technol., Jul. 13, 2022, 56, 15, 10721-10731.

He, Anen et al. "Exploring the origin of efficient adsorption of poly- and perfluoroalkyl substances in household point-of-use water purifiers: Deep insights from a joint experimental and computational study," Science of The Total Environment, vol. 831, Jul. 20, 2022, 154988.

Rahman, M. Feisal et al. "Ion-Exchange Treatment of Perfluorinated Carboxylic Acids in Water: Comparison of Polystyrenic and Polyacrylic Resin Structures and Impact of Sulfate on Their Performance," ACS EST Water, Jun. 22, 2022, 2, 7, 1195-1205.

Croll, Henry C. et al. "Adaptation of selected models for describing competitive per- and polyfluoroalkyl substances breakthrough curves in groundwater treated by granular activated carbon," Journal of Hazardous Materials, vol. 433, Jul. 5, 2022, 128804.

Mulhern, Riley et al. "Longitudinal assessment of point-of-use carbon filters for removal of per- and polyfluoroalkyl substances from private well water," AWWA Water Sciencevol. 3, Issue 6, e1262, Dec. 6, 2021.

Long, Min et al. "Adsorption and Reductive Defluorination of Perfluorooctanoic Acid over Palladium Nanoparticles," Environ. Sci. Technol., Sep. 9, 2021, 55, 21, 14836-14843.

Pilli, Sridhar et al. "Detection and removal of poly and perfluoroalkyl polluting substances for sustainable environment," Journal of Environmental Management, vol. 297, Nov. 1, 2021, 113336.

Bolan, Nanthi et al. "Distribution, behaviour, bioavailability and remediation of poly- and per-fluoroalkyl substances (PFAS) in solid biowastes and biowaste-treated soil," Environment International, vol. 155, Oct. 2021, 106600.

Liu, Charlie J. et al. "Pilot-scale field demonstration of a hybrid nanofiltration and UV-sulfite treatment train for groundwater contaminated by per- and polyfluoroalkyl substances (PFASs)," Water Research, vol. 205, Oct. 15, 2021, 117677.

Jian, Xiangzhe et al. "Contribution of Nanobubbles for PFAS Adsorption on Graphene and OH- and NH2-Functionalized Graphene: Comparing Simulations with Experimental Results," Environ. Sci. Technol., Sep. 23, 2021, 55, 19, 13254-13263.

Choudhary, Aditya et al. "Interaction of Short-Chain PFAS with Polycationic Gels: How Much Fluorination is Necessary for Efficient Adsorption?" ACS Macro Lett., Aug. 29, 2022, 11, 9, 1123-1128.

Kumar, Pranjali et al. "Per- and polyfluoroalkyl substance removal in carbon-based advanced treatment for potable reuse," AWWA Water Sciencevol. 3, Issue 5, e1244, Oct. 5, 2021.

Huang, Danlian et al. "Phytoremediation of poly- and perfluoroalkyl substances: A review on aquatic plants, influencing factors, and phytotoxicity," Journal of Hazardous Materials, vol. 418, Sep. 15, 2021, 126314.

Zhang, Weilan et al. "Effects of hydrothermal treatments on destruction of per- and polyfluoroalkyl substances in sewage sludge," Environmental Pollution, vol. 285, Sep. 15, 2021, 117276.

Garg, Shafali et al. "Remediation of water from per-/poly-fluoroalkyl substances (PFAS)—Challenges and perspectives," Journal of Environmental Chemical Engineering, vol. 9, Issue 4, Aug. 2021, 105784.

Groele, Joseph R. et al. "An investigation of plasma-driven decomposition of per- and polyfluoroalkyl substances (PFAS) in raw contaminated ground water," J. Appl. Phys. 130, 053304 (Aug. 3, 2021).

Feng, Danyi et al. "Environmental, human health, and economic implications of landfill leachate treatment for per- and polyfluoroalkyl substance removal," Journal of Environmental Management, vol. 289, Jul. 1, 2021, 112558.

Chen, Ruya et al. "Field study on the transportation characteristics of PFASs from water source to tap water," Water Research, vol. 198, Jun. 15, 2021, 117162.

Londhe, Kaushik et al. "Energy Evaluation of Electron Beam Treatment of Perfluoroalkyl Substances in Water: A Critical Review," ACS EST Engg. Apr. 20, 2021, 1, 5, 827-841.

Baghirzade, Busra Sonmez et al. "Thermal Regeneration of Spent Granular Activated Carbon Presents an Opportunity to Break the Forever PFAS Cycle," Environ. Sci. Technol., Apr. 21, 2021, 55, 9, 5608-5619.

Fang, Yida et al. "Removal of Per- and Polyfluoroalkyl Substances (PFASs) in Aqueous Film-Forming Foam (AFFF) Using Ion-Exchange and Nonionic Resins," Environ. Sci. Technol., Mar. 22, 2021, 55, 8, 5001-5011.

Kah, Melanie et al. "Sequestration and potential release of PFAS from spent engineered sorbents," Science of The Total Environment, vol. 765, Apr. 15, 2021, 142770.

Singh, Raj Kamal et al. "Treatment of PFAS-containing landfill leachate using an enhanced contact plasma reactor," Journal of Hazardous Materials, vol. 408, Apr. 15, 2021, 124452.

Choi, Paula Jungwon et al. "Low-pressure volume retarded osmosis for removal of per- and polyfluoroalkyl substances," Water Research, vol. 194, Apr. 15, 2021, 116929.

Schwidetzky, Ralph et al. "Ice Nucleation Activity of Perfluorinated Organic Acids," J. Phys. Chem. Lett., Mar. 31, 2021, 12, 13, 3431-3435.

Ziaee, Farzaneh et al. "Synthesis and application of a green surfactant for the treatment of water containing PFAS/ hazardous metal ions," Journal of Hazardous Materials, vol. 407, Apr. 5, 2021, 124800.

Wanninayake, Dushanthi M. "Comparison of currently available PFAS remediation technologies in water: A review," Journal of Environmental Management, vol. 283, Apr. 1, 2021, 111977.

Nadagouda, Mallikarjuna N. et al. "Cross-Flow Treatment of PFAS in Water: Materials Challenges and Potential Solutions," Acc Mater Res. Feb. 10, 2021;2(3):129-133. doi: 10.1021/accountsmr.0c00106.

Qanbarzadeh, Mojtaba et al. "Impacts of Reactor Configuration, Degradation Mechanisms, and Water Matrices on Perfluorocarboxylic Acid Treatment Efficiency by the UV/Bi3O(OH)(PO4)2 Photocatalytic Process," ACS EST Engg. Nov. 16, 2020, 1, 2, 239-248.

Gonzalez, Dana et al. "Assessment of PFAS fate, transport, and treatment inhibition associated with a simulated AFFF release within a Wastewater treatment plant," Chemosphere, vol. 262, Jan. 2021, 127900.

Sörengård, Mattias et al. "Laboratory-scale and pilot-scale stabilization and solidification (S/S) remediation of soil contaminated with per- and polyfluoroalkyl substances (PFASs)," Journal of Hazardous Materials, vol. 402, Jan. 15, 2021, 123453.

Popovic, Jovan et al. "Evaluation of a drop-in waste volume reduction method for liquid investigation derived waste containing per- and polyfluoroalkyl substances," Journal of Environmental Management, vol. 279, Feb. 1, 2021, 111502.

(56) References Cited

OTHER PUBLICATIONS

Bolan, Nanthi et al. "Remediation of poly- and perfluoroalkyl substances (PFAS) contaminated soils—To mobilize or to immobilize or to degrade?" Journal of Hazardous Materials, vol. 401, Jan. 5, 2021, 123892.
Yan, Wangwang et al. "Interaction of perfluorooctanoic acid with extracellular polymeric substances—Role of protein," Journal of Hazardous Materials, vol. 401, Jan. 5, 2021, 123381.
Mastropietro, Teresa F. et al. "Reverse osmosis and nanofiltration membranes for highly efficient PFASs removal: overview, challenges and future perspectives," Dalton Trans., Apr. 6, 2021,50, 5398-5410.
Xiong, Jiaqing et al. "The rejection of perfluoroalkyl substances by nanofiltration and reverse osmosis: influencing factors and combination processes," Environ. Sci.: Water Res. Technol., Sep. 17, 2021,7, 1928-1943.
Kundu, Sazal et al. "Removal of PFASs from biosolids using a semi-pilot scale pyrolysis reactor and the application of biosolids derived biochar for the removal of PFASs from contaminated water," Environ. Sci.: Water Res. Technol., Dec. 16, 2021,7, 638-649.
Abusallout, Ibrahim et al. "Emerging investigator series: rapid defluorination of 22 per- and polyfluoroalkyl substances in water using sulfite irradiated by medium-pressure UV," Environ. Sci.: Water Res. Technol., Jun. 25, 2021,7, 1552-1562.
Jun, Tonghui et al. "Amyloid fibril-based membranes for PFAS removal from water," Environ. Sci.: Water Res. Technol., Aug. 16, 2021, 7, 1873-1884.
Sun, Heejong et al. "The Adsorption Selectivity of Short and Long Per- and Polyfluoroalkyl Substances (PFASs) from Surface Water Using Powder-Activated Carbon," Water, Nov. 23, 2020, 12(11), 3287.
Qu, Yingxi et al. "Poly- and perfluoroalkyl substances in a drinking water treatment plant in the Yangtze River Delta of China: Temporal trend, removal and human health risk," Science of The Total Environment, vol. 696, Dec. 15, 2019, 133949.
Sörengård, Mattias et al. "Electrodialytic per- and polyfluoroalkyl substances (PFASs) removal mechanism for contaminated soil," Chemosphere. Oct. 2019:232:224-231. doi: 10.1016/j.chemosphere. 2019.05.088. Epub May 22, 2019.
Turner, Brett D. "Novel remediation of per- and polyfluoroalkyl substances (PFASs) from contaminated groundwater using *Cannabis sativa* L. (hemp) protein powder," Chemosphere, vol. 229, Aug. 2019, pp. 22-31.
Schaefer, Charles E. et al. "Assessing Rapid Small-Scale Column Tests for Treatment of Perfluoroalkyl Acids by Anion Exchange Resin," Ind. Eng. Chem. Res. May 16, 2019, 58, 22, 9701-9706.
Dalameh, Sahar S. et al. "Potential of biochar filters for onsite wastewater treatment: Effects of active and inactive biofilms on adsorption of per- and polyfluoroalkyl substances in laboratory column experiments," Environmental Pollution, vol. 247, Apr. 2019, pp. 155-164.
Zhang, Weilan et al. "Nanotechnology in remediation of water contaminated by poly- and perfluoroalkyl substances: A review," Environmental Pollution, vol. 247, Apr. 2019, pp. 266-276.
Liu, Charlie J. et al. "Removal of per- and polyfluoroalkyl substances (PFASs) from contaminated groundwater using granular activated carbon: a pilot-scale study with breakthrough modeling," Environ. Sci.: Water Res. Technol., Jun. 25, 2019,5, 1844-1853.
Dixit, Fuhar et al. "PFOA and PFOS removal by ion exchange for water reuse and drinking applications: role of organic matter characteristics," Environ. Sci.: Water Res. Technol., Sep. 2, 2019,5, 1782-1795.
Klemes, Max J. et al. "Reduction of a Tetrafluoroterephthalonitrile-β-Cyclodextrin Polymer to Remove Anionic Micropollutants and Perfluorinated Alkyl Substances from Water," Angewandte Chemie International Edition, Jun. 17, 2019, vol. 58, Issue 35 p. 12049-12053.

Chen, Shuqin et al. "Seasonal and annual variations in removal efficiency of perfluoroalkyl substances by different wastewater treatment processes," Environmental Pollution, vol. 242, Part B, Nov. 2018, pp. 2059-2067.
Glover, Caitlin M. et al. "Removal of perfluoroalkyl and polyfluoroalkyl substances in potable reuse systems," Water Research, vol. 144, Nov. 1, 2018, pp. 454-461.
Maimaiti, Ayiguli et al. "Competitive adsorption of perfluoroalkyl substances on anion exchange resins in simulated AFFF-impacted groundwater," Chemical Engineering Journal, vol. 348, Sep. 15, 2018, pp. 494-502.
Xiao, Xin et al. "Sorption of Poly- and Perfluoroalkyl Substances (PFASs) Relevant to Aqueous Film-Forming Foam (AFFF)-Impacted Groundwater by Biochars and Activated Carbon," Environ. Sci. Technol. Jun. 6, 2017, 51, 11, 6342-6351.
Stratton, Gunnar R. et al. "Plasma-Based Water Treatment: Efficient Transformation of Perfluoroalkyl Substances in Prepared Solutions and Contaminated Groundwater," Environ. Sci. Technol. Jan. 12, 2017, 51, 3, 1643-1648.
Pramanik, Biplob Kumar "Occurrence of perfluoroalkyl and polyfluoroalkyl substances in the water environment and their removal in a water treatment process," Journal of Water Reuse and Desalination (2015) 5 (2): 196-210. Published Sep. 29, 2014.
Panda, Debabrata et al. "Kinetics and mechanism of low-frequency ultrasound driven elimination of trace level aqueous perfluorooctanesulfonic acid and perfluorooctanoic acid," Chemical Engineering and Processing—Process Intensification, vol. 142, Aug. 2019, 107542.
Liu, Guanhong et al. "Direct and efficient reduction of perfluorooctanoic acid using bimetallic catalyst supported on carbon," Journal of Hazardous Materials, vol. 412, Jun. 15, 2021, 125224.
Ma, Qingquan et al. "Electrosorption, Desorption, and Oxidation of Perfluoroalkyl Carboxylic Acids (PFCAs) via MXene-Based Electrocatalytic Membranes," ACS Appl. Mater. Interfaces, Jun. 9, 2023, 15, 24, 29149-29159.
Huang, Dahong et al. "Photoinduced Hydrodefluorination Mechanisms of Perfluorooctanoic Acid by the SiC/Graphene Catalyst," Environ. Sci. Technol. Apr. 29, 2016, 50, 11, 5857-5863.
Giri, R.R. et al. "Oxidative-reductive photodecomposition of perfluorooctanoic acid in water," International Journal of Environmental Science and Technology, vol. 11, pp. 1277-1284, published May 25, 2013.
Liu, Guanhong et al. "Thermal assisted heterogeneous activation of peroxymonosulfate by activated carbon to degrade perfluorooctanoic acid in soil," Journal of Environmental Chemical Engineering, vol. 10, Issue 3, Jun. 2022, 107475.
Jiang, Fang et al. "Enhancement of photocatalytic decomposition of perfluorooctanoic acid on CeO2/In2O3," RSC Adv., Jul. 25, 2016,6, 72015-72021.
Longendyke, Grace K. et al. "PFAS fate and destruction mechanisms during thermal treatment: a comprehensive review," Environ Sci Process Impacts. Feb. 23, 2022;24(2):196-208. doi: 10.1039/d1em00465d.
Juve, Jan-Max Arana et al. "Concentrate and degrade PFOA with a photo-regenerable composite of In-doped TNTs@AC," Chemosphere. Aug. 2022:300:134495. doi: 10.1016/j.chemosphere.2022.134495. Epub Apr. 4, 2022.
Vecitis, Chad D. et al. "Sonochemical Degradation of Perfluorooctanesulfonate in Aqueous Film-Forming Foams," Environ. Sci. Technol., Dec. 4, 2009, 44, 1, 432-438.
Bentel, Michael J. et al. "Defluorination of Per- and Polyfluoroalkyl Substances (PFASs) with Hydrated Electrons: Structural Dependence and Implications to PFAS Remediation and Management," Environ. Sci. Technol. Mar. 15, 2019, 53, 7, 3718-3728.
Isowamwen, Osakpolo et al. "Plasma-assisted degradation of a short-chain perfluoroalkyl substance (PFAS): Perfluorobutane sulfonate (PFBS)," Journal of Hazardous Materials, vol. 456, Aug. 15, 2023, 131691.
Chowdhury, Nusrat et al. "Dependency of the photocatalytic and photochemical decomposition of per- and polyfluoroalkyl substances (PFAS) on their chain lengths, functional groups, and structural properties," Water Sci Technol. Dec. 2021;84(12):3738-3754. doi: 10.2166/wst.2021.458.

(56) References Cited

OTHER PUBLICATIONS

Biswas, Sohag et al. "Degradation of Perfluorooctanoic Acid on Aluminum Oxide Surfaces: New Mechanisms from Ab Initio Molecular Dynamics Simulations," Environ. Sci. Technol. Apr. 5, 2023, 57, 16, 6695-6702.
Gobindlal, Kapish et al. "Solvent-Free, Ambient Temperature and Pressure Destruction of Perfluorosulfonic Acids under Mechanochemical Conditions: Degradation Intermediates and Fluorine Fate," Environ. Sci. Technol. Dec. 28, 2022, 57, 1, 277-285.
Wiens, Justin P. et al. "Elementary Reactions Leading to Perfluoroalkyl Substance Degradation in an Ar+/e– Plasma," J. Phys. Chem. A, Nov. 22, 2022, 126, 48, 9076-9086.
Gao, Xin et al. "Surface Complex and Nonradical Pathways Contributing to High-Efficiency Degradation of Perfluorooctanoic Acid on Oxygen-Deficient In2O3 Derived from an In-Based Metal Organic Framework," ACS EST Water Jul. 4, 2022, 2, 8, 1344-1352.
Metz, Jordin et al. "Perfluorooctanoic acid Degradation by UV/Chlorine," Environ. Sci. Technol. Lett., Jul. 19, 2022, 9, 8, 673-679.
Wen, Yinghao et al. "Integrated Photocatalytic Reduction and Oxidation of Perfluorooctanoic Acid by Metal-Organic Frameworks: Key Insights into the Degradation Mechanisms," J. Am. Chem. Soc. Jun. 22, 2022, 144, 26, 11840-11850.
Liu, Guoshuai et al. "Degradation of Perfluorooctanoic Acid with Hydrated Electron by a Heterogeneous Catalytic System," Environ. Sci. Technol. Dec. 23, 2021, 56, 10, 6223-6231.
Liu, Liquan et al. "Degradation of OBS (Sodium p-Perfluorous Nonenoxybenzenesulfonate) as a Novel Per- and Polyfluoroalkyl Substance by UV/Persulfate and UV/Sulfite: Fluorinated Intermediates and Treatability in Fluoroprotein Foam," Environ. Sci. Technol. Feb. 2, 2022, 56, 10, 6201-6211.
Hao, Shilai et al. "Application of Hydrothermal Alkaline Treatment for Destruction of Per- and Polyfluoroalkyl Substances in Contaminated Groundwater and Soil," Environ. Sci. Technol. May 6, 2022, 56, 10, 6647-6657.
Bai, Lu et al. "Mechanistic Understanding of Superoxide Radical-Mediated Degradation of Perfluorocarboxylic Acids," Environ. Sci. Technol. Dec. 21, 2021, 56, 1, 624-633.
Li, Lei et al. "First-Principles Study of the Degradation of Perfluorooctanesulfonate and Perfluorobutanesulfonate on a Magnéli Phase Ti4O7 Anode," ACS EST Water, Jul. 28, 2021, 1, 8, 1737-1744.
Maza, William A. et al. "Impact of Submicellar Aggregation on Reduction Kinetics of Perfluorooctanoate by the Hydrated Electron," Environ. Sci. Technol. Lett. Jan. 31, 2022, 9, 3, 226-232.
Chen, Zhonghang et al. "Efficient Recognition and Removal of Persistent Organic Pollutants by a Bifunctional Molecular Material," J. Am. Chem. Soc. Dec. 20, 2022, 145, 1, 260-267.
Chen, Gongde et al. "Hydrogen-polarized vacuum ultraviolet photolysis system for enhanced destruction of perfluoroalkyl substances," Journal of Hazardous Materials Letters, vol. 3, Nov. 2022, 100072.
Chen, Zhanghao et al. "Enhanced UV photoreductive destruction of perfluorooctanoic acid in the presence of alcohols: Synergistic mechanism of hydroxyl radical quenching and solvent effect," Applied Catalysis B: Environmental, vol. 316, Nov. 5, 2022, 121652.
Chen, Zhanghao et al. "Challenging the contamination of per- and polyfluoroalkyl substances in water: advanced oxidation or reduction?" Environmental Functional Materials, vol. 1, Issue 3, Sep. 2022, pp. 325-337.
Li, Meng et al. "Efficient decomposition of perfluorooctane sulfonate by electrochemical activation of peroxymonosulfate in aqueous solution: Efficacy, reaction mechanism, active sites, and application potential," Water Research, vol. 221, Aug. 1, 2022, 118778.
Li, Meng et al. "Exploration of perfluorooctane sulfonate degradation properties and mechanism via electron-transfer dominated radical process," Water Research, vol. 215, May 15, 2022, 118259.
Javed, Hassan et al. "Discerning the Relevance of Superoxide in PFOA Degradation," Environ. Sci. Technol. Lett. Jul. 13, 2020, 7, 9, 653-658.
Duan, Lijie et al. "Efficient Photocatalytic PFOA Degradation over Boron Nitride," Environ. Sci. Technol. Lett. Jun. 14, 2020, 7, 8, 613-619.
Xiao, Feng et al. "Thermal Stability and Decomposition of Perfluoroalkyl Substances on Spent Granular Activated Carbon," Environ. Sci. Technol. Lett. Apr. 20, 2020, 7, 5, 343-350.
Wang, Kaixuan et al. "Enhanced perfluorooctanoic acid degradation by electrochemical activation of peroxymonosulfate in aqueous solution," Environment International, vol. 137, Apr. 2020, 105562.
Zhou, Yongyue et al. "Quantification of perfluorooctanoic acid decomposition mechanism applying negative voltage to anode during photoelectrochemical process," Chemosphere, vol. 284, Dec. 2021, 131311.
Zheng, Zhe et al. "Guanidinocalix[5]arene for sensitive fluorescence detection and magnetic removal of perfluorinated pollutants," Nat Commun. Dec. 17, 2019;10(1):5762. doi: 10.1038/s41467-019-13775-1.
Liang, Jie et al. "Research Updates on the Mechanism and Influencing Factors of the Photocatalytic Degradation of Perfluorooctanoic Acid (PFOA) in Water Environments," Molecules. Jun. 1, 2023;28(11):4489. doi: 10.3390/molecules28114489.
Park, Hyunwoong et al. "Reductive defluorination of aqueous perfluorinated alkyl surfactants: effects of ionic headgroup and chain length," J Phys Chem A. Jan. 29, 2009;113(4):690-6. doi: 10.1021/jp807116q.
Yang, Lie et al. "Persulfate-based degradation of perfluorooctanoic acid (PFOA) and perfluorooctane sulfonate (PFOS) in aqueous solution: Review on influences, mechanisms and prospective," J Hazard Mater. Jul. 5, 2020:393:122405. doi: 10.1016/j.jhazmat.2020.122405. Epub Feb. 25, 2020.
Schaefer, Charles et al. "Electrochemical treatment of perfluorooctanoic acid (PFOA) and perfluorooctane sulfonic acid (PFOS) in groundwater impacted by aqueous film forming foams (AFFFs)," J Hazard Mater. Sep. 15, 2015:295:170-5. doi: 10.1016/j.jhazmat.2015.04.024. Epub Apr. 10, 2015.
Meegoda, Jay N. et al. "A Review of PFAS Destruction Technologies," Int J Environ Res Public Health. Dec. 7, 2022;19(24):16397. doi: 10.3390/ijerph192416397.
Kim, Hak-Hyeon et al. "Treatment of electrochemical plating wastewater by heterogeneous photocatalysis: the simultaneous removal of 6:2 fluorotelomer sulfonate and hexavalent chromium," RSC Adv. Nov. 22, 2021;11(59):37472-37481. doi: 10.1039/d1ra06235b. eCollection Nov. 17, 2021.
Zhang, Han et al. "Enhancing Interface Reactions by Introducing Microbubbles into a Plasma Treatment Process for Efficient Decomposition of PFOA," Environ. Sci. Technol. Nov. 9, 2021, 55, 23, 16067-16077.
Zhang, Wei et al. "Electrochemical oxidation coupled with hydrated electron reduction in ultraviolet (UV)-sulfite system for complete defluorination and mineralization of Perfluorooctanoic Acid (PFOA)," Journal of Water Process Engineering, vol. 53, Jul. 2023, 103836.
Sun, Shaohua et al. "Rapid degradation and efficient defluorination of perfluorooctanoic acid(PFOA) by microwave discharge plasma in liquid combined with catalytic ions Fe2+," Journal of Environmental Chemical Engineering, vol. 11, Issue 3, Jun. 2023, 109887.
Xiong, Xingaoyuan et al. "Complete defluorination of perfluorooctanoic acid (PFOA) by ultrasonic pyrolysis towards zero fluoro-pollution," Water Research, vol. 235, May 15, 2023, 119829.
Cardoso, Ines M. F. et al. "Nanomaterial-Based Advanced Oxidation/Reduction Processes for the Degradation of PFAS," Nanomaterials, May 18, 2023, 13(10), 1668.
Saleem, Mubbshir et al. "Highly efficient degradation of PFAS and other surfactants in water with atmospheric RAdial plasma (RAP) discharge," Chemosphere, vol. 307, Part 2, Nov. 2022, 135800.
Duan, Lijie et al. "Titanium oxide improves boron nitride photocatalytic degradation of perfluorooctanoic acid," Chemical Engineering Journal, vol. 448, Nov. 15, 2022, 137735.
Schlesinger, Danielle R. et al. "Destruction of per/poly-fluorinated alkyl substances by magnetite nanoparticle-catalyzed UV-Fenton reaction," Environ. Sci.: Water Res. Technol., Sep. 21, 2022,8, 2732-2743.

(56) References Cited

OTHER PUBLICATIONS

Johnson, M.J. et al. "Low power degradation of perfluorooctane sulfonate (PFOS) in water using a nanosecond pulsed atmospheric pressure plasma," 2022 Plasma Sources Sci. Technol. 31 085001.
Liu, Xiaoqing et al. "High-performance photocatalytic decomposition of PFOA by BiOX/TiO2 heterojunctions: Self-induced inner electric fields and band alignment," Journal of Hazardous Materials, vol. 430, May 15, 2022, 128195.
Gong, Yanyan et al. "Removal of aqueous perfluorooctanoic acid (PFOA) using starch-stabilized magnetite nanoparticles," Science of The Total Environment, vol. 562, Aug. 15, 2016, pp. 191-200.
Gu, Pengfei et al. "Enhanced photoreductive degradation of perfluorooctanesulfonate by UV irradiation in the presence of ethylenediaminetetraacetic acid," Chemical Engineering Journal, vol. 379, Jan. 1, 2020, 122338.
Hori, Hisao et al. "Efficient Decomposition of Environmentally Persistent Perfluorooctanesulfonate and Related Fluorochemicals Using Zerovalent Iron in Subcritical Water," Environ. Sci. Technol. Jan. 6, 2006, 40, 3, 1049-1054.
Hori, Hisao et al. "Efficient Decomposition of Perfluorocarboxylic Acids and Alternative Fluorochemical Surfactants in Hot Water," Environ. Sci. Technol. Aug. 30, 2008, 42, 19, 7438-7443.
Li, Kexin et al. "Fabrication of mesoporous Fe3O4@SiO2@CTAB-SiO2 magnetic microspheres with a core/shell structure and their efficient adsorption performance for the removal of trace PFOS from water," Colloids and Surfaces A: Physicochemical and Engineering Aspects, vol. 465, Jan. 20, 2015, pp. 113-123.
Li, Mingjie et al. "Photocatalytic decomposition of perfluorooctanoic acid by noble metallic nanoparticles modified TiO2," Chemical Engineering Journal, vol. 286, Feb. 15, 2016, pp. 232-238.
Li, Jing et al. "Removal of perfluorooctanoic acid from water with economical mesoporous melamine-formaldehyde resin microsphere," Chemical Engineering Journal, vol. 320, Jul. 15, 2017, pp. 501-509.
Luo, Qi et al. "Laccase-Catalyzed Degradation of Perfluorooctanoic Acid," Environ. Sci. Technol. Lett., Jun. 1, 2015, 2, 7, 198-203.
Niu, Zhijuan et al. "Electrochemically enhanced removal of perfluorinated compounds (PFCs) from aqueous solution by CNTs-graphene composite electrode," Chemical Engineering Journal, vol. 328, Nov. 15, 2017, pp. 228-235.
Ong, Chin Boon et al. "Solar photocatalytic and surface enhancement of ZnO/rGO nanocomposite: Degradation of perfluorooctanoic acid and dye," Process Safety and Environmental Protection, vol. 112, Part B, Nov. 2017, pp. 298-307.
Soriano, Alvaro et al. "Efficient treatment of perfluorohexanoic acid by nanofiltration followed by electrochemical degradation of the NF concentrate," Water Research, vol. 112, Apr. 1, 2017, pp. 147-156.
Chen, Zhanghao et al. "Application of surfactant modified montmorillonite with different conformation for photo-treatment of perfluorooctanoic acid by hydrated electrons," Chemosphere, vol. 235, Nov. 2019, pp. 1180-1188.
Li, Yulong et al. "Boosting degradation and defluorination efficiencies of PFBS in a vacuum-ultraviolet/S(IV) process with iodide involvement," Chemosphere, vol. 313, Feb. 2023, 137531.
Chen, Jing et al. "Photodegradation of perfluorooctanoic acid by 185 nm vacuum ultraviolet light," Journal of Environmental Sciences, vol. 19, Issue 4, 2007, pp. 387-390.
Chen, Meng-Jia et al. "Decomposition of perfluorooctanoic acid by ultraviolet light irradiation with Pb-modified titanium dioxide," Journal of Hazardous Materials, vol. 303, Feb. 13, 2016, pp. 111-118.
Du, Ziwen et al. "Adsorption behavior and mechanism of perfluorinated compounds on various adsorbents—A review," Journal of Hazardous Materials, vol. 274, Jun. 15, 2014, pp. 443-454.
Schroder, Horst Fr. et al. "Stability of fluorinated surfactants in advanced oxidation processes—A follow up of degradation products using flow injection-mass spectrometry, liquid chromatography—mass spectrometry and liquid chromatography—multiple stage mass spectrometry," Journal of Chromatography A, vol. 1082, Issue 1, Jul. 29, 2005, pp. 110-119.

O'Connor, Natalia et al. "Forever no more: Complete mineralization of per- and polyfluoroalkyl substances (PFAS) using an optimized UV/sulfite/iodide system," Science of The Total Environment, vol. 888, Aug. 25, 2023, 164137.
Li, Yueh-Feng et al. "Cationic surfactants influencing the enhancement of energy efficiency for perfluorooctanoic acid (PFOA) removal in the electrocoagulation-flotation (ECF) system," Chemosphere, vol. 318, Mar. 2023, 137932.
Giri, Rabindra Raj et al. "Factors influencing UV photodecomposition of perfluorooctanoic acid in water," Chemical Engineering Journal, vol. 180, Jan. 15, 2012, pp. 197-203.
Wang, B.B. et al. "Photochemical decomposition of perfluorodecanoic acid in aqueous solution with VUV light irradiation," Journal of Hazardous Materials, vol. 181, Issues 1-3, Sep. 15, 2010, pp. 187-192.
Song, Chao et al. "Photodegradation of perfluorooctanoic acid by synthesized TiO2-MWCNT composites under 365 nm UV irradiation," Chemosphere, vol. 86, Issue 8, Feb. 2012, pp. 853-859.
Li, Zhenmin et al. "In2O3 nanoporous nanosphere: A highly efficient photocatalyst for decomposition of perfluorooctanoic acid," Applied Catalysis B: Environmental, vol. 125, Aug. 21, 2012, pp. 350-357.
Sun, Shaohua et al. "Defluorination of per-fluorinated compound (PFC) by microwave discharge plasma in liquid: A green and efficient water treatment technology," Separation and Purification Technology, vol. 319, Aug. 15, 2023, 124071.
Estrellan, Carl Renan et al. "Photocatalytic decomposition of perfluorooctanoic acid by iron and niobium co-doped titanium dioxide," Journal of Hazardous Materials, vol. 179, Issues 1-3, Jul. 15, 2010, pp. 79-83.
Uwayezu, Jean Noel et al. "Validation of UV/persulfate as a PFAS treatment of industrial wastewater and environmental samples," Journal of Water Process Engineering, vol. 53, Jul. 2023, 103614.
Chang, Po-Hsiang et al. "Synthesis and characterization of PCN-222 metal organic framework and its application for removing perfluorooctane sulfonate from water," Journal of Colloid and Interface Science, vol. 636, Apr. 15, 2023, pp. 459-469.
Lv, Yuancai et al. "Rapid degradation of PFOA by the activated peroxymono-sulfate with FeCo/MoS2 catalyst," Journal of Environmental Chemical Engineering, vol. 11, Issue 2, Apr. 2023, 109467.
Cheng, Jian-hua et al. "Photochemical defluorination of aqueous perfluorooctanoic acid (PFOA) by VUV/Fe3+ system," Chemical Engineering Journal, vol. 239, Mar. 1, 2014, pp. 242-249.
Carter, Kimberly E. et al. "Oxidative destruction of perfluorooctane sulfonate using boron-doped diamond film electrodes," Environ Sci Technol. Aug. 15, 2008;42(16):6111-5. doi: 10.1021/es703273s.
Giri, R.R. et al. "UV photolysis of perfluorooctanoic acid (PFOA) in dilute aqueous solution," Water Sci Technol. 2011;63(2):276-82. doi: 10.2166/wst.2011.050.
Wang, Yuan et al. "Enhanced photochemical decomposition of environmentally persistent perfluorooctanoate by coexisting ferric ion and oxalate," Environ Sci Pollut Res Int. May 2016;23(10):9660-8. doi: 10.1007/s11356-016-6205-4. Epub Feb. 4, 2016.
Sidnell, Tim et al. "Sonolysis of per- and poly fluoroalkyl substances (PFAS): A meta-analysis," Ultrason Sonochem. Jun. 2022;87:105944. doi: 10.1016/j.ultsonch.2022.105944. Epub Feb. 7, 2022.
Alinezhad, Ali et al. "An Investigation of Thermal Air Degradation and Pyrolysis of Per- and Polyfluoroalkyl Substances and Aqueous Film-Forming Foams in Soil," ACS EST Engg., Jan. 11, 2022, 2, 2, 198-209.
Cui, Junkui et al. "Hydrated Electron Degradation of PFOA Laden on Ion-Exchange Resins in the Presence of Natural Organic Matter," ACS EST Engg., Oct. 13, 2023, 3, 1, 86-93.
Wu, Yaoyao et al. "Highly Efficient Degradation of Perfluorooctanoic Acid over a MnOx-Modified Oxygen-Vacancy-Rich In2O3 Photocatalyst," ChemCatChem, vol. 11, Issue 9, Mar. 28, 2019, p. 2297-2303.
Woodard, Steve et al. "Ion exchange resin for PFAS removal and pilot test comparison to GAC," Remediation Journal, vol. 27, Issue 3, p. 19-27, Jun. 7, 2017.

(56) References Cited

OTHER PUBLICATIONS

Pramanik, Biplob Kumar et al. "A comparative study of coagulation, granular- and powdered-activated carbon for the removal of perfluorooctane sulfonate and perfluorooctanoate in drinking water treatment," vol. 36, Issue 20, pp. 2610-2617, May 5, 2015.

Olimattel, Kunal et al. "Enhanced removal of perfluorooctane sulfonic acid and perfluorooctanoic acid via polyelectrolyte functionalized ultrafiltration membrane: Effects of membrane modification and water matrix," Journal of Hazardous Materials Letters, vol. 2, Nov. 2021, 100043.

Boonyao-atichart, Apisara et al. "Study of hybrid membrane filtration and photocatalysis for removal of perfluorooctanoic acid (PFOA) in groundwater," Water Sci Technol (Apr. 17, 2018) 2017 (2): 561-569.

Omo-Okoro, Patricia N. et al. "Removal of per- and polyfluoroalkyl substances from aqueous media using synthesized silver nanocomposite-activated carbons," Journal of Environmental Health Science and Engineering, vol. 19, pp. 217-236, (Jan. 7, 2021).

Tang, Chuyang Y. et al. "Use of Reverse Osmosis Membranes to Remove Perfluorooctane Sulfonate (PFOS) from Semiconductor Wastewater," Environ. Sci. Technol., Oct. 5, 2006, 40, 23, 7343-7349.

Soriano, Alvaro et al. "Selection of High Flux Membrane for the Effective Removal of Short-Chain Perfluorocarboxylic Acids," Ind. Eng. Chem. Res., Jan. 25, 2019, 58, 8, 3329-3338.

Wang, Tao et al. "Fabrication of novel poly(m-phenylene isophthalamide) hollow fiber nanofiltration membrane for effective removal of trace amount perfluorooctane sulfonate from water," Journal of Membrane Science, vol. 477, Mar. 1, 2015, pp. 74-85.

Pensini, Erica et al. "Effect of salts and pH on the removal of perfluorooctanoic acid (PFOA) from aqueous solutions through precipitation and electroflocculation," Canadian Journal of Civil Engineering, Mar. 22, 2019. https://doi.org/10.1139/cjce-2018-0705.

Zhou, Yusun et al. "Preparation of a functional silica membrane coated on Fe3O4 nanoparticle for rapid and selective removal of perfluorinated compounds from surface water sample," Chemical Engineering Journal, vol. 303, Nov. 1, 2016, pp. 156-166.

Liu, Fangzhou et al. "Influences of microwave irradiation on performances of membrane filtration and catalytic degradation of perfluorooctanoic acid (PFOA)," Environment International, vol. 143, Oct. 2020, 105969.

Soriano, Alvaro et al. "Membrane preconcentration as an efficient tool to reduce the energy consumption of perfluorohexanoic acid electrochemical treatment," Separation and Purification Technology, vol. 208, Jan. 8, 2019, pp. 160-168.

Shi, Huanhuan et al. "Degradation of Perfluorooctanesulfonate by Reactive Electrochemical Membrane Composed of Magnéli Phase Titanium Suboxide," Environ. Sci. Technol., Nov. 15, 2019, 53, 24, 14528-14537.

Fagbayigbo, Bamidele Oladapo et al. "Removal of PFOA and PFOS from aqueous solutions using activated carbon produced from Vitis vinifera leaf litter," Environmental Science and Pollution Research, Apr. 5, 2017, vol. 24, pp. 13107-13120.

Van den Bergh, Matthias et al. "Highly Selective Removal of Perfluorinated Contaminants by Adsorption on All-Silica Zeolite Beta," Angewandte Chemie International Edition, vol. 59, Issue 33, p. 14086-14090, May 4, 2020.

Lee, Yu-Chi et al. "Efficient decomposition of perfluorocarboxylic acids in aqueous solution using microwave-induced persulfate," Water Research, vol. 43, Issue 11, Jun. 2009, pp. 2811-2816.

Baggioli, Alberto et al. "Thermodynamics of aqueous perfluorooctanoic acid (PFOA) and 4,8-dioxa-3H-perfluorononanoic acid (DONA) from DFT calculations: Insights into degradation initiation," Chemosphere, vol. 193, Feb. 2018, pp. 1063-1070.

Chu, Liquan et al. "Efficient decomposition of perfluorooctane sulfonate by hydrated electrons: Performance, mechanism, and carbon emission reduction," Journal of Water Process Engineering, vol. 49, Oct. 2022, 103070.

Yang, She-wei et al. "Effect of vacuum ultraviolet on ultrasonic defluorination of aqueous perfluorooctanesulfonate," Chemical Engineering Journal, vol. 234, Dec. 2013, pp. 106-114.

Vecitis, Chad D. et al. "Treatment technologies for aqueous perfluorooctanesulfonate (PFOS) and perfluorooctanoate (PFOA)," Frontiers of Environmental Science & Engineering in China, May 27, 2009, vol. 3, pp. 129-151.

Wang, Yuan et al. "Photocatalytic decomposition of perfluorooctanoic acid (PFOA) by TiO2 in the presence of oxalic acid," Journal of Hazardous Materials, vol. 192, Issue 3, Sep. 15, 2011, pp. 1869-1875.

Li, Shuo et al. "Microwave enhanced Fenton-like process for degradation of perfluorooctanoic acid (PFOA) using Pb—BiFeO3/rGO as heterogeneous catalyst," Chemical Engineering Journal, vol. 326, Oct. 15, 2017, pp. 756-764.

Li, Tengfei et al. "Highly efficient photocatalytic degradation toward perfluorooctanoic acid by bromine doped BiOI with high exposure of (001) facet," Applied Catalysis B: Environmental, vol. 268, Jul. 5, 2020, 118442.

Zhuang, Yuan et al. "Confinement Fenton-like degradation of perfluorooctanoic acid by a three dimensional metal-free catalyst derived from waste," Applied Catalysis B: Environmental, vol. 275, Oct. 15, 2020, 119101.

Lyu, Xian-Jin et al. "Photodegradation of perfluorooctane sulfonate in environmental matrices," Separation and Purification Technology, vol. 151, Sep. 4, 2015, pp. 172-176.

Taniyasu, Sachi et al. "The environmental photolysis of perfluorooctanesulfonate, perfluorooctanoate, and related fluorochemicals," Chemosphere, vol. 90, Issue 5, Feb. 2013, pp. 1686-1692.

Vaalgamaa, Sanna et al. "Photochemical reactivity of perfluorooctanoic acid (PFOA) in conditions representing surface water," Science of The Total Environment, vol. 409, Issue 16, Jul. 15, 2011, pp. 3043-3048.

Hori, Hisao et al. "High-performance liquid chromatography with conductimetric detection of perfluorocarboxylic acids and perfluorosulfonates," Chemosphere, vol. 57, Issue 4, Oct. 2004, pp. 273-282.

Li, Zhenmin et al. "Synthesis of In2O3-graphene composites and their photocatalytic performance towards perfluorooctanoic acid decomposition," Journal of Photochemistry and Photobiology A: Chemistry, vol. 271, Nov. 1, 2013, pp. 111-116.

Duan, Lijie et al. "Insight into the key role of oxygen dopants over ball-milled boron nitride for efficient degradation of PFOS alternative 6:2 fluorotelomer sulfonic acid," Journal of Hazardous Materials, vol. 445, Mar. 5, 2023, 130419.

Lashuk, Brent et al. "Application of photocatalytic ozonation with a WO3/TiO2 catalyst for PFAS removal under UVA/visible light," Science of The Total Environment, vol. 843, Oct. 15, 2022, 157006.

Dixit, Fuhar et al. "PFAS and DOM removal using an organic scavenger and PFAS-specific resin: Trade-off between regeneration and faster kinetics," Science of The Total Environment, vol. 754, Feb. 1, 2021, 142107.

Yang, Zehong et al. "Fabrication and characterizations of Zn-doped SnO2-Ti4O7 anode for electrochemical degradation of hexafluoropropylene oxide dimer acid and its homologues," Journal of Hazardous Materials, vol. 455, Aug. 5, 2023, 131605.

Zhu, Yangmo et al. "Metal-doped carbon-supported/modified titanate nanotubes for perfluorooctane sulfonate degradation in water: Effects of preparation conditions, mechanisms, and parameter optimization," Science of The Total Environment, vol. 853, Dec. 20, 2022, 158573.

Dehghani, Mostafa et al. "Sunlight-driven photocatalytic per- and polyfluoroalkyl substances degradation over zinc oxide/cellulose nanofiber catalyst using a continuous flow reactor," Journal of Environmental Chemical Engineering, vol. 10, Issue 6, Dec. 2022, 108686.

Zhang, Weilan et al. "Environmental factors affecting degradation of perfluorooctanoic acid (PFOA) by In2O3 nanoparticles," Journal of Environmental Sciences, vol. 93, Jul. 2020, pp. 48-56.

(56) References Cited

OTHER PUBLICATIONS

Babu, Diwakar Suresh et al. "Experimental insights into anodic oxidation of hexafluoropropylene oxide dimer acid (GenX) on boron-doped diamond anodes," Chemosphere, vol. 288, Part 1, Feb. 2022, 132417.
Li, Chen et al. "Photodegradation of Hexafluoropropylene Oxide Trimer Acid under UV Irradiation," Journal of Environmental Sciences, vol. 97, Nov. 2020, pp. 132-140.
Wang, Wanjun et al. "Photocatalytic reductive defluorination of perfluorooctanoic acid in water under visible light irradiation: the role of electron donor," Environ. Sci.: Water Res. Technol., Apr. 6, 2020,6, 1638-1648.
Park, Yonggyun et al. "Different Adsorption Behavior between Perfluorohexane Sulfonate (PFHxS) and Perfluorooctanoic Acid (PFOA) on Granular Activated Carbon in Full-Scale Drinking Water Treatment Plants," Processes, Mar. 25, 2021, DOI: 10.3390/PR9040571, Corpus ID: 233650310.
Rayne, S. et al. "Perfluoroalkyl sulfonic and carboxylic acids: A critical review of physicochemical properties, levels and patterns in waters and wastewaters, and treatment methods," Journal of Environmental Science and Health, Part A 44 (Sep. 4, 2009): 1145-1199.
Trojanowicz, Marek. "Removal of persistent organic pollutants (POPs) from waters and wastewaters by the use of ionizing radiation," Science of The Total Environment, vol. 718, May 20, 2020, 134425.
Yu, Xiaolong. "FTOH Biodegradation Properties and PFOA Impact on Microorganisms in Activated Sludge," Jan. 23, 2018, DOI:10.14989/DOCTOR.K20814, Corpus ID: 134636194.
Xu, Bentuo et al. "Improved photocatalysis of perfluorooctanoic acid in water and wastewater by Ga2O3/UV system assisted by peroxymonosulfate," Chemosphere. Jan. 2020:239:124722. doi: 10.1016/j.chemosphere.2019.124722. Epub Sep. 2, 2019.
Yin, Penghua et al. "Activated Persulfate Oxidation of Perfluorooctanoic Acid (PFOA) in Groundwater under Acidic Conditions," Int J Environ Res Public Health. Jun. 17, 2016;13(6):602. doi: 10.3390/ijerph13060602.
Lee, Yu-Chi et al. "Efficient decomposition of perfluorooctanic acid by persulfate with iron-modified activated carbon," Water Research, vol. 174, May 1, 2020, 115618.
Park, Saerom et al. "Heat-activated persulfate oxidation of PFOA, 6:2 fluorotelomer sulfonate, and PFOS under conditions suitable for in-situ groundwater remediation," Chemosphere. Feb. 2016:145:376-83. doi: 10.1016/j.chemosphere.2015.11.097. Epub Dec. 12, 2015.
Xu, Bentuo et al. "Visible and UV photocatalysis of aqueous perfluorooctanoic acid by TiO2 and peroxymonosulfate: Process kinetics and mechanistic insights," Chemosphere. Mar. 2020:243:125366. doi:10.1016/j.chemosphere.2019.125366. Epub Nov. 15, 2019.
Kishimoto, Naoyuki et al. "Effects of pH and coexisting chemicals on photolysis of perfluorooctane sulfonate using an excited xenon dimer lamp," Water Sci Technol. Jan. 2018;77(1-2):108-113. doi: 10.2166/wst.2017.526.
Lyu, Xian-Jin et al. "Boiling significantly promotes photodegradation of perfluorooctane sulfonate," Chemosphere. Nov. 2015:138:324-7. doi: 10.1016/j.chemosphere.2015.06.027. Epub Jun. 25, 2015.
Jarjour, Julie et al. "Reduced bioaccumulation of fluorotelomer sulfonates and perfluoroalkyl acids in earthworms (*Eisenia fetida*) from soils amended with modified clays," J Hazard Mater. Feb. 5, 2022;423(Pt A):126999. doi: 10.1016/j.jhazmat.2021.126999. Epub Aug. 21, 2021.
Wang, Nan et al. "Complete Defluorination and Mineralization of Perfluorooctanoic Acid by a Mechanochemical Method Using Alumina and Persulfate," Environ Sci Technol. Jul. 16, 2019;53(14):8302-8313. doi: 10.1021/acs.est.9b00486. Epub Jun. 13, 2019.
Li, Yuanhao et al. "The defluorination of perfluorooctanoic acid by different vacuum ultraviolet systems in the solution," Water Environ Res. Mar. 2021;93(3):455-463. doi: 10.1002/wer.1448. Epub Sep. 15, 2020.
Zhang, Tiliang et al. "Temperature effect on photolysis decomposing of perfluorooctanoic acid," J Environ Sci (China). Apr. 2016:42:126-133. doi: 10.1016/j.jes.2015.05.008. Epub Jul. 2, 2015.
Yang, Nanyang et al. "Solvent-Free Nonthermal Destruction of PFAS Chemicals and PFAS in Sediment by Piezoelectric Ball Milling," Environ Sci Technol Lett. Jan. 9, 2023;10(2):198-203. doi: 10.1021/acs.estlett.2c00902. eCollection Feb. 14, 2023.
Hou, Jie et al. "Electrochemical destruction and mobilization of perfluorooctanoic acid (PFOA) and perfluorooctane sulfonate (PFOS) in saturated soil," Chemosphere, vol. 287, Part 3, Jan. 2022, 132205.
Kucharzyk, Katarzyna H. et al. "Novel treatment technologies for PFAS compounds: A critical review," J Environ Manage. Dec. 15, 2017;204(Pt 2):757-764. doi: 10.1016/j.jenvman.2017.08.016. Epub Aug. 14, 2017.
Takagi, Sokichi et al. "Fate of perfluorooctanesulfonate and perfluorooctanoate in drinking water treatment processes," Water Res. Jul. 2011;45(13):3925-32. doi: 10.1016/j.watres.2011.04.052. Epub May 13, 2011.
Yang, Yiqiong et al. "Highly effective adsorption removal of perfluorooctanoic acid (PFOA) from aqueous solution using calcined layer-like Mg—Al hydrotalcites nanosheets," Environ Sci Pollut Res Int. Apr. 2020;27(12):13396-13408. doi: 10.1007/s11356-020-07892-4. Epub Feb. 5, 2020.
Heidari, Hamed et al. "GenX is not always a better fluorinated organic compound than PFOA: A critical review on aqueous phase treatability by adsorption and its associated cost," Water Res. Oct. 15, 2021:205:117683. doi: 10.1016/j.watres.2021.117683. Epub Sep. 23, 2021.
Yang, Li-Hui et al. "Is HFPO-DA (GenX) a suitable substitute for PFOA? A comprehensive degradation comparison of PFOA and GenX via electrooxidation," Environ Res. Mar. 2022;204(Pt A):111995. doi: 10.1016/j.envres.2021.111995. Epub Sep. 4, 2021.
Sun, Jun et al. "Removal of per- and polyfluoroalkyl substances (PFAS) from water by ceric(iv) ammonium nitrate," RSC Adv. May 13, 2021;11(29):17642-17645. doi: 10.1039/d1ra02635f.
Ordonez, Diana et al. "Green sorption media for the removal of perfluorooctanesulfonic acid (PFOS) and perfluorooctanoic acid (PFOA) from water," Sci Total Environ. May 1, 2022:819:152886. doi: 10.1016/j.scitotenv.2021.152886. Epub Jan. 6, 2022.
Grgas, Dijana et al. "A Review: Per- and Polyfluoroalkyl Substances—Biological Degradation," Toxics. May 9, 2023;11(5):446. doi: 10.3390/toxics11050446.
Sun, Min et al. "Distribution of perfluorinated compounds in drinking water treatment plant and reductive degradation by UV/SO32- process," Environ Sci Pollut Res Int. Mar. 2018;25(8):7443-7453. doi: 10.1007/s11356-017-1024-9. Epub Dec. 26, 2017.
Lu, Zhibo et al. "Risk exposure assessment of per- and polyfluoroalkyl substances (PFASs) in drinking water and atmosphere in central eastern China," Environ Sci Pollut Res Int. Apr. 2018;25(10):9311-9320. doi: 10.1007/s11356-017-0950-x. Epub Dec. 17, 2017.
Yiu, Lin et al. "Elucidation of the Molecular Determinants for Optimal Perfluorooctanesulfonate Adsorption Using a Combinatorial Nanoparticle Library Approach," Environ Sci Technol. Jun. 20, 2017;51(12):7120-7127. doi: 10.1021/acs.est.7b01635. Epub Jun. 6, 2017.
Yao, Yuan et al. "Comparative study on adsorption of perfluorooctane sulfonate (PFOS) and perfluorooctanoate (PFOA) by different adsorbents in water," Water Sci Technol. 2014;70(12):1983-91. doi: 10.2166/wst.2014.445.
Haupert, Levi M. et al. "Avoiding pitfalls when modeling removal of per- and polyfluoroalkyl substances by anion exchange," AWWA Water Sci. 2021;3(2):10.1002/aws2.1222. doi: 10.1002/aws2.1222.
Liu, Longfei et al. "Copper Nanoparticle Loading and F Doping of Graphene Aerogel Enhance Its Adsorption of Aqueous Perfluorooctanoic Acid," ACS Omega. Mar. 4, 2021;6(10):7073-7085. doi: 10.1021/acsomega.1c00044. eCollection Mar. 16, 2021.
Zhou, Yuqi et al. "Complete mechanochemical defluorination of perfluorooctanoic acid using Al2O3 and Al powders through matching electron-mediated reduction with decarboxylation," Chemosphere. Nov. 2022;307(Pt 2):135872. doi: 10.1016/j.chemosphere.2022.135872. Epub Aug. 4, 2022.

(56) References Cited

OTHER PUBLICATIONS

Vellanki, Bhanu Prakash et al. "Advanced Reduction Processes: A New Class of Treatment Processes," Environ Eng Sci. May 2013;30(5):264-271. doi: 10.1089/ees.2012.0273.

Amador, Camille K. et al. "Ultra-short chain fluorocarboxylates exhibit wide ranging reactivity with hydrated electrons," Chemosphere, vol. 311, Part 1, Jan. 2023, 136918.

Song, Zhou et al. "Reductive defluorination of perfluorooctanoic acid by hydrated electrons in a sulfite-mediated UV photochemical system," Journal of Hazardous Materials, vol. 262, Nov. 15, 2013, pp. 332-338.

Wu, Dan et al. "Mechanism insight of PFOA degradation by ZnO assisted-photocatalytic ozonation: Efficiency and intermediates," Chemosphere (2017), doi: 10.1016/j.chemosphere.2017.03.127. Accepted Mar. 21, 2017.

Lee, Tae et al. "High-pressure membrane filtration processes for separation of Per- and polyfluoroalkyl substances (PFAS)," Chemical Engineering Journal, vol. 431, Part 2, Mar. 1, 2022, 134023.

Zeng, Chao et al. "Removing per- and polyfluoroalkyl substances from groundwaters using activated carbon and ion exchange resin packed columns," AWWA Wat Sci. 2020;e1172. https://doi.org/10.1002/aws2.1172 (Accepted Jan. 22, 2020).

Liu, Charlie J. et al. "Removal of per- and polyfluoroalkyl substances from contaminated groundwater by granular activated carbon and anion exchange resins: a pilot-scale comparative assessment," Environ. Sci.: Water Res. Technol., Aug. 4, 2022,8, 2245-2253.

Shi, Huanhuan et al. "An electrocoagulation and electrooxidation treatment train to remove and degrade per- and polyfluoroalkyl substances in aqueous solution," Science of The Total Environment, vol. 788, Sep. 20, 2021, 147723.

Dixit, Fuhar et al. "PFAS removal by ion exchange resins: A review," Chemosphere, vol. 272, Jun. 2021, 129777.

Pavithra, K. et al. "A Review on Distribution and Removal Techniques for Perfluoroalkyl and Polyfluoroalkyl Substances (PFASs) in Water and Wastewater," Legacy and Emerging Contaminants in Water and Wastewater, Jun. 4, 2022, pp. 389-408.

Zhang, Yinjie et al. "Enhanced Removal of Polyfluoroalkyl Substances by Simple Modified Biochar: Adsorption Performance and Theoretical Calculation," ACS EST Water, Feb. 13, 2023, 3, 3, 817-826.

Olshansky, Yaniv et al. "Synthesis and Characterization of Customizable Polyaniline-Derived Polymers and Their Application for Perfluorooctanoic Acid Removal from Aqueous Solution," ACS EST Water, May 19, 2021, 1, 6, 1438-1446.

Iwabuchi, Katsumi et al. "Effectiveness of household water purifiers in removing perfluoroalkyl substances from drinking water," Environ Sci Pollut Res Int. Mar. 2021;28(9):11665-11671. doi: 10.1007/s11356-020-11757-1. Epub Jan. 6, 2021.

Zhang, Dongqing et al. "Sorption of perfluoroalkylated substances (PFASs) onto granular activated carbon and biochar," Environ Technol. May 2021;42(12):1798-1809. doi: 10.1080/09593330.2019.1680744. Epub Oct. 30, 2019.

Sorengard, Mattias et al. "Stabilization and solidification remediation of soil contaminated with poly- and perfluoroalkyl substances (PFASs)," Journal of Hazardous Materials, vol. 367, Apr. 5, 2019, pp. 639-646.

Niarchos, Georgios et al. "Electrokinetic remediation for removal of per- and polyfluoroalkyl substances (PFASs) from contaminated soil," Chemosphere, vol. 291, Part 3, Mar. 2022, 133041.

Quan, Qinzhi et al. "Fluorous-Core Nanoparticle-Embedded Hydrogel Synthesized via Tandem Photo-Controlled Radical Polymerization: Facilitating the Separation of Perfluorinated Alkyl Substances from Water," ACS Appl. Mater. Interfaces, May 4, 2020, 12, 21, 24319-24327.

Sorengard, M. et al. "Thermal desorption as a high removal remediation technique for soils contaminated with per- and polyfluoroalkyl substances (PFASs)," Jun. 25, 2020. https://doi.org/10.1371/journal.pone.0234476.

Pica, Nasim E. et al. "Electrochemical Oxidation of Hexafluoropropylene Oxide Dimer Acid (GenX): Mechanistic Insights and Efficient Treatment Train with Nanofiltration," Environ. Sci. Technol. Oct. 10, 2019, 53, 21, 12602-12609.

Wan, Ziren et al. "Enhanced Electrochemical Destruction of Perfluorooctanoic Acid (PFOA) Aided by Overlooked Cathodically Produced Bubbles," Environ. Sci. Technol. Lett. Dec. 21, 2022, 10, 1, 111-116.

Mirabediny, Maryam et al. "Effective PFAS degradation by electrochemical oxidation methods—recent progress and requirement," Chemosphere, vol. 321, Apr. 2023, 138109.

Altarawneh, Mohammednoor et al. "Thermal decomposition of perfluorinated carboxylic acids: Kinetic model and theoretical requirements for PFAS incineration," Chemosphere, vol. 286, Part 2, Jan. 2022, 131685.

Wang, Xuelin et al. "A review on degradation of perfluorinated compounds based on ultraviolet advanced oxidation," Environmental Pollution, vol. 291, Dec. 15, 2021, 118014.

Shende, Takshak et al. "Power density modulated ultrasonic degradation of perfluoroalkyl substances with and without sparging Argon," Ultrasonics Sonochemistry, vol. 76, Aug. 2021, 105639.

Yu, Fangke et al. "Promotion of the degradation perfluorooctanoic acid by electro-Fenton under the bifunctional electrodes: Focusing active reaction region by Fe/N co-doped graphene modified cathode," Chemical Engineering Journal, vol. 457, Feb. 1, 2023, 141320.

Alinezha, Ali et al. "Mechanistic Investigations of Thermal Decomposition of Perfluoroalkyl Ether Carboxylic Acids and Short-Chain Perfluoroalkyl Carboxylic Acids," Environ. Sci. Technol. May 17, 2023, 57, 23, 8796-8807.

Yao, Yinyun et al. "Enhanced Photocatalytic Degradation of Perfluorooctanoic Acid by Mesoporous Sb2O3/TiO2 Heterojunctions," Front Chem. May 19, 2021:9:690520. doi: 10.3389/fchem.2021.690520. eCollection 2021.

Gao, Jinyu et al. "Photochemical degradation pathways and near-complete defluorination of chlorinated polyfluoroalkyl substances," Nature Water, Apr. 3, 2023, 1, 381-390.

Wang, Junli et al. "Critical Review of Thermal Decomposition of Per- and Polyfluoroalkyl Substances: Mechanisms and Implications for Thermal Treatment Processes," Environ. Sci. Technol. Apr. 21, 2022, 56, 9, 5355-5370.

Li, L. et al. Association between exposure to per-and perfluoroalkyl substances (PFAS) and reproductive hormones in human: a systemic review and meta-analysis. Environmental Research, 241, p. 117553 (2024).

Lee, Y. et al. "Decomposition of perfluorooctanoic acid by microwaveactivated persulfate: Effects of Temperature, pH, and chloride ions," Frontiers of Environmental Science & Engineering, 6, pp. 17-25 (2012).

Zhou et al. "Persulfate-based advanced oxidation processes (AOPs) for organic-contaminated soil remediation: A review," Chem. Engg. J. vol. 372, 2019, p. 836-851.

Ren et al. "Reductive degradation of perfluorooctanoic acid in complex water matrices by using the UV/sulfite process," Oct. 15, 2021, Water Research, vol. 205.

Vellanki, B. P.; Batchelor, B. Nitrate Reduction by the Ultraviolet-Sulfite Advanced Reduction Process. Environ. Eng. Sci. 2021, 38, 927.

Bentel, M. J.; Liu, Z.; Yu, Y.; Gao, J.; Men, Y.; Liu, J. Enhanced Degradation of Perfluorocarboxylic Acids (PFCAs) by UV/Sulfite Treatment: Reaction Mechanisms and System Efficiencies at pH 12. Environmental Science & Technology Letters 2020, 7 (5), 351-357.

Buchner, F.; Kirschbaum, T.; Venerosy, A.; Girard, H.; Arnult, J,-C.; Kiendl, B.; Krueger, A.; Larsson, K.; Bande, A.; Petit, T.; Merschjann, C. "Early Dynamics of the emission of solvated electrons from nanodiamonds in water", Nanoscale, 2022 (on line) DOI: 10.1039/d2nr03919b.

Xin, X; Kim, ,J; Ashley, D.C.; Huang C-H ; Degratation and Deflourination of Per- and Polyfluornalkyl Substances by Direct Photolysis at 222 nm, ACS EST Water https://doi.org/10.1021/ascwater.3c00274.

(56) References Cited

OTHER PUBLICATIONS

Appel, M. et al. "Vibrational spectra of ferrocene, ferrocene-containing polymers and their oxidized compounds", Dynamics of Molecules and Materials—II, Journal of Physics: Conference Series 554 (2014), 012008 (8 pages).
Dowex Ion Exchange Resins Fundamentals of Ion Exchange, based on paper by R.M. Wheaton and L.J. Lefevre, published Jun. 2000 (9 pages).
Qasem, N, A.A.; Mohammed, R.H.; Lawal, D. U.; Removal of heavy metal ions from wastewater: a comprehensive and critical review, Clean Water, 2021, 36, 1-15.
Chen, G.: Liu, S.; Shi, Q.; Gan, J.; Jin, B.; Men, Y.; Liu, H.; Hydrogen-polarized vacuum ultraviolet photolysis system for the enhanced destruction of perfluoroalkyl substances; Journal of Hazardous Materials, Letters, 2022, 3, 100072.
Liao, L-L; Song, L; Yan.S.-S.; Ye. J.-H.; Yu. D-G.: Highly reductive photocatalytic systems in organic synthesis. Trend. Chem. 2022, 4, 512-527.
C.H.M. Hofman-Caris, et al. UV/sulphite as alternative for UV/H2O2 for micropollutant degradation in drinking water, Water Supply vol. 21 No. 8, 4109 doi: 10.2166/ws.2021.164 (Year: 2021).
Ace Glass Co., Photochemical/Photobiological Equipment catalog, 2023, part "7864-10." (Year: 2023).
Bao, Yixiang et al. "Degradation of PFOA Substitute: GenX (HFPO-DA Ammonium Salt): Oxidation with UV/Persulfate or Reduction with UV/Sulfite?", Environmental Science & Technology, Sep. 12, 2018, XP093203158, US ISSN: 0013-936X, DOI: 10.1021/acs.est.8b02172 (7 pages).
International Search Report and Written Opinion for related PCT Application No. PCT/US2024/037823 mailed Sep. 27, 2024 (12 pages).
International Search Report and Written Opinion for related PCT Application No. PCT/US2024037886 mailed Oct. 1, 2024 (12 pages).
Su, Yiming et al. "Potential-Driven Electron Transfer Lowers the Dissociation Energy of the C-F Bond and Facilitates Reductive Defluorination of Perfluorooctane Sulfonate (PFOS)", Applied Materials & Interfaces, vol. 11, No. 37, Sep. 18, 2019, pp. 33913-33922.
International Search Report and Written Opinion for related PCT Application No. PCT/US2024/037840 mailed Oct. 11, 2024 (13 pages).
International Search Report and Written Opinion for related PCT Application No. PCT/US2024/037813 mailed Oct. 11, 2024 (11 pages).
English Translation of Patent Publication KR-20100088310-A, published Aug. 9, 2010. (Year: 2010).
English Translation of Patent Publication JP-6167254-B1, published Jul. 19, 2017. (Year: 2017).
English Translation of Patent Publication CN-111530510-A, published Aug. 14, 2020. (Year: 2020).
Moussavi, G.; Shekoohiyan, S. Simultaneous Nitrate Reduction and Acetaminophen Oxidation Using the Continuous-flow Chemical-less VUV Process as an Integrated Advanced Oxidation and Reduction Process. J. Hazard Mater. 2016, 318, 329-338.
Duan, Y.; Batchelor, B. Impacts of Natural Organic Matter on Perchlorate Removal by an Advanced Reduction Process. J. Environ. Sci. Health A Tox Hazard Subst Environ. Eng. 2014, 49 (6), 731-40.
Nawaz, S.; Shah, N. S.; Khan, J. A.; Sayed, M.; Al-Muhtaseb, A. a. H.; Andersen, H. R.; Muhammad, N.; Murtaza, B.; Khan, H. M. Removal Efficiency and Economic Cost Comparison of Hydrated Electron-mediated Reductive Pathways for Treatment of Bromate. Chemical Engineering Journal 2017, 320, 523-531.
Jung, B.; Nicola, R.; Batchelor, B.; Abdel-Wahab, A. Effect of Low- and Medium-pressure Hg UV Irradiation on Bromate Removal in Advanced Reduction Process. Chemosphere 2014, 117, 663-72.
Xiao, Q.; Yu, S.; Li, L.; Wang, T.; Liao, X.; Ye, Y. An Overview of Advanced Reduction Processes for Bromate Removal from Drinking Water: Reducing Agents, Activation Methods, Applications and Mechanisms. J. Hazard Mater. 2017, 324 (Pt B), 230-240.

Xiao, Q.; Wang, T.; Yu, S.; Yi, P.; Li, L. Influence of UV Lamp, Sulfur(IV) Concentration, and pH on Bromate Degradation in UV/Sulfite Systems: Mechanisms and Applications. Water Res. 2017, 111, 288-296.
Xiao, Q.; Yu, S.; Li, L.; Zhang, Y.; Yi, P. Degradation of Bromate by Fe(II)/Ti(IV) Layered Double Hydroxides Nanoparticles Under Ultraviolet Light. Water Res. 2019, 150, 310-320.
Qu, Y.; Zhang, C.; Li, F.; Chen, J.; Zhou, Q. Photo-reductive Defluorination of Perfluorooctanoic Acid in Water. Water Res. 2010, 44 (9), 2939-47.
Song, Z.; Tang, H.; Wang, N.; Zhu, L. Reductive Defluorination of Perfluorooctanoic Acid by Hydrated Electrons in a Sulfite-mediated UV Photochemical System. J. Hazard Mater. 2013, 262, 332-8.
Gu, Y.; Liu, T.; Wang, H.; Han, H.; Dong, W. Hydrated Electron Based Decomposition of Perfluorooctane Sulfonate (PFOS) in the VUV/Sulfite System. Sci. Total Environ. 2017, 607-608, 541-548.
Tian, H.; Gao, J.; Li, H.; Boyd, S. A.; Gu, C. Complete Defluorination of Perfluorinated Compounds by Hydrated Electrons Generated from 3-Indole-Acetic-Acid in Organomodified Montmorillonite. Sci. Rep. 2016, 6, 32949.
Tian, H.; Gu, C. Effects of Different factors on Photo-defluorination of Perfluorinated Compounds by Hydrated Electrons in Organo-montmorillonite System. Chemosphere 2018, 191, 280-287.
Chen, Z.; Mi, N.; Li, C.; Teng, Y.; Chen, Y.; Gu, C. Effects of Different Variables on Photodestruction of Perfluorooctanoic Acid in Self-assembled Micelle System. Sci. Total Environ. 2020, 742, 140438.
Chen, Z.; Li, C.; Gao, J.; Dong, H.; Chen, Y.; Wu, B.; Gu, C. Efficient Reductive Destruction of Perfluoroalkyl Substances under Self-Assembled Micelle Confinement. Environ. Sci. Technol. 2020, 54 (8), 5178-5185.
Chen, Z.; Teng, Y.; Mi, N.; Jin, X.; Yang, D.; Wang, C.; Wu, B.; Ren, H.; Zeng, G.; Gu, C. Highly Efficient Hydrated Electron Utilization and Reductive Destruction of Perfluoroalkyl Substances Induced by Intermolecular Interaction. Environ. Sci. Technol. 2021, 55 (6), 3996-4006.
Bentel, M. J.; Yu, Y.; Xu, L.; Li, Z.; Wong, B. M.; Men, Y.; Liu, J. Defluorination of Per- and Polyfluoroalkyl Substances (PFASs) with Hydrated Electrons: Structural Dependence and Implications to PFAS Remediation and Management. Environ. Sci. Technol. 2019, 53 (7), 3718-3728.
Bentel, M. J.; Yu, Y.; Xu, L.; Kwon, H.; Li, Z.; Wong, B. M.; Men, Y.; Liu, J. Degradation of Perfluoroalkyl Ether Carboxylic Acids with Hydrated Electrons: Structure-Reactivity Relationships and Environmental Implications. Environ. Sci. Technol. 2020, 54 (4), 2489-2499.
Liu, C. J.; McKay, G.; Jiang, D.; Tenorio, R.; Cath, J. T.; Amador, C.; Murray, C. C.; Brown, J. B.; Wright, H. B.; Schaefer, C.; Higgins, C. P.; Bellona, C.; Strathmann, T. J. Pilot-Scale Field Demonstration of a Hybrid Nanofiltration and UV-Sulfite Treatment Train for Ground-water Contaminated by Per- and Polyfluoroalkyl Substances (PFASs). Water Res. 2021, 205, 117677.
Liu, Z.; Bentel, M. J.; Yu, Y.; Ren, C.; Gao, J.; Pulikkal, V. F.; Sun, M.; Men, Y.; Liu, J. Near-Quantitative Defluorination of Perfluorinated and Fluorotelomer Carboxylates and Sulfonates with Integrated Oxidation and Reduction. Environ. Sci. Technol. 2021, 55 (10), 7052-7062.
Tenorio, R.; Liu, J.; Xiao, X.; Maizel, A.; Higgins, C. P.; Schaefer, C. E.; Strathmann, T. J. Destruction of Per- and Polyfluoroalkyl Substances (PFASs) in Aqueous Film-Forming Foam (AFFF) with UV-Sulfite Photoreductive Treatment. Environ. Sci. Technol. 2020, 54 (11), 6957-6967.
Javed, H.; Lyu, C.; Sun, R.; Zhang, D.; Alvarez, P. J. J. Discerning the Inefficacy of Hydroxyl Radicals During Perfluorooctanoic Acid Degradation. Chemosphere 2020, 247, 125883.
Cao, Y.; Qiu, W.; Li, J.; Jiang, J.; Pang, S. Review on UV/Sulfite Process for Water and Wastewater Treatments in the Presence or Absence of O2. Sci. Total Environ. 2021, 765, 142762.
Wu, S.; Shen, L.; Lin, Y.; Yin, K.; Yang, C. Sulfite-based Advanced Oxidation and Reduction Processes for Water Treatment. Chemical Engineering Journal 2021, 414, 128872.
Trojanowicz, M.; Bojanowska-Czajka, A.; Bartosiewicz, I.; Kulisa, K. Advanced Oxidation/Reduction Processes Treatment for Aque-

(56) References Cited

OTHER PUBLICATIONS ous Perfluorooctanoate (PFOA) and Perfluorooctanesulfonate (PFOS)—A Review of Recent Advances. Chemical Engineering Journal 2018, 336, 170-199.

Rosenfeldt, E. J.; Linden, K. G. The ROH, UV Concepts to Characterize and the Model UV/H2O2 Process in Natural Waters. Environ. Sci. Technol. 2007, 41 (7), 2548-2553.

Bolton, J. R.; Mayor-Smith, I.; Linden, K. G. Rethinking the Concepts of Fluence (UV Dose) and Fluence Rate: The Importance of Photon-based Units—A Systemic Review. Photochem. Photobiol. 2015, 91 (6), 1252-62.

Mack, J.; Bolton, J. R. Photochemistry of Nitrite and Nitrate in Aqueous Solution: A Review. J. Photochem. Photobiol., A 1999, 128 (1-3), 1-13.

Xie, B.; Li, X.; Huang, X.; Xu, Z.; Zhang, W.; Pan, B. Enhanced Debromination of 4-Bromophenol by the UV/Sulfite Process: Efficiency and Mechanism. J. Environ. Sci. (China) 2017, 54, 231-238.

Yazdanbakhsh, A.; Eslami, A.; Moussavi, G.; Rafiee, M.; Sheikhmohammadi, A. Photo-assisted Degradation of 2, 4, 6-Trichlorophenol by an Advanced Reduction Process Based on Sulfite Anion Radical: Degradation, Dechlorination and Mineralization. Chemosphere 2018, 191, 156-165.

Nash, K.; Mulac, W.; Noon, M.; Fried, S.; Sullivan, J. C. Pulse Radiolysis Studies of U(VI) Complexes in Aqueous Media. Journal of Inorganic and Nuclear Chemistry 1981, 43 (5), 897-899.

Maza, W. A.; Breslin, V. M.; Plymale, N. T.; DeSario, P. A.; Epshteyn, A.; Owrutsky, J. C.; Pate, B. B. Nanosecond Transient Absorption Studies of the pH-dependent Hydrated Electron Quenching by HSO3-. Photochem. Photobiol. Sci. 2019, 18 (6), 1526-1532.

Trojanowicz, M.; Bobrowski, K.; Szostek, B.; Bojanowska-Czajka, A.; Szreder, T.; Bartoszewicz, I.; Kulisa, K. A Survey of Analytical Methods Employed for Monitoring of Advanced Oxidation/ Reduction Processes for Decomposition of Selected Perfluorinated Environmental Pollutants. Talanta 2018, 177, 122-141.

Grossweiner, L. I.; Swenson, G. W.; Zwicker, E. F. Photochemical Generation of the Hydrated Electron. Science 1963, 141 (3583), 805-806.

Li, X.; Ma, J.; Liu, G.; Fang, J.; Yue, S.; Guan, Y.; Chen, L.; Liu, X. Efficient Reductive Dechlorination of Monochloroacetic Acid by Sulfite/UV Process. Environ. Sci. Technol. 2012, 46 (13), 7342-9.

Sun, Z.; Zhang, C.; Chen, P.; Zhou, Q.; Hoffmann, M. R. Impact of Humic Acid on the Photoreductive Degradation of Perfluorooctane Sulfonate (PFOS) by UV/Iodide Process. Water Res. 2017, 127, 50-58.

Sauer, M. C.; Crowell, R. A.; Shkrob, I. A. Electron Photodetachment from Aqueous Anions. 1. Quantum Yields for Generation of Hydrated Electron by 193 and 248 nm Laser Photoexcitation of Miscellaneous Inorganic anions. Journal Physical Chemistry A 2004, 108 (25), 5490-5502.

Yu, K.; Li, X.; Chen, L.; Fang, J.; Chen, H.; Li, Q.; Chi, N.; Ma, J. Mechanism and Efficiency of Contaminant Reduction by Hydrated Electron in the Sulfite/Iodide/UV Process. Water Res. 2018, 129, 357-364.

Awtrey, A. D.; Connick, R. E. The Absorption Spectra of I2, I3-, I-, IO3-, S4O6= and S2O3=. Heat of the Reaction I3-=I2 30 I-. J. Am. Chem. Soc. 1951, 73 (4), 1842-1843.

Iwata, A.; Nakashima, N.; Kusaba, M.; Izawa, Y.; Yamanaka, C. Quantum Yields of Hydrated Electrons by UV Laser Irradiation. Chem. Phys. Lett. 1993, 207 (2-3), 137-142.

Sun, Z.; Zhang, C.; Xing, L.; Zhou, Q.; Dong, W.; Hoffmann, M. R. UV/Nitrilotriacetic Acid Process as a Novel Strategy for Efficient Photoreductive Degradation of Perfluorooctanesulfonate. Environ. Sci. Technol. 2018, 52 (5), 2953-2962.

Kaper, J. M.; Gebhard, O.; Van Den Berg, C. J.; Veldstra, H. Studies on Indolepyruvic Acid. Arch. Biochem. Biophys. 1963, 103 (3), 475-487.

Zechner, J.; Kohler, G.; Getoff, N.; Tatischeff, I.; Klein, R. Wavelength Effects on the Photoprocesses of Indole and Derivatives in Solution. Photochem. Photobiol. 1981, 34 (2), 163-168.

Deister, U.; Warneck, P. Photooxidation of SO32- in Aqueous Solution. J. Phys. Chem. 1990, 94, 2191-2198.

Fischer, M.; Warneck, P. Photodecomposition and Photo-oxidation of Hydrogen Sulfite in Aqueous Solution. J. Phys. Chem. 1996, 100, 15111-15117.

Lee, J. Y.; Baugher, J. F.; Grossweiner, L. I. Pairwise Recombination in the Decay of Photochemical Hydrated Electrons. Photochem. Photobiol. 1979, 29 (5), 867-874.

Schwarz, H. A.; Gill, P. S. Diffusion-Limited Solvated Electron Reactions in Ethanol and Water. J. Phys. Chem. 1977, 81 (1), 22-25.

Elliot, A. J.; Ouellette, D. C. Temperature Dependence of the Rate Constant for the Reaction eaq- + OH in Water up to 150 C. J. Chem. Soc., Faraday Trans. 1994, 90 (6), 837-841.

Zoschke, K.; Bornick, H.; Worch, E. Vacuum-UV Radiation at 185 nm in Water Treatment—A Review. Water Res. 2014, 52, 131-45. (74).

Rao, U.; Su, Y.; Khor, C. M.; Jung, B.; Ma, S.; Cwiertny, D. M.; Wong, B. M.; Jassby, D. Structural Dependence of Reductive Defluorination of Linear PFAS Compounds in a UV/Electrochemical System. Environ. Sci. Technol. 2020, 54 (17), 10668-10677.

Rahn, R. O. Potassium Iodide as a Chemical Actinometer for 254 nm Radiation: Use of Iodate as an Electron Scavenger. Photochem. Photobiol. 1997, 66, 450-455.

Backer, L. C.; Esteban, E.; Rubin, C. H.; Kieszak, S.; McGeehin, M. A. Assessing Acute Diarrhea From Sulfate In Drinking Water. Journal—American Water Works Association 2001, 93 (9), 76-84.

Gu, Y.; Liu, T.; Zhang, Q.; Dong, W. Efficient Decomposition of Perfluorooctanoic Acid by a High Photon Flux UV/Sulfite Process: Kinetics and Associated Toxicity. Chemical Engineering Journal 2017, 326, 1125-1133.

Gu, Y.; Dong, W.; Luo, C.; Liu, T. Efficient Reductive Decomposition of Perfluorooctanesulfonate in a High Photon Flux UV/Sulfite System. Environ. Sci. Technol. 2016, 50 (19), 10554-10561.

Rosenfeldt, E. J.; Linden, K. G. Degradation of Endocrine Disrupting Chemicals Bisphenol A, Ethinyl Estradiol, and Estradiol during UV Photolysis and Advanced Oxidation Processes. Environ-mental science & technology 2004, 38 (20), 5476-5483.

Rosenfeldt, E. J.; Linden, K. G.; Canonica, S.; von Gunten, U. Comparison of the Efficiency of ·OH Radical Formation During Ozonation and the Advanced Oxidation Processes O3/H2O2 and UV/ H2O2. Water Res. 2006, 40 (20), 3695-704.

Ulliman, S. L.; McKay, G.; Rosario-Ortiz, F. L.; Linden, K. G. Low Levels of Iron Enhance UV/H2O2 Efficiency at Neutral pH. Water Res. 2018, 130, 234-242.

Ulliman, S. L.; Miklos, D. B.; Hubner, U.; Drewes, J. E.; Linden, K. G. Improving UV/H2O2 Performance Following Tertiary Treatment of Municipal Wastewater. Environmental Science: Water Research & Technology 2018, 4 (9), 1321-1330.

Zepp, R. G.; Braun, A. M.; Hoigne, J.; Leenheer, J. A. Photoproduction of Hydrated Electrons From Natural Organic Solutes in Aquatic Environments. Environ. Sci. Technol. 1987, 21 (5), 485-490.

Thomas-Smith, T. E.; Blough, N. V. Photoproduction of Hydrated Electron from Constituents of Natural Waters. Environ. Sci. Technol. 2001, 35 (13), 2721-2726.

Gu, J.; Ma, J.; Jiang, J.; Yang, L.; Yang, J.; Zhang, J.; Chi, H.; Song, Y.; Sun, S.; Tian, W. Q. Hydrated electron (eaq-) Generation from Phenol/UV: Efficiency, Influencing Factors, and Mechanism. Applied Catalysis B: Environmental 2017, 200, 585-593.

Li, X.; Fang, J.; Liu, G.; Zhang, S.; Pan, B.; Ma, J. Kinetics and Efficiency of the Hydrated Electron-induced Dehalogenation by the Sulfite/UV Process. Water Res. 2014, 62, 220-8.

Munch, D. J.; Much, J. W.; Pawlecki, A. M. Method 552.2—Determination of Haloacetic Acids and Dalapon in Drinking Water by Liquid-Liquid Extraction, Derivatization and Gas Chromatography with Electron Capture Detection—Revision 1.0; U.S. Environmental Protection Agency: 1995.

Anbar, M.; Hart, E. J. The Reaction of Haloaliphatic Compounds with Hydrated Electrons. J. Phys. Chem. 1965, 69 (1), 271-274.

Butler, I. B.; Schoonen, M. A.; Rickard, D. T. Removal of Dissolved Oxygen From Water: A Comparison of Four Common Techniques. Talanta 1994, 41 (2), 211-215.

(56) References Cited

OTHER PUBLICATIONS

Crittenden, J. C.; Hu, S.; Hand, D. W.; Green, S. A. A Kinetic Model for H2O2/UV Process In a Completely Mixed Batch Reactor. Water Res. 1999, 33 (10), 2315-2328.

Li, C.; Zheng, S.; Li, T.; Chen, J.; Zhou, J.; Su, L.; Zhang, Y. N.; Crittenden, J. C.; Zhu, S.; Zhao, Y. Quantitative Structure-activity Relationship Models for Predicting Reaction Rate Constants of Organic Contaminants with Hydrated Electrons and Their Mechanistic Pathways. Water Res. 2019, 151, 468-477.

Zheng, S.; Li, C.; Wei, G. QSAR Modeling for Reaction Rate Constants of eaq- With Diverse Organic Compounds in Water. Environmental Science: Water Research & Technology 2020, 6 (7), 1931-1938.

Liu, X.; Zhong, J.; Fang, L.; Wang, L.; Ye, M.; Shao, Y.; Li, J.; Zhang, T. Trichloroacetic Acid Reduction by an Advanced Reduction Process Based on Carboxyl Anion Radical. Chemical Engineering Journal 2016, 303, 56-63.

Yang, Y.; Zhang, Q.; Chen, B.; Long, L.; Zhang, G. Toward Better Understanding Vacuum Ultraviolet-Iodide Induced Photolysis via Hydrogen Peroxide Formation, Iodine Species Change, and Difluoroacetic Acid Degradation. Front. Environ. Sci. Eng. 2022, 16 (5), 55.

Qiwen, M.; Kim, K. H.; Han, I. Correlation Analysis of Pollutant Factors Influencing the Sulfite/UV-L Advanced Reduction Process. KSCE Journal of Civil Engineering 2018, 22 (2), 475-481.

Yazdanbakhsh, A.; Eslami, A.; Mahdipour, F.; Ghanbari, F.; Ghasemi, S. M.; Atamaleki, A.; Maleksari, H. S.; Lin, K.-Y. A. Dye Degradation in Aqueous Solution by Dithionite/UV-C Advanced Reduction Process (ARP): Kinetic Study, Dechlorination, Degradation Pathway and Mechanism. J. Photochem. Photobiol., A 2021, 407, 112995.

Liu, W.; Chen, H.; Zhang, Z.; Yang, Z.; Yang, Q. Photoreductive Degradation of CCl4 by UV—Na2SO3: Influence of Various Factors, Mechanism and Application. Environ. Technol. 2021, 42 (2), 217-226.

Zhang, T.; Wang, J.; Yan, D.; Wang, L.; Liu, X. Efficient Reduction of Bromate by Iodide-Assisted UV/Sulfite Process. Catalysts 2018, 8 (12), 652.

Liu, X.; Zhang, T.; Shao, Y. Aqueous Bromate Reduction by UV Activation of Sulfite. Clean—Soil, Air, Water 2014, 42 (10), 1370-1375.

Vellanki, B.P., Batchelor, B. Perchlorate Reduction by the Sulfite/Ultraviolet Light Advanced Reduction Process. Journal Hazardous Materials 2013, 262, 348-56.

Tan, L.; Mao, R.; Su, P.; Gu, J.; Chen, H.; Jiang, F.; Zhao, X. Efficient Photochemical Denitrification by UV/Sulfite System: Mechanism and Applications. J. Hazard Mater. 2021, 418, 126448.

Zhang, C.; Qu, Y.; Zhao, X.; Zhou, Q. Photoinduced Reductive Decomposition of Perfluorooctanoic Acid in Water: Effect of Temperature and Ionic Strength. Clean—Soil, Air, Water 2015, 43 (2), 223-228.

Qu, Y.; Zhang, C. J.; Chen, P.; Zhou, Q.; Zhang, W. X. Effect of Initial Solution pH on Photo-induced Reductive Decomposition of Perfluorooctanoic Acid. Chemosphere 2014, 107, 218-223.

Lyu, X. J.; Li, W. W.; Lam, P. K.; Yu, H. Q. Insights into Perfluorooctane Sulfonate Photodegradation in a Catalyst-Free Aqueous Solution. Sci. Rep 2015, 5, 9353.

Anbar, M.; Hart, E. J. On the Reactivity of Hydrated Electrons Toward Inorganic Compounds. In. Radiation Chemistry 1968, 81, 79-94.

Anbar, M.; Hart, E. J. Reactions of Hydrated Electron. Solvated Electron 1965, 50, 55-81.

Thomas, J. K.; Gordon, S.; Hart, E. J. The Rates of Reactions of the Hydrated Electron in Aqueous Inorganic Solutions. J. Phys. Chem. 1964, 68 (6), 1524-1527.

Anbar, M. The Reactions of Hydrated Electrons with Organic Compounds. Adv. Phys. Org. Chem. 1969, 7, 115-151.

Maza, W. A.; Breslin, V. M.; Owrutsky, J. C.; Pate, B. B.; Epshteyn, A. Nanosecond Transient Absorption of Hydrated Electrons and Reduction of Linear Perfluoroalkyl Acids and Sulfonates. Environmental Science & Technology Letters 2021, 8 (7), 525-530.

Lichtscheidl, J.; Getoff, N. Radiolysis of Halogenated Aromatic Compounds in Aqueous Solution—I Conductometric Pulse Radiolysis and Steady-State Studies of the Reaction of eaq-. International Journal for Radiation Physics and Chemistry 1976, 8 (6), 661-665.

Merino, N.; Qu, Y.; Deeb, R. A.; Hawley, E. L.; Hoffmann, M. R.; Mahendra, S. Degradation and Removal Methods for Perfluoroalkyl and Polyfluoroalkyl Substances in Water. Environmental Engineering Science 2016, 33 (9), 615-649.

Van Hoomissen, D. J.; Vyas, S. Early Events in the Reductive Dehalogenation of Linear Perfluoroalkyl Substances. Environmental Science & Technology Letters 2019, 6 (6), 365-371.

Dixit, F.; Barbeau, B.; Mostafavi, S. G.; Mohseni, M. Removal of Legacy PFAS and Other Fluorotelomers: Optimized Regeneration Strategies in DOM-rich Waters. Water Res. 2020, 183, 116098.

Smith, B. A.; Teel, A. L.; Watts, R. J. Identification of the Reactive Oxygen Species Responsible for Carbon Tetrachloride Degradation in Modified Fenton's System. Environ. Sci. Technol. 2004, 38 (20), 5465-5469.

Da Silva-Rackov, C. K. O.; Lawal, W. A.; Nfodzo, P. A.; Vianna, M. M. G. R.; do Nascimento, C. A. O.; Choi, H. Degradation of PFOA by Hydrogen Peroxide and Persulfate Activated by Iron-modified Diatomite. Applied Catalysis B: Environmental 2016, 192, 253-259.

Panchangam, S. C.; Lin, A. Y.; Tsai, J. H.; Lin, C. F. Sonication-assisted Photocatalytic Decomposition of Perfluorooctanoic Acid. Chemosphere 2009, 75 (5), 654-660.

He, X.; Sun, B.; He, M.; Chi, H.; Wang, Z.; Zhang, W.; Ma, J. Highly Efficient Simultaneous Catalytic Degradation and Defluorination of Perfluorooctanoic Acid by the H2O2-carbon/MnO2 System Generating O2- and OH Synchronously. Applied Catalysis B: Environmental 2020, 277, 119219.

Neta, P.; Huie, R. E. Free-Radical Chemistry of Sulfite. Environ. Health Perspect. 1985, 64, 209-217.

Huang, L.; Dong, W.; Hou, H. Investigation of the Reactivity of Hydrated Electron Toward Perfluorinated Carboxylates by Laser Flash Photolysis. Chem. Phys. Lett. 2007, 436 (1-3), 124-128.

Szajdzinska-Pietek, E.; Gebicki, J. L. Pulse Radiolytic Investigation of Perfluorinated Surfactants in Aqueous Solutions. Res. Chem. Intermed. 2000, 26, 897-912.

Le, T. X. H.; Haflich, H.; Shah, A. D.; Chaplin, B. P. Energy-Efficient Electrochemical Oxidation of Perfluoroalkyl Substances Using a Ti4O7 Reactive Electrochemical Membrane Anode. Environmental Science & Technology Letters 2019, 6 (8), 504-510.

Keen, O.; Bolton, J.; Litter, M.; Bircher, K.; Oppenländer, T. Standard Reporting of Electrical Energy per Order (EEO) for UV/H2O2 Reactors (IUPAC Technical Report). Pure Appl. Chem. 2018, 90 (9), 1487-1499.

Buck, R. C.; Franklin, J.; Berger, U.; Conder, J. M.; Cousins, I. T.; de Voogt, P.; Jensen, A. A.; Kannan, K.; Mabury, S. A. van Leeuwen, S. PJ.; Perfluoroalkyl and Polyfluoroalkyl Substances in the Environment: Terminology, Classification, and Origins; Integrated Environmental Assessment and Management, 2011, 7(4), 513-541.

Cotton, F.A. and Wilkinson, G. (1988) Advanced Inorganic Chemistry. 5th Edition, Wiley-Interscience, New York, pp. 152-161 and 560-573.

Hudson, R. D.A.; Ferrocene polymers: current architectures, syntheses and utility; Journal of Organometallic Chemistry, 2001, 637-639, 47-69.

Lawniczak, A. E.; Zbierska, J.; Nowak, B.; Achtenberg, K.; Grzeskowiak, A.; Kanas, K.; Impact of agriculture and land use on nitrate contamination in groundwater and running waters in central-west Poland, Environ Monit Assess. 2016; 188: 172.

Beltrame, T. F.; Zoppas, F. M.; Ferreira, J. Z.; Marchesini, F. A.; Bernardes, A. M.; Nitrate reduction by electrochemical processes using copper electrode: evaluating operational parameters aiming low nitrite formation, Water Science & Technology, 2021,84(1), 200-215.

Fanning, J. C.; The Chemical reduction of nitrate aqueous solution, Coordination Chemistry Review, 2000, 199, 159-179.

Matei, A.; Racovitenanu; Review of the technologies for nitrates removal from water intended for human consumption; 2021 IOP Conf. Ser.:Earth Environ. Sci. 664, 012024.

(56) References Cited

OTHER PUBLICATIONS

Siantar, D. P.; Schreier, C. G.; Chou, C.-S.; Reinhard, M.; Treatment of 1,2-Dibromo-3-Chloropropane and Nitrate-Contaminated Water with Zero-Valent Iron or Hydrogen/Palladium Catalysts; Wat. Res., 1996, 30(10), 2315-2322.

Liu, Y.; Zhang, X.; Wang, J.; A critical review of various adsorbents for selective removal of nitrate from water: Structure, performance, and mechanism; Chemosphere, 2022, 291, 132728.

Sanchis, I.; Pizarro, A. H.; Rodriguez, J. J.; Mohedano, A. F.; Nitrate reduction with bimetallic catalysts. A stability-addressed overview; Separation and Purification Technology, 2022, 290, 120750.

Lu, X.; Song, H.; Cai, J.; Lu, S.; Recent development of electrochemical nitrate reduction to ammonia: A mini review: Electrochemical Communications, 2021, 129, 107094.

Jung, J.; Bae, S.; Lee, W.; Nitrate reduction by maghemite supported Cu—Pd bimetallic catalyst, Applied Catalysis B; Environmental, 2012, 127, 148-158.

Guo., S.; Heck, K.; Kasiraju, S.; Qian, H.; Zhao, Z.; Grabow, L. C.; Miller, J.; Wong, M. S.; Insights into nitrate reduction over Indium-Decorated Palladium Nanoparticle Catalysts; ACS Catal. 2018, 8(1), 503-515.

Kishimoto, N.; Matsuda, N.; Bromate Ion Removal by Electrochemical Reduction Using an Activated Carbon Felt Electrode: Environ. Sci. Technol. 2009, 43, 6, 2054-2059.

Rusanova, M. Y.: Polaskova, P.; Muzikiar, M.; Fawcett, W. R.; Electrochemical reduction of perchlorate ions on platinum-activated nickel; Electrochimica Acta 2006, 51(15) 3097-3101.

Zhuo, Q.: Deng, S.; Yang, B.; Huang, J.; Wang, B.; Zhang, T.; Yu, G.; Degradation of perfluorinated compounds on a boron-doped diamond electrode; Electrochimica Acta 2012, 30 17-22.

Zhu, D.; Zhang, L.; Ruther, R.E.; Hamers, R. J.; Photo-illuminated diamond as a solid-state source of solvated electrons in water for nitrogen reduction, Nat. Mater., 2013,12, 836-841.

Almassi, S.; Ren, C.; Liu, J.; Chaplin, B. P.; Electrocatalytic Perchlorate Reduction Using an Oxorhenium Complex Supported on a Ti4O7 Reactive Electrochemical Membrane; Environ. Sci. Technol. 2022, 56, 5, 3267-3276.

Restivo, J.; Soares, O. S. G. P.; Orfao, J. J. M.; Pereira, F. R.; Metal assessment for the catalytic reduction of bromate in water under hydrogen; Chemical Engineering Journal 2015, 263, 119-126.

Song, Z.; Zhou, H.; Towards sustainable and versatile energy storage devices: an overview of organic electrode materials, Energy Environ. Sci., 2013, 6, 2280.

Huyno, S. K. M.; Rene, E. R.; van Hullebusch, E. D.; Annachhatre, A. P.; Nitrate removal from groundwater: a review of natural and engineering processes, 2018, Journal of Water Supply: Research and Technology—Aqua, 2018, 67(8), 885-902.

Kalu, E.E.; White, R.E.; Hobbs, D.T.; Use of a hydrogen Anode for Nitrate Waste Destruction, J. Electrochem. Soc., 1996, 143 (10), 3094-3099.

Li, H-L; Robertson, D.H.; Chambers, J. Q.; Hobbs, D.T.; Electrochemical Reduction of Nitrate and Nitrite in Concentrated Sodium Hydroxide at Platinum and Nickel Electrodes, J. Electrochem. Soc., 1988, 135(5), 1154.

Chaplin, Critical Review of Electrochemical Advanced Oxidation processes for Water Treatment Applications, Environ. Sci.: Processes Impacts, 2014, 16, 1182-1203.

Olatunde, O. E.; Kuvarega, A. T.; Onwudiwe, D. C.; Photo enhanced degradation of polyfluoroalkyl and perfluoroalkyl substances, Heliyon, 2020, 6, e05614.

Liu, Z; Chen, Z.; Gao, J.; Men, Y.; Gu, C.; Liu, J.; Accelerated Degradation of Perfluorosulfonates and Perfluorocarboxylates by UV/Sulfite + Iodide: Mechanisms and System Efficiencies, Environ. Sci. Technol. 2022, 56 3699-3709.

Fennell, B. D; Stephen P. Mezyk, S.P.; McKay, G.; Critical Review of UV-Advanced Reduction Processes for the Treatment of Chemical Contaminants in Water. ACS Environ. Au 2022, 2, 178-205.

Ubar, M; Reductive and Oxidative UV Degradation of PFAS—Status, Needs and Future Perspectives, Water, 2021,13, 3185.

Barham, J.P. and Konig, B. (2020) Synthetic photoelectrochemistry. Angew. Chem. Int. Ed. 59, 11732-11747.

Shirom, M.; Stein, G.; Excited State Chemistry of the Ferrocyanide Ion in Aqueous Solution. I. Formation of the Hydrated Electron; J. Chem. Phys. 1971, 55, 3372.

Schmalzbauer, M.; Marcon, M.; Konig, B.; Excited State Anions in Organic Transformations, Angew. Chem. Int. Ed., 2020, 59, 2-25.

Zeidabadi, F. A.; Esfahani, E. B.; McBeth, S. T.; Dubrawski, K. L.; Electrochemical degradation of PFOA and its common alternatives: Assessment of the key parameters, roles of active species, and transformational pathway; Chemosphere, 2023, 315, 137743.

Ciblak, A.; Mao, X.; Padilla, I.; Vesper, D.; Alshawabkeh, I.; Alshawabkeh, A.; Electrode effects on temporal changes in electrolyte pH and redox potential for water treatment; J. Environ. Sci. Health A Tox Subst. Environ Eng.,2012 47(5), 718-726.

Chen, J.; Zhang, H.; Tomov, I. V.; Ding, X.; Rentzepis, P.M.; Photochemistry and electron-transfer mechanism of transition metal oxalate complexes excited in the charge transfer band, PNAS, 2008, 105(40), 15235-15240.

Park, H.; Vecitis, C. D.; Cheng, J.; Choi, W.; Mader, B. T.; Hoffmann, M. R. Reductive Defluorination of Aqueous Perfluorinated Alkyl Surfactants: Effect of Ionic Headgroup and Chain Length. J. Phys. Chem. A. 2009, 113, 690-696.

Cui, J.; Gao, P.; Deng, Y. Destruction of Per- and Polyfluoroalkyl Substances (PFAS) with Advanced Reduction Processes (ARPs): A Critical Review. Environ. Sci. Technol. 2020, 54 (7), 3752-3766.

Yang, L.; He, L.; Xue, J.; Ma, Y.; Shi, Y.; Wu, L.; Zhang, Z. UV/SO32-Based Advanced Reduction Processes of Aqueous Contaminants: Current Status and Prospects. Chemical Engineering Journal 2020, 397, 125412.

Kaushik, V.; Duan, Y.; Jung, B.; Batchelor, B.; Abdel-Wahab, A. Arsenic Removal Using Advanced Reduction Process with Dithionite/ UV—A Kinetic Study. Journal of Water Process Engineering 2018, 23, 314-319.

Jung, B.; Sivasubramanian, R.; Batchelor, B.; Abdel-Wahab, A. Chlorate Reduction by Dithionite/UV Advanced Reduction Process. International Journal of Environmental Science and Technology 2017, 14, 123-134.

Botlaguduru, V. S. V.; Batchelor, B.; Abdel-Wahab, A. Application of UV-Sulfite Advanced Reduction Process to Bromate Removal. Journal of Water Process Engineering 2015, 5, 76-82.

Vellanki, B. P.; Batchelor, B.; Abdel-Wahab, A. Advanced Reduction Processes: A New Class of Treatment Processes. Environ. Eng. Science 2013, 30 (5), 264-271.

Trang, B.; Li, Y.; Ateia, M.; Houk, K.N.; Dichtel, W.R.; Low temperature mineralization of perfluorocarboxylic acids, Science, 2022, 377, 839-845.

Czapla-Masztafiak, J.; Szlachetko, J. Silva, J.L.; Araujo, C. M.; Fernandes, D. L. A.; Lu, L.; Kiely, C. J.; Abdellah, M.; Nordlander, P.; Sa, J.; Hydrated Electron Generation by Excitation of Copper Localized Surface Plasmon Resonance; 2019, Journal of Physical Chemistry Letters, 10(8), 1743-1749.

Chen, G.; Hanukovich, S.; Chebeir, M.; Christopher, P.; Liu, H. Nitrate Removal via a Formate Radical-Induced Photochemical Process. Environ. Sci. Technol. 2019, 53 (1), 316-324.

Amador, C. K.; Van Hoomissen, D. J.; Liu, J.; Strathmann, T. J.; Vyas, S.; Ultra-short chain fluorocarboxylates exhibit wide ranging reactivity with hydrated electrons; Chemosphere, 2023, 311, 136918.

Buxton, G. V.; Greenstock, C. L.; Helman, W. P.; Ross, A. B. Critical Review of Rate Constants for Reactions of Hydrated Electrons, Hydrogen Atoms and Hydroxyl Radicals (·OH/·O- in Aqueous Solution. J. Phys. Chem. Ref. Data 1988, 17 (2), 513-886.

Nam, D. et al. "A seawater battery with desalination capabilities enabling a dual-purpose aqueous energy storage system," Energy Storage Materials 37 (2021), 556-566.

Liu, C. J.; Strathmann, T. J.; Bellona, C. Rejection of Per- and Polyfluoroalkyl Substances (PFASs) in Aqueous Film-Forming Foam by High-Pressure Membranes. Water Res. 2021, 188, 116546.

Naumann, R.; Lehmann, F.; Goez, M. Generating Hydrated Electrons for Chemical Syntheses by Using a Green Light-Emitting Diode (LED). Angew. Chem., Int. Ed. Engl. 2018, 57 (4), 1078-1081.

(56) References Cited

OTHER PUBLICATIONS

Hamers, R. J.; Bandy, J. A.; Zhu, D.; Zhang, L.; Photoemission from diamond films and substrates into water: Dynamics of solvated electrons and implications for diamond photoelectrochemistry; J. Name., 2013, 00, 1-3.

Zhang, Yanan, and Limin Wu. "Photochemical reduction of nitrate to nitrite in aqueous solution and its application to the determination of total nitrogen in water." Analyst 111.7 (1986): 767-769.

Suslick, Kenneth S., and Randall A. Watson. "Photochemical reduction of nitrate and nitrite by manganese and iron porphyrins." Inorganic chemistry 30.5 (1991): 912-919.

Li, Yuexiang, and F. Wasgestian. "Photocatalytic reduction of nitrate ions on TiO2 by oxalic acid." Journal of Photochemistry and 0Photobiology A: Chemistry 112.2-3 (1998): 255-259.

Chen, Gongde, et al. "Nitrate removal via a formate radical-induced photochemical process." Environmental science & technology 53.1 (2018): 316-324.

Zhang, J-Y, Boyd, I. W., Efficient excimer ultraviolet sources from a dielectric barrier discharge in rare-gas /halogen mixtures, Journal of Applied Physics, 1996, 80,633.

Jensen, Vivian B., et al. "Nitrate in potable water supplies: alternative management strategies." Critical Reviews in Environmental Science and Technology 44.20 (2014): 2203-2286.

Xu et al., Electrocatalytic reduction of nitrate—a step towards a sustainable nitrogen cycle. Chemical Society Review 51 (2022): 2710-2758.

Rowley, John G., et al. "Iodide Chemistry in Dye-Sensitized Solar Cells: Making and Breaking I-I Bonds for Solar Energy Conversion." The Journal of Physical Chemistry Letters 1.20 (2010): 3132-3140.

Algurainy, Yazeed; D.F. Call. Asymmetrical removal of sodium and chloride in flow-through capacitive deionization. Water Research 183 (2020): 116044.

Holubowitch, A. et al., Membrane-free electrochemical deoxygenation of aqueous solutions using symmetric activated carbon electrodes in flow-through cells. Electrochimica Acta, 297 (2019): 163-172.

Shapira, B. et al., Side reactions in capacitive deionization (CDI) processes: the role of oxygen reduction. Electrochimica Acta 220 (2016): 285-295.

Garcia-Segura, S. et al., Electrocatalytic reduction of nitrate: Fundamentals to full-scale water treatment applications. Applied Catalysis B: Environmental 236 (2018): 546-568.

Zhang, X. et al., "Recent advances in non-noble metal electrocatalysts for nitrate reduction". Chemical Engineering Journal 403 (2021): 126269.

Liu et al., "Activity and Selectivity Trends in Electrocatalytic Nitrate Reduction on Transition Metals." ACS Catalysis (2018): 7052-7064.

Boschloo, G. and A. Hagfeldt. "Characteristics of the Iodide/Triiodide Redox Mediator in Dye-Sensitized Solar Cells." Accounts of Chemical Research 42(11):1819-26.

Ghasemi, S. et al., "Preparation of electrochemically reduced graphene oxide/bimetallic copper-platinum nanohybrid as counter electrode for fabrication of dye-sensitized solar cell." Journal of Electroanalytical Chemistry 833 (2019): 242-250.

Onuki, K.; Hwang, G.-J.; Arifal, Shimizu, S.; Electro-electrodialysis of hydroiodic acid in the presence of iodine at elevated temperature; J. of Membrane Science, 2001, 192, 193-199.

Qasem, N, A.A.; Mohammed, R.H.; Lawal, D. U.; Removal of heavy metal ions from wastewater: a comprehensive and critical review, njp Clean Water, 2021, 36.

Vorlop, K. D., & Tacke, T. (1989). Erste schritte auf dem weg zur edelmetallkatalysierten nitrat-und nitrit-entfernung aus trinkwasser. Chem. Ing. Tech., 61(10), 836-837.

Sarapas and Tew (Sarapas, J.M. and Tew, G.N.; Poly(ether-thioethers) by Thiol-Ene Click and Their Oxidized Analogues as Lithium Polymer Electrolytes; Macromolecules 2016, 49, 1154-1162).

Zhang, K.; Monteiro, M.J.; Zhongfan Jia, Z.; Stable organic radical polymers: synthesis and Applications; Polym. Chem., 2016, 7, 5589-5614.

Ertem, S.P. and Coughlin, E.B.; Alkaline Stability Evaluation of Polymerizable Hexyl-tethered Ammonium Cations; Macromol.Rapid. Comm. 2022, 43, 12, 2100610.

You, W.; Noonan, K.J.T.; Coates, W.G.; Alkaline Stable anion exchange membranes: A review of synthetic approaches; Prog. Polym.Sci. 2020, 100, 10117.

Esfahani, E. B.; Mohseni, M., "Fluence-based photo-reductive decomposition of PFAS using vacuum UV (VUV) irradiation: Effects of key parameters and decomposition mechanism", J. Environmental Chemical Engineering; 10, 2022, 107050.

Maza, W.A.; Breslin, V. M.; Feygelson, T. I.; DeSario, P.A.; Pate, B.B.; Owrutsky, J. C.; Epshteyn, A.; "Degradation of perfluorooctanesulfonate (PFOS) by sub-bandgap irradiation of hydrogen-terminated nanodiamond" Applied Catalysis B: Environmental, 325, 2023, 122306.

Liu, G.; Feng, C.; Shao, P., "Degradation of Perflurooctanoic Acid with Hydrated Electrons by a Heterogeneous Catalytic System", Environ. Sci. Technol. 56, 2022, 6223-6231.

Chen, G.; Liu, S.; Shi, Q.; Gan, J.; Jin, B.; Men, Y.; Liu, H.; "Hydrogen-polarized vacuum ultraviolet photolysis system for enhanced destruction of perfluoroalkyl substances"; J. of Hazardous Materials Letters, 3 20122, 100072.

Liu, S.; Chen, G.; Shi, Q.; Gan, J.; Jin, B.; Men, Y.; Liu, H.; "Promotive Effects of Chloride and Sulfate on the Near-Complete Destruction of Perfluorocarboxylates (PFCAs) in Brine via Hydrogen-tuned 185 nm UV Photolysis: Mechanism and Kinetics", Environ. Sci. Technol. 2024, 58, 10347-10356.

Guan, Y.; Liu, Z.; Yang, N.; Yang, S.; Quispe-Cardenas, L. E.; Liu, J.; Yand, Y., "Near-Complete destruction of PFAS in Aqueous film-forming foam by integrated photo-electrochemical processes", Nature Water, May 1, 2024 https://doi.org/10.1038/s44221-024-00232-7.

Zhu, D.; Zhang, L.; Ruther, R. E.; Hamer, R. J., "Photo-illuminated diamond as a solid-state source of solvated electrons in water for nitrogen reduction", Nature Materials, 12, September (on line) 2013.DOI:10.1038/NMAT3696.

Heyer, S.; Janssen, W.; Turner, S.; Yeap, W. S.; Verbeeck, J.; Haenen. K.; Krueger, A, "Towards Deep Blue Nano Hope Diamonds: Heavily Boron-Doped Diamond Nanoparticles"; ACSNano, 8(6) 2014, 5757-2014.

Bachman, B. F.; Zhu, D.; Bandy, J.; Zhang, L.; Hamers, R. J.; Detection of Aqueous Solvated Electrons Produced by Photoemission from solids using Absorption Measurements; ACS Meas. Sci. Au 2022, 2,46-56.

Liu, Z.; Bentel, M. J.; Yu, Y.; Ren, C.; Gao, J.; Pulikkal, V. F.; Sun. M.; Men; Y.; Liu, J., "Near-Quantitative Defluorination of Perfluorinated and Fluorotelomer Carboxylates and Sulfonates, with Integrated Oxidation and Reduction", Environ. Sci. Technol., 2021, 55, 7052-7062.

Sollo, F. W.; Larson, T. E.; Mueller, H. F.; "Fluoride Removal From Potable Water Supplies", WRC Research Report No. 136, Final Report Project No. A-094-ILL, University of Illinois, Water Resources Center, 1978.

Makhayeva, D.N.; Irmukhametova, G. S.; and Khutoryanskiy, Polymeric Iodophors: Preparation, Properties, and Biomedical Applications; Review Journal of Chemistry, 2020, vol. 10, No. 1-2, 40-57.

Jassby, D.; Cwiertny, D.; Wong, B.; "A combined Photo/Electrochemical Reductive Pathway Towards Enhanced PFAS Destruction", SERDP Project ER18-1595, Feb. 2020.

Anari, E.H.B. et al. "Substituted ferrocenes and iodine as synergistic thermoelectrochemical heat harvesting redox couples in ionic liquids," Chem. Commun., 2016, 52, 745-748.

Grebel (Effect of Halide Ions and Carbonates on Organic Contaminant Degradation by Hydroxyl Radical Based Advanced Oxidation Processed in Saline Waters, Environ Sci. Technol. 2010, 44, 6822-6828). (Year: 2010).

http://pressbooks-dev.oer.hawaii.edu:80/chemistry/chapter/the-periodic-table/ Wyaback Machine Jan. 11, 2018. 9 pages (Year: 2018).

(56) References Cited

OTHER PUBLICATIONS https://ecampusontario.pressbooks.pub/chemistry/chapter/2-5-the-periodic-table/ Internet Archive Date Feb. 7, 2023. Two pages. (Year: 2023).

* cited by examiner

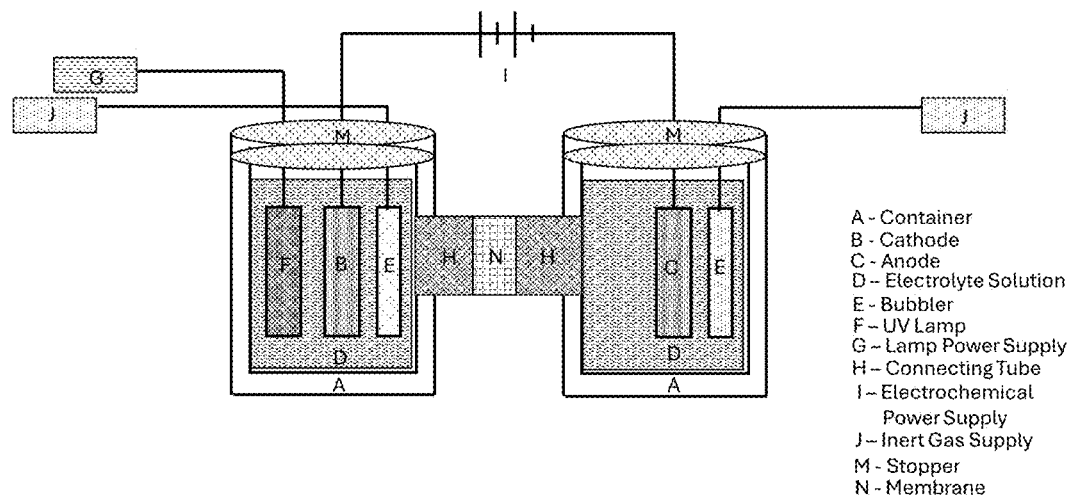
A - Container
B - Cathode
C - Anode
D - Electrolyte Solution
E - Bubbler
F - UV Lamp
G - Lamp Power Supply
H - Connecting Tube
I - Electrochemical Power Supply
J - Inert Gas Supply
M - Stopper
N - Membrane
Figure 9
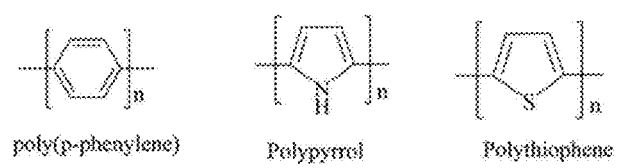
poly(p-phenylene)  Polypyrrol  Polythiophene
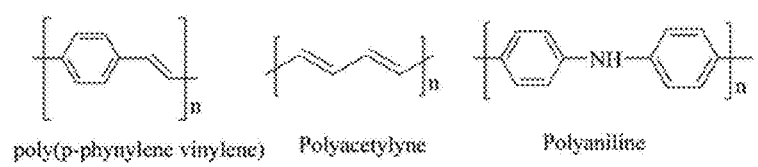
poly(p-phynylene vinylene)  Polyacetylyne  Polyaniline
Figure 10

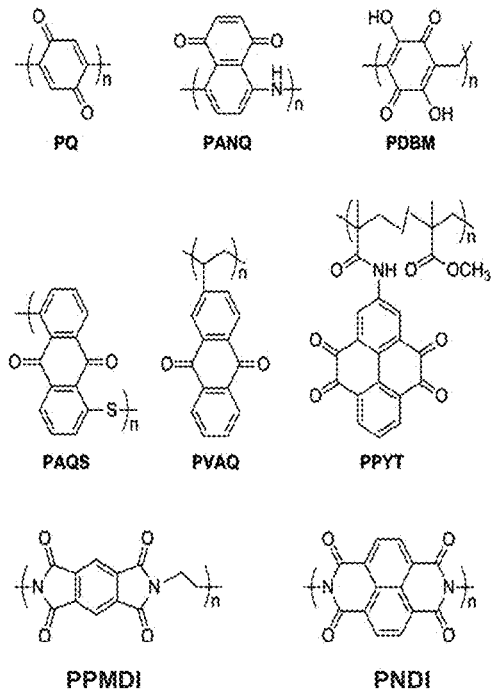

Figure 11

N-type polymeric materials based on conjugated carbonyl groups: polymeric quinone (PQ), poly(5-amino-1,4-naphthoquinone) (PANQ), poly(2,5-dihydroxy-1,4-benzoquinone-3,6-methylene) (PDBM), poly(anthraquinonyl sulfide) (PAQS), poly(2-vinylanthraquinone) (PVAQ), polymer-bound pyrene-4,5,9,10-tetraone (PPYT), polymeric pyromellitic diimide (PPMDI) and polymeric naphthalene diimide (PNDI).

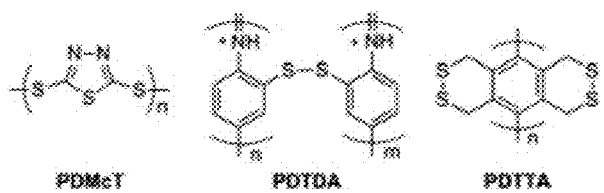

Typical organodisulfides and their theoretical capacity: poly(2,5-dimercapto-1,3,4-thiadiazole) (PDMcT), poly(2,20- dithiodianiline) (PDTDA), poly(5,8-dihydro-1H,4H-2,3,6,7-tetrathia-anthracene) (PDTTA).

Figure 12

A - Container
B - Diamond Cathode
C - Anode
D - Electrolyte Solution
E - Bubbler
F - UV Lamp
G - Lamp Power Supply
H - Connecting Tube
I - Electrochemical Power Supply
J - Inert Gas Supply
M - Stopper
N - Membrane A - Container
E - Bubbler (optional)
F - Lamp
G - Lamp Power Supply
J - Inert Gas Supply
M - Stopper
N - Cartridge with
    Immobile Reducing Agent
O - Pump
P - Pump Power Supply
R - Return
U - Uptake

R=H, X=O
R=H, X=NH

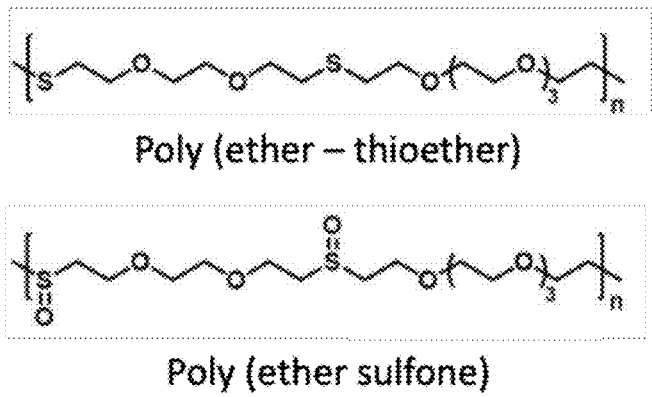
Poly (ether – thioether)
Poly (ether sulfone)
Figure 24
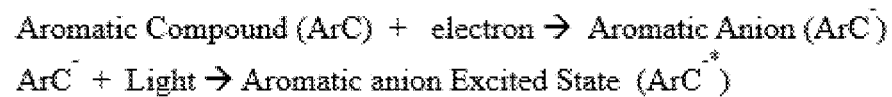
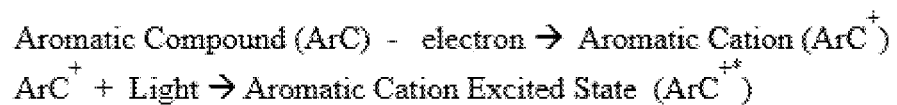
Figure 25

METHODS AND SYSTEMS OF NITRATE REMOVAL IN AQUEOUS SYSTEMS FOR IMPROVED PFAS DESTRUCTION

CROSS REFERENCE TO RELATED APPLICATIONS

This application claims priority to the following: PROCESSES FOR EFFICIENT PHOTOCHEMICAL DESTRUCTION OF PFAS FROM WASTE STREAMS Filed Jul. 14, 2023 U.S. Provisional Application No. 63/513,782; SYSTEMS AND METHODS OF PFAS DESTRUCTION Filed Oct. 17, 2023 U.S. Provisional Application No. 63/591,040; PRETREATMENT OF CONTAMINATED PFAS WATER PRIOR TO PHOTOREDUCTION Filed Apr. 18, 2024 U.S. Provisional Application No. 63/635,938; and METHODS AND SYSTEMS OF NITRTE REMOVAL IN AQUEOUS SYSTEMS FOR IMPROVED PFAS DESTRUCTION Filed Jul. 12, 2024 U.S. Nonprovisional application number U.S. Ser. No. 18/771,292, the disclosures of all of which are hereby incorporated by reference.

BACKGROUND

Per- and polyfluoroalkyl substances (PFASs) are a class of synthetically prepared compounds that have been used for decades in numerous consumer and industrial applications. PFASs have some unique surface properties and can also be both hydrophobic and oleophobic. As a result, PFASs are used as coating aids, lubricants, foaming aids and various surface treatments. They have proven especially useful as flame retardants in the form of aqueous film-forming foams (AFFF). Also, some PFASs are known to bio-accumulate in plants and animals. There is a growing body of evidence that exposure to PFASs can also cause a variety of health problems. Owing to these concerns, various world-wide regulatory agencies have started to establish strict limits to the presence of PFAS in food and water.

PFASs are a class of chemicals that contain perfluoroalkyl or polyfluoroalkyl groups. The definition and classification of PFASs has changed over time. PFASs are fluorinated substances that contain at least one fully fluorinated methyl or methylene carbon atom (without any H/Cl/Br/I atom attached to it), i.e. with a few noted exceptions, any chemical with at least a perfluorinated methyl group (—CF3) or a perfluorinated methylene group (—CF2-) is a PFAS. Some of the most important examples of PFASs include the perfluorosulfonic acids (PFSAs), such as perfluorooctanesulfonic acid (PFOS) and the perfluorocarboxylic acids (PFCAs) like perfluorooctanecarboxylic acid (PFOA). Fluorotelomers are fluorocarbon-based oligomers, or telomers, synthesized by telomerization. Some fluorotelomers and fluorotelomer-based compounds are a source of environmentally persistent perfluorinated carboxylic acids such as PFOA.

The persistence of PFASs, the health issues, and the regulatory landscape have prompted a great deal of research effort to reduce their presence in the environment. Much of the early work was focused on capture, for example from drinking water. However, more recently, there has been a stronger effort on the destruction of these materials. One of the attributes of PFASs is their resistance towards breaking down in the environment. PFASs are not easily metabolized by organisms, and do not decompose by exposure to visible light or longer wavelength UV irradiation typically found under terrestrial conditions.

Some of the methods that have proven effective for breaking down PFASs are supercritical water oxidation (SCWO) and treatment of PFASs in an aprotic polar solvent. SCWO works by heating water to 374° C. under high pressure (over 3000 psi). Therefore, SCWO is quite energy intensive and can suffer from clogging issues. The use of SCWO often requires wastes containing high solids because it relies on the heat capacity (btu) generated from this waste to make the process cost effective. An advantage of SCWO is its short residence time to be effective, on the order of 30 seconds to minutes. The use of basic aprotic media to destroy PFASs suffers from the fact that most waste streams are water-based and therefore not readily transferred to aprotic media that requires minimum water levels. In other cases, generating subcritical water conditions in alkaline environments has also been shown to destroy PFAS compounds. This process, referred to as hydrothermal alkaline treatment (HALT), operates at temperatures around 350° C. and pressures around 2400 psi.

Other processes for destroying PFASs involve the use of electrochemistry. Electrochemical destruction can destroy long chain PFASs (for example, PFOS and PFOA), however, shorter chain PFASs are less prone to destruction. It is speculated that the longer chained PFASs readily assemble on the electrodes and therefore can be readily oxidized or reduced. Other work has shown that sonication can result in PFAS destruction.

Improved processes are needed to efficiently and effectively destroy PFAS, particularly PFAS in water.

SUMMARY

Various embodiments include systems and methods for nitrate reduction for improved PFAS destruction. In some embodiments, the methods and systems include filtering water containing PFAS and nitrate through a membrane selective for PFAS to obtain a membrane reject containing PFAS and nitrate and a filtrate containing nitrate; forming a treatment solution using the membrane reject comprising diluting the membrane reject, and combining the membrane reject with a photosensitizer, a sulfite salt, and a sufficient amount of base such that the treatment solution has a pH of about 10 or more; and irradiating the treatment solution with UV light in a photoreactor to destroy a portion of the PFAS. In some embodiments, the selective membrane includes a reverse osmosis, forward osmosis, nanofiltration (NF), and/or ultrafiltration (UF) membrane. In some embodiments, the selective membrane includes a reverse osmosis membrane. The filter may retain greater than 99% of the PFAS in the water. The photosensitizer may be a halide salt, such as an iodide salt or a bromide salt. Before dilution, the concentration of PFAS in the membrane reject may be between about a 3 times and about a 20 times greater than in the water containing PFAS and nitrate before the filtering step, for example. In some embodiments, dilution of the membrane reject includes between about a 3 and about a 20 times dilution. In some embodiments, the concentration of PFAS in the water containing PFAS and nitrate before the filtering step is between about ¼ and about 4 times the concentration of PFAS in the treatment solution. In some embodiments, the concentration of PFAS in the water containing PFAS and nitrate before the filtering step is between about ½ and 2 times the concentration of PFAS in the treatment solution. The treatment solution may have a pH of about 12 or more, for example.

Various embodiments includes systems and methods for destruction of PFAS in water including a nitrate removal system configured to remove nitrate from water containing PFAS and nitrate, the nitrate removal system including a membrane selective for PFAS which produces a membrane reject, a source of water configured to dilute the membrane reject, a photoreactor including a reactor vessel an influent port configured to direct the membrane reject into the reactor vessel and a source of ultraviolet light source positioned to direct light onto the diluted membrane reject within the reactor vessel, in which the system is configured to mix water with the membrane reject before entry into the photoreactor or within the photoreactor. In some embodiments, the system may include a tank configured to receive the membrane reject, to receive water from the water source, to mix the membrane reject with the water, and to supply the diluted membrane reject to the photoreactor. The system may also include a pipe configured to convey membrane reject from the nitrate removal system to the photoreactor, wherein the water supply is configured to provide water to the pipe, in which the system is configured to dilute the membrane reject by mixing with water within the pipe. The supply of water may be configured to supply water to the photoreactor to dilute the membrane reject by mixing with water within the photoreactor. In some embodiments, the membrane selective for PFAS includes a membrane having a MWCO of between about 150 and about 300 Da, for example. In some embodiments, the membrane is negatively charged. In some embodiments, the membrane excludes about 99% or more of PFAS in wastewater.

BRIEF DESCRIPTION OF THE DRAWINGS

The following drawings are illustrative of embodiments and do not limit the scope of the invention. The drawings are not necessarily to scale and are intended for use in conjunction with the following detailed description. Embodiments of the invention will be described with reference to the drawings, in which like numerals may represent like elements.

FIG. 9 is a schematic of an alternative embodiment of a photo-electrolytic cell according to various embodiments;

FIG. 10 is the chemical structures of examples of polymers which may be used in various embodiments;

FIG. 11 are the chemical structures of further examples of polymers which may be used in various embodiments;

FIG. 12 shows examples of structures of polymeric n-type organic semiconductors that may be used in various embodiments;

FIG. 24 is a depiction of the chemical structure of polymers with tetramethylpiperidine 1-oxyl (TEMPO) side chains, which may be used in various embodiments;

FIG. 25 is an example of a process for the destruction of PFAS including the use of aromatic compounds;

DETAILED SUMMARY OF THE INVENTION

Figure 1:
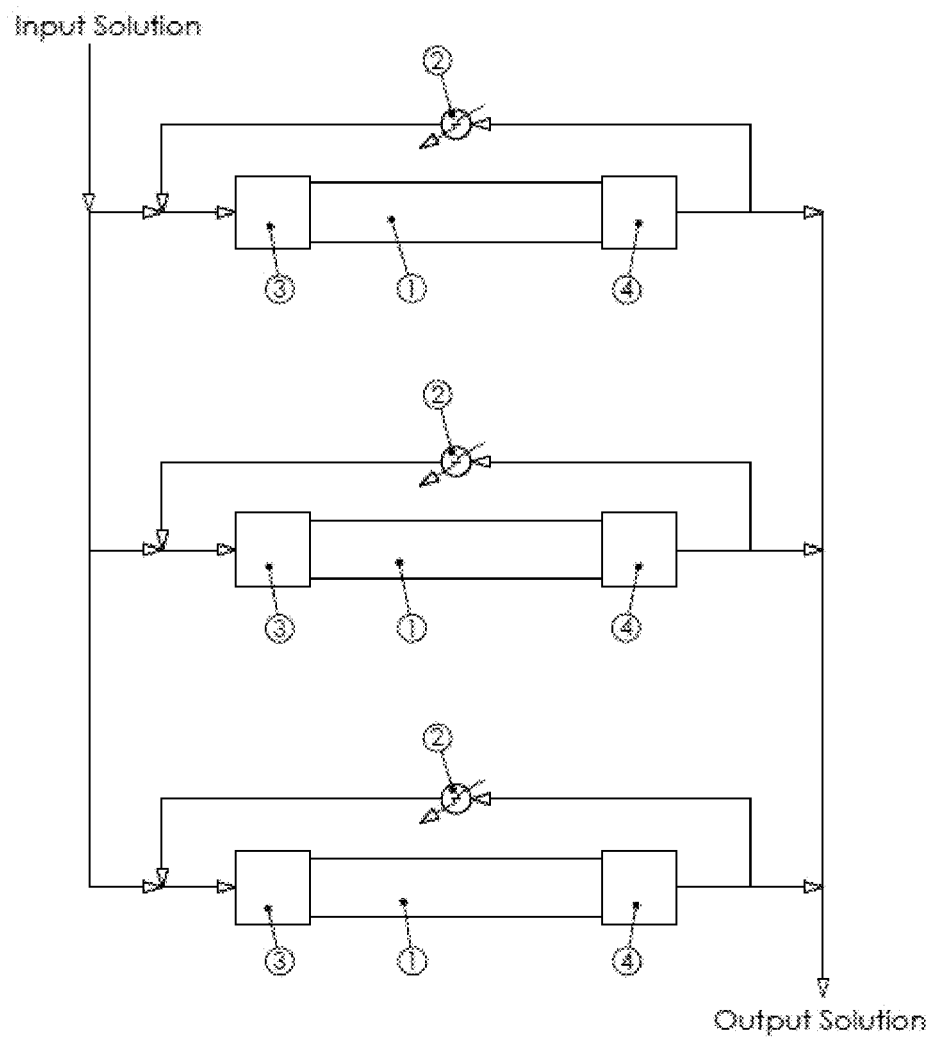
FIG. 1 is a schematic showing an example of an integrated system incorporating pretreatment, photolysis, and post treatment according to various embodiments.

The systems and methods described herein relate to processes for the photochemical destruction of PFASs. More specifically, the systems and methods relate to a class of UV photochemical destruction referred to as Ultraviolet-based advanced reduction processes (UV-ARP). The UV-ARP method is based on generating a highly reducing species, such as solvated electrons, produced by the irradiation of a photosensitizer. The photosensitizer or sensitizer absorbs UV energy and generates a solvated electron and an oxidized sensitizer species. The solvated electrons can react with a PFAS molecule.

Various embodiments include processes to increase the efficiency of the photochemical destruction of PFAS and allow photochemical methods to be more generally used on a variety of PFAS-containing waste streams. Other embodiments include UV photolysis reactor designs to accomplish more efficient destruction of PFASs. Still other embodiments include systems and methods for recovering high value materials following UV photolysis of PFAS materials. Other embodiments include systems and methods for additional treatment of waste streams after UV photolysis and prior to release into the environment or for reuse in an industrial application.

Various embodiments include photochemical destruction of PFASs as a method to destroy the so-called "Forever Chemicals". In some embodiments, the photochemical system includes a reactor vessel with one or more UV light sources. The reactor may be charged with a liquid consisting of one or more PFAS, water (or another solvent), and sensitizers capable of absorbing UV light and producing a reactive species. In addition, there optionally may be one or more other chemical additives to promote the reaction. The process, systems and methods disclosed herein result in improved efficiencies, lower costs, and use of less chemicals. In some embodiments, the materials used in the process may be recycled and reused, further increasing efficiency and lowering costs. A further embodiment is to treat the photolyzed solution such that the solution can be recycled, further purified or disposed of.

Various embodiments include the use of ultraviolet-based advanced reduction processes (UV-ARP) which may be effective for the treatment of several classes of recalcitrant chemical contaminants in water. Advanced reduction processes are based on the production of highly reducing hydrated electrons which exhibit fast bimolecular reaction rate constants with inorganic and organic compounds. In UV-ARP, solvated electrons may be produced by the illumination of sensitizers capable of generating a solvated electron when irradiated with a UV light source. Photoproduced solvated electrons, produced by the systems and methods describe herein, can react with PFASs and other pollutants, leading to the destruction of the PFAS.

A result of UV-ARP is the mineralization of the PFASs by converting the carbon-fluoride bond to the fluoride ion and carbon species, such as acetate, formate, carbon dioxide, shorter chain PFAS molecules, other polyfluorinated molecules, and/or carbonate. In this context, mineralization means reduction of the carbon-bound fluorine on PFAS to the fluoride ion $F^-$.

In some embodiments, the UV-ARP method may be used to treat PFAS present in wastewater or other water sources directly, such as in a high throughput treatment system. In other embodiments, the UV-ARP method may be used to treat PFAS which has been extracted or absorbed and isolated and/or concentrated from the environment, such as from wastewater or other water sources. This PFAS may be suspended or dissolved into an aqueous solution for use in the UV-ARP methods and systems described herein.

The methods and systems of PFAS destruction described herein include the ability to destroy PFAS contaminants, including carboxylated and sulfonated PFAS contaminants. Examples of PFAS which may be destroyed by the embodiments described herein include but are not limited to Trifluoroacetic Acid (TFA), Perfluorobutanoic acid (PFBA), perfluoropentanoic acid (PFPeA), Perfluorohexanoic d (PFHxA), Perfluorooctanoic acid (PFOA), Perfluorobutanesulfonic acid (PFBS), Perfluorohexanesulfonic acid (PFHxS) and Perfluorooctanesulfonic acid (PFOS). More than one type of PFAS may be treated and destroyed simultaneously using the photoreaction methods described herein.

Destruction of the PFAS includes a change in the identity of the target chemical pollutant through the cleavage of chemical bonds. Destruction that yields complex chemical compounds as final products is referred to as degradation. Destruction includes removing one or more chemical groups to reduce or eliminate toxicity.

The PFAS used in various embodiments may be in aqueous solution, such as PFAS present in a water from a contaminated natural source or other source or may be concentrated by a prior capture or pretreatment method or other treatment method.

Some embodiments include an electrochemical system to convert the photochemical byproducts back to the original sensitizer and to prevent the build-up of significant concentrations of species that scavenge solvated electrons.

There are relatively few processes for destroying PFASs compared to other pollutants. Since photolytic generation of solvated electrons is one of these methods, it is beneficial to minimize possible interferences with the photochemical process. Therefore, it may be desirable in some cases for the waste stream to be pre-treated, using other processes, to allow the photolysis reaction to proceed with maximum efficiency. Furthermore, the photolysis reaction to efficiently generate solvated electrons may require very alkaline conditions, such as a pH greater than 10 or greater than 12. In addition, other inorganic salts may be added to scavenge photoproducts and minimize the concentration of molecular oxygen. As a result, the concentration of inorganic ions can be quite high. The destruction of PFASs also produces the inorganic fluoride anion ($F^-$). In order to dispose of the waste stream following photolysis, it therefore may be desirable to reduce the concentration of potentially corrosive species or other unwanted species. Also, even though photolysis can remove greater than 90% and often more than 99% of the PFASs, it may still be beneficial to use other separation techniques to further lower the PFASs concentration, such as to comply with regulatory limits or to decrease reactor time. Many of these processes, for example ion exchange technology, reverse osmosis, or granular activated carbon (GAC) beds which would be used to further decrease the PFAS concentration, may be negatively impacted by the presence of competitive ionic species. Therefore, to effectively deploy these technologies it may also be beneficial to decrease the ionic loading.

For at least these reasons, an effective system for photochemically destroying PFASs may consist of the following steps: pretreatment, then photolysis, then post-treatment, then optionally a polishing step. Different systems and methods may be employed for each of these steps, in various combinations. While all of the steps may be used in many cases, in other cases a system of methods may not include all of these steps. Furthermore, the systems and embodiments may further include means for fluid transportation including pipes, pumps, valves, inlets, outlets, etc., such as to connect various components and connect to and from inlets and outlets of various components. An example of an integrated system incorporating pretreatment, photolysis, and pretreatment is shown in FIG. 1.

Pretreatment Step(s)

Various embodiments successfully implement UV-ARP by minimizing the time for photochemical destruction of the PFAS and minimizing the cost of reagents, including through the use of pretreatments.

PFASs are found in many waste streams. Some common PFAS-containing waste streams that may be treated according to various embodiments include effluent from industrial producers of PFASs, effluent from textiles plants, foam fractionation concentrates, Aqueous Film-Forming Foams (AFFF), AFFF rinsates, landfill leachates, contaminated ground water, municipal water waste streams, and pot still bottoms. Some of these waste streams may be amenable to simple pretreatment protocols such as filtering. Other waste streams may require unique pretreatments, such as removal of solvated electron scavengers, scattering materials. or UV absorbers. In some cases, such as where the composition of a waste stream is known, and the nature of the non-PFAS species is understood, the pre-treatment step can be omitted. One or more pretreatment systems and methods as described herein may be used in various embodiments.

Solvated electrons react with a variety of chemical species naturally present in water. Any photochemical system that uses solvated electrons to react with PFASs can be sensitive to other chemical species in the waste stream. These other chemical species can scavenge the solvated electrons. In fact, many common chemical pollutants react faster with solvated electrons than PFAS. Depending on the concentration and nature of these chemical species, the solvated electrons may preferentially react with these materials until such times that these species are consumed. This can result in substantially longer reaction times to destroy the PFASs.

Therefore, in various embodiments, these contaminants may be preferentially consumed before the targeted PFAS. In some cases, the contaminants are present in sufficient quantities such that PFAS destruction would not occur, or would occur very slowly, such as over days or weeks. Nitrates are an example of a common contaminant in wastewater that will readily react with solvated electrons and reduce UV efficiency. There are two reasons that nitrate may interfere with the photochemical destruction of PFASs: 1) nitrate is an efficient scavenger of electrons, 2) nitrate has strong absorption of light in the UV part of the electromagnetic spectrum. Since UV photolysis is one of processes that can destroy PFASs under ambient conditions, and other contaminates can be efficiently removed by other processes, a pre-treatment step may be used to remove these contaminants.

Various embodiments disclosed herein include systems and methods of oxidative pretreatment of waste streams including PFAS prior to UV photoreduction. The pretreatment processes may include oxidation processes including thermal oxidation and/or ozone oxidation treatment. In some embodiments, thermal oxidation treatment may include mixing the wastewater with a persulfate such as potassium persulfate or sodium persulfate as well as a base or acid to increase or reduce the pH of the wastewater and treating the wastewater at elevated temperature and/or pressure. In some embodiments, the ozone treatment includes mixing the wastewater with a base to increase the pH of the wastewater followed by ozone treatment. After pretreatment, UV photoreduction of the wastewater may be more efficient, with a higher percentage of reduction of PFAS achieved following the photoreduction. For example, the thermal oxidation treatments disclosed herein result in a much more efficient PFAS destruction using UV photoreduction at 222 nm, requiring much less dilution and, therefore, making the photoreduction process much more efficient and cost effective.

Pretreatment is beneficial because, in addition to the PFAS targets of UV photoreduction, waste streams may include other components which inhibit or interfere with photoreduction. Some of these components may interfere with light transmission, making UV-based PFAS destruction process less effective. Others may interfere with the chemical reactions occurring during UV photoreduction. Various embodiments include methods of reducing or eliminating the presence of these components, enabling more efficient subsequent PFAS photoreduction. The pretreatment processes described herein may remove solvated electron scavengers, scattering materials and/or UV absorbers. The process and systems increase the efficiency of the photochemical destruction of PFAS, allow photochemical methods to be more generally used on a variety of PFAS-containing waste streams, and decrease the time required for PFAS destruction as well as the expense.

Pretreatment may improve light transmission, enabling the UV light to penetrate the wastewater more thoroughly. At the same time, the pretreatment may not interact with the PFAS substances or remove them from the water component of the wastewater. In this way, the PFAS component of the wastewater is not split during the pretreatment, which would then require treatment of not only the liquid component of the wastewater but also the PFAS which was separated from the liquid component of the wastewater, increasing the complexity and the cost. The pretreatment is not expected to result in defluorination of the PFAS but might alter the PFAS (such as a telomer) to another PFAS that is easier to photoreduce. However, the main purpose of the pretreatment is to interact with, alter, or remove non-PFAS components of the waste stream, which might otherwise interfere with the subsequent UV reduction. Furthermore, the pretreatments do not produce chemical products which interfere with or reduce the efficiency of the UV photoreduction process. The pretreatments disclosed herein result in a waste stream that is more amenable to UV photoreduction and therefore more efficient due to increased light transmission without a separation of the PFAS and without the creation of interfering substances.

Challenges for the successful implementation of UV photoreduction of PFAS in wastewater include maximizing the destruction performance, minimizing the time for photochemical destruction and minimizing the cost of reagents. The pretreatments disclosed herein result in a more efficient UV photoreduction, with less dilution of the waste stream. As a result, the process requires less volume and, overall, less reagents.

Another issue with using UV-ARP is that the sensitizer cost tends to dominate the bill of materials. Therefore, a practical and efficient method to recover the sensitizer or sensitizer precursor is desired.

In some cases, the compositions of the waste streams are well understood, and steps can be taken to reduce potential scavengers. This might be the case for industrial waste streams where the reactants and products are known. In other cases, various embodiments may characterize the waste stream, such as by one or more analytical techniques such as mass spectrometry, gas chromatography mass spectroscopy, multinuclear NMR, infrared spectroscopy, and/or UV absorption spectroscopy. The determination of concentrations and the chemical composition allow for the waste stream to be treated prior to UV photolysis. Pre-treatment of the waste streams prior to the UV photolysis may result in substantial reduction in the time to destroy the PFASs.

In some embodiments, treatment may occur between multiple photoreactors in series as an intermediate step. For example, photolysis may be performed in a first reactor. The waste stream may then be further processed in a second reactor (or more additional reactors in series) which might employ different treatment conditions than the first reactor, such as different wavelengths of light, sensitizers, pH, temperature, etc.

In some embodiments, multiple pretreatment steps may be employed before the photolysis process. For example, a clarification step may be used, such as between a pretreatment process and the photolysis process, which may allow for settling and separation of solids out of the wastewater.

For removal of contaminants that scavenge active photochemical species, multiple techniques may be employed. For example, nitrate and nitrite may be particularly problematic impurities in the UV-ARP and may be reduced or removed in various embodiments prior to UV treatment. Other water impurities that also scavenge solvated electrons, and that may be removed by pretreatment in various embodiments, include but are not limited to the following: 1) organic impurities such as chlorinated organic compounds (COCs) including: chlorinated biphenyls, chlorinated dibenzodioxin, chloroform, tetrachloroethylenes and other chlorinated solvents and cleaning fluids, 2) halogen oxides: $OCl^-$, $ClO_2^-$, $ClO_3^-$, $ClO_4^-$, $OBr^-$, $BrO_2^-$, $BrO_3^-$, $BrO_4^-$, $IO^-$, $IO_2^-$, $IO_3^-$, $IO_4^-$ or their corresponding conjugate acids.

One method of managing impurities that interfere with UV treatment is to have them consumed as part of the ARP. In such cases, such as with nitrates, the impurities may be consumed before the PFAS, during an induction time before the PFAS destruction occurs. However, there are wastewaters that are contaminated with very high levels of impurities such as nitrates, for example, near water sources that are associated with intense agricultural activity. In these cases, the nitrate levels can exceed 400 mg/Liter (400 ppm). It is not uncommon for these waste waters to be further concentrated by using other techniques, such as reverse osmosis or the use of solvent extraction methods on adsorbent media (e.g., in pot still bottoms), to levels of 20,000 ppm or higher. In PFAS samples with these levels of nitrate PFAS destruction is not just delayed but ineffective (less than 5% over a twenty-four-hour period of UV photolysis). In such cases, alternative methods of pretreatment such as those described herein may be particularly useful.

In various embodiments including catalytic systems, the catalyst may be put on a support and configured such that the water to be treated is allowed to flow over the catalyst and support. For example, for nitrate reduction with hydrogen using a noble metal as a catalyst, can result in the production of $NH_4^+$. Moreover, when hydrogen gas is used t, $H^+$ is a byproduct, which may cause the pH of the system to be lowered. Therefore, in various embodiments, a base may be added to compensate for these changes.

In some embodiments, hydrogen gas may be used as a reductant. For example, hydrogen gas may be bubbled through the solution or electrochemically generated and used in conjunction with a catalytic system as described above as a pretreatment that could be used to eliminate non-PFAS pollutants. Various embodiments may include a mono-metallic system, while other embodiments may include bimetallic catalysts for selectively reducing.

Examples of bimetallic metal catalysts which may be used in various embodiments include a first metal such as a noble metal like Pd or Pt and a second metal (promoter metal) such as Cu, Sn or In. Although combinations may also be used, such as bimetallic catalysts in which the first metal is Rh, Ru or Ir and the second metal (promoter metal) is Ni, Ag, Zn or Fe.

Halogen oxides, like bromate, are also catalytically reduced by many metals including Pd, Pt, Ir, Rh, Ru, Fe, Sn, Cu, Zu and Ni supported on activated carbon and hydrogen gas at room temperature and pressure. All these catalysts are active in the conversion of bromate into bromide. Ruthenium, palladium, platinum and rhodium were the most efficient; platinum showed the best activity. The halogen oxides can also be electrochemically reduced. An organometallic rhenium catalyst deposited on a $Ti_4O_7$ reactive electrochemical membrane was effective in electrocatalytically reducing aqueous $ClO_4^-$ to $Cl^-$. The sulfite ion can also reduce the number of halogen oxides to benign species like halides.

Electrochemical pretreatment. In some embodiments, pretreatment of the waste stream may be performed using electrochemistry. Because electrochemistry may break down only longer-chain PFASs (for example, PFOS or PFOA), it may not constitute an efficient solution to total PFAS destruction. However, in various embodiments, electrochemistry may be used as a pretreatment step to partially react PFASs to a form that is susceptible or more susceptible to the subsequent UV-ARP process. In this regard, pre-reacting various telomers, for example, may significantly reduce the photolysis time and maximize the efficiency of the process.

Nitrate pretreatment. Various embodiments include pretreatment of a waste stream to remove nitrate and nitrite. One or more methods may be used including chemical reduction, ion exchange membranes, electrodialysis, electrochemical reduction, photochemical reduction, and bioremediation wherein nitrate or nitrite are degraded by an organism. Although in principle any of these methods could be effective, a key consideration is to minimize the formation of potential products that might efficiently scavenge electrons, for example other nitrogen oxides, or those which have absorption transitions in the UV that might reduce the amount of light that can be absorbed by the sensitizer. If the concentration of potentially interfering chemical species has been determined, chemicals can be added that transform these contaminants into materials that do not react with or react less facilely with solvated electrons.

In some embodiments, pretreatment to reduce or remove nitrate may include the reduction of nitrate to molecular nitrogen or ammonia. For example, in acidic solutions, nitrate may be reduced as a pretreatment, for example, by formic acid, iron metal or zero-valent iron, aluminum-iron alloys, methanol and ammonium ion. In basic solutions, nitrate may be chemically reduced as a pretreatment by constituents that include but are not limited to aluminum powder, zinc and iron metal or zero-valent iron, $Fe^{2+}$, ammonia, hydrazine, glucose, hydrogen and thiosulfate, for example. In some embodiments, a suitable catalyst may be used to help accelerate these reactions. Example of a suitable catalysts which may be used in various embodiments include palladium on carbon.

In some embodiments, the photochemical processes may be utilized, alone or in combination with pretreatment, for the reduction of nitrate. For example, in some cases, the addition of an inorganic photocatalyst like titanium dioxide, iron, or manganese may be used in a photoreactor to selectively reduce and remove nitrate and nitrite prior to the addition of a hydrated electron generating species for the reduction of PFAS. In other embodiments, an organic acid or base including, but not limited to, oxalic acid and/or formate may be added to a photochemical reactor and treated under UV light as a means of removing nitrate. Inorganic and organic photocatalysts may be used in combination in a separate UV reactor or a same UV reactor as the PFAS reduction.

Some embodiments may use an electrochemical process for reduction of nitrate and other contaminates to treat nitrate or nitrite in water. For example, the methods may use a system including three components: 1) a cathode where reduction takes place, 2) an anode where oxidation occurs, and 3) an electrolyte solution which is capable of supporting ion transport.

Various embodiments may include the electrochemical reduction of nitrate to nitrogen gas and may involve numerous reactions, products, and intermediates (e.g., ammonia, nitrite, hydrazine, hydroxylamine, nitric oxide, and nitrous oxide). However, $N_2$ and $NH_3/NH_4^+$ are the thermodynamically most stable forms of nitrogen under standard conditions. Electrochemical nitrate reduction according to various embodiments may be described by the following reactions:

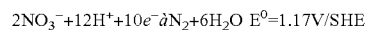

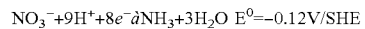

Both above reactions are multi-electron transfer processes. Several factors, such as electrode material or crystal plane, may be modified or adjusted to determine the final products of electrochemical reduction of nitrate. For example, various embodiments may employ a catalyst and/or electrode material or other conditions selected to produce molecular nitrogen as a reaction product.

In some embodiments, electrochemical reduction of nitrogen may include the use of monometallic catalysts of noble metal (such as Ru, Rh, Pd, Ag, Pt, Au, etc.) and/or first-row transition metal systems. For example, some first-row transition metal systems which may be used in various embodiments show a high catalytic selectivity for electrochemical reduction of nitrate, effective removal, and low cost, including iron or copper metal foams, Cu nanosheets, Cu on 3,4,5,9-perylenetetracarboxylic anhydride, cobalt nanoarrays among others. In some embodiments, two-component metal catalyst systems such as Pt- and Pd-based catalysts modified by introducing modifier metals (Sn, Cu, Bi, and Ge) onto the electrode surface may be used and may result in higher nitrate reduction activity. Other bimetallic catalysts which may be used in various embodiments include Cu/Fe systems, $Pt_{78}Ru_{22}$ on Carbon, $Cu_{50}Ni_{50}$. In still other embodiments, electrochemical reduction of nitrate may include the use of metal oxide catalysts such as NiO porous nanoplates on $Co_3O_4$, nanotube heterostructure of Co/CoO nanosheet arrays with Schottky interfaces on nickel foams, $Cu/Cu_2O$ nanowire arrays, $TiO_{2-x}$, or $TiO_2$.

In some embodiments, electrochemistry may be performed as a pretreatment to reduce nitrate using an iron cathode. For example, in various embodiments, the electrode may be used under constant reductive bias to limit the formation of $Fe^{2+}$ or $Fe^{3+}$ which could dissolve, causing corrosion of the electrode. The solutions may be modified, such as by the addition of base, or maintained within the basic range, such as a pH range of greater than about 10, or about 10 to about 12, for example, to limit the dissolution of iron that can occur in acidic conditions. A voltage in the range of −1.0 to −1.5 V vs Ag/AgCl may be applied to the iron electrode. Higher voltages may be used, but they could result in decreased selectivity for nitrate reduction due to increasing water reduction. The electrolysis should be continued until the desired nitrate concentration is reached.

In some embodiments, electrochemistry may be performed as a pretreatment to reduce nitrate using a copper cathode. For example, in various embodiments, the electrode may be used under constant reductive bias to limit the formation of $Cu^+$ or $Cu^{2+}$ which could dissolve, causing corrosion of the electrode. The solution may be modified or maintained to be within the pH range of about 2 to about 12, for example. In some embodiments, the pH may be modified, such as by the addition of acid, or maintained within the acidic range, such as less than about 4, or between about 2 and about 4, as ammonia is the primary product of nitrate reduction in acidic conditions, and ammonia does not interfere with the ARP. In basic conditions nitrite is the primary product of nitrate reduction, and nitrite could interfere with the ARP. In the acidic condition, a voltage in the range of −0.6 to −1.0 V vs Ag/AgCl may be applied to the copper electrode. Higher voltages could result in the formation of nitrite instead of ammonia and may be avoided. The electrolysis should be continued until the desired nitrate concentration is reached.

In some embodiments, electrochemistry may be performed as a pretreatment to reduce nitrate using a copper:iron cathode. The electrode may be under constant reductive bias to limit the formation of $Cu^+$, $Cu^{2+}$, $Fe^{2+}$, or $Fe^{3+}$ which could dissolve, causing corrosion of the electrode. The solution may be modified, such as by the addition of base, or maintained to be in the basic pH range, such as a pH of greater than about 10, or a pH of between about 10 and about 12, to limit the dissolution of iron that may occur in acidic conditions. A voltage in the range of −1.3 to −1.4 V vs Ag/AgCl may be applied to the Cu:Fe cathode. This is sufficient to effectively reduce nitrate and nitrite to nitrogen gas, while limiting the competition from water reduction. The electrolysis should be continued until the desired nitrate concentration is reached.

Figure 2:
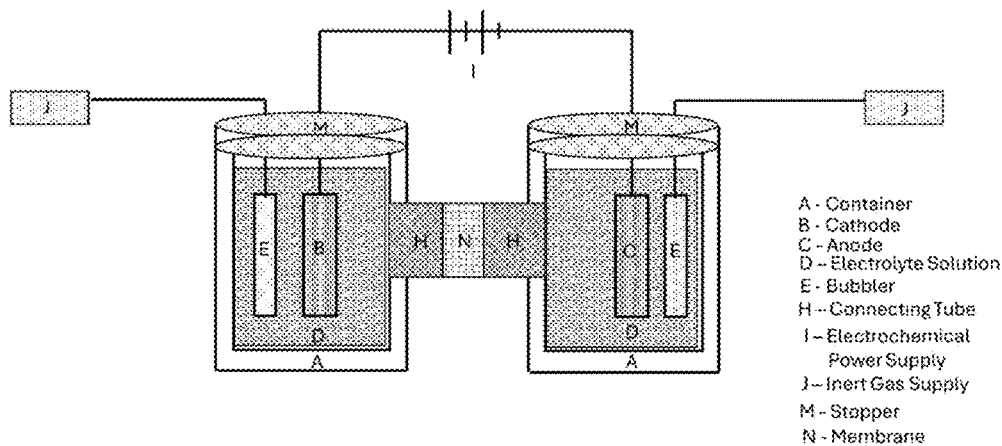
FIG. 2 is a schematic of an electrolytic call according to various embodiments.

Electrochemical systems may be utilized prior to or simultaneous with UV irradiation. An example of an electrochemical system that may be used in various embodiments described herein, such as prior to UV irradiation including during various pretreatment processes, is shown in FIG. 2. The containers that the anode or cathode are placed in might also be referred to as the anode compartment and cathode compartment, respectively. A system like the one shown may be used for pretreatment to reduce nitrate as discussed above, for example. The system may also be used in post treatment steps to recover valuable reagents such as a sensitizer. The electrolytic cell as shown is an electrochemical device that uses an external power supply to provide electrical energy to drive chemical reactions that would not occur in the without the application of electrical energy. The electrical energy establishes a voltage difference between two electrodes which are immersed in an electrolyte. The electrolyte may be a solvent with dissolved salt or salts. For example, in many embodiments, the solvent is water and the salts are inorganic salts like sodium chloride, sodium bromide, sodium iodide, potassium chloride, potassium bromide, sodium sulfate and/or potassium sulfate. However, in various embodiments described herein, some salts like sodium nitrate, potassium nitrate, sodium perchlorate and potassium perchlorate may interfere with the photochemical reaction because they react with solvated electrons and therefore these salts may be excluded from use as electrolytes. In various embodiments including aqueous solutions, the concentration of electrolytes may be between about 0.01 M to 1.0 M, or at least about 0.1 M, such as between about 0.1 M and about 1.0 M, to allow migration of the charges.

In the example electrolytic cell shown in FIG. 2, the system includes two electrodes, an electrical power supply, electrolyte, and inert gas that can be bubbled through the system. The electrodes are in separate compartments that are connected by a membrane or a salt bridge, also known as an ion bridge. The salt bridge or membrane serves several important functions including maintaining electrical neutrality, stabilizing the junction potential, and minimizing cross-contamination. A typical membrane used in this device is a cation exchange membrane. Examples of cation exchange membranes that may be used include, but are not limited to, perfluorinated or partially fluorinated polymers, such as Nafion. In alternative embodiments, the electrodes could be in the same compartment. Although not shown, in various embodiments the electrolyte may be stirred in both chambers, such as by a mechanical stirrer or a magnetic stirrer including a magnet in the chamber with the cell on top of the magnetic stirrer. In this electrolytic cell configuration, the reaction products formed at each electrode are separated. In some cases, this is useful because some of the products can interfere with the desired reactions. Although FIG. 2 shows a single electrode in the anode and cathode compartments, multiple electrodes can be placed in these compartments. These electrodes could be the same material or a different material.

Figure 3:
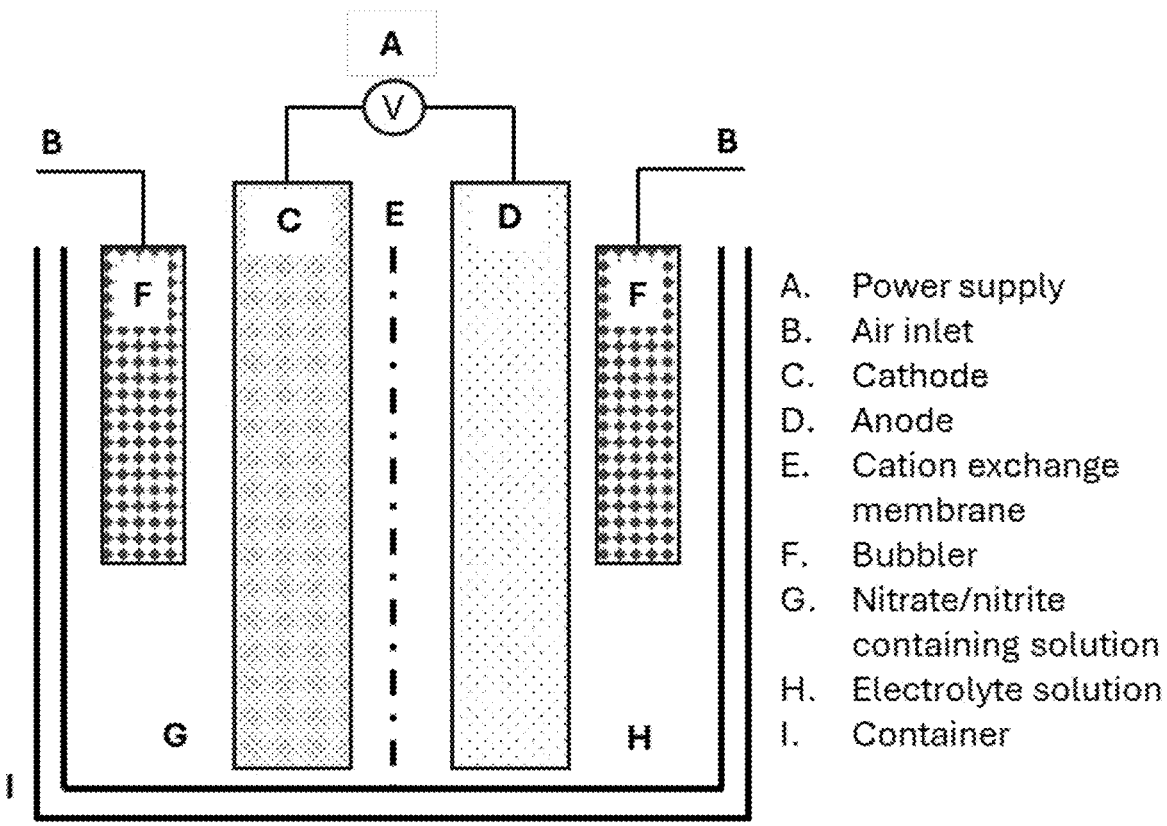
FIG. 3 is a schematic of an electrolytic cell for nitrate reduction according to various embodiments.

FIG. 3 is an example of an electrolytic system which may be used for nitrate reduction according to various embodiments. In the example, the electrolytic cell is a divided 2-electrode nitrate/nitrite reduction electrolytic cell. A nitrate/nitrite solution and a separate electrolyte solution are divided by a cation exchange membrane. Both solutions are purged with an inert gas, such as argon. A cathode is placed in the nitrate/nitrite solution and an anode is placed in the other electrolyte solution. A voltage is applied between the cathode and anode to cause the reduction of nitrate/nitrite to $N_2$ at the cathode and a sacrificial oxidation reaction at the anode. The oxidation reaction occurring at the anode could be water oxidation to form $O_2$. In another embodiment a sacrificial electron donor, such as sodium sulfite, could be added to lower the voltage requirement of the cell.

In some manifestations, the electrode systems could be used in a compartment that is separate from the photolysis chamber. For example, some embodiments may have an electrochemical system that removes impurities like nitrate and nitrite separate from the photolysis chamber so that wastewater could be scrubbed of these impurities while simultaneously photolyzing pre-purified water. For example, a system may include a first chamber in which pre-treatment occurs and a second chamber in which photolysis occurs. The system may have additional chambers as well. After photolysis of a first batch of wastewater is complete, the treated wastewater could be removed from the photolysis chamber and pretreated solution could be transferred from the pretreatment chamber to the photolysis chamber. The pretreatment chamber could then be refilled with wastewater, such as PFAS contaminated water, for pretreatment. In this way, pre-treatment and photolysis may be occurring at the same time but in separate chambers.

In some embodiments the post-electrolysis solution may be run through a cation exchange resin before the ARP. In this way, any cations that are present in the solution due to dissolution of the nitrate reduction cathode, which will be detrimental to the ARP, can be exchanged for Na or K, which will not be detrimental to the ARP.

Figure 4:
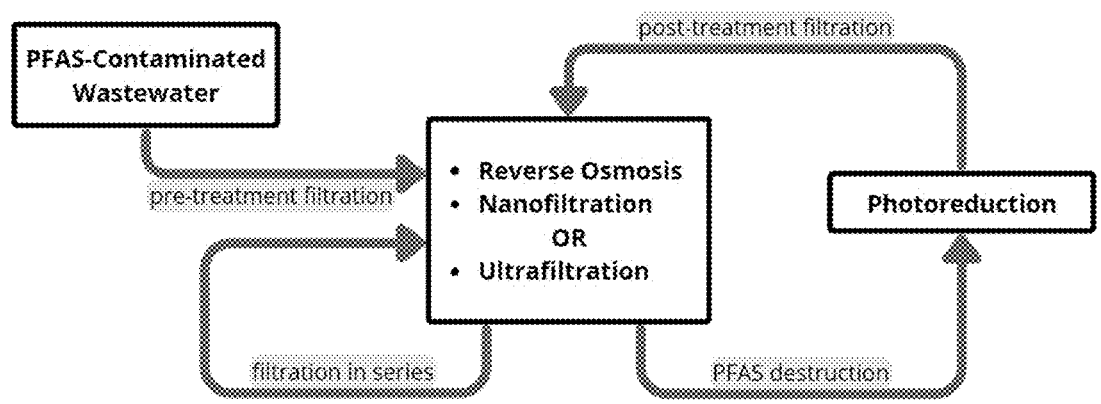
FIG. 4 is a method of integrating filtration and photodestruction according to various embodiments.

Filtration pretreatment. Various embodiments may include pretreatment filtration of the wastewater. For example, FIG. 4 presents a schematic demonstrating potential pathways to implement membrane-based separation technologies such as reverse osmosis (RO), nanofiltration (NF), ultrafiltration (UF), ultrafiltration, microfiltration, forward osmosis, and/or electrodialysis prior to photoreduction to improve water throughput and defluorination performance. In some embodiments, the process begins by concentrating the PFAS in the contaminated wastewater with a pre-treatment filtration through one or more membrane systems such as RO, NF, and/or UF, for example. The membrane reject solution, also called the concentrate, includes the materials which do not pass through the membrane, such as the large PFAS molecules whose molecular weight is above half of the molecular weight cut-off (MWCO). As a result, the concentration of PFAS increases in the membrane reject the solution, while the water that passes through the membrane is free of or contains only trace levels of PFAS compounds. For example, the membrane may reject greater than 99% of PFAS, or greater than 99.9% of PFAS present in the wastewater. After filtration of the wastewater, the membrane reject solution may be further filtered one or more additional times by passing the rejection solution through the same membrane system again and/or a different membrane system. The membrane reject solution with a higher than initial concentration of PFAS may then undergo photoreduction.

In other embodiments, the membrane reject solution with a higher than initial concentration of PFAS may be diluted before undergoing photoreduction. In such embodiments, the concentration of PFAS in the membrane reject may increase, but the concentration of other components in the wastewater may also increase. As a result, it may be desirable to dilute the membrane reject to lower the concentration of other components of the wastewater prior to photoreduction of the membrane reject. For example, filtration may be used to reduce the concentration of nitrate in wastewater prior to irradiation using a filtration system which is permeable to nitrate but impermeable to PFAS. As nitrate passes through the filtration system, water and nitrate pass through the filter and PFAS is retained in the membrane reject. However, some nitrate remains in the membrane reject along with the PFAS. The resulting membrane reject may, therefore, include concentrated PFAS as well as nitrate, which might also be present at an increased or undesirable concentration at which it may interfere with photoreduction. In such embodiments, the membrane reject may be diluted, such as with clean water without PFAS, prior to photoreduction. In this way, the concentration of nitrate may be reduced below a level at which it may interfere with, or at which it may significantly interfere with photolysis.

In some embodiments, the membrane reject may be diluted by an amount equal to the amount by which the reject was concentrated, for complete or 100% dilution. For example, in such embodiments, the concentration of PFAS in the wastewater may be the same after concentration and dilution as the concentration of PFAS in the wastewater before concentration. In other embodiments, the membrane reject may be diluted by an amount which is less than the amount by which it was concentrated. For example, the membrane reject may be diluted by more than about 25%, or by more than about 50%, such as by between about 25% and about 100%, or between about 50% and about 100%. In still other embodiments, the membrane reject may be diluted by an amount which is more than the amount by which it was concentrated. For example, the membrane reject may be diluted by more than about 100%, such as about 150% or about 200% or more, such as between about 100% and about 200%.

In some embodiments, the concentration of PFAS in the membrane reject may be between about 2 times and about 100 times greater than in the original wastewater containing PFAS. In other embodiments, the concentration of PFAS in the membrane reject may be between about 3 times and about 20 times greater than in the original wastewater containing PFAS. In some embodiments, the dilution of the membrane reject comprises between about 2 and about 100 times dilution, or between about 3 and about a 20 times dilution. The concentration of PFAS in the wastewater containing PFAS and nitrate may be between about ¼ and about 4 times, the concentration of PFAS in the treatment solution after dilution. In other embodiments, the concentration of PFAS in the wastewater containing PFAS and nitrate may be between about ½ and 2 times the concentration of PFAS in the treatment solution after dilution.

The amount of dilution of the membrane reject which is used may depend upon the initial concentration of the other concentrated components of the wastewater, such as the initial nitrate concentration, as well as how much they are concentrated in the wastewater as a result of filtration. In wastewater having low initial levels of nitrate, less dilution may be required. In contrast, when the initial levels of nitrate in the wastewater are higher, high levels of dilution may be required. The amount of dilution used may bring the concentration of nitrate in the wastewater to a level at which interference with the photoreduction is minimal. For example, in some embodiments, the concentrated wastewater may be diluted sufficiently to reduce the nitrate to less than about 5 ppm, or less than about 1 ppm, or less than about 0.5 ppm, or less than about 0.1 ppm. In some embodiments, the initial wastewater may have a nitrate concentration of greater than about 10 ppm, or greater than about 5 ppm, or greater than 1 ppm, and after the concentration and dilution steps the wastewater may have a nitrate concentration of less than about 1, or less than about 0.1 ppm. For example, the wastewater may have an initial nitrate concentration of greater than about 1 ppm, and after the concentration and dilution steps, it may have a nitrate concentration of less than about 0.1 ppm.

In embodiments in which the wastewater is diluted to provide a diluted wastewater with lower levels of nitrate, such as less than 0.1 ppm, sulfite may quickly react with the low levels of remaining nitrate, resulting in little slowing of the destruction of the PFAS by the nitrate. However, when nitrate levels are higher, such as between about 0.1 ppm and about 1 ppm, or between about 1 ppm and about 5 ppm, higher levels of sulfite may needed to fully react with the nitrate, and more time and energy input may be required for PFAS destruction. The PFAS destruction may become increasingly inefficient, with less ability for the sulfite to compensate, as the nitrate levels increase.

The membranes used for filtration pretreatment may retain PFAS as described above. For example, the membrane may have a MWCO which retains PFAS while allowing nitrate to pass. Examples of such membranes include membranes with an MWCO of between about 150 and about 300 Da. In some embodiments, the membrane may be a polymer Polyamice-TFC membrane. The membrane may be negatively charged, which may further increase the rejection rate of PFAS, which are anionic in basic conditions. While the nitrate, such as monovalent nitrate with a size of about 62 Da may pass through the filter, it may also be partially retained by a negatively charged membrane.

The filtered and concentrated wastewater may be diluted with a source of water, such as municipal water or other water, which may be a supply tank of water or a water line connection such as to a municipal water supply line, for example. The source of water may be combined with the filtered and concentrated wastewater by mixing with the water before supplying the wastewater to the photoreactor or within the photoreactor. The water may be supplied by a pump and/or metered to supply the appropriate amount for the desired level of dilution of the filtered wastewater. For example, the diluting water and the filtered wastewater may each be supplied separately to the photoreactor vessel, where they may be mixed to dilute the wastewater. Alternatively, the system may include a vessel such as a tank such as a mixing tank, and the diluting water and the filtered wastewater may be supplied to the mixing vessel which they may be mixed to dilute the filtered wastewater. In other examples, the diluting water and the filtered wastewater may be mixed to dilute the filtered wastewater within a pipe configured to transport the filtered wastewater from the filtration system to the photoreactor. The water may be directed into the pipe, and mixing may occur within the pipe.

Following pretreatment including concentration and dilution, the diluted wastewater reject may proceed to photoreduction treatment and optional post treatment as described herein. The wastewater permeate may be discharged or further processed.

Following photoreduction treatment, the solution may optionally be filtered again through one or more membrane systems to remove remaining PFAS compounds in the effluent. The subsequent filtration process is also helpful for recovering the chemicals used in the destruction process (e.g., recirculating concentrated rejects back to photoreactor). This filtration process may be used in any of the variety of systems and methods of PFAS destruction as described herein. Additionally, other types of filtration media or membranes may be used to selectively concentrate and isolate PFAS from background constituents. For example, an alternative pore size membrane with macro or nano-sized pores could be used to selectively isolate PFAS into the reject solution while allowing anions such as nitrate, chloride, or sulfate to pass through the membrane to the permeate.

Organics pretreatment. Other contaminants that may inhibit UV-ARP processes are those that inhibit the transmission of UV light into a water stream. These include but are not limited to organic substances like humic acid, particulate matter/suspended solids, and UV absorbing inorganic species like iron. These contaminants may also be reduced in concentration or removed by pretreatment according to various embodiments.

For removal of UV inhibiting substances, multiple techniques may be utilized. For the removal of solids, techniques include but are not limited to flocculation, coagulation, clarification, filtration, centrifugation, and sedimentation. For the removal of organic constituents, pre-treatments such as chemical oxidation, including but not limited to photochemical, chemical, ozonolysis or electrochemical oxidation processes, may be utilized. In addition, biological or hydrothermal treatments may be utilized in various embodiments. Oxidative species that may be used include but are not limited to ozone, hydrogen peroxide, persulfate, and permanganate species.

Reagent pretreatment. In various embodiments, the method of pretreatment may include adding reagents that are used in the UV-ARP and results in byproducts that do not interfere with the UV-ARP reaction. For example, sulfite may be added as a pretreatment to reduce or eliminate oxyhalides contaminants. The byproducts of this reaction are halides and sulfate ions which minimally affect the UV-ARP.

Metal complex pretreatment. Another class of solvated electron scavengers which may be removed by pretreatment in various embodiments is metal ions or metal complexes. Heavy metals are being found in increasing levels in wastewater, including zinc, mercury, nickel, chromium, and arsenic, which cause concern for human health. The increased presence of these species is the result of industrial activity (e.g. plating, battery manufacture and disposal, textiles, petrochemical and paper manufacturing). Wastewater may also contain silver, iron and manganese, calcium, molybdenum, antimony, arsenic, and cobalt. Various embodiments include methods and systems to remove these species including electrocoagulation, adsorption treatments, using synthetic and/or natural absorbents, membrane treatments, chemical treatments, electrical treatments and photocatalytic treatments. The absorption treatments may include carbon-based absorbents including one or more of the following: activated carbon, carbon nanotubes and graphene, and in some embodiments, other chemical species may be grafted to the carbon treatments. Other absorbents which may be used in various embodiments include chitosan, various minerals such as micas, clays, and zeolites, magnetic adsorbents where a magnetic nanoparticle is attached to an absorbent species, and metal-organic framework materials. For example, the treatment solution could be run through a column or bed to remove scavengers. Alternatively, reagents could be added to the treatment solution to cause precipitation, coagulation, or flocculation. This could be followed by settling and removal of the clear solution such as by decanting or siphoning. In other alternatives, the solids could be removed by passing the solution through a filter. Membranes are also used to remediate metal contamination in various embodiments. Membrane solutions may include ultrafiltration, nanofiltration, microfiltration, reverse osmosis, forward osmosis, and electrodialysis, as discussed above with regard to filtration pretreatment. Other embodiments may include removing metals from water by chemical separation methods such as precipitation, coagulation, and/or flocculation. Various electrochemical treatments which may be used in some embodiments for removing metal species include electrochemical oxidation or reduction and electroflocculation. In addition, ion exchange treatments can be viewed as a form of electric-based separation and are an effective means to remove metal ions in some embodiments.

In some embodiments, cationic exchange may be used to eliminate or reduce the concentration of one or more metal contaminants. For example, a cation exchange membrane may be deployed to simultaneously reduce the concentration of multiple cationic transition metal species (e.g. $Fe^{2+}$, $Fe^{3+}$, $Mn^{3+}$, $Cu^{2+}$, $Cu^{1+}$, $Pb^{2+}$, $Cd^{2+}$) that can scavenge solvated electrons. Cation exchange membranes can also reduce the concentration of or substantially eliminate alkaline metal cations such as $Mg^{2+}$ and $Ca^{2+}$ which may then be precipitated as $Mg(OH)_2$ and $Ca(OH)_2$, respectively, upon addition of a base. Inclusion of a base may be used to achieve a high pH condition for the Advanced Reductive Process, as discussed further below. However, fine precipitates of $Mg(OH)_2$ and or $Ca(OH)_2$ result in light scattering, which may also reduce the number of photons that are available for absorption by the sensitizer. The consequence may be higher energy usage and/or longer reaction times. Therefore, pretreatment methods that facilitate the removal of $Mg^{2+}$ and $Ca^{2+}$ could be desirable.

Solids. Depending upon the source of the waste stream, some embodiments may include a step of settling the waste stream, which may be done prior to and/or after other pretreatments, such as prior to and/or after oxidation pretreatment. This optional settling step may be used to let solids such as soil particles settle out of the liquids and improve UV transmission. For example, pretreatment of waste streams including landfill leachate and natural water sources may include a settling step, which may include letting the waste stream sit for a period of time such as at least one hour, such as about one hour to one day, or about 6 hours to about 18 hours, or about 10 to about 14 hours, or about 12 hours. The amount of time needed for the settling step, if any, may depend upon the source of the waste stream and the level of solids present. Once complete, the liquid component may be removed from the settled solid component and then processed further by pretreatment and UV photoreduction to destroy the PFAS.

Oxidative pretreatment. In some embodiments, oxidative pre-treatment processes may be utilized for the treatment of PFAS including targeted fluorotelomer species. In some embodiments, the partial breakdown of long-chain telomers may be done by an oxidative process.

Oxidative pretreatment may be used, for example, for the treatment of fluorotelomer species contained in aqueous film forming foam (AFFF) products. Oxidative pre-treatments and other chemical treatments are also beneficial for PFAS in wastewater and concentrated sources of PFAS such as concentrates generated by a foam fractionation process. Foam fractionation occurs when a gas (for example, air or nitrogen) is bubbled through water that contains PFASs. The PFASs attach to the bubble and are brought to the surface where the foam can be captured. In some cases, an additional surfactant is added to facilitate the process.

The pretreatment can utilize one or more technologies that can be applied in combination, simultaneously and/or sequentially, according to some embodiments. For example, oxidative treatments may be utilized to reduce or eliminate multiple organic species like humic acid and/or fulvic acid. Humic acid and fulvic acid absorb in the UV spectrum and their presence may reduce the number of photons absorbed by the sensitizer. A cationic exchange media may be used to eliminate or reduce the concentration of one or more metal contaminants, as described above. Pretreatment methods may include the removal of $Mg^{2+}$ and $Ca^{2+}$ in various embodiments.

An example of a sequential pre-treatment would be to perform an oxidative pre-treatment, followed by flowing the solution through an ion exchange membrane, followed by a nanofiltration step. However, in some embodiments, such as when the purpose is to remove $Mg^{2+}$ and/or $Ca^{2+}$ then the oxidative pre-treatment could be omitted. For example, an ion-exchange membrane could be used, and subsequent nanofiltration could be omitted. Alternatively, a base such as NaOH/KOH could be added to increase the pH to remove the $Mg^{2+}$ and/or $Ca^{2+}$ to cause precipitation, followed by separation such as through a sediment tank or other methods.

In some embodiments, the oxidative pretreatment processes disclosed herein may be utilized for the treatment of targeted fluorotelomer species, for example, those contained in aqueous film forming foam (AFFF) products. The thermal and ozone oxidation pretreatment processes described herein may also be used to treat waste streams generated by foam fractionation processes. Foam fractionation occurs when a gas (for example, air or nitrogen) is bubbled through water that contains PFASs. The PFASs attach to the bubble and are brought to the surface where the foam can be captured. In some cases, the foam fraction may include an additional surfactant which was added to facilitate the process.

Depending upon the source of the waste stream, some embodiments may include a step of settling the waste stream prior to and/or after oxidation pretreatment, as discussed above.

In addition to solid particles which may be present in the waste stream, other substances present in the waste stream may also reduce UV transmission or the chemical process of photoreduction. It is, therefore, useful to pretreat the waste stream to improve UV transmission, but importantly not to introduce any substance that would interfere with the UV photoreduction process. Various embodiments disclosed herein for oxidative pretreatment can pretreat the waste stream to not only improve UV transmission but do so without disruption the UV photoreduction reaction. In some embodiments disclosed herein, such as embodiments for oxidative pretreatment, subsequent UV photoreduction may be improved even without improving UV transmission. For example, pre-treatment may not result in improvement in UV transmission but may still result in improved photolysis but other means, such as possibly by the pretreatment products interacting with the reagents used in photolysis.

Pretreatment methods which may be used in various embodiments include oxidation of the waste stream. For example, the waste stream may be pretreated using thermal oxidation. In other embodiments, it may be pretreated using ozone oxidation.

Embodiments which include thermal oxidation may include combining the waste stream with chemical additives and adjusting the pH. The chemical additives may include a persulfate and an acid or base to adjust the pH.

In some embodiments, the persulfate may be potassium persulfate, sodium persulfate, and/or aluminum persulfate, for example. The amount of persulfate used may be adjusted as needed to achieve the desired concentration in the final treated solution. For example, the concentration of persulfate may be about 100 to about 200 mM, or about 125 mM to about 175 mM, or about 140 to about 160 mM, or about 150 mM in the final solution.

In some embodiments, the base may be sodium hydroxide, potassium hydroxide, and/or calcium hydroxide, for example. In some embodiments, the acid may be sulfuric acid, hydrochloric acid and/or phosphoric acid, for example. The amount of acid or base may be adjusted, as needed, to achieve the desired pH. For example, when the thermal oxidation is performed under basic conditions, the pH may be adjusted to about 12, such as about 10 to about 14, or about 11.5 to about 12.5, or about 11.8 to about 12.3. When the thermal oxidation is performed under acidic conditions, the pH may be adjusted to about 3.0, such as about 1.5 to about 5, or about 2 to about 4 or about 2.5 to about 3.5, for example.

Thermal oxidation may be performed in a vessel in which the wastewater is treated at elevated temperature and pressure. Examples of vessels which may be used include autoclaves, for example. In some embodiments, the thermal oxidation process may be conducted in the same vessel as the UV treatment, such as in the sequential batch mode. In other embodiments, the oxidation process may be conducted in a separate treatment vessel prior to the UV photo treatment in the UV photo treatment vessel.

In some embodiments, the thermal oxidation pretreatment may be performed at an increased temperature. For example, the wastewater and added chemicals may be heated to a temperature of about 80 to about 160 degrees Celsius, or about 100 to about 140 degrees Celsius, or about 115 to about 125 degrees Celsius, or about 120 degrees Celsius, though other temperatures may also be used.

In some embodiments, thermal oxidation may be performed at an increased pressure along with the increased temperature. For example, the wastewater and added chemicals may be heated at a pressure of about 0.5 to about 10 bar, or about 1 to about 5 bar, or about 1.5 to about 2.5 bar such as about 2 bar.

Embodiments which include ozone oxidation may include combining the waste stream with a base such as sodium hydroxide, potassium hydroxide, and/or calcium hydroxide. The amount of base used may be adjusted as required to raise the pH to the desired level, such as a pH about 10 to about 14, or about 11.5 to about 12.5, or about 11.8 to about 12.3, or about 12.

The wastewater including the base may then be treated by ozone oxidation. For example, the waste stream may be treated with an ozone generator, such as a portable ozone generator like the MultiPurpose Ozone Machine available from Shenzhen VANSU Technology Co., of China. The treatment may be at a rate of about 500 mg/h O3 to about 2000 mg/h O3, such as 800 mg/h O3 to about 1000 mg/h O3, or about 1000 mg/h O3, for example. The treatment duration may be about 3 to about 9 hours, such as about 7 to about 10 hours, or about 6 hours. The duration of treatment may depend upon the rate of ozone production and exposure.

Pretreatment with thermal oxidation or ozone oxidation and optionally a settling step may result in substantial improvement of UV transmission. For example, UV transmission may increase from 0% to about 10-20%, or to about 25-45%.

Furthermore, pretreatment with thermal oxidation or ozone oxidation and optionally a settling step may result in substantial improvement of UV transmission without the separation of the PFAS from the liquid. This is an improvement over some pretreatment methods, in which removal of substances which result in improvement of UV transmission also removes a portion of the PFAS. This splitting of the PFAS results in the requirement to treat two PFAS streams, substantially increasing the complexity and cost of treatment. In contrast, the oxidative pretreatment methods disclosed herein result in can improve the UV transmission to enhance PFAS destruction without removing PFAS from the wastewater and thereby maintaining a single waste stream for subsequent treatment.

Following pretreatment according to the embodiments described herein, the wastewater may be treated using UV photoreduction. However, in some cases, it may be preferable to dilute the waste stream prior to UV photoreduction. For example, the waste stream may be diluted between about 1.5 and about 10 times, such as about 2 to about 5 times, or about 2 to about 3 times. The amount of dilution may depend upon the source and nature of the waste stream. However, due to the improved UV transmission (without disruption of UV photoreduction) produced by various embodiments, less dilution is required. This results in a much more efficient process, because the treatment volume is not as substantially increased as compared to some other methods.

Following pretreatment, and optional dilution, the waste stream may be treated to destroy the PFAS, such as using a photoreactor to perform UV photoreduction. Various embodiments employ a photoreactor including a light source which delivers a narrow range of ultraviolet light radiation with a peak at approximately 222 nm, such as a krypton/chloride excimer lamp.

The photoreduction method is based on generating a highly reducing species, generally a solvated electron produced by the irradiation of a photosensitizer. Oxidative pretreatment of the wastewater as described herein allows increased the efficiency of the photochemical destruction of PFAS and allow photochemical methods to be more generally used on a variety of PFAS-containing waste streams.

In some embodiments, the UV photoreduction process may be performed using one or more reactor vessels with one or more UV light sources as described further below. The reactor is charged with pretreated wastewater including PFAS, water and sensitizers capable of absorbing UV light and producing a reactive species. In addition, there optionally can be one or more other chemical additives to promote the reaction.

Figure 5:
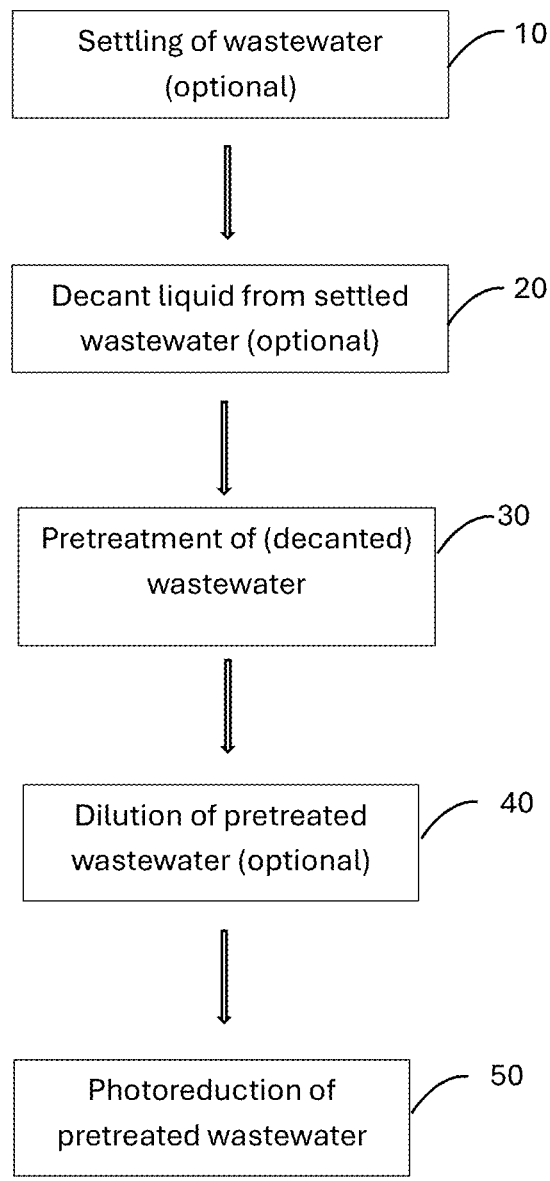
FIG. 5 is a flow chart of a process of PFAS destruction in a wastewater stream.

FIG. 5 presents an example of a method of PFAS treatment that may be used in various embodiments. The method begins with optionally settling of the wastewater 10, followed by decanting or otherwise removing the liquid from the settled wastewater 20. For example, as an alternative to decanting, the clarified water could be pumped off the top above the solids, the solids could be pumped or drained from the bottom beneath the clarified water, or other separation methods may be used. Next, the optionally decanted (or otherwise separated) wastewater is pretreated 30 such as by oxidative pretreatment. The pretreated wastewater is then optionally diluted 40, and then the pretreated and optionally diluted wastewater is photoreduced 50 such as by UV treatment at 222 nm and/or 254 nm.

Figure 6:
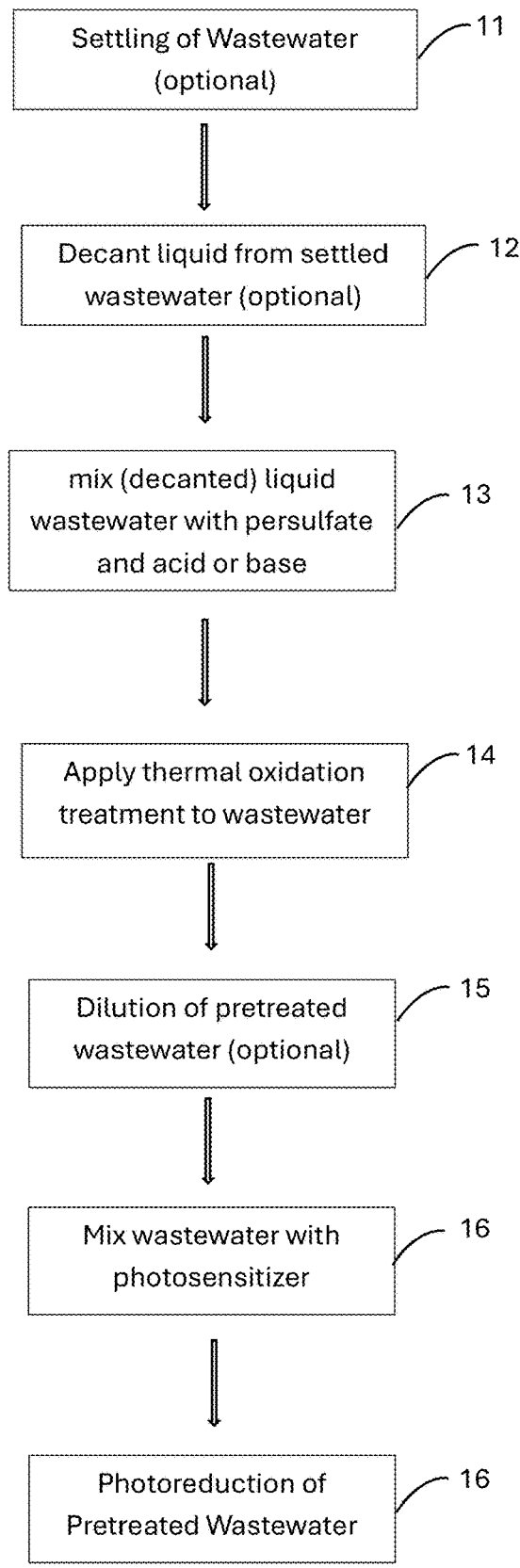
FIG. 6 is a flow chart of a process of PFAS destruction in a wastewater stream including thermal oxidation pretreatment.

FIG. 6 presents a diagram of a method of thermal oxidation and photoreduction. The method begins with optionally settling of the wastewater 110, followed by decanting or otherwise removing the liquid from the settled wastewater 120. Next, the optionally decanted (or otherwise separated) liquid wastewater is mixed with persulfate and acid or base 130. The wastewater is then pretreated by thermal oxidation 140 by subjecting it to increased temperature and pressure for a sufficient period of time to complete the reaction. Next, the pretreated wastewater may optionally be diluted 150, and mixed with the photosensitizer 160. The order of steps 150 and 160 may alternatively be reversed or performed simultaneously. The wastewater is then subjected to photoreduction 170 such as by UV treatment at 222 nm and/or 254 nm.

Figure 7:
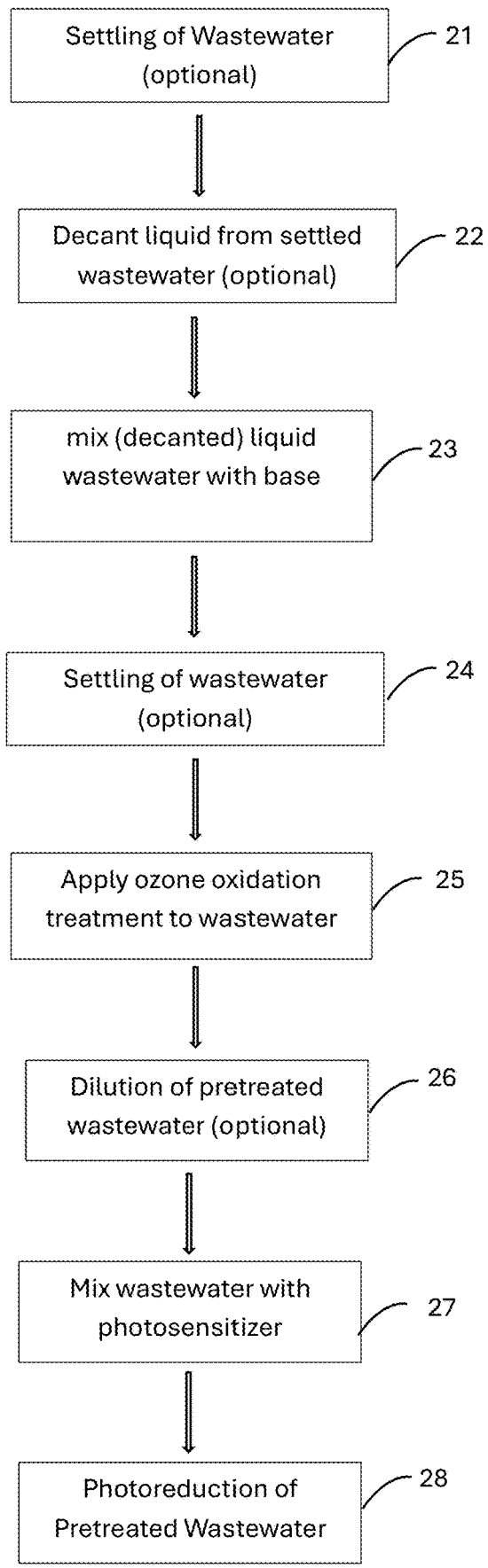
FIG. 7 is a flow chart of PFAS destruction in a wastewater stream including ozone oxidation.

FIG. 7 presents a diagram of a method of ozone oxidation and photoreduction. The method begins with optionally settling of the wastewater 210, followed by decanting or otherwise removing the liquid from the settled wastewater 220. Next, the optionally decanted liquid wastewater is mixed with base 230. The wastewater is optionally settled 240, then subjected to ozone oxidation 250 for a sufficient period of time to complete the pretreatment reaction. Next, the pretreated wastewater may optionally be diluted 260, and mixed with the photosensitizer 270. The order of steps 260 and 270 may alternatively be reversed or performed simultaneously. The wastewater is then subjected to photoreduction 280 such as by UV treatment at 222 nm and/or 254 nm.

The methods shown in FIGS. 5-7 may optionally include additional settling and/or decanting steps (or other separation steps), or the settling and/or decanting steps (or other separation steps) may be performed at other times. For example, the method of FIG. 6 may include an optional settling and decanting step (or other separation step) after mixing the wastewater with the persulfate and the acid or base 130, followed by decanting (or otherwise removing) the separated the liquid, then applying thermal oxidation 140 to the decanted liquid. As another example, the method of FIG. 7 may include a decanting step (or other form of removal of the separated liquid) after the step of settling the wastewater 240 and before the step of applying ozone oxidation 250.

In an exemplary embodiment, a wastewater stream including PFAS is settled for an appropriate period of time to allow settling of the solids, such as about 6 to about 18 hours. The liquid is decanted or otherwise separated from the solid and is combined with a persulfate and an acid or base. The resulting wastewater includes the persulfate at a concentration of about 150 mM and a pH of about 11 to about 13 or about 12. The wastewater is then treated at an elevated temperature, such as about 100 to about 140 degrees Celsius or about 100 degrees Celsius and about 0.5 to about 10 bar, or about 1 to about 5 bar, or about 1.5 to about 2.5 bar such as about 2 bar, for a sufficient period of time to complete the reaction, such as about 1 to about 3 hours, or about 2 hours. Following pretreatment, the wastewater is then combined with a photosensitizer including a sulfite and a halide salt, and a base. The resulting wastewater includes about 40 to about 60 mM sulfite, about 7 to about 13 mM halide salt, and a pH of about 13 to about 15. Alternatively, the resulting wastewater may include about 5 to about 15 mM sulfite, about 1 to about 4 mM halide salt, and a pH of about 12. The wastewater may then optionally be diluted about 2 to 5 times, or about 2 to 3 times. The wastewater is then treated by UV photoreduction at 222 nm and/or 254 nm for the necessary period of time to complete the reactions, such as about 1 h to about 24 h, or about 2 h to about 12 h or about 4 h to about 8 h. After completion of photoreduction, the majority of the PFAS may be destroyed, such as about 70% to about 90%, or about 80%. For example, after about 8 hours of photoreduction, about 80% of the PFAS may be destroyed as compared to the original level of PFAS in the wastewater.

In some embodiments, additional pretreatments may also be employed, in addition to those disclosed above. For example, pre-treatment to remove nitrate, nitrite or other contaminants can be accomplished by several methods including chemical reduction, ion exchange membranes, electrodialysis, electrochemical reduction, photochemical reduction, and bioremediation wherein contaminants are degraded by an organism. In addition, for removal of UV inhibiting substances, for example, techniques such as flocculation, coagulation, clarification, filtration, centrifugation, and sedimentation may be used. For the removal of organic constituents, for example, treatments such as chemical oxidation, such as photochemical, or electrochemical oxidation processes may be utilized, as well as other chemical or ozonolysis methods. In addition, biological or hydrothermal treatments may be utilized. Other oxidative species that may be used include permanganate species. The oxidative pretreatment systems and methods described herein may be used in combination with any of these processes.

A system for the UV destruction of PFAS can consist of a single reactor vessel where the oxidative pretreatment, optional additional pretreatments such as settling, UV photoreduction, and other steps are sequentially performed. Alternatively, such as to maximize the efficiency of the process, the above processes may occur in a single vessel or separate vessels or chambers.

Photolysis Step(s)

UV Reactors. In some embodiments, the system for the UV destruction of PFAS may include a single reactor vessel in which pretreatment, photolysis, and the post-treatment steps are sequentially performed. In other embodiments, one or more or all of the steps of pre-treatment, photolysis, and post treatment may occur in separate vessels or chambers of a vessel, such as for continuous processes.

In some embodiments, the UV photoreduction process may be performed using one or more reactor vessels with one or more UV light sources. The reactor is charged with pretreated wastewater including PFAS, water and sensitizers capable of absorbing UV light and producing a reactive species. In addition, there optionally can be one or more other chemical additives to promote the reaction.

The reactor vessel may include one or more UV light sources emitting light, such as UV light at 222 nm or UV lights at 254 nm. In some embodiments, multiple wavelengths may be emitted from a light source, or from various light sources, and other wavelengths of lights in addition to 222 nm and 254 nm may contribute to PFAS photoreduction, such as 185 nm.

The photoreactor may be used alone, or in combination with other reactors, such as in a serial configuration, which may also employ a photoreduction at the same or different wavelength or may employ other PFAS destruction methodologies. Alternatively, one or more steps may be performed in the same vessel.

Examples of PFAS capture systems, treatment systems, and pretreatment are provided in the applicant's other applications, such as U.S. patent application Ser. No. 18/212,603, entitled METHOD AND APPARATUS FOR THE DESTRUCTION AND DEFLUORINATION OF PER- AND POLYFLUOROALKYL SUBSTANCES (PFAS), FLUOROTELOMERS AND OTHER PERSISTENT ORGANIC POLLUTANTS filed Jun. 21, 2023, U.S. Pat. App. No. 63/513,782 entitled PROCESSES FOR EFFICIENT PHOTOCHEMICAL DESTRUCTION OF PFAS FROM WASTE STREAMS filed Jul. 14, 2023, and U.S. patent application Ser. No. 18/555,135 entitled SORBENTS AND METHODS FOR THE CAPTURE AND DEFLUORINATION OF PER AND POLY FLUOROALKYL SUBSTANCES (PFAS) and filed Oct. 12, 2023 (national stage entry), the disclosures of all of which are hereby incorporated by reference. The systems and methods described herein may be used in combination with the methods and systems described in these applications.

One example of a photoreactor which may be used in various embodiments comprises a one or more lamps, such as lamps including cylindrical bulbs or other bulb shapes, and one or more photoreactor vessels configures such that the light of the lamp will project onto the contents of the reactor vessel or vessels. The lamps may be supported on a frame such as a metal support frame, at a desired distance over a top surface of a photoreactor vessel and/or above the top surface of liquid in the photoreactor vessel when in use to shine directly on the surface of the reaction solution or to shine through the reactor vessel wall. Alternatively, the lamp may fit into the reactor vessel to shine light directly onto the contents from within the reactor vessel. The bulb may be protected and/or separated from the reaction solution within the reactor vessel, such as by a sleeve or other barrier. In some embodiments, the photoreactor vessel may include two cylindrical lamps and a support frame holding the two lamps horizontally at a selected distance above a level surface of a photoreactor vessel. Other light and reactor vessel configurations and orientations may be used to optimize energy delivery and PFAS destruction.

The photoreactor vessel may be any appropriate material such as quartz or other material which is non-reactive and is transparent to 222 nm radiation. In other embodiments, such as those in which the bulb is located within the reactor vessel, the reactor vessel need not be transparent and may be a nontransparent and nonreactive material such as stainless steel. The vessel may be configured to contain a fluid and may include a top which may seal the vessel. In some embodiments, the photoreactor may include a single reactor vessel, while in others it may include more than one reactor vessel, such as two or three reactor vessels or more. The reactor vessel may be any size or shape. In some embodiments, the reactor vessel is cylindrical.

The lamp(s), lamp support, and the reactor vessel may be contained in a housing such as a metal enclosure or other enclosure.

Examples of lamps which may be used in various embodiments include krypton/chloride excimer lamps emitting radiation at 222 nm. Other excimer lamps which emit a narrow band of radiation at other wavelengths could alternatively be used. The lamps may consume 100 Watts of power or could consume more or less power. The power supply to the lamps may be 20 kilovolts or may be more or less than 20 kilovolts. In some embodiments, the lamp powers for lamps including those emitting at 222 nm and 254 nm, for example, may be between about 50 and about 5000 W, such as between about 100 and about 1000 W or between about 100 and about 300 W. Single lamps may be used or multiple lamps, which may be identical or different.

The photoreaction methods as described herein may be performed at room temperature or at a temperature greater than room temperature. For example, in some embodiments, the temperature of the photoreactor may be between about 55 and about 60 degrees Celsius during the reaction. However, higher or lower temperatures could alternatively be used. In addition, heating and/or cooling elements could be added to the reactor and/or to the room containing the reactor to raise or lower the temperature, such as air-ducting, fans and lamps.

The reactor solution may be stationary during UV treatment, or it may be agitated. For example, the reactor may include stirrers or agitators with the capacity to stir or agitate the solutions. In some embodiments, stirring or agitating the reactor solution during irradiation may facilitate exposure of PFAS compounds to regions of higher radiation. Alternatively, the solution could be recirculated through a heat exchange unit.

Ultimately, optimization of reactor solution for efficiency may also depend upon direct agitation or stirring of the compound to expose more solution constituents to a region of higher radiation field in a smaller amount of time.

In some embodiments, the PFAS irradiation at 222 nm and/or 254 nm may be performed in a reaction solution including only an aqueous solution of the PFAS. However, the results may be improved by including appropriate reducing solutions at appropriate concentrations. This may result in faster, more efficient, and more complete destruction of PFAS.

Photoreduction of the PFAS may destroy the PFAS through mineralization of the PFASs, including converting the carbon-fluoride bond to the fluoride ion and carbon species, such as acetate, carbon dioxide and/or carbonate. In this context mineralization may include reduction of the carbon-bound fluorine on PFAS to the fluoride ion F—.

Some embodiments result in complete destruction of the PFAS or near complete destruction, such as greater than 99% destruction. Some embodiments result in at least 90% or at least 95% destruction of PFAS, such as about 90% to about 100%, or about 95% to about 100% destruction of PFAS.

The duration of treatment necessary to achieve complete destruction of the PFAS or near complete destruction may depend upon the design of the photoreactor which is used, as well as other variables.

Various embodiments include UV reactors for photochemical destruction of PFAS. In some embodiments, the UV reactor includes a photochemical chamber containing one or more UV light sources. The UV reactor may further include a recirculating system which may be equipped with a heat-exchange system configured to control the solution temperature. The UV reactor may further include a sensor module configured to allow continuous monitoring of the physical and/or chemical state of the reaction solution. In some embodiments, the UV reactor may also include one or more ports for adding additional reagents and/or sampling the reaction mixture.

One example of a UV reactor according to various embodiments includes a reactor providing greater than 1000 Ws of UV light and configured to maintain the solution at less than 50° C. The UV reactor includes a sensor module that may be configured to provide information to help maintain optimal photochemical conditions through a closed-looped control system to automatically maintain the conditions. The sensor system in some embodiments one or more sensors configure to monitor one or more of the following: temperature, pressure, pH, UV intensity, fluoride ion concentration, and oxidation-reduction potential.

The additives charged from the ports can be added either continuously or in one or more batches. Typical additives include, but are not limited to, sulfite salts, initiators, bases such as sodium hydroxide or sodium carbonate.

Depending on the waste streams, it may be useful to perform both an oxidative treatment and a reductive treatment. Although these two treatments could be performed sequentially in the same vessel, they could also be performed in separate vessels. The sequence that these steps are performed in could vary depending on the components in the waste stream.

Figure 8:
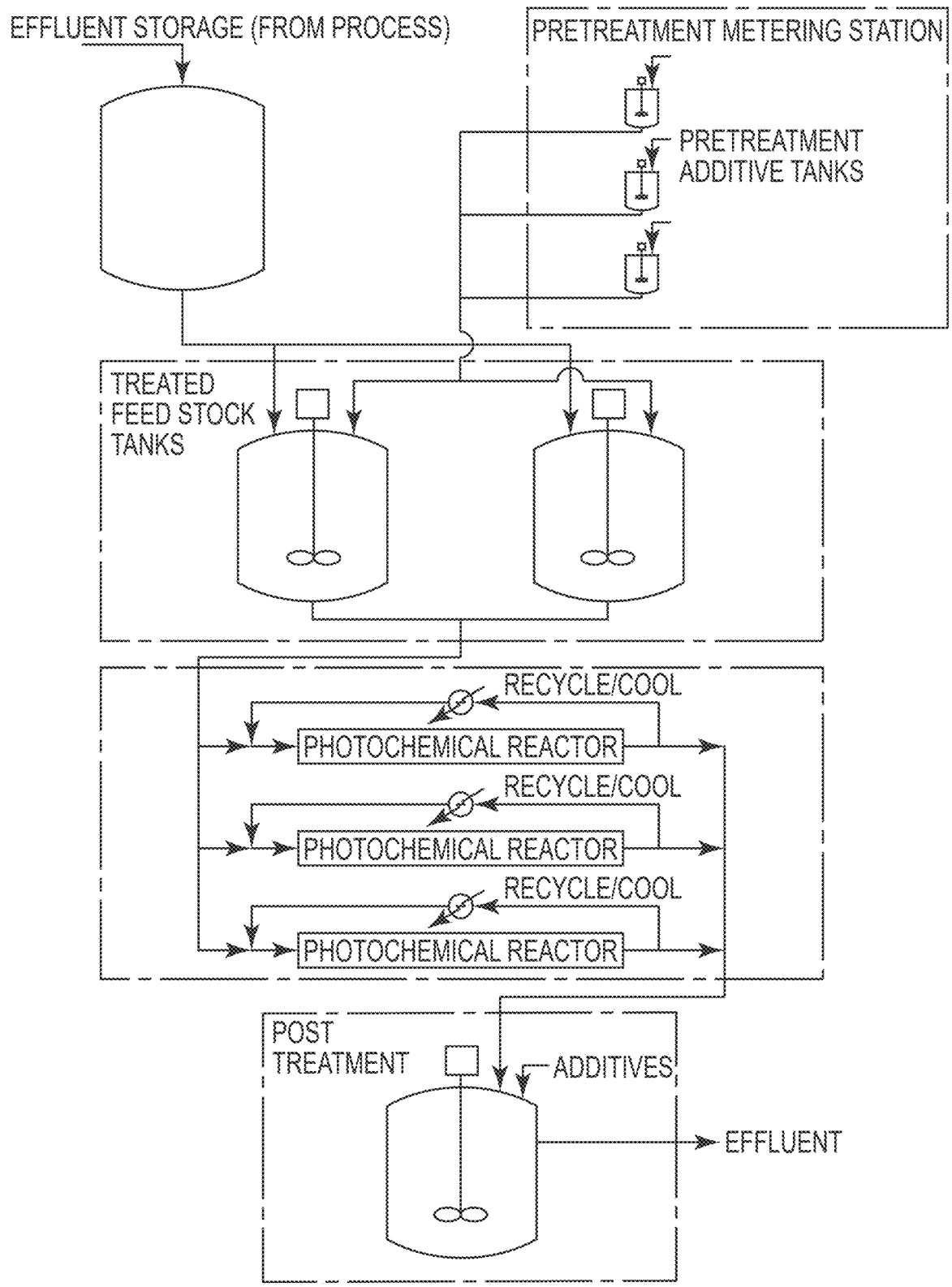
FIG. 8 is a representation of an example of a UV reactor as a photochemical portion of a treatment system.

An example of a UV reactor as the photochemical portion of a treatment system is shown in Figure A. The UV reactor in FIG. 8 can be run in a batch or a continuous mode. One embodiment of this design would be a continuous stirred tank reactor.

Sensitizers. Various embodiments include a sensitizer which is added to the wastewater. The photoreduction method is based on generating a highly reducing species, such as a solvated electron, produced by the irradiation of a photosensitizer.

In the UV-ARP, the sensitizer absorbs the UV photon and as a result an oxidized sensitizer and a solvated electron are generated as shown below:

a. 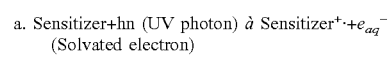
(Solvated electron)

Photosensitizers which may be used in various embodiments include halides, pseudo halogens, inorganic oxoanions, anionic metal complexes, metal clusters, Zintl Compounds, nanometal particles of a transition metals, organic anions, nitrogen heterocycles, boron-doped nanodiamonds, and/or nitrolotriacetic acid. These sensitizers may be used in combination or separately in conjunction with different light sources.

Examples of halides which may be used include iodide, chloride, and bromide, Examples of pseudohalogens which may be used include cyanide, isocyanate, cyanate, isocyanide, isocyanate, azide, hydroxide, hydrosulfide, hydroselenide, hydrotelluride, fulminate, thiocyanate, selenocyanate, tellurocynate, isothiocyanate, nitroxide, tetracarbonyl colbaltate, trinitromethanide, tricyanomethanide, 1,2,3,4-thiatriazol-5-thiolate, fulminate, cyaphide, and auride. Examples of inorganic oxoanions which may be used include sulfite ($SO_3^{2-}$), sulfate ($SO_4^{2-}$), hyposulfite ($SO_2^{2-}$) thiosulfate ($S_2O_3^{2-}$), carbonate ($CO_3^{2-}$), phosphate ($PO_4^{3-}$), phosphite ($PO_3^{3-}$), hypophosphite ($PO_2^{-3}$), and borate ($BO_3^{3-}$), including protonated forms of these anions (e.g. $HSO_3^-$, $HSO_4^-$, $HCO_3^-$). Examples of anionic metal complexes which may be used include ferricyanide ion, ferrioxalate ion, tetrachloroplatinate ion, hexachloroiridate ion, cyanocuprates and cerium (III) complexes). Examples of metal clusters that may be used include $Mo_6Cl_{14}^{2-}$, $[(Zr_6CCl_{12})\ Cl_6]^{4-}$, $Ta_6Cl_{18}^{4-}$, $Re_3Cl_{12}^{3-}$, and iron sulfur clusters. Examples of Zintl Compounds that may be used include $[Bi_3]^{3-}$, $[Sn_9]^{4-}$. Examples of nanometal particles of a transition metals that may be used include gold, copper and iron. Examples of organic anions that may be used include ascorbic acid anion, ascorbic acid dianion, phenolates, cresolates, dihydroybenzenes anions, methoxyphenolates, thiophenolates. Examples of nitrogen heterocycles that may be used include indole-3-acetic acid.

Other components which may be included in the reactor include photosensitizers such as halide salts alone or in combination with other components such as sulfites. The concentration of the sensitizer will depend on the electronic absorption of spectra of the sensitizer, the spectral output of the lamp, and the concentration of other sensitizers contained within the reactor The concentration of halide salt may be about 1 mM to about 150 mM, or about 5 to about 15 mM, or about 7 mM to about 13 mM. For example, the concentration of KI may be about 1 mM to about 10 mM when UV254 nm or UV222 nm radiation is utilized in the photoreactor. The concentration of KBr may be about 10 mM to about 150 mM when UV22 nm radiation is utilized, for example. The concentration of sulfite may be about 5 mM to about 100 mM, such as about 25 mM to about 75 mM, or about 35 mM to about 65 mM, or about 45 mM to about 55 mM. For example, when UV222 nm light is used in the reactor, the concentration of sulfite may be about 5 mM. The pH may be greater than 10, or greater than 12, or greater than 13, for example. In some embodiments, the pH may be about 11 to about 15, or about 13 to about 15, for example. In other embodiments in which UV185 nm light is utilized in the photoreactor, the concentration of photosensitizers, which may include halide salts, sulfites and sulfates may be about 1 micromolar to about 10 mM. For example, the concentration of NaCl may be around 150 micromolar, and the concentration of sulfate and sulfite 1 mM. The pH range of the solution may be greater than about 7, or greater than about 8, or greater than about 10, for example.

Other components which may be included in the reactor include halide salts alone or in combination with other components such as sulfites. In some embodiments, such as embodiments utilizing UV222 nm or UV254 nm light, KI and $Na_2SO_3$, may be included in the reactor solution, such as 1 mM KI and 5 mM $Na_2SO_3$, though higher or lower concentrations may be used, such as 10 mM KI and 50 mM $Na_2SO_3$. Other components which may alternatively be used in the reactor solution include KBr and $Na_2SO_3$ such as approximately 10 mM KBr and 50 mM $Na_2SO_3$ when UV 222 nm light is utilized, or approximately 150 mM KBr and 5 mM $Na_2SO_3$ when UV 222 nm light is utilized, though higher or lower concentrations may alternatively be used. In some embodiments utilizing either UV222 nm or UV 254 nm light, the photosensitizer includes about 10 mM Na2SO3 and about 2 mM KI at a pH of about 12. In some embodiments, the photosensitizer includes about 50 mM $Na_2SO_3$ and about 10 mM KI at a pH of about 14. Still other embodiments may include only a sulfite such as $Na_2SO_3$, such as approximately 50 mM $Na_2SO_3$, though higher or lower concentrations may alternatively be used.

In some embodiments, a lower concentration of the additional components may be used, such as micromolar concentrations, for components such as a halide salt. These low levels may optimize and facility efficient light absorption at 222 nm and 185 nm. For example, micromolar concentrations of halide salt may be used.

In some embodiments, it is preferable to maintain a high pH during photoreduction, such as a pH of 10 or more, or 11 or more, or 12 or more, or 13 of more. Therefore, in addition to the reagents discussed above, it may be useful to include a base such as sodium carbonate and/or one or more other bases such as hydroxide to increase the efficiency of the reaction.

In some embodiments, iodide (I) may be used as the photosensitizer during photoreduction. As a result of its absorption of a UV photon, a variety of iodine-containing species are potentially generated including but not limited to the following: Iodine radical ($I^-$), Iodine ($I_2$), Iodine radical anion ($I_2^-$.) and triiodide anion ($I_3^-$). Many of these iodine-containing species also react with solvated electrons. If these species are not removed from the system, the concentration of one or more of these species increases and the resultant efficiency of PFAS destruction is reduced.

In addition, in some cases the water to be treated contains other materials that can interfere with the efficiency of the reaction. Also, the pH plays an important role in the reaction efficiency. In some embodiments, the pH may be above 9 or about 10 such as between 12-14. Furthermore, higher pH may increase the extent of PFAS mineralization through its influence on chemical degradation mechanisms. In some cases, chemicals may be added to modify the properties of the liquid to be treated which could results in great cost and generation of greater amounts of waste.

Photosensitizers, including but not limited to those aforementioned, may be further synthetically modified to induce PFAS selectivity in order to improve the kinetics and extent of PFAS mineralization in the photochemical reaction. Means of imbuing PFAS selectivity according to various embodiments may include but need not be limited to the addition of moieties or functional groups which are fluorophilic, hydrophobic, or those which induce electrostatic interactions with the charged terminal groups of the PFAS molecules. PFAS-selective synthetic modifications of the photosensitizer may encompass one or more of these moieties simultaneously. These modified PFAS-selective photosensitizers may further be intercalated into mesoporous clay materials including but not limited to montmorillonite, bentonite, or kaolinite. PFAS sequestration into the mesoporous clay's interlayer will thus co-localize the PFAS molecule with the photosensitive active site, in a local environment with an absence of scavengers and co-contaminants.

The effectiveness of these respective sensitizers, and their selection for a particular embodiment, may be dependent on the wavelength of the light source.

Light sources. Low pressure mercury lamps, medium pressure mercury lamps and mercury amalgam lamps may be used as the source of UV radiation in various embodiments because of their relatively low cost and high efficiency of converting electrical energy into UV photons. Mercury vapor lamps exhibit pronounced spectral lines in the ultraviolet and visible. For PFAS destruction, 184.5 nm (typically referred to as 185 nm) and 253.7 nm (typically referred to as 254 nm) are important wavelengths. However, other light sources can also be used in various embodiments. In particular, various excimer lamps which have high efficiency, high-powered, narrow-band radiation across the UV spectrum (near UV to Vacuum UV) are also excellent light sources and may be used in various embodiments. Excimer lamps are a type of discharge lamp that involves rare gases such as argon (Ar), krypton (Kr) or Xenon (Xe), or halogen dimers ($F_2$, $Cl_2$ $Br_2$ or $I_2$) or combinations of halogens and rare gases. The UV light from an excimer source is due to emission from the excited state of rare gas dimer ($Ar_2^*$, $Kr_2^*$ and $Xe_2^*$), halogen dimers ($F_2^*$, $Cl_2^*$ $Br_2^*$ or $I_2^*$) and rare-gas halide excimers (ArF*, ArCl*, ArBr*, ArI*, KrF*, KrCl*, KrBr*, KrI*, XeF*, XeCl*, XeBr* and XeI*), where the asterisk denotes an excited state. Examples of excimers light sources and their principle emission output that may be used in various embodiments include XeXe* (172 nm), ArCl* (175 nm), KrI* (190 nm), ArF* (193 nm), KrBr* (207 nm), KrCl* (222 nm), KrF* (248 nm), XeI (253 nm), $Cl_2^*$ (259 nm), XeBr*, $Br_2^*$ (289 nm) and XeCl* (308 nn). The preferred lamps have outputs between 190 nm and 289 nm. The wavelength output and availability of powerful KrCl* excimer lamps make them especially preferred in certain embodiments. Although the efficiencies of excimer lamps may not be as high as the efficiencies from mercury lamps, the ability to fine tune the light emission to a given sensitizer is useful to the overall effectiveness of photochemical process in various embodiments. These lamps have the added advantage of not containing mercury.

Other UV light sources that may be used in various embodiments include xenon arc lamps, deuterium arc lamps mercury/xenon arc lamps, metal/halide arc lamps, and UV LEDs. The amount of light (power) from a UV LED is generally much lower than mercury or other discharge lamps and therefore multiple LEDs may be included in various embodiments to destroy PFASs in a time frame of minutes to hours, for example.

The light sources included in various embodiments produce sufficient energy to generate a solvated electron from the sensitizer. The UV light produced by the light sources and used in various embodiments may have a wavelength of between about 190 nm and about 300 nm. For example, some embodiments may include mercury lamps with a strong output peak at 254 nm. In other embodiments, higher energy (lower wavelength) irradiation may be used, such as excimer bulbs, for example, krypton/chloride excimer lamps. Ultraviolet Light emitting diodes can also be used as light sources.

Light sources, including but not limited to those listed above, may be used separately or in combination, either sequentially or simultaneously, in a single reactor or reactors in series.

Photolysis at 222 nm. Various embodiments described herein relate to systems and methods for the photochemical destruction of PFASs using 222 nm radiation using UV-ARP to generate a highly reducing species, such as a solvated electron, produced by the irradiation of a photosensitizer. The process and systems increase the efficiency of the photochemical destruction of PFAS, allow photochemical methods to be more generally used on a variety of PFAS-containing waste streams, and decrease the time required for PFAS destruction as well as the expense.

In various embodiments, the photochemical system includes a reactor vessel with one or more UV light sources emitting light at 222 nm. The reactor is charged with a liquid consisting of a PFAS, water (and/or another solvent), and sensitizers capable of absorbing UV light and producing a reactive species. In addition, there optionally may be one or more other chemical additives to promote the reaction. The photoreactor may be used alone, or in combination with other reactors, such as in a serial configuration. These other reactors may also employ an UV-ARP at the same or different wavelengths or may employ other PFAS destruction methodologies. In addition, the photoreactor system may include one or more processes for pretreatment of the PFAS contaminated material, such as wastewater or other water sources, as well as post treatment and polishing processes.

Various embodiments employ a photoreactor including a light source which delivers a narrow range of ultraviolet light radiation with a peak at approximately 222 nm, such as a krypton/chloride excimer lamp.

The photoreactor vessel may be any appropriate material such as quartz or other material which is non-reactive and is transparent to 222 nm radiation. (When UV-ARP is performed using light at different wavelengths, the photoreactor vessel should alternatively or additionally be transparent to that wavelength of radiation.) In other embodiments, such as those in which the bulb is located within the reactor vessel, the reactor vessel need not be transparent and may be a nontransparent and nonreactive material such as stainless steel. The vessel may be configured to contain a fluid and may include a top which may seal the vessel. In some embodiments, the photoreactor may include a single reactor vessel, while in others it may include more than one reactor vessel, such as two or three reactor vessels or more. The reactor vessel may be any size or shape. In some embodiments, the reactor vessel is cylindrical. The lamp(s), lamp support, and the reactor vessel may be contained in a housing such as a metal enclosure or other enclosure. The same designs may be used for UV-ARP systems delivering at other wavelengths as well.

Examples of lamps which may be used in various embodiments include krypton/chloride excimer lamps emitting radiation at 222 nm. Other excimer lamps which emit a narrow band of radiation at other wavelengths could alternatively be used. The lamps may consume 100 Watts of power or could consume more or less power. The Excimer lamps systems, which may include the bulbs, wiring and ballasts (power supply), may have an overall power conversion efficiency of 0.1% to around 20%, with conversion efficiency declining as lamp intensity increases. The power supplied to the lamps may be around 20 kilovolts in some embodiments that support high power lamps, or may be around 3 kV for embodiments that support lamps of lesser intensity, for example.

The photoreaction methods as described herein may be performed at room temperature or at a temperature greater than room temperature. For example, in some embodiments, the temperature of the photoreactor may be between about 55 and about 60 degrees Celsius during the reaction. However, higher or lower temperatures could alternatively be used. In addition, heating and/or cooling elements could be added to the reactor and/or to the room containing the reactor to raise or lower the temperature, such as air-ducting, fans and lamps.

The reactor solution may be stationary during UV treatment, or it may be agitated. For example, the reactor may include stirrers or agitators with the capacity to stir or agitate the solutions. In some embodiments, stirring or agitating the reactor solution during irradiation may facilitate exposure of PFAS compounds to regions of higher radiation. Alternatively, the solution could be recirculated through a heat exchange unit.

Ultimately, optimization of reactor solution for efficiently may also depend upon direct agitation or stirring of the compound to expose more solution constituents to a region of higher radiation field in a smaller amount of time.

In some embodiments, the PFAS irradiation at 222 nm may be performed in a reaction solution including only an aqueous solution of the PFAS. However, the results may be improved by including appropriate reducing solutions at appropriate concentrations. This may result in faster, more efficient, and more complete destruction of PFAS.

Some embodiments result in complete destruction of the PFAS or near complete destruction, such as greater than 99% destruction. Some embodiments result in at least 90% or at least 95% destruction of PFAS, such as about 90% to about 100%, or about 95% to about 100% destruction of PFAS.

The duration of treatment necessary to achieve complete destruction of the PFAS or near complete destruction may depend upon the design of the photoreactor which is used, as well as other variables. However, in some embodiments, complete destruction may be achieved after about 5 minutes to about 6 hours of treatment, such as about 2 hours to about 5 hours of treatment to achieve complete or near complete (such as 99% or more) destruction of PFAS.

In some of the examples included herein, control samples were tested which did not include reagents. Even in the absence of reagents, irradiation at 222 nm results in the destruction of the PFAS through a process of direct photolysis. However, the PFAS destruction was much slower and less complete. In contrast, when the reagents were included, PFAS destruction was faster and more complete. It is believed that using the advanced reductive process described herein produced superior results through the production of solvated electrons which are capable of reacting with the carbon-fluorine bond rather than relying on the direct absorption of the energy by the PFAS and subsequent scission of bonds.

In addition, while direct irradiation at 222 nm in the absence of reagents may produce some enhanced photolysis of perfluroalkycarboxylic acids (PFCAs), fluorotelomers, unsaturated carboxylic acids, and GenX PFAS compounds as compared to photolysis at 254 nm, the 222 nm treatment alone has minimal performance/effectiveness against perfluoroalkylsulfonic acids. In contrast, the use of the advanced reductive process at 222 nm described herein results in more rapid, more complete, and overall more efficient destruction of both perfluoroalkylcarboxylic acids (PFCAs) and perfluoroalkylsulfonic acids (PFSAs).

Combination Photochemistry/Electrochemistry. In some embodiments, UV photolysis may be used in conjunction with an electrochemical system. This may be used, alone or in combination with other methods of UV photolysis described herein, and the combination can further enhance the destruction rate of PFASs. An example of an electrolytic cell which may be used in combination with photochemistry is the photo-electrolytic cell shown in FIG. 9, in which the cathode is immersed in an electrolytic solution with the UV lamp. This photo-electrolytic cell is like the photo-electrolytic cell discussed above with regard to FIG. 2. For example, the photo-electrolytic cell like the one shown may be used to reduce the photo-oxidized sensitizer back to the sensitizer to prevent the buildup of species that can react with solvated electrons. In other embodiments, the photo-electrolytic cell may be used to increase the pH around the electrode and therefore minimize the reactions of solvate electrons with protons. In still other embodiments, the photo-electrolytic cell may be used to produce hydrogen gas which, under some conditions, can increase the concentration of solvated electrons which can significantly increase the efficiency of photo-destruction of PFAS.

Consider that the oxidized sensitizer can undergo further reactions. For example, when iodide is the sensitizer, the following reactions can occur:

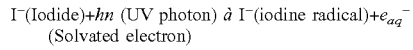
$$I^-(\text{Iodide}) + h\nu \text{ (UV photon)} \rightleftharpoons I^\cdot(\text{iodine radical}) + e_{aq}^- \text{ (Solvated electron)}$$

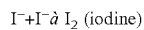
$$I^\cdot + I^- \rightleftharpoons I_2 \text{ (iodine)}$$

$$I_2 + I^- \rightleftharpoons I_3^- \text{ (triiodide anion)}$$

The iodine radical, iodine, and the triiodide anion are all photolysis byproducts. All of these species are efficient scavengers of solvated electrons and have higher second order rates for the reaction with solvated electrons than PFASs. The presence and accumulation of these species reduces the efficiency of the destruction of PFASs and therefore various embodiments may remove these species. As discussed above, one way to accomplish this is to introduce a sacrificial reductant that is capable of reducing the photochemical byproducts back to the original sensitizer. An example of a sacrificial reductant which may be used in various embodiments is sulfite. Sulfite may react with the iodide products as follows:

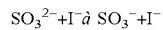
$$SO_3^{2-} + I^\cdot \rightleftharpoons SO_3^{-\cdot} + I^-$$

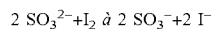
$$2\ SO_3^{2-} + I_2 \rightleftharpoons 2\ SO_3^{-\cdot} + 2\ I^-$$

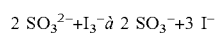
$$2\ SO_3^{2-} + I_3^- \rightleftharpoons 2\ SO_3^{-\cdot} + 3\ I^-$$

These reactions are thought to occur through a series of sulfur-iodine intermediates. Moreover, the chemistry seems to be particularly well tuned for iodide.

In other embodiments, the iodide byproducts may be electrically reduced. For example, an electrochemical system may be used to regenerate the original sensitizer (iodide) from photolysis byproducts (iodine radical, iodide, and triiodide) in situ in the photolysis reactor. In the case of iodide as a sensitizer, the following reactions may occur at the cathode:

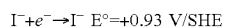
$$I^\cdot + e^- \rightarrow I^- \quad E° = +0.93\ \text{V/SHE}$$

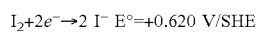
$$I_2 + 2e^- \rightarrow 2\ I^- \quad E° = +0.620\ \text{V/SHE}$$

$$I_3^- + 2e^- \rightarrow 3\ I^- \quad E° = +0.536\ \text{V/SHE}$$

Depending on the pH and temperature of water, iodine can also be hydrolyzed and generate several products such $I_3^-$, $IO^-$, $HOI_2^-$ and $HOI$. Electrodes which may be used in various embodiments may include Ru- or Pt-based electrodes and metal oxides such as $TiO_2$ as a cathode material that can reduce triiodide into iodide, and graphene oxide deposited with Cu—Pt bimetallic nanoparticles to reduce triiodide to iodide.

In order to complete the circuit, a suitable oxidation process occurs at the anode. There are several possible anode reactions in aqueous medium, but the following reaction on the anode may occur when high overpotential is present:

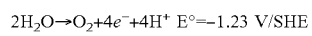
$$2H_2O \rightarrow O_2 + 4e^- + 4H^+ \quad E° = -1.23\ \text{V/SHE}$$

Combining the half-cell reactions of the reduction of iodine and the oxidation of water results in the following overall reaction in various embodiments:

$$I_2 + H_2O \rightarrow 2\ I^- + \tfrac{1}{2}\ O_2(g) + 2\ H^+$$

The products from this reaction are acid and $O_2$, both of which are not desirable because they may react with solvated electrons. This problem can be ameliorated in various embodiments by addition of a base like sodium hydroxide to neutralize the acid or by removing the oxygen gas by sparging with an inert gas, for example. Another method to avoid oxygen interference is to have the electrodes in separate compartments.

In some embodiments, the production of $O_2$ from $H_2O$ oxidation may be avoided by including a sacrificial carbon layer of the electrode material or using porous carbon-based anode, for example. Oxidation of carbon at the anode is a faradaic process with the following reaction:

$$\tfrac{1}{4}C + \tfrac{1}{2}H_2O \rightarrow \tfrac{1}{4}CO_2 + H^+ + e^- \quad E^\circ = 0.7\text{-}0.9\ \text{V/SHE}$$

Oxidation of $H_2O$ can be avoided by addition of a sacrificial reductant in various embodiments. As in the chemistry above for the UV Sulfite/$I_2$, sulfite could be added to the reaction solution. In this case, the anode and overall reaction would be the following:

Anode (oxidation): $SO_3^{2-} + 2OH^- \rightarrow SO_4^{2-} + H_2O + 2e^-$
    $E^\circ = 0.936$ V/SHE Cathode (reduction): $I_2 + 2e^- \rightarrow 2I^-\ \ E^\circ = +0.620$ V/SHE Overall reaction: $I_2 + SO_3^{2-} + 2OH^- \rightarrow 2\ I^- + SO_4^{2-} + H_2O$ In this case, the sulfate ion ($SO_4^{2-}$) is a reaction product as well as acid. Sulfate has a low affinity for solvated electrons and therefore would not compete with PFASs for solvated electrons.

Another option which may be used in various embodiments is to include in the reaction solution a polysulfide species like $S_2^{-2}$ which undergoes oxidation:

Anode (oxidation): $2\ S_2^{2-} \rightarrow S_4^{2-} + 2e^-\ \ E^\circ = 0.497$
    V/SHE Cathode (reduction): $I_2 + 2e^- \rightarrow 2I^-\ \ E^\circ = +0.620$ V/SHE Overall reaction: $I_2 + 2S_2^{2-} \rightarrow 2\ I^- + S_4^{2-}$ Various embodiments may include electrochemistry to reduce other photosensitizers that have generated a solvated electron, and therefore been oxidized, back to the original photosensitizer. For example, in some embodiments, irradiation of ferrocyanide $Fe(CN)_6^{4-}$ at wavelengths shorter than 313 nm may be used to produce solvated electrons and the ferricyanide anion $Fe(CN)_6^{3-}$. The ferricyanide ion may subsequently be reduced at cathode back to the ferrocyanide anion:

$Fe(CN)_6^{4-} + \text{UV Photon} \rightarrow Fe(CN)_6^{3-} + \text{Solvated electron}$ $Fe(CN)_6^{3-} + \text{electron} \rightarrow Fe(CN)_6^{4-}$ (reaction at the cathode)

Sulfite can also act as a sensitizer, especially at shorter wavelengths, for example, at 222 nm or 185 nm. In this case a solvated electron and the sulfite radical ($SO_3^-$) are produced. The sulfite radical can dimerize and form dithionate $S_2O_6^{2-}$ or undergo further reactions. Electrolytic reduction of these species can reduce the amount of sulfite required.

A photo-electrolytic device can increase the efficiency of PFAS destruction in multiple ways. As mentioned above, the photo-oxidized sensitizer can be electrochemically reduced back to the sensitizer. A photo-electrolytic device can also reduce the presence of scavenging species. For example, oxygen is an efficient scavenger of solvated electrons and interferes with destruction of PFAS. Lowering the levels of oxygen would be useful. Oxygen levels can be reduced by electrochemically reducing oxygen to less reactive species like water. In this case, the electrolytic reaction could occur before and or during the photolysis. The replacement of fluorine on PFAS for hydrogen requires two electrons. The mechanism is believed to involve two separate one electron reduction steps. One of these electrons could be provided by reaction with a solvated electron, in electrolytic device the second electron could be provided electrochemically.

In some embodiments, the anode may be comprised of a semiconducting polymer on a conductive substrate such as a metal or carbon electrode. For example, metals that oxidize to diamagnetic species that have an empty d-shell, such as $Al^{3+}$ or one that is filled such as $Zn^{2+}$ may be used. In some embodiments, a polymeric semiconductor may be coated on the anode to prevent diffusion of potential scavenging species which might compete with PFASs destruction. For example, the anode may be coated with oxidizable entities. Examples of oxidizable entities which may be used in various embodiments include π-conjugated polymers, including but not limited to polyacetylene, polyaniline, polythiophene, polypyrrole, poly(p-phenylene), poly(p-phenylene vinylene) and their derivatives, as well as polymers that are based on the reduced form of n-type semiconductor polymers or blends thereof. Examples include but are not limited to polymeric quinone (PQ), poly(5-amino-1,4-naphthoquinone) (PANQ), poly(2,5-dihydroxy-1,4-benzoquinone-3,6-methylene) (PDBM), poly(anthraquinonyl sulfide) (PAQS), poly(2-vinylanthraquinone) (PVAQ), polymer-bound pyrene-4,5,9,10-tetraone (PPYT), naphthalene diimide (PNDI) derivatives, pyromellitic diimides (PPMDI) derivatives, polylactam/lactone derivatives, polymeric isoindigo (IIG) derivatives, polymeric diketopyrrolopyrrole (DPP) derivatives and acceptor-acceptor derivatives. Another example includes polymers with oxidizable pendent groups including but not limited to ascorbic acid and alkali or alkaline metal salts of polymeric ascorbic acid, or anthracene, pyrene, naphthalene. The anionic forms of the semiconductors may be charge balanced by an alkali cation ($Na^+$, $K^+$, $Rb^+$) or alkaline metal ($Mg^{2+}$, $Ca^{2+}$, $Ba^{2+}$) or tetraalkylammonium cations in some embodiments. When the electrons are removed from the reduced form of the semiconductor, the cations are released into the solution. Some of the above undergo irreversible reactions but others can be recharged to the anionic state by electrochemical reduction. In the case of all the polymers with pendent units the linkage between the polymer backbone and the pendent group should not be hydrolysable under the photolysis condition which is generally at a high pH (>9). Examples of polymers which may be used in various embodiments are shown in FIGS. 10 and 11. FIG. 12 shows examples of structures of polymeric n-type organic semiconductors that may be used in embodiments of the present disclosure.

In some embodiments, the anode may be contained in an UV opaque material while still allowing contact with the wastewater that is being irradiated. This may be beneficial when organic semiconducting molecules are part of the anode to prevent unwanted photolytic reactions that could lead to the decomposition of the organic semiconductors and possible introduction of unwanted byproducts that could react with solvated electrons.

Other potential materials that may be coated or bound to the anode in various embodiments are polymeric alcohols and sugars that can be oxidized. Polymeric alcohols or sugars can be oxidized to aldehydes, ketones, carboxylic acids or carbon dioxide. In the case of polymeric alcohols or sugars, they may be consumed and may be viewed as sacrificial reductants. An example of a polymeric alcohol which may be used in various embodiments is polyvinyl alcohol.

Figure 13:
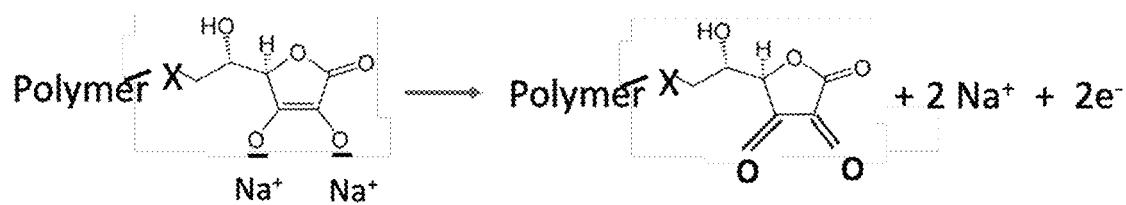
FIG. 13 is a depiction of an example of the oxidation of disodium salt attached to a polymer according to various embodiments.

In some embodiments, an oxidizable unit may be attached to polymeric alcohols such as polymer bound ascorbic acid, where the disodium salt would be oxidized to the corresponding dehydroascorbic acid form and the sodium would be released into the solution as shown in the reaction shown in FIG. 13. A water-insoluble ascorbic acid-containing polymer such as that disclosed in WO2000072959A1 may be used in various embodiments. This polymer acts as an antioxidant via the reaction of ascorbic acid units with oxidizing agents present in the environment. If used in a reaction solution, it can subsequently be removed from the solution by, for example, filtration. In some embodiments, a similar polymer can be used in conjunction with the UV-ARP process to reduce chemical compounds such as molecular oxygen and photosensitizer byproducts as defined previously.

Figure 14:
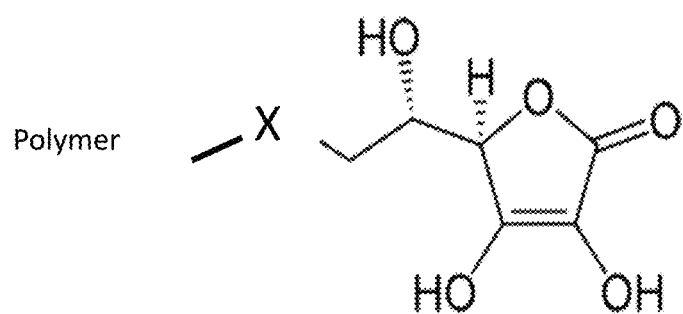
FIG. 14 is an example of the chemical structure polymers that may be used in various embodiments.

In various embodiments, polymeric ascorbic acid and derivatives that are stable at high pH may be used. For example, in the chemical structure as shown in FIG. 14, the linking group X, may be selected from the following: oxy (—O—), thio (—S—), aza (—$NR_1$—) where $R_1$ is a hydrogen, alkyl or aryl group, alkylene (—$(CR_2R_3)_n$—), where $R_2$ and $R_3$ can independently be selected from hydrogen, hydroxy, alkyl or aryl, arylene, and aralkylene, an alkarylene, amide (—C(O)NH—), or combinations thereof. The polymer may be selected from polyacrylates, polystyrenes, polyurethanes, polycarbonates, polyolefins, polypeptides, polyamides, polyethers, and siloxanes.

Figure 15:
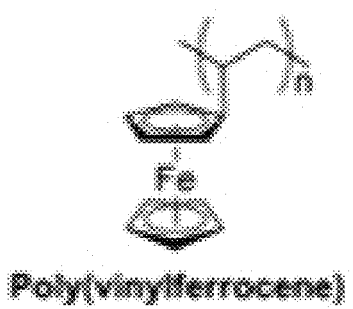
FIG. 15 is an example of the chemical structure of a polymer with oxidizable units that may be used in various embodiments.

Other examples of polymers with oxidizable units which may be used in various embodiments are sulfur containing polymers, including but not limited to polyether-thioethers and polyethersulfones such as those shown in FIG. 15. One such example that may be used in various embodiments is a polymer designed to be used in lithium ion polymers as a polymer electrolyte as reported by Sarapas and Tew (Sarapas, J. M. and Tew, G. N.; Poly(ether-thioethers) by Thiol-Ene Click and Their Oxidized Analogues as Lithium Polymer Electrolytes; Macromolecules 2016, 49, 1154-1162).

Various shapes or structures may be used for the electrodes. For example, in some embodiments, the cathode may be a metal wire electrode. In other embodiments, the cathode may be a mesh structure, which may increase the surface area and allow for more efficient and uniform capture of the photo-generated products. The materials for this electrode may include, for example, high density graphite, platinum, gold or other non-kinetically reactive conductors. In some embodiments, metals like iron, zinc or aluminum could be used, depending on the pH.

Recycling sensitizer. As discussed above, in the advanced reductive process (ARP) solvated electrons are generated by UV irradiation of a sensitizer. A common sensitizer is iodide, with UV light generating a solvated electron and iodine radical. The solvated electron reacts with the PFAS molecule. However, two iodine radicals can combine and form iodine, and iodine and iodine radicals can react with solvated electrons. So, if the iodine concentration builds up, the destruction of PFAS may be impaired. One solution to this problem which may be used in various embodiments is the inclusion or addition of millimolar sulfite to the reaction mixture. The sulfite reduces the iodine or iodine radicals back to iodide. The sulfite eventually reacts to form sulfate that does not interfere with the photochemical destruction of PFAS. The use of sulfite is a good solution; however, high concentrations of sulfite also react with solvated electrons and there are chemical biproducts.

Figure 16:
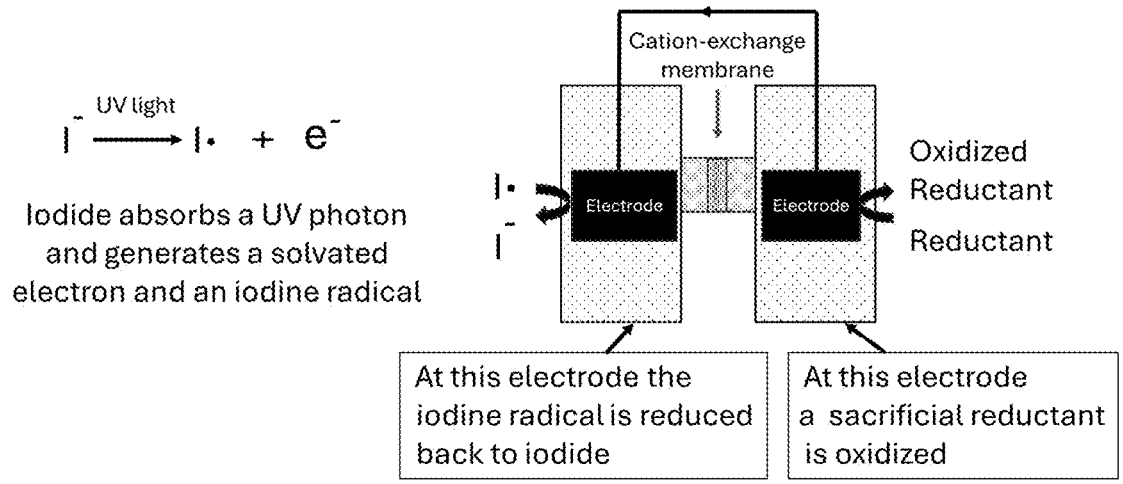
FIG. 16 is a representation of an example of a system for the electrochemical regeneration of reduced iodide from iodine or iodine radicals.

In alternative embodiments, electrochemical reduction of iodine or iodine radicals may be used to prevent interference with the destruction of PFAS. As compared to processes which use sulfite as discussed above, the use of electrochemical reduction allows the use of lower concentrations or no sulfite. Although electrochemistry involves generating oxidized species at the anode, the oxidation and reduction can be performed in separate compartments of the photoelectrolytic device, and therefore the oxidized species do not interfere with PFAS destruction. For example, as shown in FIG. 16 photolysis and iodine reduction may occur in one compartment, while oxidation may occur in a separate compartment with the compartments separated by a membrane or ionic bridge. If water is oxidized, the chamber could be sparged with an inert gas like argon or nitrogen, which would prevent the oxygen from getting into the compartment where photolysis and reduction are occurring.

Figure 17:
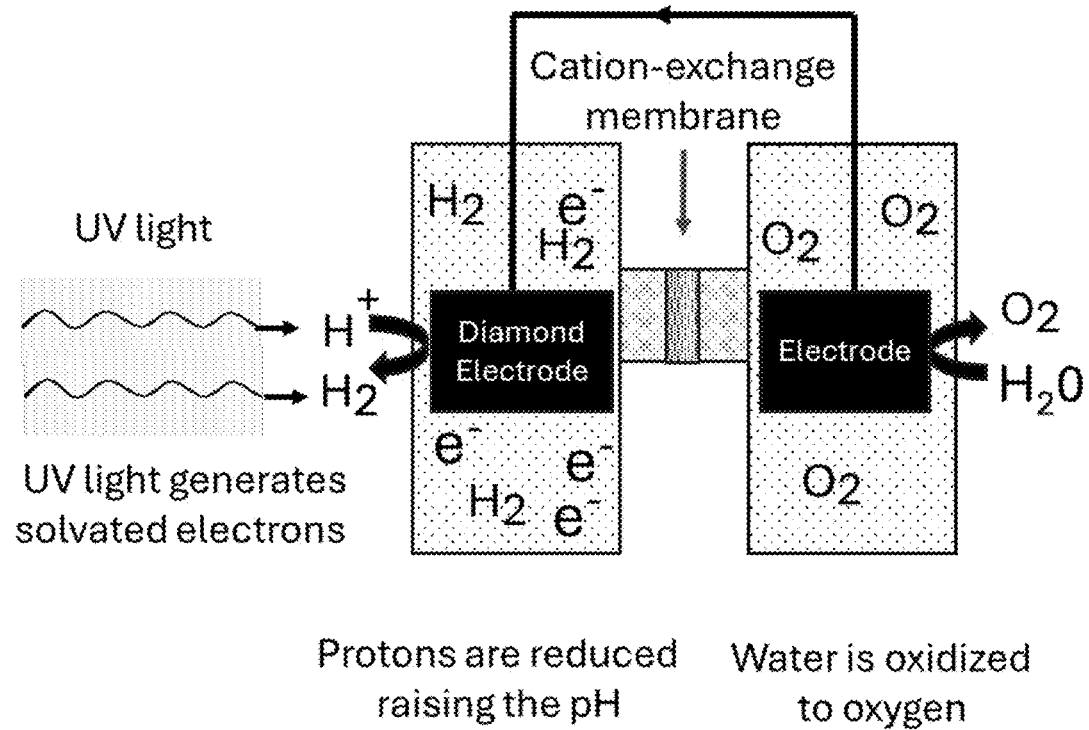
FIG. 17 is a representation of an example of electrochemical regeneration of oxidized iodide according to various embodiments.
Figure 18:
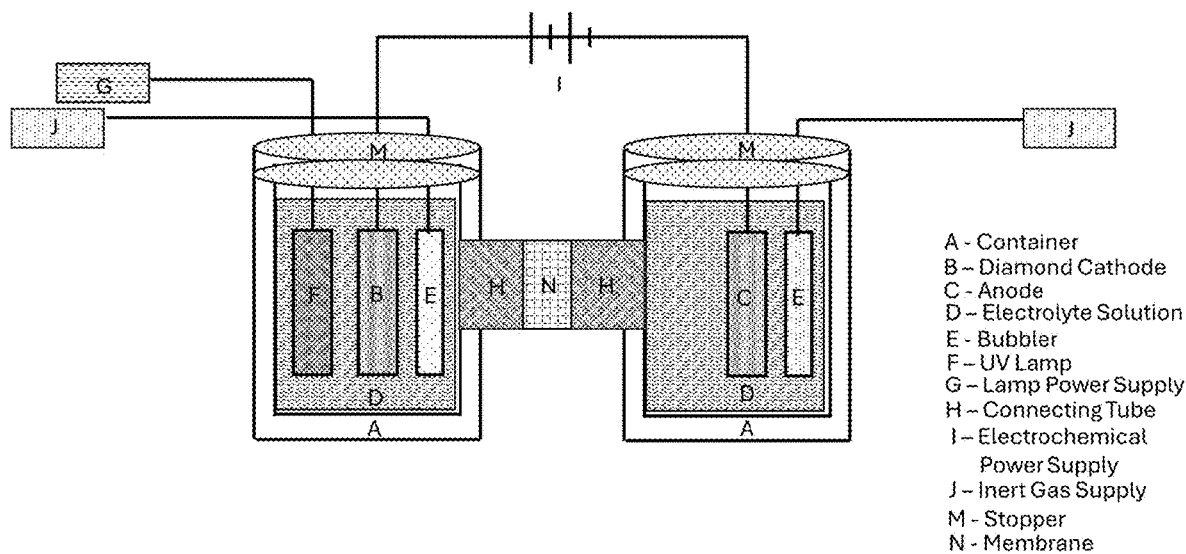
FIG. 18 is a representation of another example of electrochemical regeneration of oxidized iodide according to various embodiments.

An example of the electrochemical regeneration of oxidized iodide is shown in FIGS. 17 and 18, using a system like the one shown in FIG. 9. At one electrode the iodine radicals generated by photo-oxidation of iodide are reduced back to iodide. At the other electrode, an oxidation process occurs. In aqueous media water can be oxidized to oxygen and provide electrons. Other examples of species that can act as reductants are sulfite, iodide, ascorbic acid or ascorbate can also act as reductants.

Figure 19:
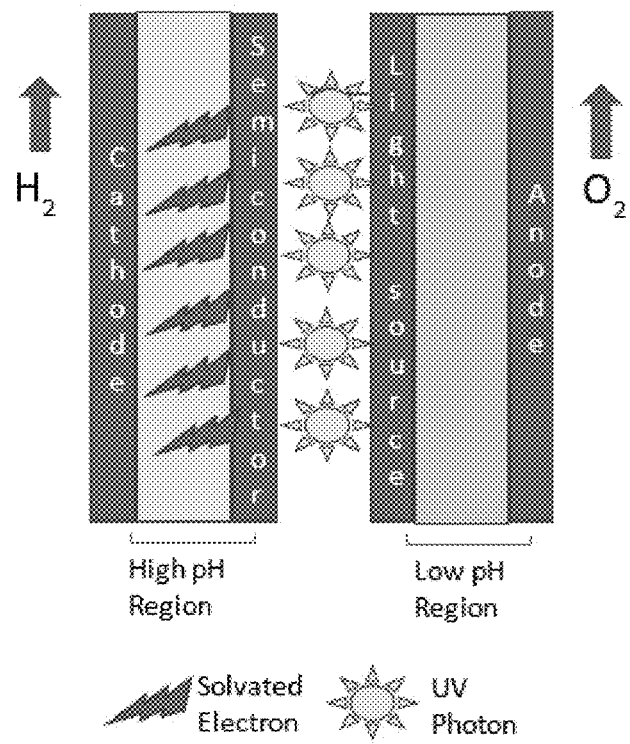
FIG. 19 is a depiction of the use of an electrochemical system to modify the local pH of the solution according to various embodiments.

Solvated electrons. In some embodiments, an electrochemical system may be used to modify the local pH of the solution as shown in FIG. 19. Electrolysis of water at the cathode causes the pH to increase. High pH is generally desirable for the destruction of PFASs by solvated electrons because the hydrogen ion ($H^+$) rapidly reacts with solvated electrons. The pH is lowered in the vicinity of the anode. Therefore, if solvated electrons are generated near the cathode, they have sufficient lifetime to react with PFASs. One possible configuration is to have a light source that is irradiating a semiconductor such as a diamond-like carbon or boron-doped diamond in close proximity to the cathode. Systems like this have the advantage of requiring minimal salt concentrations and minimal pH adjustments.

In some embodiments, boron-doped diamonds may be used as an electrode and the source of solvated electrons when irradiated by sufficiently energetic UV photons. Hydrogen-terminated diamonds have been considered to be preferred diamonds to use for UV generation of solvated electrons. This is because they are negative electron affinity materials. Electrolyzing water causes an increase in the pH around the cathode. Irradiation of the boron-doped diamond at the cathode may be used, resulting in generation of solvated electrons that are sufficiently long-lived to react with PFASs.

Doped-diamonds may be used to generate solvated electrons, the hole that is formed on the diamond can be electrochemical reduced. The doped-diamonds used in various embodiments may have another atom incorporated into the diamond structure at the time it was synthesized.

For example, in some embodiments, solvated electrons may be generated by irradiating hydrogen-terminated diamonds, such as those described in "Degradation of perfluorooctanoic acid with hydrated electron heterogeneous catalytic system", Liu, G.; Feng C.; and Shao, P.; Environ. Sci. Technol. 2022, 56, 6223-6231. In this process, UV light may be used to promote an electron from the valence band to the conduction band of the diamond. The electron is emitted into the aqueous solution. The solvated electron can then react with PFAS. For example, in some embodiments, the diamond may be irradiated in one compartment of an electrochemical cell. The other compartment may contain iodide and may be connected to the first compartment by a cation exchange membrane. As the photolysis proceeds, the solvated electrons generated from irradiation of the diamond react with the PFAS and the electron "holes" in the valence band of the diamond are reduced by the reaction of iodide to iodine at the electrode. This is an example of a galvanic device. However, the iodine will build up in the cell and eventually diffuse across the membrane barrier since it is neutral and wouldn't be impeded by the membrane. An improvement to this is to irradiate the diamond while applying a voltage across the two electrodes such that protons are reduced to hydrogen at the cathode which results in an increase of pH around the cathode. A higher pH at this electrode will allow the photochemically generated solvated electrons to live longer and have more time to react with PFAS. At the electrode in the second compartment, an oxidation reaction occurs. In one embodiment, water can be oxidized to oxygen which may be removed by sparging the compartment with an inert gas (e.g. argon or nitrogen). Other species can also be added to this chamber to reduce the potential. These species include but are not limited to sulfite, iodide, ascorbate, ascorbate anions and easily oxidized metal ions.

185 nm Hydroxyl Radical Generation

In some embodiments, gases such as hydrogen may be generated by electrolysis of water. Hydrogen gas can be used in conjunction with vacuum UV photolysis to greatly enhance the degradation of PFASs.

Irradiation of water solutions containing PFAS with 185 nm UV light results in modest degradation of PFAS through the generation of hydroxyl radicals. However, hydroxy radicals do not efficiently react with PFAS. Therefore, in some embodiments, 185 nm irradiation of an aqueous solution of PFAS to form hydroxyl radicals may be used with concurrent electrochemical generation of hydrogen gas. In such embodiments, the 185 nm irradiation of water results in generation of hydroxyl radicals in the presence of hydrogen gas in the aqueous PFAS solution.

Under basic conditions hydrogen gas reacts with hydroxyl radicals to form hydrogen atoms and water, and the hydrogen atoms produce solvated electrons. This combination of electrochemical generation of hydrogen gas in water and irradiation of water with 185 nm light to produce hydroxyl radicals may be used in various embodiments for more efficient PFAS destruction process.

Producing hydrogen gas through electrolysis according to various embodiments avoids the need to separately provide hydrogen gas to saturate the solution. In addition to being more complicated, such a process would include the use and storage of a highly flammable substance. Rather, by generating hydrogen gas electrochemically using the methods described herein, the hydrogen gas may be produced in close proximity to where the light is being absorbed, such as less than 2 cm, or between about 0.5 and 2 cm, or about 1 cm.

Figure 20:
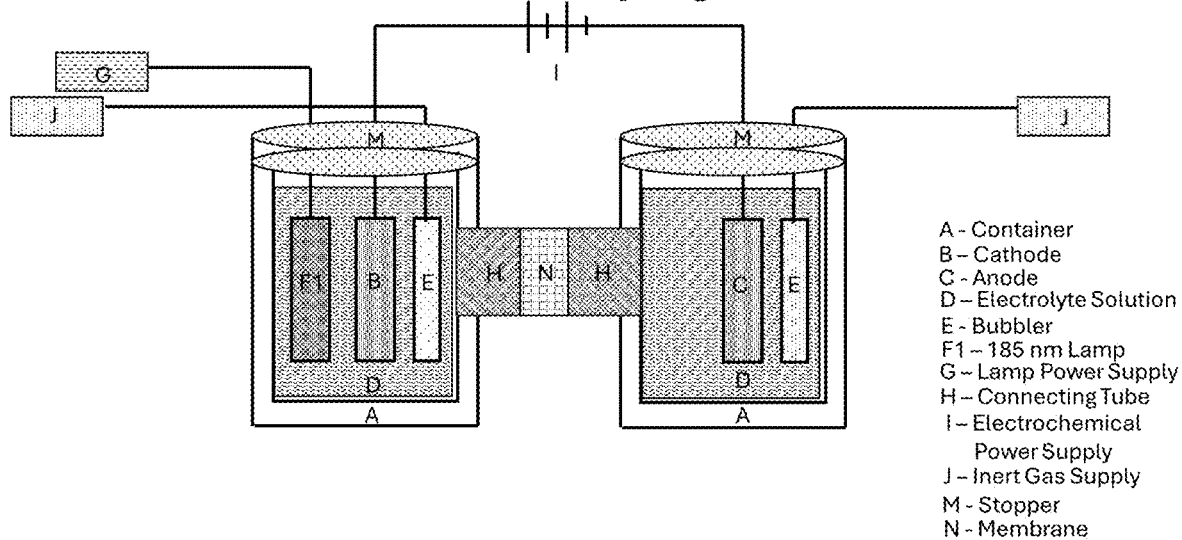
FIG. 20 is a schematic of an example of a system for photo-electrolytic 185 mm irradiation with hydrogen evolution according to various embodiments.

For example, in some embodiments, a photo-electrolytic cell may be used like that shown in FIG. 20. The light source, such as a 185 nm light source, may be placed in a test tube or other transparent container, and submerged in the PFAS solution. An electrode may be wrapped around the test tube, such as about 1 cm from the test tube. A voltage sufficient to produce hydrogen gas may be applied across the electrode. This electrode is electrically connected to the electrode in the separate compartment, where oxidation occurs. If water is the reductant oxygen is the product. The electrode may be a mesh, for example. The electrode may be platinum, titanium, or stainless steel, for example. In some embodiments, the electrode may be platinum coated titanium, such as a platinum coated titanium mesh. For example, the cathode may be made of a high surface area construction, such as a mesh or foam, in which the electrochemically active surface area is greater than the geometric surface area. Other electrodes described elsewhere in this disclosure may also be constructed in these ways.

After the photolysis is complete, the excess hydrogen can be electrochemically oxidized to make water by reversing the flow of current to reverse the electrochemical process.

Figure 21:
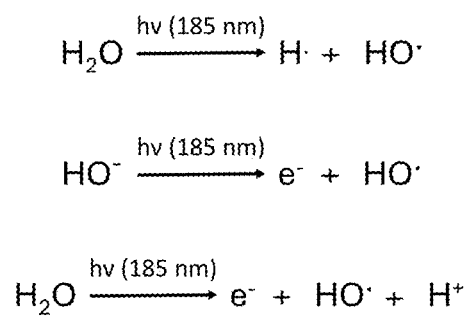
FIG. 21 depicts reactions resulting from the absorption of light at 185 nm by water.

Vacuum Ultraviolet (VUV) is defined as the portion of the electromagnetic spectrum between 100-200 nm. Mercury lamps can emit in this region at 185 nm. As shown in FIG. 21, water absorbs at 185 nm radiation and can be broken apart into hydrogen radicals and hydroxyl radicals with a quantum efficiency of ~0.3; hydroxide also absorbs 185 nm light and generates the hydroxyl radical and a solvated electron with a quantum efficiency of ~0.1. In addition, water can absorb 185 nm radiation and form a hydroxyl radical, solvated electron and a proton with a quantum efficiency of ~0.045.

In various embodiments, hydrogen gas may be electrochemically generated by electrolysis of water in close proximity to where the UV light is being absorbed. A consequence of electrochemically generating hydrogen at the electrode is an increase in pH. This system does not require an external source of hydrogen. It allows for the construction of a simple, inexpensive device that does not require added chemicals, like hydrogen or sulfite. In addition, any excess hydrogen can be reacted with oxygen after the photolysis is completed.

The electrolysis of water can be continuous or intermittent during the photolysis process. At high pH, such as a pH of 9-12 an intermittent electrolysis process might be sufficient, where the main effect is providing a high concentration of hydrogen gas. Continuous electrolysis may be preferred at neutral pHs, such as pHs of 6-8, because electrolysis will raise the pH in the volume around the electrode. In some cases, it would not be necessary to adjust the pH. However, in some embodiments, the pH may need to be raised, such as through the addition of a base, such as if the pH is less than about 6.

The above method provides a process for destroying PFAS with minimal additives. As such it may be useful as a device that could treat drinking water to remove PFAS, such as in the form of a self-contained unit for home use that could be operated by connecting to a power source like a power outlet, and the household water supply. Alternatively, it could be used in conjunction with an RO system to destroy the PFAS of the RO reject. Such a system could be deployed at small commercial or residential locations. The main biproducts of the reaction would be free fluoride and carbon dioxide as well as hydrogen and oxygen from the electrolysis reaction. Free fluoride levels could be controlled by treating the water with lime or bone ash. Hydrogen and oxygen could be combined to produce water.

Figure 22:
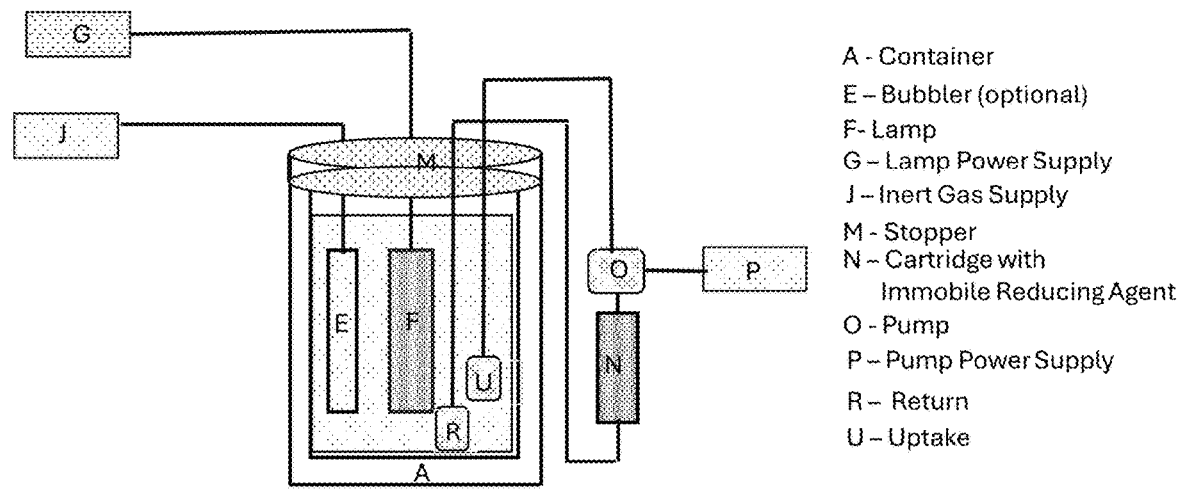
FIG. 22 is a schematic of a non-electrochemical system for iodine reduction, according to various embodiments.
Figure 23:
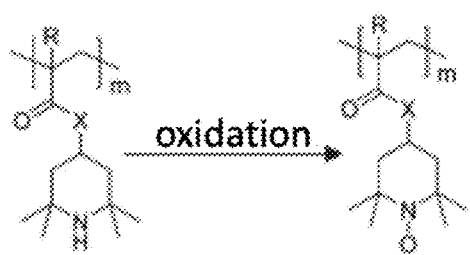
FIG. 23 is a depiction of the chemical structure of polyvinylferrocene, which may be used in various embodiments.

Non-mobile media reduction of byproducts. A non-electrochemical method which may be used in various embodiments includes utilizing polymeric species as non-mobile media that can reduce oxidized byproducts of the photochemical reaction back to the original sensitizer such as iodide. The non-mobile media may include beads or membranes or other structures, for example, that have polymerically bound reducing agents. For example, in the case of iodide as the sensitizer, the oxidized byproducts (iodine radical, iodine or triiodide) can react with a polymeric ascorbic acid which may be used as the polymerically bound agent in various embodiments. Less salts, like sodium sulfite, would be required in such embodiments and the polymer-bond ascorbate and oxidized form may be physically separated from the photolysis reaction. In FIG. 22, one possible configuration is shown. The photolyzed solution is pumped through a cartridge containing a reducing species that can reduce the photooxidized sensitizer back to the sensitizer. The polymer bound reductants are physically separated from scavenging solvated electrons and therefore cannot react with solvated electrons. For example, the solution that is being irradiated could be pumped through a container containing a material capable of reducing iodine back to iodide. Many of the previously mentioned polymeric semiconductors may also be included to reduce the sensitizer byproducts back to the sensitizer. Preferred semiconducting polymers would be capable of being chemically or electrochemically regenerated and therefore allowing reuse of these materials in subsequent photolysis runs. Another example of a polymeric media that may be used in various embodiments to reduce the iodine radical, iodine or triiodide back to iodide are polymeric ferrocenes, for example polyvinylferrocene, shown in FIG. 23, or polymers that are based on the reduced form of n-type semiconductor polymers or blends thereof as listed above. Alternatively, the reduction of these species could be accomplished by a metal like zinc or aluminum or metal alloy in some embodiments. For example, the solution could be pumped through a column containing metal shot. In the case of metals, the metal ions that may be generated from the process should not act as scavengers of solvated electrons.

Another example of polymeric radical scavengers that may be used in various embodiments are polymers that can undergo red/ox reaction, such as polymers that contain a stable radical. One example is polymers with tetramethylpiperidine 1-oxyl (TEMPO) side chains, as shown in FIG. 24.

Oxygen reduction. In some embodiments, the UV reactor may contain one or more electrochemical systems for one or more functions (such as removing impurities in the water, removing or recycling photoproducts, and/or local pH modification). For instance, dissolved oxygen in water could compete with sensitizer in scavenging the hydrated electron, thus it may be removed in some embodiments. In an electrochemical system according to various embodiments, several cathode-driven $O_2$ reductions reactions (ORR) can be achieved such as:

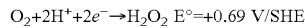

$O_2 + 2H^+ + 2e^- \rightarrow H_2O_2$  $E° = +0.69$ V/SHE

$O_2 + 2H_2O + 4e^- \rightarrow 4OH^-$  $E° = +0.40$ V/SHE

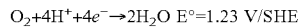

$O_2 + 4H^+ + 4e^- \rightarrow 2H_2O$  $E° = 1.23$ V/SHE

Alternative solvents. In some embodiments, destruction of PFASs may be performed using solvents other than water. Some such embodiments may use electrochemistry in polar aprotic solvents to generate a highly reduced or oxidized species that can be subsequently photolyzed to generate other highly reactive species. Examples of aprotic polar solvents that may be used in various embodiments include acetonitrile, pyridine, dimethylsulfoxide, N,N-dimethylformamide, acetone, ethyl acetate, oxalane/tetahydrofuran and crown ethers. For example, aromatic species like dicyanoanthracene (DCA) which may be used in various embodiments can be reduced to a radical anion (DCA⁻) electrochemically and then be irradiated to generate an even more powerful reductant, the dicyanoanthracene radical anion excited state (DCA⁻*). Other aromatic species that can be used are 2,6-diisopropylphenyl-naphthlene and perylene bisimide. Since many of the radical anions which may be used in various embodiments absorb in the visible region or near UV region of the electromagnetic spectrum, this approach has the potential advantage of allowing lower energy (less than UV-C) to make very reactive species. It also may allow for the more complete absorption of the lamp energy if used in conjunction with a higher energy photon. An example of a process including aromatic compounds is shown in FIG. 25.

In some embodiments, the photochemical reactor may be equipped with the electrochemical system to decompose other recalcitrant pollutants such as pharmaceuticals, hormones, pesticides, antibiotics and cleaning solvents.

Post-Treatment Steps

Figure 26:
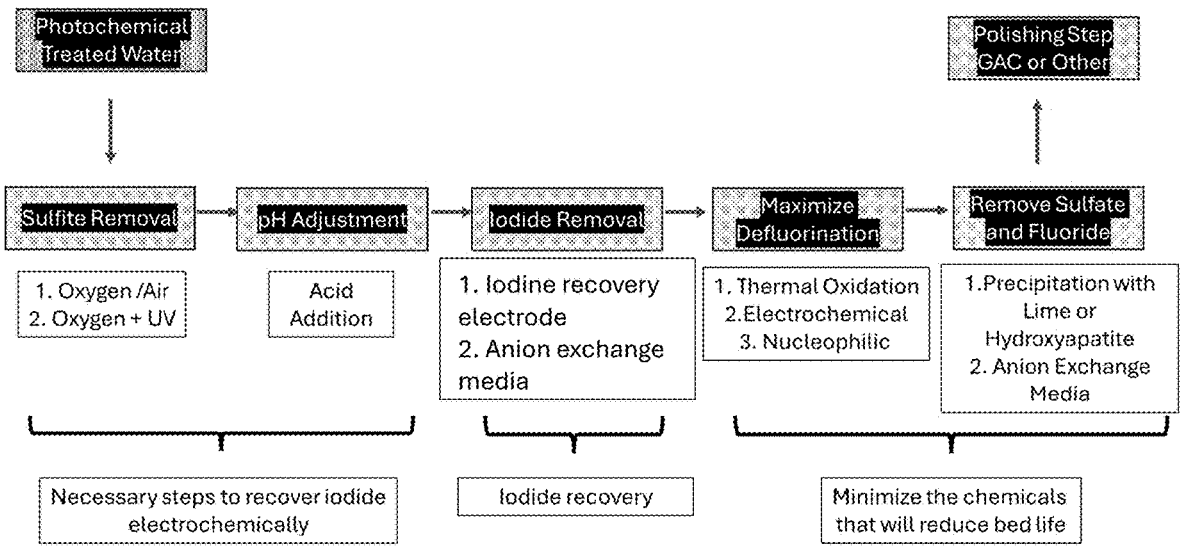
FIG. 26 is a schematic example of a post treatment process.

Following the photochemical destruction of PFAS, it may be desirable to further treat the solution before final disposal or recycling of the photolyzed wastewater. A potential post treatment scheme is shown in FIG. 26. In some cases, all these steps might be followed. In other instances, only one or some might be required. The post treatment steps may be performed sequentially and, in some cases, a given process could be perform more than one of these functions at once.

Post treatments used in various embodiments may depend on the outlet of the treated water. In some industrial settings, it might be desirable to reuse or reclaim the water. In other cases, the treated water might be returned to the environment. In other cases, the water might be allowed to evaporate or subject to incineration. The goal of the post treatment may be to condition the water to a specification for reuse or to meet regulatory or anticipated regulatory requirements. In other cases, some of the photochemically treated water may be treated with a membrane where the membrane reject (water that does not pass through the membrane) is circulated back into the photoreactor for further treatment.

The schematic shown in FIG. 26 presents the steps of a possible post treatment process. For some scenarios, it might be necessary to perform all the steps outlined. For many scenarios, only some of the post treatment steps would be required. In many embodiments, adjusting the pH to 6-8 will be required.

The sensitizer may be the most expensive reagent used in the photoreduction step, so it may be desirable to recover it or a material that could be readily converted to it. In the case where iodide is the sensitizer, one useful way to capture the iodide is to electrochemically reduce the iodide to iodine or a polyiodide in a specific electrode. To recover the iodide, the captured polyiodide can be reduced either electrochemically or chemically from the iodine-containing electrode. To accomplish this, it may be preferred to lower the pH to between 5-8 because iodine and polyiodide are susceptible to other reactions at high pH. Excess sulfite may potentially reduce the efficiency of the electrochemical process, therefore, a step involving destruction or removal of the sulfite prior to sensitizer recovery may also be preferred.

For some applications, recovering the iodide may not be economical, however, it still may be necessary to remove the iodide from the final treated water. In this case, adjusting the pH and then running the solution through one or more anion-exchange media could remove iodide, fluoride, sulfite or sulfate. A final polishing step, such as a GAC treatment, may then be used to lower iodide further, such as to meet the recycled water specification or regulatory requirements.

In some embodiments, all anionic constituents including sulfite, iodide, sulfate and fluoride could all be removed simultaneously by an anion exchange media with or without pH adjustment, such as a means of direct polishing of the photochemical treated water.

In some embodiments, the photochemical treated water may be removed by evaporative processes such as thermal vaporization or spray drying and the ions and their salts recovered by precipitation.

A potentially lower cost but more time-consuming post-treatment which may be used in various embodiments includes reducing the pH and then precipitation, such as of the fluoride and sulfate, by adding lime and allowing the solids to settle and clarify. The clarified water could then be passed through a final polishing step, such as running through a GAC bed or subjecting it to RO.

To put PFAS containing water back into the environment, these molecules would have to be removed to the appropriate level to comply with existing regulations for allowable concentration of some PFAS molecules. The photoreduction process may be successful at destroying most of the regulated PFAS, however, some small amounts of new PFAS and polyfluorinated may be generated. These molecules, currently, do not have specified limits. In the future, regulations could change to include these materials. One option to eliminate these materials that may be used in various embodiments is by doing a thermal oxidation process with persulfate as a post-treatment step. Alternatively, or additionally, an electrolytic process may be used to reduce or eliminate these materials. Another method which may be used in various embodiments, alternatively or additionally, is nucleophilic displacement of fluorine atom from these molecules to increase the amount of free fluoride and reduce the levels of PFAS and polyfluorinated species. These post treatments can result in near complete destruction of materials containing carbon-fluoride bonds.

Various UV-ARP processes may be performed at a high pH which is very caustic. Therefore, in some embodiments, the post-treatment solution may involve lowering the pH to 6-8. by addition of acid. In addition to making the solution less caustic, some of the subsequent post-treatment steps are more effective at lower pH.

Various UV-ARP processes use a sensitizer and a sacrificial electron donor. For example, the sensitizer for UV-ARP at 254 nm may be iodide and the sacrificial donor may be sulfite. At shorter wavelengths, for example 254 nm and 185 nm, sulfite can also be an effective sensitizer. Excess sulfite can be converted to sulfate by oxidation with air, oxygen or peroxides or electrochemical. UV light can be used to accelerate the oxidation of sulfite to sulfate. However, as discussed above, sulfite may be an impediment to recovering oxidized iodide species such as iodine, triiodide or other polyiodides. Therefore, it may be preferable in some embodiments to reduce or eliminate the sulfite prior to electrochemical recovery of iodide species from the post-treatment solution.

The sensitizer is often the costliest reagent in ARP. Iodide salts are often used as a sensitizer. Therefore, methods to recover the iodide such as those disclosed above are desirable.

Photosensitizer recovery. In some embodiments, photosensitizer such as iodide may be recovered by specific anion exchange membranes (AEMs) such as iodide-specific anion exchange membranes. In some embodiments, the AEM can be used in conjunction with an electrochemical cell, such as for iodine-iodide recycle and recovery.

In some embodiments, the photolysis condition may require a high pH, a sensitizer and one or more inorganic salts. The photochemical destruction of PFAS results in formation of the fluoride ion. In order to remediate the water and recover high value materials, further processes may be used. For example, in one embodiment in which iodide is used as a sensitizer, the iodide may be oxidized to iodine which is relatively insoluble in water. The iodine could be precipitated and recovered by filtration. However, in some cases, the iodine concentration is low enough that all the iodine is left in the solution. In this case, a precipitation process would be ineffective. Also, iodine is unstable at high pH. Therefore, some embodiments may further include lowering the pH to between 3-8, or 5-7, to more fully recover iodine. The pH could be lowered by use of a suitable acid, like a mineral acid.

Sulfite also reduces iodine back to iodide. To enable the recovery of photosensitizer species in various chemical forms such as iodide, separation processes to isolate the photosensitizer from other constituents such as sulfite may be employed. These processes include but are not limited to ion exchange membranes, ion selective resins, and size exclusion materials.

In some embodiments, such as embodiments in which sulfite is present, post processing may be performed to transform the sulfite to sulfate. For example, sulfite may be converted to sulfate by the addition of a suitable oxidant to the reaction solution after UV treatment. Examples of oxidants that may be used in various embodiments include air, oxygen, and/or hydrogen peroxide, for example. Oxygen or air may be preferred in some embodiments because they oxidize sulfite but do not oxidize iodide and therefore may be used in excess concentration. Other oxidants may alternatively or additionally be used in some embodiments to selectively remove sulfite. In some embodiments, the post photolysis process of transforming sulfite to sulfate may be accomplished or accelerated by the addition of catalysts or electrochemically.

In some embodiments, the iodine species may be recovered by adding a tetraalkylammonium salt, like tetraalkylammonium hydroxide which may directly precipitate the iodide ion and form a tetraalkylammonium iodide. In other embodiments, iodide could be removed through complexation with a quaternary ammonium or other cationic polymer. Furthermore, cationic polymer materials could be blended with an electrode coating. However, tetraalkyl ammonium cations may be prone to degradation in strong alkaline conditions due to their propensity towards Hofmann elimination among other degradation pathways. Therefore, the cationic unit may be chosen from those with proven stability. These include but are not limited to alkyltrimethylammonium cations where alkyl chain is longer than 4 carbons, cyclic ammonium cations, and imidazolium cations. Other cation centers that may be used include phosphonium, cobaltcenium, and ruthenium cations.

In some embodiments, after the sulfite is transformed and/or removed, the iodide may be oxidized to iodine which could precipitate. The precipitated iodine may then be collected. In some embodiments, the iodine may be precipitated electrochemically in a module that could be removed or and the iodine recovered and then reused. A similar sequence of reactions could be used to recover pseudo-halogens species that may be oxidized to a neutral, insoluble species in aqueous media.

Various embodiments include processes for allowing the efficient destruction of PFAS materials including the use of an electrochemical system to convert the reaction products of UV sensitizer back to the original sensitizer. For example, in some embodiments, iodine species may be recovered from the photolyzed solution by electrochemical means.

For example, some methods for recovering iodine species from aqueous solutions include electrochemical oxidation of an aqueous solution containing iodide to iodine species such as the triiodide ion or other polyiodide anion. Polyiodides are a class anion composed entirely of iodine atoms. The most common member is the triiodide ion, $I^-_3$. Other known polyiodides include $[I_4]^{2-}$, $[I_5]^-$, $[I_6]^{2-}$, $[I_7]^-$, $[I_8]^{2-}$, $[I_9]^-$, $[I_{10}]^{2-}$, $[I_{10}]^{4-}$, $[I_{11}]^{3-}$, $[I_{12}]^{2-}$, $[I_{13}]^{3-}$, $[I_{14}]^{4-}$, $[I_{16}]^{2-}$, $[I_{22}]^{4-}$, $[I_{26}]^{3-}$, $[I_{26}]^{4-}$, $[I_{28}]^{4-}$ and $[I_{29}]^{3-}$. All these may be formed from the interaction of the $I^-$, $I_2$, and $I^-_3$ building blocks.

In some embodiments, electrochemical oxidation of iodide may include the use of an iodophilic electrode, such as an electrode including 1) an iodophilic material which has an affinity for iodide, iodine, or a polyiodide, 2) an electrically conductive material and 3) a binder material to provide mechanical and chemical integrity to the electrode. The iodophilic material may be, for example, anion exchange resins, starches and/or inorganic or organometallic complexes that form iodide or polyiodide salts. The conducting material may be, for example, graphite, graphene, carbon nanotubes, and/or a conducting polymer or metal. The iodophilic material may be present in a range of about 20% to about 70% of the combined electrode material. The electrically conductive material may be present in a range of about 10% to about 60% of the combined electrode material. The binder material may be present in a range of about 20% to about 50% of the combined electrode materials. For example, in some embodiments, the iodophilic material may be about 35 to about 60%, the electrically conductive materials may be about 20% to about 50%, and the binder material may be about 30% to about 50% of the electrode material.

The iodophilic material may be used to concentrate and immobilize the iodine containing species present in the treated solution after UV-ARP during post-treatment. The conductive material may be used to allow for efficient transport of electrons throughout the electrode composition. The binder may be used to provide chemical and mechanical integrity to the electrode. In some embodiments, an electrically conducting material may be used which acts both as a conductor and a binder. In some embodiments, an iodophilic material may be used which is also conductive, such as conductive polymers like polyaniline. In such embodiments, the electrode may include only two components.

The binder material may provide the electrode with mechanical integrity, supporting the electrochemical processes. The iodophilic material and conductive material may be organic or inorganic powders, for example, and therefore the binder material such as a polymer may be needed to maintain the structural integrity of the electrode and make the electronic network continuous by binding the active material and conducting additives together. In addition to binder materials such as polymers holding the active materials and conductive agents together, it can also function to adhere the electrode to a current collector. In addition, the binder material may facilitate the formation of electron and ion circuits to guarantee the electrochemical reaction by providing good mechanical integrity to support electrical conductivity. The iodophilic electrode can be free-standing construction (electrically connected but without a current collector) or attached or bonded to a current collector.

Examples of binding materials which may be used include, but are not limited to, polyvinylidene fluoride (PVDF) and/or styrene butadiene rubber (SBR). PVDF synthesis may be usually done by emulsion polymerization or suspension polymerization process, for example, such as commercially available materials HSV900 (from Arkema) and 5130 (from Solvay), made by the two methods, respectively. Other binder materials that may be used include polytetrafluoroethylene (PTFE). Many of the binders used in lithium-ion battery cathode constructions could also be used for this application.

The purpose of the iodophilic material in the electrode, having a high affinity for iodine/iodide/polyiodide, is to interact with some or all of the iodide species in the treatment solution and immobilize them in or on the electrode. These iodine-containing species can exist in equilibrium with each other. Therefore, materials that can interact with iodine, iodide or a polyiodide species can be useful. For example, to capture iodide, an anion exchange membrane would be effective. Anion exchange membranes are crosslinked polymers that have low solubility. Iodine is a Lewis acid and, as such, it can form complexes with electron donors.

One method to reduce the solubility of various iodophilic polymers in aqueous media is by crosslinking the material. Many polymers can be used, for example, starches and other polymeric sugars are known to have a strong affinity for capturing the triiodide anion. Starches can be crosslinked with epichlorohydrin or 2,3-epoxypropyltrimethylammonium chloride. For example, in some embodiments, membrane materials might help capture iodide at the electrode where it can be reduced. In some embodiments, starches may be used which may be crosslinked to be water soluble.

Iodine forms strong iodine complexes with crosslinked cationic starch derivatives N-(2-hydroxyl) propyl-3-trimethylammonium chloride, and this material may be used as the iodophilic material in various embodiments. The starches could be crosslinked starched or could be crosslinked during the ball-milling or formulation step, for example. Other iodophilic materials which may be used in various embodiments include crosslinked polyvinyl alcohols (PVAs), chitosan, cellulose, some derivatives of cellulose, crosslinked copolymers of N-vinylpyrrolidone (N-VP) and/or copolymers of polyethylene gylcols. A water-soluble chitosan may be used, with the solubility determined or adjusted by the extent of deacetylation, the pH and the degree of crystallinity. One consideration for the selection of the iodophilic material is that it have limited solubility in the aqueous solution under the time frame of the electrodeposition process.

Other possible materials with high affinity for iodide that may be used as the iodophilic material in various embodiments include metallocene such as ferrocene and its substituted derivatives or polymeric ferrocenes such as polyvinylferrocenes, all of which form triiodide salts. In still other embodiments, the materials used in organic semiconductors, for example, polythiophenes, polypyrroles and polyanilines, which can form polyiodide salts, may also be used as iodophilic material. One iodophilic material may be used in the electrode or a combination of two or more materials, such as those listed herein, may be used in various embodiments.

Various systems and methods may use the iodophilic electrode for the recovery of iodine species from an aqueous solution where iodide serves as a photosensitizer in an advance reductive process (ARP) used to generate solvated electrons in the destruction of PFAS compounds. These systems and methods are particularly useful for cost reduction since the photosensitizer is often the most expensive reagent in UV-ARP processes. The use of an iodide recovery electrode allows the iodide to be isolated from the other photochemical biproducts and reused in additional subsequent cycles of UV-ARP with different batches of wastewater.

Unlike methods of iodine recovery used in other settings, such as through the use of a polyhalide ion exchange resin using bromine or chlorine, no such additional highly reactive species need to be added using the iodophilic electrode for iodine recovery as taught in this disclosure. Similarly, methods of halide recovery that use electrochemical oxidation cause the iodide to precipitate at the electrode where it is then collected as a solid. In contrast, the process disclosed herein using the iodophilic electrode result in the capture of iodide/triiodide/polyiodide in the volume of the electrode. The electrode may then be removed, and the iodide can be released by electrochemical reduction using a current in the opposite direction.

The systems and methods may be used with treated solution having any concentration of iodide, though lower concentrations may have lower rates of oxidation and therefore require longer electrolysis times. Iodide concentrations above 1 mM may be preferable. In some embodiments, an anion exchange material might be used to concentrate the iodide near the electrode. In some embodiments, the time to capture the iodine may be reduced by increasing the surface area of the electrode. Molecular Iodine, and therefore triiodide and polyiodide, form more readily in neutral and acidic pH, so an operating pH below pH 9 is preferable. Various embodiments include adding acid to treatment solutions having a basic pH to bring the pH of the treatment solution below about 9, such as between about 4 and about 9, or between about 5 and about 9. It is also useful if the iodide containing treated solution has adequate conductivity to minimize the over potentials needed for iodide oxidation. Therefore, in various embodiments, a total electrolyte concentration above about 10 mM is preferable, and higher concentration such as above about 100 mM may be useful to achieve rapid iodide oxidation. If the solution does not already contain adequate electrolyte concentrations, an electrolyte that does not interfere with the oxidation reaction may be added. For example, various embodiments may include adding suitable electrolyte such as Na2SO4, K2SO4, NaCl, and/or KCl, among others, among others, to increase the conductivity before iodide recovery using the iodophilic electrode.

When preparing the treated solution for iodide recovery, it may not be necessary to adjust the pH for iodine stability, as iodide is stable in all pHs. However, the pH may impact the chemical stability of the electrode, depending upon the composition of the electrode. While many of the conductive materials and the binder materials used in the electrode may have good chemical stability, the iodophilic material used in the electrode may be sensitive to pH, and therefore pH may need to be adjusted depending upon the choice of the iodophilic material and the pH of the treated solution. In some embodiments, the iodophilic electrode may be used in treated solutions having a near neutral pH, such as a pH from about 6 to about 8, to provide good chemical stability. The treated solution may be adjusted through the addition of an acid or base to achieve this pH range prior to post-treatment using the iodophilic electrode.

In various embodiments, to avoid competition from water oxidation and water reduction, the iodophilic electrode may be operated in a voltage range in which water oxidation or water reduction are not present. For example, in a solution having a pH of about 7, a voltage range of about −1.0 to about 1.2 V vs Ag/AgCl is appropriate and may be used in various embodiments. When the solution has a higher pH, the voltage range used may shift by −0.059 V with each one point increase in pH value. When the solution has a lower pH, the voltage range used may shift by +0.059 V with each one point decrease in pH value.

The electrode may be used in either a galvanostatic or potentiostatic condition, for example. In methods and systems using a galvanostatic operation, a constant current is applied to the electrode. A range of 0.1 to 10 mA/cm$^2$ may be for oxidation and −0.1 to −10 mA/cm$^2$ may be for reduction, to balance speed and efficiency, though lower or higher ranges could alternatively be used. The reaction may continue until the total charge passed is sufficient to substantially or to fully load/unload the electrode and then may be stopped, for example. Alternatively, the reaction may continue until the voltage reaches a cut off limit that is set before beginning the reaction, such as in order to avoid performing water oxidation or reduction, and then may be stopped, for example. In potentiostatic operation a constant potential may be applied to the electrode. A potential may be chosen that is sufficient to oxidize iodide to triiodide/polyiodide without inducing water oxidation for the anode and a potential may be chosen that will be sufficient to reduce triiodide/polyiodide to iodide without inducing water reduction for the cathode, as described above.

The above electrode may be part of an electrochemical device. The electrochemical device may include an anode chamber that contains iodide, such as iodide in a post UV-ARP treated solution, and a cathode chamber that does not contain iodide separated by a cation exchange membrane. In the anode chamber an oxidizing current is applied to the electrode described and the iodide is oxidized to triiodide/polyiodide which is immobilized in the electrode. In the cathode chamber a cathodic current is applied to the iodide capture electrode that has been loaded with triiodide/polyiodide causing the triiodide/polyiodide to be reduced to iodide that is then released into solution.

Figure 27:
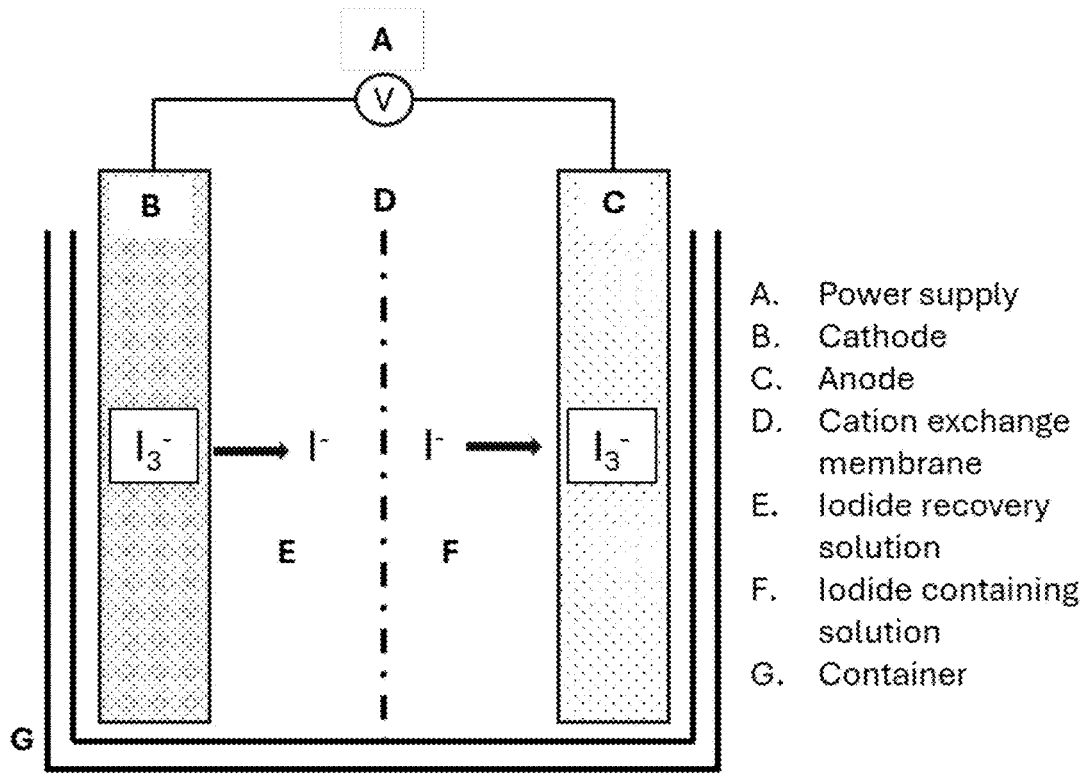
FIG. 27 is an example of an electrolytic cell for iodide recovery.

Various embodiments of the cell include a two-electrode system in which an unloaded iodide capture electrode is used as the anode and a loaded iodide capture electrode is used as the cathode. An example of an electrolytic system that may be used for iodine recovery is shown in FIG. 27. This example includes a two-electrode system in which an iodide recovery electrode is used for both the cathode and the anode. In this system an iodide recovery electrode that has previously been loaded with triiodide/polyiodide is used as the cathode, and an iodide recovery electrode that is empty is used as the anode, for example. The cathode is placed in an iodide recovery solution that does not initially contain iodide at the start of the electrolysis. The anode is placed in an iodide containing solution. A current is applied to the electrodes from an external power supply such that triiodide/polyiodide is reduced to iodide at the cathode, and iodide is oxidized to triiodide/polyiodide at the anode. During electrolysis the concentration of iodide in the cathode chamber increases as it is released from the cathode, and the concentration of iodide in the anode chamber decreases as it is stored in the anode in the form of triiodide/polyiodide. When the reaction is complete, electrode B will be depleted of triiodide/polyiodide and will be placed into a new iodide containing solution where it will act as an anode, and electrode C will be fully loaded with triiodide/polyiodide and will be placed into a new iodide recovery solution where it will act as a cathode. In this way, there is recovery of iodide from an iodide containing solution.

Various embodiments of the cell also include a three-electrode system in which an iodide recovery electrode is used as the working electrode (WE), a stable metal (e.g. Pt, Ir, Ti, etc.) is used as the counter electrode (CE), and Ag/AgCl, is used as the reference electrode (RE), though other materials such as a calomel electrode or Hg/HgO electrode could alternatively be used. In this system the iodide recovery electrode is first used as an anode in an iodide containing solution, such as a treated solution after UV-ARP, by applying a controlled voltage between the WE and RE to oxidize iodide to triiodide/polyiodide. The CE and the RE may both be in water, and the CE will perform water reduction to balance the current flow. When the iodide recovery electrode is loaded with triiodide/polyiodide the WE chamber is switched to an iodide free solution. The WE is then used as a cathode to reduce the immobilized triiodide/polyiodide to iodide that is released into the recovery solution. The CE will perform water oxidation. Sacrificial oxidants (e.g. $O_2$) and reductants (e.g. sulfite) may be added to the CE chamber to lower the required cell voltage.

In some embodiments, an alternative iodophilic electrode may be used. The electrodes may be a double-layered cathode having a first layer formed of a conductive material and a second layer in contact with the first layer, where the second layer adsorbs a triiodide ion and where the triiodide ion is reduced at the interface between the first and second layers. The first layer may include a two-dimensional carbon structure such as graphene or a carbon fiber cloth. The second layer may contain at least a polypyrrole, a polyaniline or poly(3.4-ethylenedioxythiophene), for example.

Various embodiments include an iodide/iodine/triiodide/polyiodide specific electrode, and methods and devices for capturing and/or recycling iodide/iodine/triiodide/polyiodide from aqueous media, such as capturing and recycling iodide/iodine/triiodide/polyiodide back into a photochemical reactor for repeated use in UV-ARP.

In some embodiments, photosensitizer such as iodine may be recovered from the post treatment solution by flowing the solution through a module containing an anion exchange media that would complex with the iodide. This step may be done after pH adjustment and sulfite removal as discussed above, for example. The pH may be lowered through the addition of acid to a range of about 4 to about 9, or about 5 to about 9, for example.

In other embodiments, an anion exchange membrane can be used to recover photosensitizer such as iodide. For example, strong anion exchange resins, containing quaternary ammonium groups, may be used in various embodiments. Two types of anion exchange membranes which may be used include Type I resins which contain trialkyl ammonium chloride or hydroxide and Type II resins which contain dialkyl 2-hydroxyethyl ammonium chloride or hydroxide. Some examples of these resins are Dowex 1X2, Dowex 1X4, Dowex 1X8, Dowex 2X8-100, 2X8-200 and 2X8-400. Weak anion exchange resins, which lack exchangeable ions, may also be used.

In some embodiments, the membrane may be negatively charged, such as a polyamide-TFC membrane In other embodiments, a reverse osmosis system may be used to recover photosensitizer such as iodide, including a membrane and a high pressure pump. The reverse osmosis system may not be ion-selective. However, the reverse osmosis may allow some very small species to pass through, while retaining most PFAS, iodide, sulfite, sulfate, etc, such as based on size and electrostatic repulsion.

In some embodiments, including but not limited to embodiments using reverse osmosis or ion exchange membranes, greater than about 50%, or greater than about 80%, or greater than about 90%, or greater than about 95%, or about 99% or more of the photosensitizer such as iodide may be retained in the reject of concentrate.

For example, in some embodiments, after photolysis, the pH may be adjusted and then the solution may be passed through or allowed to flow through the membrane, such as the ion exchange membrane, whereupon the photosensitizer such as iodide is bound to the membrane. The photosensitizer such as iodide may then be released by flowing a solution of a salt such as a sodium chloride solution through the membrane to release the photosensitizer back into solution. The solution containing the released photosensitizer may be added to the UV-ARP reactor for reuse. Therefore, the salt should be chosen such that it will not interfere with subsequent photochemical reactions. Suitable salts which may be used in various embodiments include sodium chloride, sodium bromide, potassium chloride, potassium bromide, sodium hydroxide, potassium hydroxide, and/or sodium sulfate, for example. Unsuitable salts would contain species that have a high affinity for solvated electrons or strong absorption in the UV between 180 nm and 400 nm. Sodium nitrite and sodium nitrate are two examples of unsuitable salts to displace the iodide because nitrates absorb in the UV and also react with solvated electrons.

The concentration of the salt solution may be chosen such that it is high enough to release the photosensitizer such as iodide back into the solution. The affinity for various anions for both type I and type II resins are known. The necessary concentration of salt can be determined by relating the relative affinity for photosensitizer such as iodide and the salt of choice, and then comparing it to the photosensitizer concentration of the starting solution.

In other embodiments, after photolysis, the treated solution may be passed through a membrane such as a reverse osmosis membrane system and the photosensitizer such as iodide may be concentrated in the membrane reject. The membrane reject may be used directly for recycling of photosensitizer such as iodide for further photolysis reactions.

In various embodiments, after the photosensitizer absorbs a UV photon, a solvated electron and oxidized sensitizer are produced and the solvated electron reacts with the PFAS. The oxidized photosensitizer may be regenerated by reaction with a sacrificial reductant, for example, a sulfite ion, or by electrochemical reduction. As a result, the concentration of the photosensitizer at the end of the photochemical treatment may be close to the concentration at the beginning of the process. Often the photosensitizer is the most expensive reagent. Owing to the high cost of the photosensitizer, it may be advantageous to either recycle or recover this reagent, according to various embodiments. When iodide is used as the photosensitizer, it may be particularly beneficial to recover and recycle the iodide as described herein due to the cost of the iodide. Therefore, although iodide is often used as an example in this disclosure, other photosensitizers may also be recovered and recycled according to the various embodiments described herein. For example, photosensitizers including but not limited to bromide, ferricyanide, anionic metal complexes, anionic metal clusters and Zintl compounds, may be recovered from the UV treatment solution and recycled for additional UV treatment processes.

Figure 28:
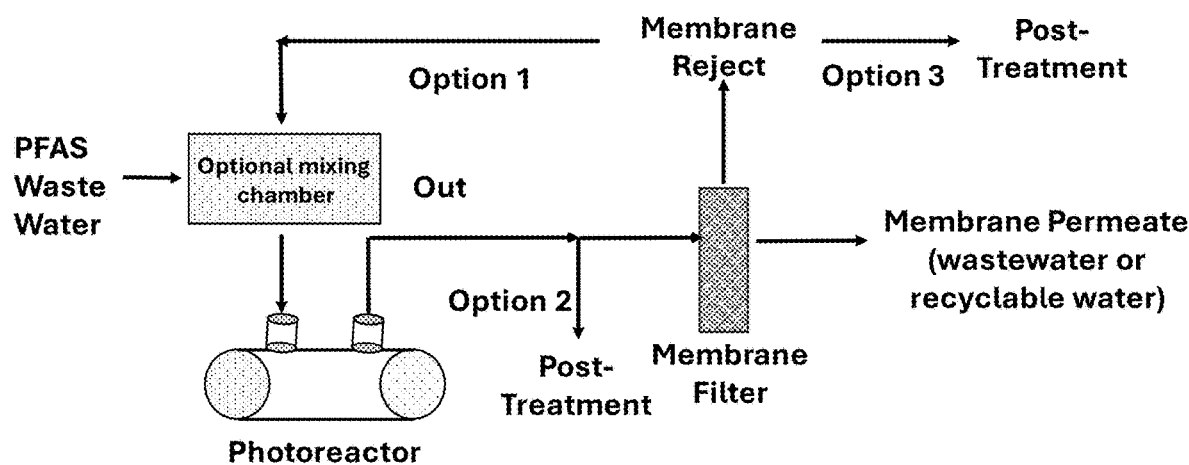
FIG. 28 is a schematic example of post-treatment filtration for iodine recovery and recycling.

FIG. 28 shows an example of a system with various options for recycling or recovering the photosensitizer from photochemically treated liquid using a membrane system. As shown in FIG. 28, there are various options for recovering and recycling photosensitizer, and a system may include only one option or more than one option, and different options may be employed at different times by the same system. Although the photosensitizer is recovered using a membrane filter in this example, the same system could be used for other alternative methods of sensitizer recovery. When the recycled photosensitizer is obtained using membranes, it may be described as membrane reject. Furthermore, the filtration or other recovery process may result in additional substances being recovered, such as sulfite, sulfate, base and PFAS, along with the recycled photosensitizer.

The system as shown in FIG. 28 includes a photoreactor and a mixing chamber, with PFAS containing wastewater mixing with recycled photosensitizer in the mixing chamber before entry of the mixed wastewater into the photoreactor. Alternatively, the recycled photosensitizer could be recycled directly into the photoreactor and mixed with the PFAS containing wastewater within the photoreactor. In other alternatives, the recycled photosensitizer may be added to the wastewater as it flows through pipes before entry into the photoreactor, such as by injection of the recycled photosensitizer into the influent stream, and sufficient mixing may occur within the influent pipes. The recycled sensitizer may be added to the influent continuously or intermittently.

In addition to recycled photosensitizer, additional photosensitizer and/or other reagents may be added to the influent PFAS wastewater, such as from a fresh supply tank of material which was not recycled or recovered. These may include additional photosensitizer such as iodide, sulfite, and/or base. Like the recycled photosensitizer, the additional photosensitizer and reagents may be added to the wastewater before photolysis, in the mixing chamber, within the influent pipes, or within the photoreactor, for example. The additional photosensitizer and reagents may be added at the same time and/or in the same place as the recycled photosensitizer or may be added separately. For example, additional base may be added to the wastewater and/or the recycled membrane reject to increase the pH of the wastewater to above 10, or to above 12, if the concentration of base in the membrane reject is insufficient and the pH is too low. Likewise, additional sulfite may be added to the wastewater and/or the recycled membrane reject if the remaining sulfite levels in the membrane reject are too low following consumption during photolysis.

The need for additional photosensitizer or reagents, and the amount needed, may depend upon the amount of photosensitizer and other reagents recovered and recycled back to the fresh wastewater influent and the composition and concentration of PFAS in the wastewater. For example, when a membrane or other system recovers higher levels of photosensitizer and reagents from the effluent, such as nearly all of the photosensitizer and reagents, less additional photosensitizer and reagents may need to be added to the influent to supplement the recycled photosensitizer and reagents. The amount of recovery may depend upon the type of membrane and other membrane details, the operating conditions employed, and other factors. When PFAS levels are higher, more reagent such as sulfite may be consumed, resulting in lower levels being recycled and higher amounts needing to be added. The number of times the photosensitizer and other reagents have been recycled may also affect the amount of additional photosensitizer and reagents which may be needed, as well as the amount of additional photosensitizer and reagents added during the previous cycles of recycling. For example, the repeated addition of photosensitizer and reagent during multiple periods of recycling could result in increased levels of photosensitizer as well as reaction products such as sulfate and base in the recycled material such as the membrane reject.

In the example shown as option 1 in FIG. 28, PFAS containing water is mixed with membrane reject including recovered photosensitizer in the optional mixing chamber. After the mixed wastewater is treated in the photoreactor, the treated wastewater effluent passes through a membrane filter. The membrane permeate includes treated wastewater which may be further treated such as with post treatment steps or may be discharged, for example. Because the photosensitizer may generally be an ion, the photosensitizer is retained in the membrane reject. The membrane reject including the photosensitizer is then reused by being recycled back for combination with more PFAS containing wastewater in the optional mixing chamber (or elsewhere). In this scenario, after an initial startup period, little or no additional photosensitizer may be required in the PFAS containing wastewater because the photosensitizer from the membrane reject may be mixed with the incoming PFAS-containing wastewater prior to entering the photoreactor. The photosensitizer and/or other reagents may be used for photoreduction, recovered, and reused with additional new PFAS containing wastewater repeatedly, for multiple cycles through the photoreactor. The recovery and reuse of the photosensitizer may occur continuously, as may the photolysis in the photoreactor, with wastewater and recycled reagents continuously flowing through the system.

Addition of the membrane reject may eventually increase the amount of ionic material in the photoreactor. At some point, the added ionic content may interfere with the photochemical efficiency. For example, as sulfite is consumed during the photolytic reaction and sulfate is produced, the amount of recovered sulfite in the membrane reject alone may be insufficient for the photolysis reaction and additional sulfite may be added to the new wastewater influent along with the recycled sulfite and iodide. As this process is repeated continuously, the addition of sulfite and recovery of sulfate may lead to increased sulfate levels in the membrane reject.

When the levels of ionic materials in the membrane reject reach an undesirable level, such as a level at which they interfere with the photolysis reaction, or significantly interfere with the photolysis reaction, a periodic purge step may be used. One example of a purge is shown in FIG. 28 as option 2. In this example, the photochemically treated volume may be purged from the recycling process before passing through the membrane. The purged volume may include at least the volume contained within one recycling circuit to fully purge the system, for example, though larger or smaller volume purges could alternatively be used. Because the purged volume has been photochemically treated, it may be discharged or may be subjected to various post-treatments processes, for example.

Alternatively, the post-treatment volume may be purged as shown in Option 3 of FIG. 28. In this example, the post-treatment volume is filtered and then the membrane reject is purged. As in option 1, the membrane reject may be discharged or subjected to various post-treatments processes. Potential non-limiting post-treatments for any of these options could include further concentration steps, pH adjustment, iodide recovery, sulfite oxidation, sulfate removal or fluorine removal, for example.

Although many membranes could be used, reverse osmosis (RO) membranes or nanofiltration membranes may be used in various embodiments and may be preferred membranes. In some embodiments, reverse osmosis membranes may be a preferred membrane.

The determination of when to purge the reactor may be empirical. Alternatively, the system may include sensors for detecting the pH and concentrations of ionic species like iodide, sulfite, and/or sulfate. These sensors may be located in the photoreactor or external to the photoreactor to optimize the system for efficient photo-destruction of PFAS. These sensors could be configured with control systems to automate the process, such that a purge is triggered when the pH or ion levels (photosensitizer, sulfite and/or sulfate) exceed a predetermined threshold. Following such a purge, larger amounts of new (not recycled) photosensitizer and reagent may be added to the wastewater influent as an induction stage until sufficient processing has occurred for the recycled sensitizer and reagents to be recycled back and added to the wastewater influent, at which point the new photosensitizer and reagent may be added to the wastewater influent at lower levels or no addition may be needed.

In various embodiments, all of the PFAS is destroyed, or all detectable PFAS is destroyed in the photoreactor. However, if any PFAS remains in the wastewater, it may also be captured by the membrane and recycled through the photoreactor one or more times with the recycled photosensitizer in the membrane reject. This repeated cycling of the PFAS may ultimately lead to the destruction of the PFAS, including PFAS species which are more difficult to destroy. Furthermore, if the concentration of PFAS in the wastewater is significantly increased by recycling of the membrane reject, additional sensitizer and/or other reagents may be added to the wastewater in addition to the membrane reject to adjust for this increase.

PFAS removal. In some embodiments, such as where further reductions in the PFASs concentration are required before release of the treated wastewater, for example, to meet the stringent EPA limits, the photochemically treated liquid may undergo one or more further post-treatment processes to further reduce the level of PFAS. Some processes that may be used for further reduction of PFAS concentration are Granular Activated Carbon (GAC), ion exchange, or reverse osmosis. In some embodiments, the ion exchange resin may be regenerable. However, the efficiency of these processes can be affected by the presence of high concentration of ions.

Even after the acidification step, the oxidation step and the iodine recovery step, there may still high concentrations of ionic species of fluoride and possibly sulfate in the solution. Therefore, in some embodiments, the reduction of concentration of these sulfate and fluoride may be accomplished with addition of an alkaline earth-containing species to the post-treatment solution. These may include some calcium or barium compounds, for example. In some embodiments, such as for economic reasons, the use of calcium compound may be preferred. Suitable calcium compounds include calcium hydroxide and/or calcium oxide. The alkaline earth ion may react with fluoride and sulfate to form minerals like fluorite ($CaF_2$) and $CaSO_4$ (anhydrite) or $CaSO_4 \cdot 2H_2O$ (gypsum) which may precipitate from the solution. In some embodiments, fluoride may be precipitated, such as by the addition of hydroxyapatite to form fluorapatite. The solids may then be allowed to settle and the supernatant may be further subjected to further processes to remove residual PFASs. Alternatively, in some embodiments, the solids may be removed by electrocoagulation whereby the surface charge of suspended particles is changed and results in the agglomeration and precipitation of the solid matter.

In some embodiments, unreacted target PFAS molecules could be treated via adsorption processes and reintroduced to the photolysis process.

After the majority of PFASs are destroyed, some partially fluorinated organic species could still be present. Non-limiting examples of partially fluorinated organic species include the following: fluoroacetic acid, difluoroacetic acid, 2-fluoropropanoic acid, 2,2-difluoropropanoic acid, 1,2-difluoropropanoic acid, 1,1-difluoropropanoic acid, 2,2,2-trifluoropropanoic acid, 1,2,2-trifluoropropanoic acid, 1,1,2-trifluoropropanoic acid, 1,2,2,2-tetrafluoropropanoic acid, 1,1,2,2-tetrafluoropropanoic acid, various isomers of monofluoro-substituted butanoic acid, difluoro-substituted butanoic acid, trifluoro-substituted butanoic acid, tetrafluoro-substituted propanoic acids, pentafluoro-substituted butanoic acids, hexafluoro-substituted butanoic acids and other partially fluoro-substituted pentanoic, hexanoic, heptanoic and octanoic acids. These partially fluorinated organic species contribute to some percentage of the remaining fluorine-containing species measured by total organofluorine analysis. Some of the partially fluorinated species are considered toxic. Therefore, the wastewater may be further treated after photolysis to reduce or remove any remaining partially fluorinated species. In some embodiments, extended UV irradiation and ARP will reduce the concentration of these species sufficiently, however, this may result in inefficient use of the photochemical reactor. Therefore, post treatment of the reaction mixture is another means to reduce or eliminate these species. In various embodiments, the post treatment may include one or more of various oxidative processes. Potential oxidants that may be used include various organic peroxides (e.g. and inorganic oxides (e.g. peroxide, peroxydisulfate, bleach) and various transition metal oxidants (e.g. permanganate), for example. In some embodiments, these post-treatment reactions can be accelerated by the use of UV irradiation and/or heat.

The partially fluorinated organic species may be more susceptible to substitution reactions than PFASs. Therefore, various nucleophilic species can be added to destroy some of these species. Nucleophiles containing nitrogen or sulfur can displace fluorine in various embodiments. Some non-limiting examples of sulfur nucleophiles that may be used in various embodiments include hydrogen sulfide and its salts, thiols (RSH), thiolate anions (RS$^-$), anions of thiolcarboxylic acids (RC(O)—S$^-$), where R is an alkyl, aryl, arylalkyl group; and anions of xanthates (RO—C(S)—S$^-$) and dithiocarbamates (R$_2$N—C(S)—S$^-$), where R is an alkyl, aryl, arylalkyl group; and thiosulfate ($S_2O_3^{2-}$), for example. Some non-limiting examples of nitrogen containing nucleophiles that may be used in various embodiments include ammonia, amines, hydroxylamine, hydrazine, carbazide, phenylhydrazine, semicarbazide, amide. For example, these may be mixed with the post-treatment solution and the mixture may then be heated, such as in an autoclave.

The effluent from post-treatment may still contain contaminant species that cannot be discharged into the environment without treatment. Therefore, after photoreduction, the effluent may be collected to test for PFAS. Depending upon the requirements and the amount of remaining PFAS, the effluent may undergo further treatment. For example, additional treatment may be used to remove the leftover contaminant down to the permitted level. For example, in some embodiments, the systems and methods may include additional systems downstream of UV photoreduction systems, such as the use of one or more of Reverse Osmosis (RO), Nanofiltration (NF), Microfiltration (MF), Ultrafiltration (UF), ion exchange resins (IXR), granular activated carbon adsorption (GAC), either individually or a combination. Additionally, these techniques may be utilized in an optimization scenario whereby the destruction process is operated for a shorter time-period and the effluent residuals are concentrated using a post-treatment listed above. Such a configuration would enable shorter residence times and higher throughout in the destruction process while still maintaining process effluent goals.

The photochemical destruction of PFAS is a sequential process. There are several mechanisms that are thought to be responsible for PFAS destruction. One mechanism is the replacement of fluorine atoms on the PFAS with hydrogen atoms. Another mechanism involves the loss of the carboxylate or sulfonate head groups and subsequent hydrolysis and chain shortening. The resulting new molecules (progeny) also contain fluorine carbon bonds. These progeny molecules can undergo further photochemical destruction. Some of these molecules are also PFAS molecules and, although not necessarily regulated, their removal may be desirable or necessary in the future.

One measure of the effectiveness of destruction of PFAS molecules and their progeny is the amount of fluoride ion generated. The defluorination percentage deF % can be defined as ratio of fluoride ions generated to the total number of fluorine atoms in the all the PFAS molecule(s). For example, in some photochemical process, the total defluorination levels might be ~70-90%. This means that up to 10-30% of the fluorine is still bound to carbon in such cases.

A post treatment to remove these molecules could involve several processes. For example, in some embodiments, persulfate may be used to oxidize the partially defluorinated PFAS molecules, which may result in complete or nearly complete defluorination. For example, the oxidation process described above for pretreatment may also be used for post treatment. Alternatively, or additionally, in some embodiments, electrochemical oxidation may be used to increase total defluorination levels.

In some cases, it might be beneficial to reduce the photolysis time, allowing for less time in the photoreactor, and rely on the post treatment defluorination step to achieve high levels of PFAS destruction. For example, the combination of decreased photolysis time in combination with post treatment defluorination may be more efficient and/or may achieve higher levels of PFAS destruction than photolysis alone, which may require extended periods of treatment using a more energy intensive process to achieve the same results.

Fluoride ion reduction. As discussed previously in this disclosure, the fluoride ion is a product of the photochemical destruction of PFAS. Although some concentration of fluoride ion is acceptable in water, high concentrations of fluoride ion are not desirable. High fluoride concentrations can cause health issues and interfere with the capacity of ion exchange resins or granulated activated carbon beds.

Lowering the concentration of fluoride ion after the photochemical (such as directly or reductively) decomposition of PFAS can be accomplished by several means. Some effective methods which may be used in various embodiments include reverse osmosis and column adsorption using a material such as a special bone char carbon filter media or activated alumina. The bone char which may be used in various embodiments, also called Brimac, is prepared by cleaning and drying animal bones followed by heating the bones to ~700° C. in the absence of oxygen. The resulting material is porous with a high surface area and is composed of calcium phosphate, calcium carbonate and carbon.

In various embodiments, fluoride may be removed from the post-treatment solution by precipitation. One example of a precipitation process that may be used in various embodiments includes the following steps: 1) addition of a material that results in the mineralization of the fluoride into fluorite $CaF_2$ or fluorapatite $Ca_5(PO_4)_3F$, to fluoride containing solution 2) allowing the mineral to settle, and 3) removing the clear solution from the settle solids. Alternatively, the precipitated fluoride mineral may be removed by filtration. In other embodiments, alum may be added to the fluoride containing solution to coagulate fluoride. In this way, the fluorite may be locked up as an insoluble solid mineral. In still other embodiments, magnesium hydroxide can be added to the fluoride solution to absorb the fluoride. The resulting fluorite is non-toxic and may optionally be used in other processes such as to make PFAS.

In some embodiments, fluoride may be precipitated as fluorite $(CaF_2)$ or fluorapatite $Ca_5(PO_4)_3F$. For example, the following materials may be added to the fluoride containing solution to cause precipitations: 1) hydrated lime $Ca(OH)_2$, 2) a combination of water-soluble calcium salts and phosphates to make a hydroxyapatite, 3) hydroxyapatite powder, or 4) bone char powder.

The fluoride treatments disclosed herein may be used alone or in combination with these or other methods.

Sulfate precipitation. ARP often uses sulfite. Some of the sulfite is converted to sulfate during the photochemical process. Following photolysis, the remaining sulfite can be converted to sulfate as discussed above. For example, many of the treatments that are used to precipitate fluoride as fluorite may also be used to cause the sulfate to precipitate as gypsum $(CaSO_4 \cdot 2H_2O)$ in various embodiments. In some embodiments, fluorite and gypsum may be precipitated together. Gypsum can be removed concurrently with fluorite by the same procedures listed above for fluorite or fluorapatite removal. Removing these minerals will reduce the free ion concentration in the solution.

Polishing Step

The effluent from post-treatment may still contain contaminant species that cannot be discharged into the environment without treatment, even after one or more post treatment steps are applied. The polishing step may act as a final treatment unit that may be useful or needed to remove any leftover contaminant, such as reducing it to below a desired threshold like a permitted level. Several methods of polishing treatment may be included downstream of one or more post-treatment units and may include processes such as Reverse Osmosis (RO), ion exchange resins (IXR), granular activated carbon beds, and/or membrane filtration. A polishing step may be considered a separate step or may be considered an additional post-treatment step. In some embodiments, polishing may be performed after photolysis and post-treatment steps to bring the levels of one or more components in the wastewater below a limit, such as a regulatory limit required for release of the treated wastewater into the environment.

Figure 29:
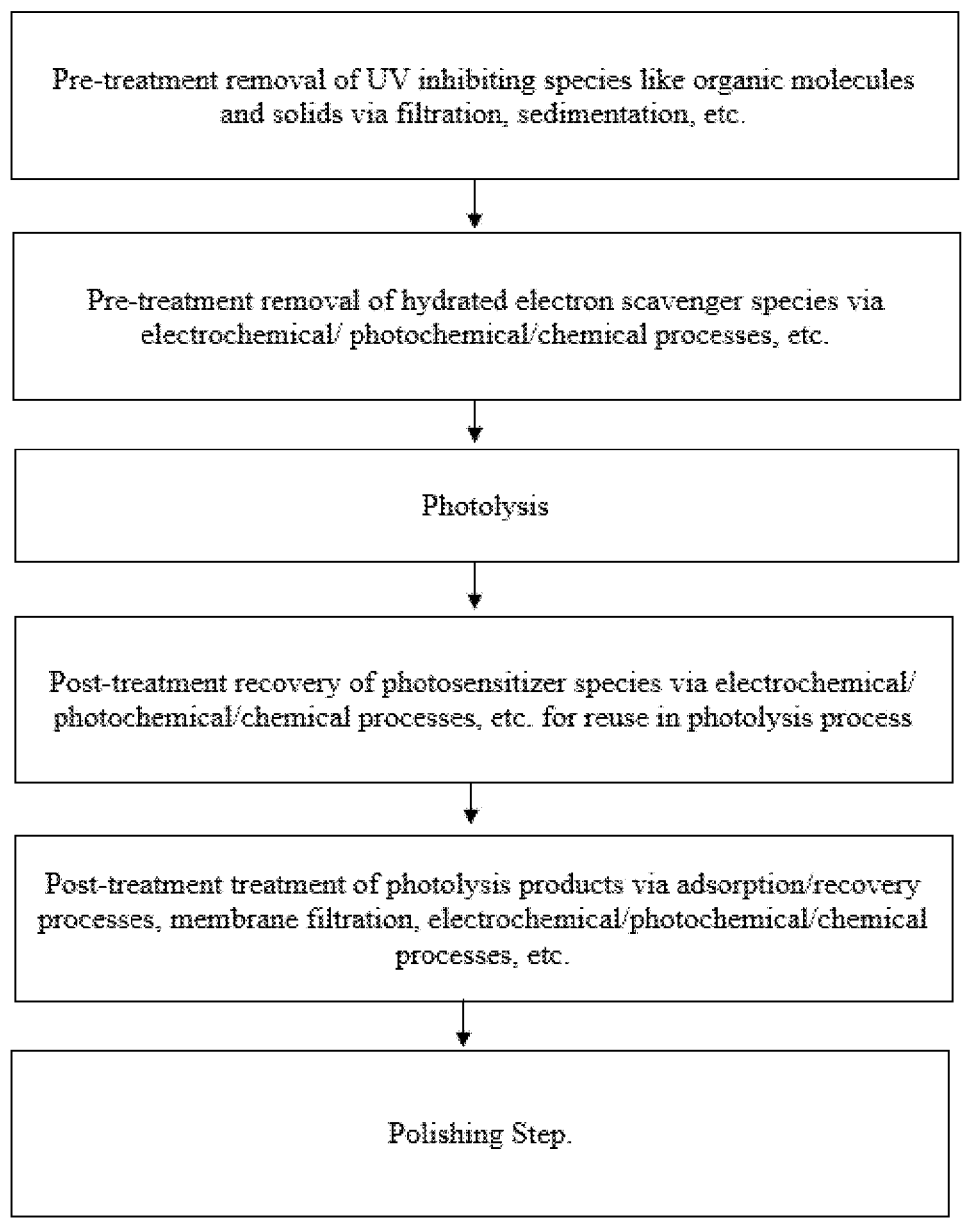
FIG. 29 is a representation of an example of a method of PFAS treatment, ending with post-treatment step followed by a polishing step.

An example of a method of PFAS treatment, ending with a post-treatment step followed by a polishing step is shown in the diagram presented as FIG. 29.

Embodiments of the present disclosure include, but are not limited to the following:

Various embodiments include ultraviolent photolysis reactors equipped with one or more electrochemical systems capable of reducing photochemical byproducts. For example, in some embodiments, the photoreactor for PFAS destruction includes an ultraviolet light source configured to deliver light at 222 nm and a reactor vessel configured to contain an aqueous solution including PFAS, wherein the light source is positioned to direct light onto the solution contained in the reactor vessel. The light source may be a krypton/chloride excimer lamp. There may optionally be a second or more light sources identical to or different from the first light source, wherein the second light or more light sources are also positioned to direct light onto the contents of the reactor vessel.

Various embodiments include methods of PFAS destruction including irradiating an aqueous solution comprising PFAS and sulfite with light at 222 nm. The solution may further include a base sufficient to adjust the pH of the aqueous solution to about 10 or more. The solution may further include a halide salt, such as a bromide or iodine salt. The solution may further include a carbonate.

Various embodiments include photochemical processes and devices that reduce photochemical sensitizer used in UV photolysis byproducts back to the original sensitizer. The sensitizer may be a halogen or pseudohalogen, such as bromide or iodide. The photochemical processes and devices may also include electrochemical elements. For example, combination photochemical and electrochemical devices may include a UV light source and an electrochemical device capable of reducing photochemical byproducts of a sensitizer species back to the original sensitizer.

Various embodiments include processes for PFAS destruction using an advanced reductive process where the oxidized sensitizer, generated by the interaction of the sensitizer and UV light and ejection of a solvated electron, is reduced back to the sensitizer by an electrochemical process. In some such embodiments, the sensitizer is sulfite and/or iodide. Various embodiments include methods for capturing and/or recycling iodine including adjusting the pH to be between about 3 and about 8 or between about 5 and 7, removing any reducing species that can reduce iodine to iodide, and electrochemically oxidizing the iodide ion to iodine, such as in a module that allows for easy recovery of iodine. Various embodiments include methods, and electrodes for performing the methods, which may include recovering iodine-containing species by electrochemical oxidation of iodide at an electrode including an iodophilic material and an electrically conductive material, such as an electrically conductive polymer, in which the oxidized iodide species is contained within the electrode and optionally also a binder material. The iodophilic material may be starch, chitosan, and/or carboxycellulose, for example, or from cellulose, starch, cationic polymer, polyvinyl alcohol, polyethylene glycol, polypropylene glycol, polyvinylpyrrolidone, polypyrrole, polyaniline, or poly(3,4-ethylenedioxythiophene) a metallocene, a metallocene-containing polymer, and/or a cationic metal complex. In some embodiments, the iodophilic material is a cationic polymer. The conductive material may graphite, graphene, carbon nanotubes, conductive polymers, and/or doped semiconductors and metals, for example. The binder may be polyvinylidenefluoride (PVDF), polyfluoroethylene (PTFE), and/or styrenebutadiene rubber, polyamide. A voltage of 0.3 V vs Ag/AgClxx.x Volts or greater may be applied to the electrode such that iodide is oxidized to iodine or a polyiodide. The method may optionally further include removing the electrode from the solution and then reducing the iodine/polyiodide containing electrode to release iodide into a solution. The electrode may be bonded to a current collector.

Various embodiments include methods for recovering and/or capturing and recycling iodide from a photochemical advance reduction process (ARP) solution including 1) adjust the pH of the photochemical ARP solution to between 4 and 8, 2) allow the ARP solution to contact an ion exchange media, 3) remove the ion exchange media from the ARP solution and allow the iodide containing ion exchange media to come in contact with an aqueous salt solution to remove the iodide bound to the ion exchange media. The ion exchange media may be a strong cation exchange media. For example, the ion exchange media may contain a quaternary ammonium group. The aqueous salt solution may be a mixture of water and sodium chloride, sodium bromide, potassium chloride, potassium bromide, sodium hydroxide, potassium hydroxide, sodium sulfate, potassium sulfate.

Various embodiments include method for capturing iodine including adjusting the pH to be between about 3 and about 8 or between about 5 and about 7, removing reducing species and electrochemically oxidizing the iodide to iodine, such as in a module that allows for recovery of iodine. For example, embodiments include methods for capturing iodine including adjusting the pH to be between about 3 and about 8, or between about 5 and about 7, selective removal of reducing species, such as by addition of an oxidant and electrochemical oxidation of the iodide ion to iodine. In other examples, various embodiments include methods for capturing iodide including adjusting the pH to be between 5 and 7, selective removal of reducing species by addition of an oxidant and either flowing the solution through an ion exchange media to selectively remove the iodide or addition of a tetraalkylammonium salt to precipitate the tetraalkylammonium iodide or both.

Various embodiments include combination photochemical and electrochemical devices and processes including a UV light source, a boron-doped diamond coated substrate capable of generating solvated electrons upon UV irradiation, and an electrode in close proximity to the diamond coated substrate such that solvated are generated into a high pH region such that the solvated electrons have sufficient lifetimes to react with PFASs and/or other halogenated pollutants. For example, the device for PFAS destruction may include a UV lamp, an electrochemical cell, where a first reducing electrode is a boron-doped diamond which serves as a reducing electrode in a compartment and a second oxidizing electrode is in a separate compartment, the two compartments are separated by ion-exchange membrane. Various embodiments also include processes for PFAS destruction using an advanced reductive process where the source of solvated electron is a boron-doped diamond which serves as the reducing electrode in an electrochemical system whereby hydrogen gas and high pH are generated during the photolysis.

Other embodiments include photochemical and electrochemical devices including a UV light source and an electrochemical device capable of reducing photochemical byproducts of a sensitizer species back to the original sensitizer and/or capable of reducing an aromatic species to its corresponding radical anion, said radical anion capable of absorbing UV radiation to produce a highly reactive excited state capable of directly reacting with a PFAS or other halogenated pollutant and/or capable of reacting with another molecule to produce a species that can react with a PFAS, such as capable or reacting with carbon dioxide to produce the carbon dioxide radical anion.

Various embodiments include processes for efficient destruction of PFAS molecules including one or more of following steps: 1) Identification of the major chemical composition of the waste stream, 2) remediation of the waste stream so as to remove chemicals that might interfere with the efficiency of the photochemical process, 3) addition of reagents to the treated waste stream to enable the UV photolytic process including the following materials: i) at least one reagent that can absorb UV photons and upon UV excitation produce chemically active species capable of reacting with one or more PFASs, ii) one or more bases to raise the pH of the solution to greater than 10, iii) optionally, one or more chemicals that can react with UV-produced photolysis product or convert them back to the original sensitizer or scavenge molecular oxygen, 4) optionally, applying a voltage at a cathode, such that UV-produced products of the sensitizer are reduced back to the original sensitizer, 4) optionally, addition of added base or basic solution to compensate for pH changes caused by the electrochemical or photolytic processes, 5) optionally, purging with an inert gas, 5) optionally, a means to file adequate flow, 6) optionally, the separation of the sensitizer or sensitizer byproducts to be removed from the reaction mixture, 7) optionally, addition of acid to the UV photolyzed mixture to lower the pH to between 4 and 8, 8) optionally, a module for capturing either the sensitizer or reduced products of the sensitizer.

Various embodiments include UV photochemical reactors including 1) one or more UV sources, 2) one or more electrochemical systems, 3) optionally, one or more systems for dispensing bases or acids to modify the pH of the reaction mixture, 4) optionally, a system for dispensing an inert gas, 5) a device to provide flow, 6) optionally, a module for collecting and or recycling either the sensitizer or reduced form of the sensitizer.

Other embodiments include processes and devices for PFAS destruction in which 185 nm UV light is used to irradiate an aqueous solution containing PFAS while a voltage is applied to an electrode in proximity to the volume being irradiated such that hydrogen gas is generated in this volume. For example, in some embodiments the device for destroying PFAS includes a 185 nm lamps and an electrochemical device capable of generating hydrogen at one electrode. In some embodiments, following photolysis, the hydrogen is reacted with oxygen. The device optionally also includes a system for removing free fluoride ions after photolysis.

Various embodiments include photoreactors for PFAS destruction including an ultraviolet light source configured to deliver light at 222 nm and a reactor vessel configured to contain an aqueous solution, wherein the light source is positioned to direct light onto the contents of the reactor vessel. The light source may be a krypton/chloride excimer lamp, for example. The photoreactor of claim 5 further comprising a second or more light sources, identical to or different from the first light source, in which the second or more light sources are also positioned to direct light onto the contents of the reactor vessel. Various embodiments include methods of PFAS destruction including irradiating an aqueous solution comprising PFAS and sulfite with light at 222 nm, such as with the photoreactor described above. The method may include adding a base sufficient to bring the aqueous solution to be treated to a pH of about 10 or more. It may further include addition a halide salt such as bromide or iodine to the aqueous solution to be treated. In some embodiments including bromide, the bromide is present in the aqueous solution at a concentration capable of destroying PFAS at a faster rate than an iodine salt would under the same conditions in which the bromide salt is present at a same or a lower concentration. The aqueous solution may further include carbonate. These devices and methods may be capable of destroying greater than 90%, or greater than 95%, or greater than 99% of the PFAS in the solution.

Various embodiments include processes for PFAS destruction using an advanced reductive process in which the oxidized sensitizer, such as sulfite or iodide, generated by the interaction of the sensitizer and UV light and ejection of a solvated electron, is reduced back to the sensitizer by an electrochemical process.

Various embodiments include devices for PFAS destruction including the following: a UV lamp, and an electrochemical cell that can regenerate the sensitizers following photolysis.

Various embodiments include processes for PFAS destruction using an advanced reductive process where the source of solvated electron is a boron-doped diamond which serves as the reducing electrode in an electrochemical system whereby hydrogen gas and high pH are generated during the photolysis. The source of solvated electron may be a boron-doped diamond which serves as the reducing electrode in an electrochemical system whereby hydrogen gas and high pH are generated during the photolysis. A device which may be used for this process of PFAS destruction may include a UV lamp and an electrochemical cell in which a first reducing electrode is a boron-doped diamond in a compartment and a second oxidizing electrode is in a separate compartment, the two compartments are separated by ion-exchange membrane.

Various embodiments include methods of treating wastewater for PFAS reduction including the following steps: a. mixing the wastewater with a persulfate and an acid or a base to increase or decrease the pH; b. subjecting the wastewater including the persulfate and acid or base to an increased temperature and pressure for a period of time sufficient for thermal oxidation; and c. subjecting the thermally oxidized wastewater to photoreduction. The photoreduction may be performed using UV radiation at 222 nm and/or 254 nm. The increased temperature may be about 100 to about 140 degrees Celsius and the increased pressure comprises about 1 bar to about 5 bar, for example. Step b may be performed for about 15 to about 120 minutes, for example. Some embodiments may include further comprising diluting the wastewater after thermal oxidation and prior to photoreduction by about 1 to about 10 fold, or about 2 to about 5 fold. Some embodiments may further include, after step b and before step c, mixing the wastewater from step b with a persulfate a second time and an acid or a base to increase or decrease the pH, and then subjecting the wastewater including the second addition of persulfate and acid or base to an increased temperature and pressure for a period of time sufficient for thermal oxidation.

Various embodiments include methods of treating wastewater for PFAS reduction including mixing the wastewater with a persulfate and a base to decrease the pH, subjecting the wastewater including the base to ozone treatment at a sufficient rate and for a period of time sufficient for ozone oxidation, and subjecting the ozone oxidized wastewater to photoreduction. The photoreduction may be performed using UV radiation at 222 nm and/or 254 nm, for example.

Various embodiments include methods of treating wastewater for PFAS reduction including subjecting the wastewater to a pretreatment comprising thermal oxidation or ozone oxidation, mixing the oxidized wastewater with a photosensitizer comprising a sulfite, a halide salt and a base, and subjecting the ozone oxidized wastewater to photoreduction at 222 nm and/or 254 nm. After oxidizing the wastewater and prior to photoreduction, the methods may also include diluting the wastewater 1 to 10 fold, or about 1 to 5 fold.

EXAMPLES

Example 1

Electrochemical Nitrate Reduction. A solution of 500 ppm nitrate (8.06 mM NaNO$_3$), 0.5 M Na$_2$SO$_4$, 20 mM NaOH, 10 uM PFHxS was prepared in DI water. 100 mL were added to both the working electrode chamber and counter electrode chamber of a divided electrochemical cell. A Nafion 212 cation exchange membrane was used to divide the cell. Porous iron was used as the working electrode, platinum mesh was used as the counter electrode, and Ag/AgCl was used as the reference electrode. A flow of argon gas was used to purge the working electrode chamber. A voltage of −1.3 V vs Ag/AgCl was applied to the working electrode for 15 hours to reduce the nitrate. The solution collected from the working electrode chamber and an identical nitrate containing solution were both subjected to a photo-reduction process to defluorinate the PFHxS. The defluorination percentage was measured throughout the photo-destruction process and the results are shown in FIG. 30.

Figure 30:
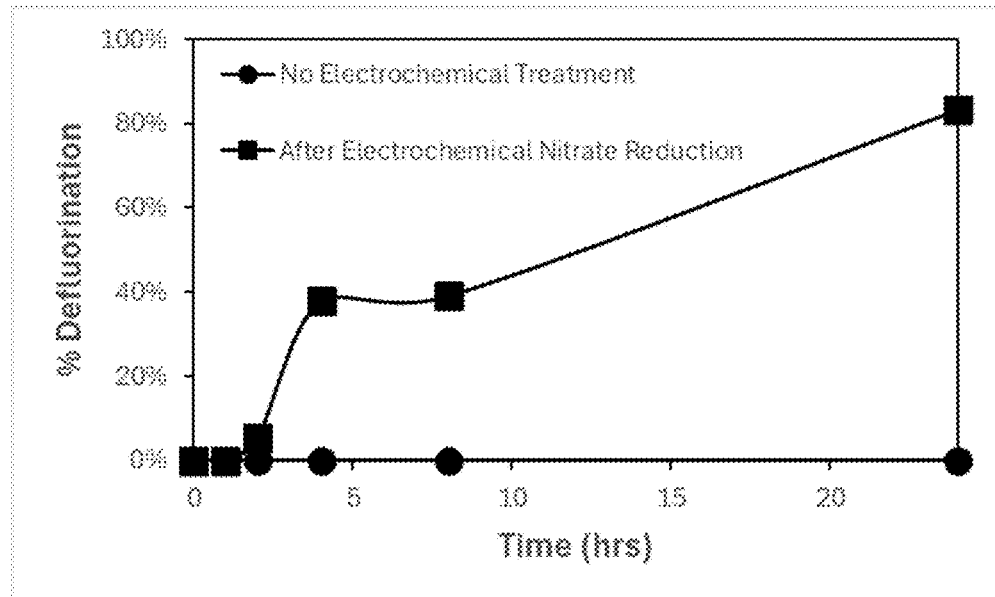
FIG. 30 is a graph of total PFAS defluorination percentage with and without an electrochemical nitrate reduction pre step in an example.

FIG. 30 shows the graph of total percent PFAS defluorination by UV254 photo-reduction process of 500 ppm Nitrate solutions with and without an electrochemical nitrate reduction pre-treatment. The photo-reduction reaction conditions were 10 mM Na2SO3, 2 mM KI. These results demonstrate that photo-reduction is unable to defluorinate PFHxS in the presence of 500 ppm nitrate, with 0% defluorination after 24 hrs. However, an electrochemical reduction of nitrate coupled with photo-reduction was shown to be effective at defluorinating PFHxS, achieving >80% defluorination after 24 hrs.

Example 2

Nitrate Nano-filtration. The PFOA degradation kinetics in the membrane reject solution generated from Nano-Filtration (NF) were compared to Reverse Osmosis (RO) in the presence of nitrate (NO$_3^-$).

In the membrane filtration process, 10 L of a synthetic aqueous solution containing 100 ppm of NO$_3^-$ and ~5 μM of PFOA was transferred into the feed tank of the Benchtop Cross Flow Filtration System (Sterlitech Corporation, Auburn, WA, USA). The benchtop system was equipped with 1812 Element Housing and an RO (SKU: 1180001, TriSep, Vacaville, CA, USA) or NFX (SKU: 1180057, Synder, Vacaville, CA, USA) spiral wound membrane element. The neutral synthetic solution was filtered through the RO or NFX systems at a flow rate of ~2 gal/min and operation pressure of ~250 psi. The membrane permeate was separately collected. 100 mL samples of the membrane reject were collected at the specified concentration factors in both membrane systems. The NO$_3^-$ concentration in membrane reject was quantified with UV-Vis Absorbance Spectroscopy (UV-2600i, Shimadzu, Kyoto, Japan) using its characteristic 301 nm peak and photoreduction at UV254 nm.

For the photoreduction of membrane rejects, 100 mL samples from the RO and NFX membrane reject solutions were transferred into separate 100 mL quartz vials (QP062, Aireka Scientific Co., Ltd, HK). 0.12604 g (10 mM) of Na$_2$SO$_3$ and 0.332 g (2 mM) of KI were mixed into each 100 mL solution. 0.2 mL (20 mM) of 10 M NaOH was then added to each solution to increase the alkalinity to pH 12. Finally, the solutions were photolyzed in a UV254 nm photoreactor (LZC-ORG type, Luzchem Research Inc. Canada). This photoreactor is equipped with eight 10-watt UV254 nm lamps. During photoreduction, 3 mL samples were taken from quartz vials at the specified timepoints for defluorination quantification.

Defluorination percentage (DeF %) was used to evaluate and compare the destruction performance of the treatment process. During the treatment process, free fluoride (F$^-$) concentrations were determined by an ion-selective electrode (ISE, Fisher brand accumet solid-state) connected to a Thermo Scientific Orion Versa Star Pro meter. Then, the defluorination percentage (DeF %) was calculated based on the measured F by the following equation, equation 1:

$$Def\% = \frac{F_t^- - F_0^-}{TOF}$$

in which $F_1^-$ and $F_0^-$ are F$^-$ concentration at time t and initial F concentration, respectively. TOF is the total organic fluorine present. The initial F$^-$ concentration was 0, and the TOF was calculated based on the initial PFOA concentration and the number of C—F bonds per molecule. A higher DeF % value indicates better efficacy and favorable conversion efficiency of the treatment process in terms of converting organic fluorine into free F$^-$.

Figure 31:
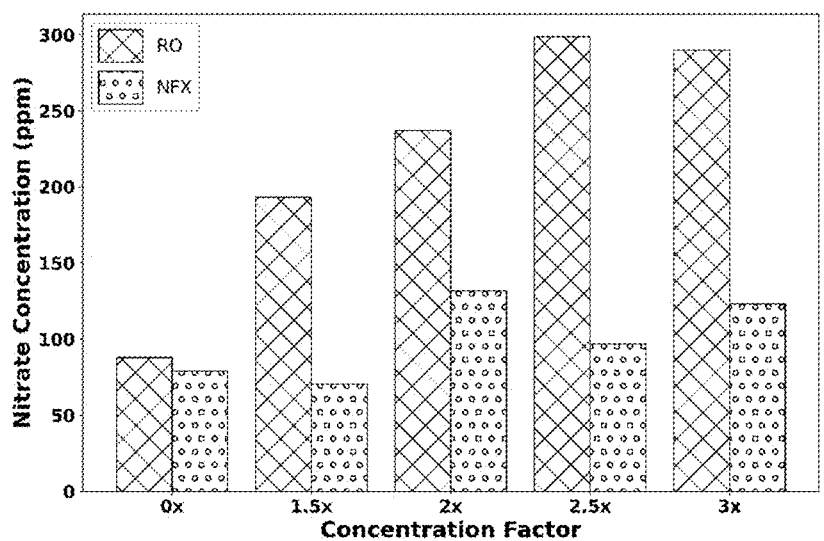
FIG. 31 is a graph of $NO_3^-$ concentration (ppm) dependence on the concentration factors of the membrane reject with RO and NFX in an example.
Figure 32:
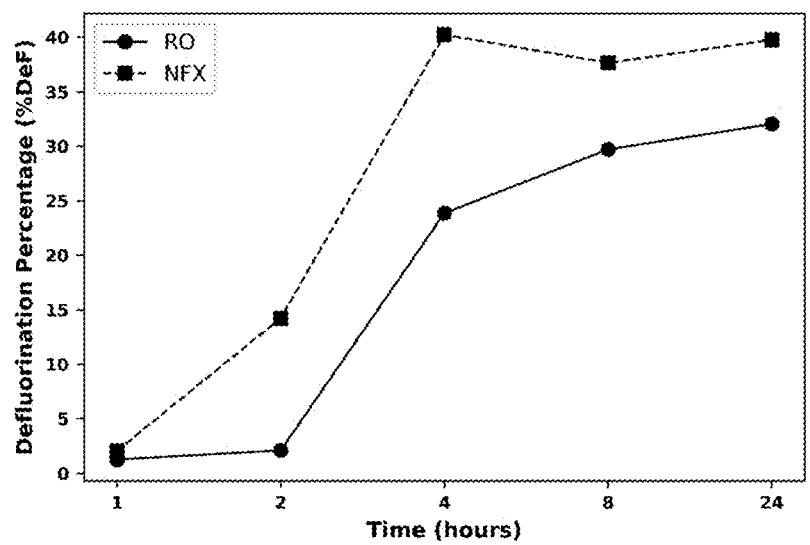
FIG. 32 is a graph comparing defluorination percentage from photoreduction of membrane reject from RO and NFX membranes.

The results are shown in the graphs presented in FIGS. 31 and 32. FIG. 31 shows the NO$_3^-$ concentration (ppm) dependence on the concentration factors of the membrane reject with RO and NFX. The operation condition were aqueous solutions with 100 ppm of NO$_3^-$ and ~5 uM of PFOA.

From FIG. 31, it can be seen that NFX was more effective than RO at allowing NO$_3^-$ to pass through the membrane, leaving less NO$_3^-$ in the membrane reject. Approximately twice the concentration of NO$_3^-$ was present in the RO reject compared to the NFX reject. At a concentration factor of 3×, the NO$_3^-$ concentration in the RO reject solution was 290 ppm, which is higher than that in the NFX reject solution (e.g., 123 ppm).

FIG. 32 shows a comparison of defluorination percentage (DeF %) from photoreduction of membrane reject from the RO and NFX membranes. The membrane reject was generated from initial aqueous solution with 100 ppm of NO$_3^-$ and ~5 uM of PFOA with 10 mM Na$_2$SO$_3$, 2 mM KI, and at pH 12.

From FIG. 32, it can be seen that the membrane reject from NFX demonstrated superior degradation kinetics than that from RO. After photolyzing for 4 hours, the NFX generated sample demonstrated 40.2% defluorination while the RO generated sample demonstrated only 23.9%. It is believed that this difference is due to the relatively higher concentration of NO$_3^-$ in the RO sample which scavenges the UV-generated hydrated electrons, reducing their availability and inhibiting the degradation kinetics.

RO and NF both demonstrated excellent rejection of long-chain PFAS, but NF rejected less NO$_3^-$. This is believed to be due to NF having a larger pore size and less electrostatic repulsion than RO. As a result, there is less NO$_3^-$ remaining in the membrane reject to scavenge the hydrated electrons which are essential for promoting the defluorination reaction. While both methods were effective, nano-filtration pretreatment resulted in improved PFOA degradation kinetics compared to reverse osmosis in the presence of nitrate.

Example 3

Thermal oxidation pre-treatment. In this Example, as well as Examples 4-8 below, the wastewater used in the experiments was a foam fractionate (FF) from landfill leachate obtained from ALTRA SANEXEN. The PFAS concentrations were measured with the EPA 1633 method on a triple quadrupole mass spectrometer (LCMS-8060, Shimadzu Corporation, USA). The concentrations of all PFAS compounds listed in EPA (Environmental Protection Agency) 1633 method, which included 40 PFAS analytes, were measured.

About 10 mL of the wastewater was put into a glass pressure vessel and 0.4 g of potassium persulfate and 75 mL of 10 M sodium hydroxide was added. Thermal oxidation reaction conditions were, therefore, 150 mM potassium persulfate and 750 mM NaOH.

The addition of these reagents resulted in a cloudy solution. The tubes were sealed loosely, to alleviate significant pressure buildup during treatment, and placed in the pressure vessel. The pressure vessel containing the tubes was then heated to and maintained at 120° C. for 120 minutes. After thermal oxidation, the solution was clear and nearly colorless.

Figure 33:
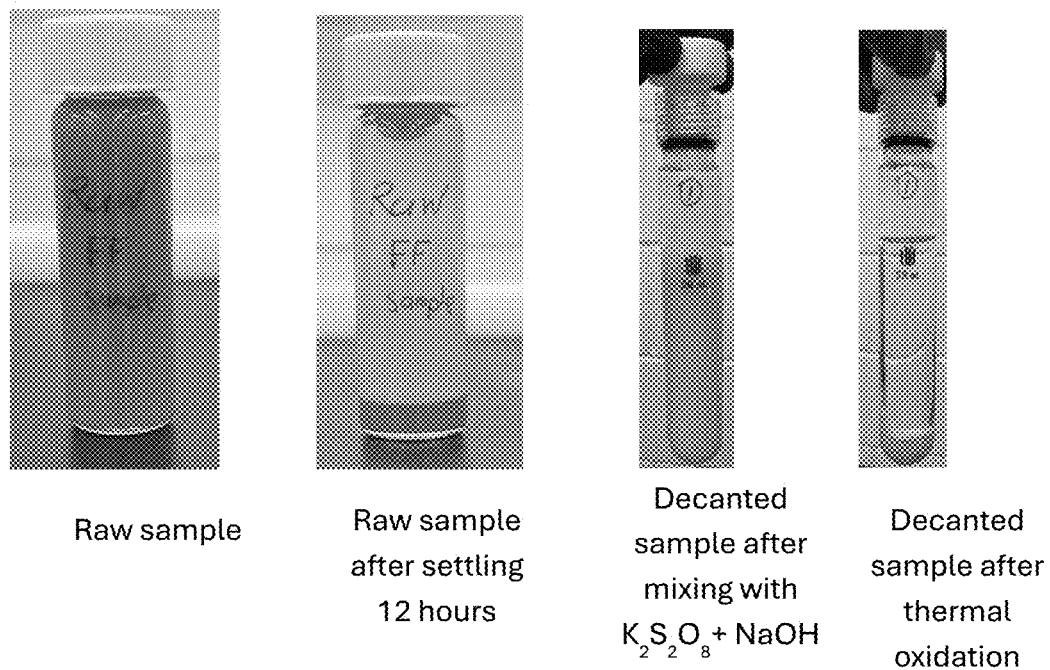
FIG. 33 is a series of photographs of wastewater during PFAS destruction including thermal oxidation pretreatment.

FIG. 33 shows photographs of the raw sample, the sample after settling, the decanted sample after mixing with potassium persulfate and sodium hydroxide, and the sample thermal oxidation. These photos show that the original sample that was very cloudy was clear after thermal oxidation treatment.

Figure 34:
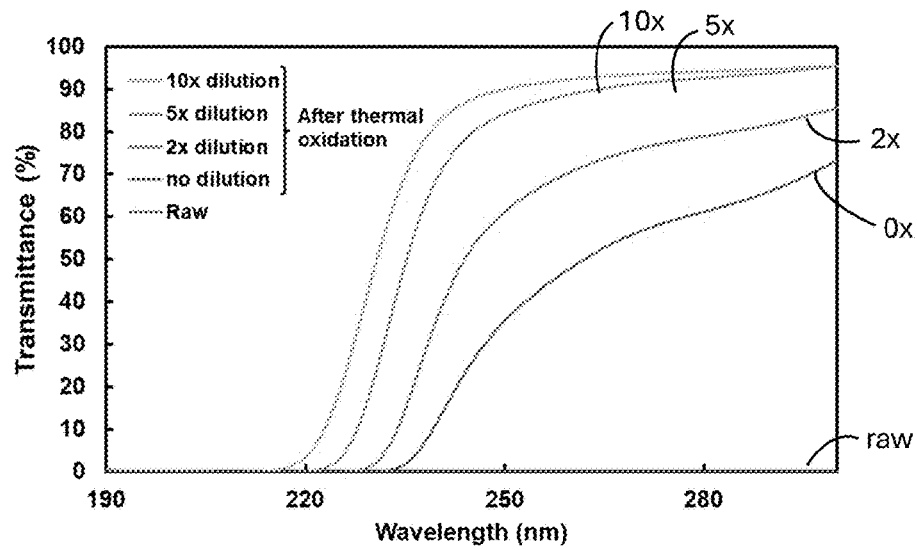
FIG. 34 is a graph of the UV transmittance spectrum of raw wastewater and wastewater after thermal oxidation and dilution at 0, 2, 5, and 10-fold dilution with DI water.

Portions of the thermally oxidized sample were further diluted by a factor of 10, 5, or 2 with deionized water (DI water). The UV transmission spectra of the raw sample and the undiluted and diluted samples after thermal oxidation are shown in FIG. 34 Table 1, below, lists the UV transmittance (%) at 222 nm and 254 nm of the raw wastewater and after thermal oxidation with 0, 2, 5, and 10-fold dilution with DI water.

TABLE 1

| Wavelength (nm) | UV Transmittance (%) | | | | |
|---|---|---|---|---|---|
| | Raw Wastewater | After thermal oxidation-dilution at 0, 2, 5, and 10-fold dilution with DI water | | | |
| | | 0x | 2x | 5x | 10x |
| 222 | 0.0 | 0.0 | 0.0 | 0.5 | 7.6 |
| 254 | 0.0 | 41.2 | 65.7 | 86.6 | 91.3 |

Next, the samples were treated in the photoreactors. Samples of 100 mL of the diluted and undiluted samples were then transferred into 100 mL quartz vials (QP062, Aireka Scientific Co., Ltd, HK). The 100 mL solution was then mixed with 126 mg sodium sulfite (10 mM sodium sulfite), 33 mg potassium iodide (2 mM potassium iodide), and 40~80 mg NaOH (10~20 mM NaOH) as needed to bring the pH to approximately 12. The samples were separately photolyzed in a 254 nm photoreactor and a 222 nm photoreactor. The 254 nm photoreactor (LZC-ORG type, Luzchem Research Inc. Canada) was equipped with eight 10-watt UV254 lamps. The 222 nm photoreactor was equipped with two 100-watt UV222 lamps. A detailed description of the 222 nm photoreactor is provided in the applicant's other application U.S. Pat. App. No. 63/591,040 entitled SYSTEMS AND METHODS OF PFAS DESTRUCTION filed Oct. 17, 2023.

Figure 35:
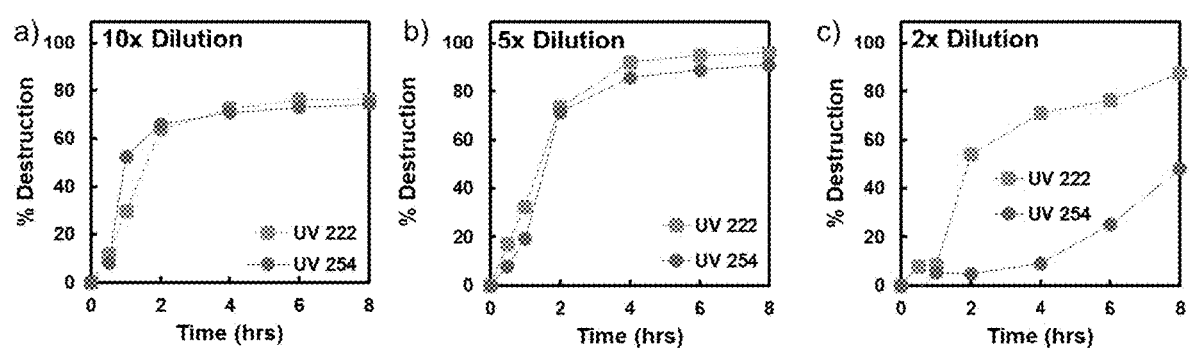
FIG. 35 is a series of graphs of total PFAS destruction percentage by UV222 and UV254 photoreduction process at varied dilution factors of wastewater samples pretreated by the thermal oxidation.

During the photoreaction, 3 mL samples were taken from quartz vials for PFAS quantification at appropriate time intervals. The PFAS concentration was measured with the EPA 1633 method on a triple quadrupole mass spectrometer (LCMS-8060, Shimadzu Corporation, USA). The total PFAS destruction percentage (Destruction %) is calculated based on the sum of PFAS detected in the EPA 1633 method and the results are shown in FIG. 35. FIG. 35 presents graphs of total PFAS destruction percentage by UV222 and UV254 photoreduction process at varied dilution factors of the thermal oxidation samples.

From FIG. 35, UV222 generally demonstrates better destruction performance than UV254 for the thermal oxidized samples. For example, for the 2-fold diluted samples, the 2 h total PFAS destruction percentage achieved 53.9% in the UV222 photoreduction process, while <5% destruction was observed in UV254 photoreduction after the 2 h reaction. After 8 h reactions, the total PFAS destruction percentage increased to 87.5% in the UV222 photoreduction process compared to 48.2% in UV254 photoreduction. The lower dilution degree in the UV222 photoreduction process is highly beneficial for wastewater treatment applications because it requires less solvent and minimizes waste production, making it more practical for large-scale applications.

Tables 2a and b and 3a and b below show the concentration of selected representative PFAS during photoreduction at UV222 and UV254, respectively, after thermal oxidation treatment of the wastewater samples and dilution by a factor of 2. Thermal oxidation reaction conditions, as described above, were 150 mM potassium persulfate and 750 mM NaOH, maintained at 120° C. for 2 hours. Photo-reduction reaction conditions, as described above, were 10 mM $Na_2SO_3$, 2 mM KI, pH 12. The results showed that UV222 and UV254 photoreduction is generally effective for a wide range of PFAS compounds such as perfluoroalkyl carboxylates and perfluoroalkyl sulfonates. Notably, UV222 is more effective at the destruction of perfluoroalkyl sulfonates (e.g., PFBS). For instance, for PFBS at an initial concentration of 168-172 µg/L, the remaining PFBS concentration is undetected after 8 h UV222 photoreduction while there is 152 µg/L PFBS remaining in UV254 photoreduction.

TABLE 2a

| Light source | Time (h) | PFAS Concentration (µg/L) | | | | |
|---|---|---|---|---|---|---|
| | | PFBA | PFPeA | PFHxA | PFHpA | PFOA |
| 222 nm | 0 | 70 | 24 | 339 | 47 | 113 |
| | 0.5 | 74 | 22 | 308 | 45 | 113 |
| | 1 | 71 | 21 | 287 | 43 | 106 |
| | 2 | 22 | 7 | 60 | 10 | 18 |
| | 4 | 11 | 4 | 13 | 6 | 2 |
| | 6 | 11 | 4 | 7 | 2 | 2 |
| | 8 | 10 | 4 | 7 | 3 | 2 |

TABLE 2b

| Light source | Time (h) | PFAS Concentration (μg/L) | | | | |
|---|---|---|---|---|---|---|
| | | PFBS | PFPeS | T-PFHxS | T-PFOS | 6:2 FTS |
| 222 | 0 | 168 | 10 | 38 | 3 | 36 |
| | 0.5 | 156 | 12 | 42 | 6 | 34 |
| | 1 | 158 | 11 | 36 | 4 | 38 |
| | 2 | 141 | 9 | 17 | 0 | 30 |
| | 4 | 123 | 5 | 12 | 0 | 18 |
| | 6 | 80 | 2 | 3 | 0 | 0 |
| | 8 | 0 | 0 | 2 | 0 | 0 |

TABLE 3a

| Light source | Time (h) | PFAS Concentration (μg/L) | | | | |
|---|---|---|---|---|---|---|
| | | PFBA | PFPeA | PFHxA | PFHpA | PFOA |
| 254 nm | 0 | 78 | 27 | 358 | 54 | 133 |
| | 0.5 | 56 | 25 | 347 | 52 | 129 |
| | 1 | 44 | 26 | 336 | 51 | 120 |
| | 2 | 55 | 27 | 328 | 51 | 119 |
| | 4 | 62 | 24 | 287 | 40 | 103 |
| | 6 | 47 | 18 | 186 | 27 | 70 |
| | 8 | 15 | 7 | 61 | 11 | 22 |

TABLE 3b

| Light source | Time (h) | PFAS Concentration (μg/L) | | | | |
|---|---|---|---|---|---|---|
| | | PFBS | PFPeS | T-PFHxS | T-PFOS | 6:2 FTS |
| 254 nm | 0 | 172 | 10 | 44 | 7 | 24 |
| | 0.5 | 168 | 10 | 43 | 5 | 40 |
| | 1 | 161 | 12 | 38 | 5 | 34 |
| | 2 | 163 | 10 | 37 | 1 | 35 |
| | 4 | 165 | 10 | 32 | 1 | 42 |
| | 6 | 162 | 11 | 32 | 1 | 81 |
| | 8 | 152 | 8 | 25 | 1 | 79 |

Example 4

Figure 36:
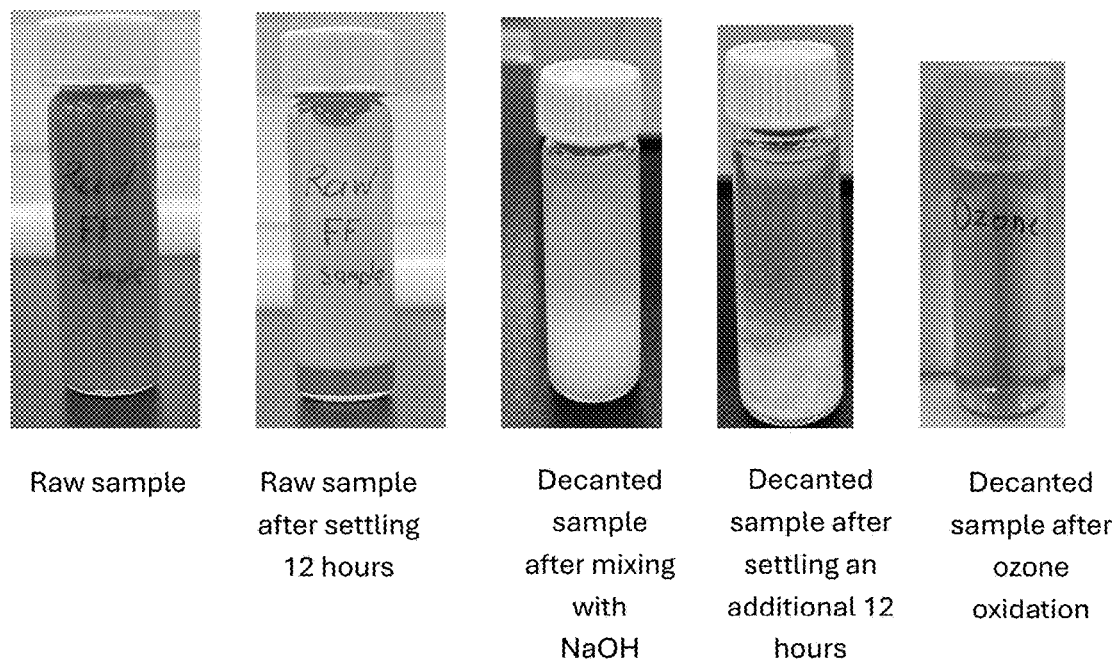
FIG. 36 is a series of photographs of wastewater during PFAS destruction including ozone oxidation pretreatment

Ozone oxidation pretreatment. In this example, the wastewater was pretreated with ozone oxidation. The same wastewater was used as in Example 3. The wastewater was allowed to settle for 12 hours. Then, a nearly clear liquid was decanted. Next, 1.2 g NaOH was added to 300 mL of the decanted liquid. The addition of NaOH resulted in a cloudy solution and the sample was allowed to settle for 12 hours. Then, 200 mL of the solution was treated with 1000 mg/h $O_3$ for 6 hours using a Portable Ozone Generator, 1000 mg/h Multipurpose Ozone Machine from Shenzhen VANSU Technology Co., Ltd, China. The resulting solution was clear and nearly colorless. Samples of the ozone-oxidized liquid were further diluted by a factor of 10, 5, and 2 with deionized water. The undiluted and diluted samples were analyzed for UV transmission. Photographs of the wastewater before treatment, after settling, after mixing with NaOH, after further setting, and after ozone treatment are shown in FIG. 36.

The UV transmission spectra of raw wastewater and the diluted samples after ozone oxidation are shown in FIG. 34 and data from these spectra are shown in Table 4, below. Table 4 lists the UV transmittance (%) at 254 nm for raw wastewater and the diluted sample after ozone oxidation.

TABLE 4

| Wavelength (nm) | UV Transmittance (%) | | | |
|---|---|---|---|---|
| | Raw Wastewater | After ozone oxidation-dilution at 2, 5, and 10-fold dilution with DI water | | |
| | | 2x | 5x | 10x |
| 254 | 0.0 | 0.1 | 2.4 | 14.5 |

These results show that ozone oxidation improved the UV transmittance of wastewater. However, the transmittance results from ozone oxidation were lower than that from thermal oxidation.

Figure 37:
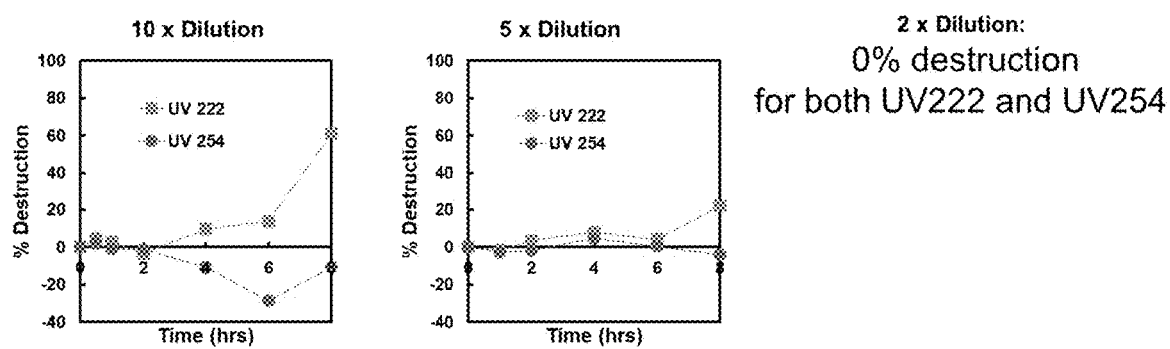
FIG. 37 is a pair of graphs of the percentage of total PFAS destruction by the UV222 and UV254 photoreduction processes verses time at 10× and 5× dilution factors for the ozone oxidation samples.

Next, the samples were treated in the photoreactors and PFAS levels were measured using the same process as described in Example 3, above. In brief, 100 mL ozone oxidation-dilution samples were mixed with 126 mg sodium sulfite (10 mM sodium sulfite), 33 mg potassium iodide (2 mM potassium iodide), and 40~80 mg NaOH (10~20 mM NaOH) as needed to bring the pH to approximately 12, and photolyzed in either a 254 nm photoreactor or a 222 nm photoreactor. PFAS levels were measured and the total PFAS destruction percentage (Destruction %) results are shown in FIG. 37. FIG. 37 presents graphs of the percentage of total PFAS destruction by the UV222 and UV254 photoreduction processes verses time at 10× and 5× dilution factors for the ozone oxidation samples. No graph is shown for the 2× dilution as there was 0% destruction of the PFAS for both the UV222 and the UV254 treatments.

From FIG. 37 it can be seen that, for the ozone oxidation-dilution samples, the UV222 photoreduction system exhibited better destruction performance than the UV254 photoreduction system. This is consistent with the results for the thermal oxidized samples in Example 3. In the UV222 photoreduction system, the total PFAS destruction percentage increased to 61% and 22% for the 10-fold and 5-fold diluted samples, respectively, after an 8-hour reaction. On the contrary, little destruction performance was observed in the UV254 photoreduction system.

Figure 38:
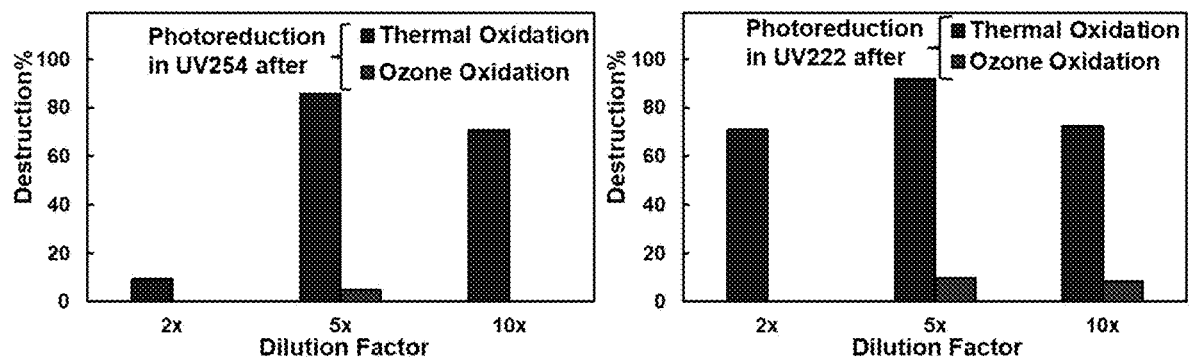
FIG. 38 is a pair of bar graphs of the PFAS destruction results following pretreatment with thermal oxidation or ozone oxidation with photoreduction at UV 222 nm and UV 254 nm.

FIG. 38 presents bar graphs of the PFAS destruction results from Example 1 and Example 2. FIG. 38 shows the total PFAS destruction percentage after 4 hours of treatment in the UV254 and UV222 photoreduction system, after either thermal oxidation or ozone oxidation as a pretreatment step. Thermal oxidation was more effective than ozone oxidation in improving the subsequent photoreduction treatment. For the 5-fold diluted sample, thermal oxidation pretreatment improved the 4 h destruction percentage to 85.5% and 91.9% in UV254 and UV222, respectively, which is higher than 4.7% and 9.6% in UV254 and UV222, respectively, after ozone oxidation as a pretreatment approach.

Example 5

Thermal oxidation pre-treatment. In this example, thermal oxidation of wastewater was performed using varying oxidant (e.g., potassium persulfate) dosages. First, 300 mL of wastewater was mixed with 1.2 g NaOH (3 mL 10 M NaOH solution). The addition of NaOH resulted in a cloudy solution and the samples were allowed to settle for 12 hours. Then, 30 mL of decanted solution was put into individual glass pressure vessels. After that, the 30 mL solution was mixed with varied dosage of potassium persulfate (0.04 g, 0.08 g, 0.2 g, 0.4 g, 0.6 g, 1.2 g) and 10 M sodium hydroxide (0.075 mL, 0.15 mL, 0.375 mL, 0.75 mL, 1.125 mL, 2.25 mL). The pressure vessels were loosely sealed and heated to 120° C. for 120 minutes.

Figure 39:
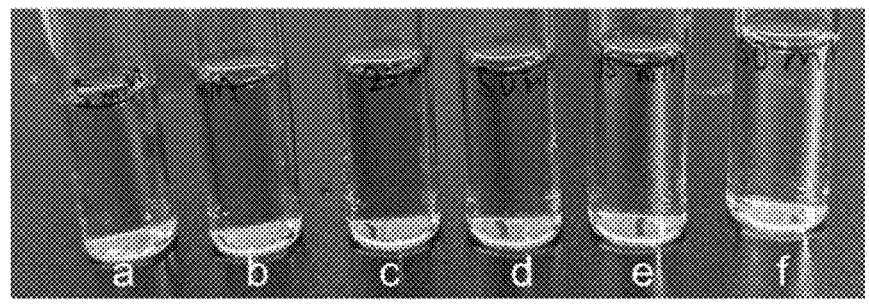
FIG. 39 is a photograph of thermal oxidized samples of wastewater at varied dosage of potassium persulfate and sodium hydroxide.

FIG. 39 shows a photograph of the solutions after thermal oxidation at varied dosages of potassium persulfate and sodium hydroxide. The vessels a-f are shown in order of increasing dosage from lowest dosage (a) to highest (f). The reaction conditions were: a) 5 mM $K_2S_2O_8$ and 25 mM NaOH; b) 10 mM $K_2S_2O_8$ and 50 mM NaOH c) 25 mM $K_2S_2O_8$ and 125 mM NaOH; d) 50 mM $K_2S_2O_8$ and 250 mM NaOH; e) 75 mM $K_2S_2O_8$ and 375 mM NaOH and f) 150 mM $K_2S_2O_8$ and 750 mM NaOH, each maintained at 120° C. for 2 hours.

As shown in FIG. 39, for the solutions with lower chemical dosages, the solution still looks yellow after thermal oxidation (vessels a-e in FIG. 39). However, at the highest dose, 150 mM $K_2S_2O_8$ and 750 mM NaOH conditions, the solution after thermal oxidation turned colorless (vessel f in FIG. 39).

Example 6

Thermal oxidation pre-treatment. In this example, thermal oxidation of wastewater was performed under varying pH conditions. About 10 mL of raw wastewater and 0.4 g of potassium persulfate were added to each of three glass pressure vessels. For the acid reaction conditions, 0.2 mL of 1 M sulfuric acid was added to the sample in the first vessel. For the base reaction conditions, 0.75 mL of 10 M sodium hydroxide solution was added to the sample in the second vessel. For the neutral reaction conditions, no additional chemical was added to the sample in the third vessel. The pressure vessels were loosely sealed and heated to 120° C. for 120 minutes. The resulting solutions were clear and nearly colorless with some sediments in the bottom of the vessels. The clear top layers of each of the oxidized samples were then diluted by a factor of 10, 5, and 2 with deionized water and UV transmittance were measured. Table 5 lists the UV transmittance at 254 nm for the raw sample and the thermal oxidation samples for each condition at 0, 2, 5, and 10-fold dilution with DI water.

TABLE 5

| Reaction condition | Raw Altra Waste water | UV Transmittance (%) at 254 nm | | | |
|---|---|---|---|---|---|
| | | After thermal oxidation-dilution at 0, 2, 5, and 10-fold dilution with DI water | | | |
| | | 0x | 2x | 5x | 10x |
| Acid | 0.0 | 20.6 | 46 | 75.9 | 86 |
| Neutral | 0.0 | 26.8 | 52 | 77.7 | 88.5 |
| Base (Example 1) | 0.0 | 41.2 | 65.7 | 86.6 | 91.3 |

Example 7

Two stage thermal oxidation pre-treatment. In this example, a two-stage thermal oxidation of wastewater was performed and compared the results of different reaction time combinations. First, 300 mL wastewater was mixed with 1.2 g NaOH (3 mL 10 M NaOH solution). The addition of NaOH resulted in a cloudy solution and the sample was allowed to settle for 12 hours. Then, 30 mL of decanted solution was put into each glass pressure vessel and 1.2 g of potassium persulfate and 2.25 mL of 10 M sodium were added. The pressure vessels were loosely sealed and maintained at 120° C. In the first stage thermal oxidation, the reaction time was controlled at 15 to 120 minutes. After the first-stage thermal oxidation, the resulting solutions were clear and nearly colorless. As a second-stage thermal oxidation, another 1.2 g of potassium persulfate was added to the 30 mL solution in the glass pressure vessels and maintained at 120° C. for 30 to 60 minutes. After the second-stage thermal oxidation, the oxidized samples were further diluted by a factor of 10, 5, and 2 with deionized water and UV transmittance were measured. Table 6 lists the UV transmittance at 254 nm for raw, untreated wastewater and the wastewater treated with two-stage thermal oxidation at 0, 2, 5, and 10-fold dilution with DI water.

TABLE 6

| Reaction time combination for the two-stage thermal oxidation (minutes) First stage + second stage | Raw Altra Waste water | UV Transmittance (%) at 254 nm | | | |
|---|---|---|---|---|---|
| | | After two-stage thermal oxidation-dilution at 0, 2, 5, and 10-fold dilution with DI water | | | |
| | | 0x | 2x | 5x | 10x |
| 15 + 15 | 0.0 | 26.7 | 48.5 | 75.3 | 85.2 |
| 30 + 30 | 0.0 | 42.2 | 57.5 | 76.8 | 88.2 |
| 30 + 60 | 0.0 | 38.4 | 64.3 | 86.9 | 94.7 |
| 60 + 30 | 0.0 | 40.6 | 64.1 | 86.1 | 93.8 |
| 60 + 60 | 0.0 | 39.7 | 65.5 | 86.7 | 93.5 |
| 120 + 60 | 0.0 | 11.1 | 54.6 | 80.9 | 88.2 |

From Table 6, two-stage thermal oxidation significantly improved the UV transmittance at 254 nm compared to the raw wastewater. Thermal oxidation with 120 minutes and then 60 minutes reaction time increased the UV transmittance at 254 nm from 0.0 to 11.1% for the undiluted sample. When reducing the reaction time to 30 minutes and then 30 minutes, the UV transmittance at 254 nm further increased to 42.2%. Compared with 120 minutes and 60 minutes reaction time combination, the reaction time combination of 30 minutes and 30 minutes is beneficial for practical applications due to higher treatment capacity with better improvements in UV transmittance.

Example 8

Photosensitizer comparison. In this example, a water sample including PFAS was treated using photoreduction without pretreatment and using two different photosensitizers concentration level. The water sample included TFA ($CF_3$—COO—) at ~0.9 ppm, PFBA ($C_3F_7$—COO—) at ~0.6 ppm and 7H-PFHpA (H—$C_6F_{12}$—COO—) at 31.8 ppm.

The first sample of wastewater was mixed with photosensitizer A including 10 mM $Na_2SO_3$ and 2 mM KI at a pH of 12. The second sample of the same wastewater was mixed with a photosensitizer B including 50 mM $Na_2SO_3$ and 10 mM KI at a pH of 14.

Next, the two samples were treated in a 750 mL tube reactor at 254 nm for 24 h and samples are taken at appropriate time point for analytical purpose such as kinetic fitting of PFAS degradation, defluorination performance calculation in the process.

PFAS levels were measured before and after photoreduction. Degradation kinetics were calculated based on fitting with pseudo-first-order kinetic model ($\ln(C_T/C_0)$=kt), where $C_t$ and $C_0$ refers to PFAS concentrations in photoreduction at time T and time 0, respectively.

Figure 40:
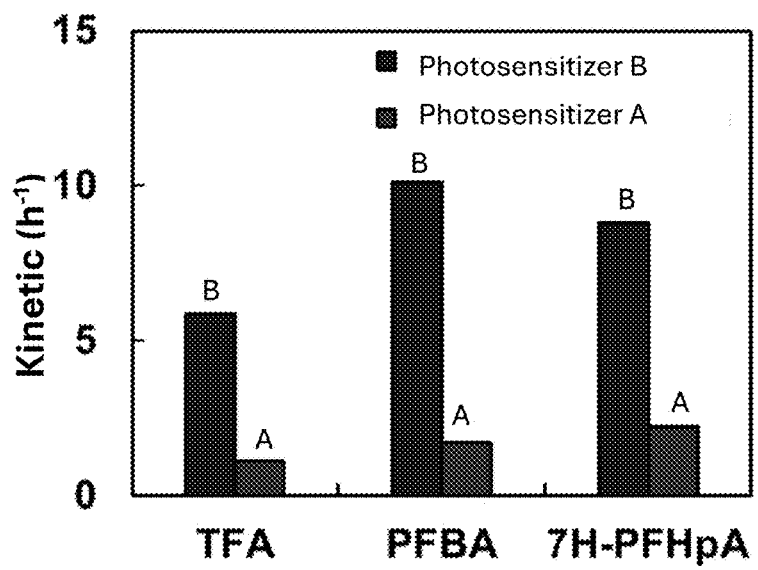
FIG. 40 is a bar graph of PFAS destruction in wastewater using photoreduction and different photosensitizers' concentration level.

A comparison between the degradation kinetics achieved using photosensitizer A as compared to photosensitizer B is shown in the bar graph presented in FIG. 40. FIG. 40 shows the results degradation kinetics for TFA, PFBA, and 7H-PFHpA. In each case, photosensitizer B resulted in surprisingly superior results, with reaction kinetics 4 to 6 times greater than those of this Example.

Example 9

222 and 254 nm UV photoreduction. The photoreactor used in this example is referred to herein as 222REACTOR1. 222REACTOR1 included two cylindrical lamps, a machined metal support used to support the lamps horizontally at some distance above a level surface, a photoreactor vessel, and a metal enclosure. The cylindrical lamps were krypton/chloride excimer lamps emitting UV radiation at approximately 222 nm. Each lamp was powered by a 20 kilovolt power supply that was located in an enclosure separate from the lamps, and each lamp consumed 100 Watts of electrical power. The lamps were 54 mm in diameter and 460 mm in length. The lamps were statically held 100 mm parallel from each other (center-to-center) at a fixed distance of 57.2 mm (surface to cylinder center) from the horizontal floor of the metal container by a rigid machined aluminum clamp. In other possible embodiments of this photoreactor, lamps of different diameter and length could be used. In other possible embodiments, the machined support for the lamps may be of different dimensions, resulting in the lamps having lesser or greater distances from one another, and lesser or greater distances from the horizontal floor.

The reactor vessel was a cylindrical quartz vial measuring 40.1 mm in diameter. The total height of the reactor vessel was 114.6 mm, of which 100 mm of the total height was of consistent diameter, the remaining 14 mm tapered to form a threaded top cylinder 12 mm in diameter. In other embodiments, the reactor vessel could have other diameters and or heights.

The photoreactor was contained in a metal enclosure. A metal filing drawer was used as the metal enclosure. Other structured enclosures such as structured metal enclosures could alternatively be used.

Seven different PFAS substances were treated in the photoreactor as described below. The tested PFAS included Perfluorobutanoic acid (PFBA), Perfluoropentanoic acid (PFPeA), Perfluorohexanoic acid (PFHxA), Perfluorooctanoic acid (PFOA), Perfluorobutanesulfonic acid (PFBS), Perfluorohexanesulfonic acid (PFHxS) and Perfluorooctanesulfonic acid (PFOS).

A PFAS stock solution of the seven different PFAS substances was prepared at concentrations between 2.5 and 10 ppm and used in this example. The PFAS stock solution was combined with 25 mM $NaHCO_3$ and one of various reduction solutions. A control solution which did not contain PFAS was also tested.

The following five solutions were used as reduction solutions: 1 mM KI and 5 mM $Na_2SO_3$; 1 mM KI and 50 mM $Na_2SO_3$; 10 mM KBr and 50 mM $Na_2SO_3$; 10 mM KI and 50 mM $Na_2SO_3$; 50 mM $Na_2SO_3$. A sixth solution was also used which included only reagent water (for direct irradiation).

The solutions were separately added to the reactor vessel and a threaded plastic cap with a silicon septum was screwed to the top of the vial to create a leak proof seal. The reactor vessel was placed between the parallel Krypton/Chloride lamps in the 222 Reactor 1, allowing for radiation to enter the vessel from two sides. The solutions were each irradiated in the photoreactor at 222 nm for three hours. The temperature of the reactor ranged between 55 and 60 degrees Celsius during the reaction.

The amount of PFAS present in the solutions was measured periodically during the photoreactor treatment by stopping the reactor, withdrawing samples of the reactor solution and pipetting them into vials to preserve them for LCMS analysis.

Figure 41:
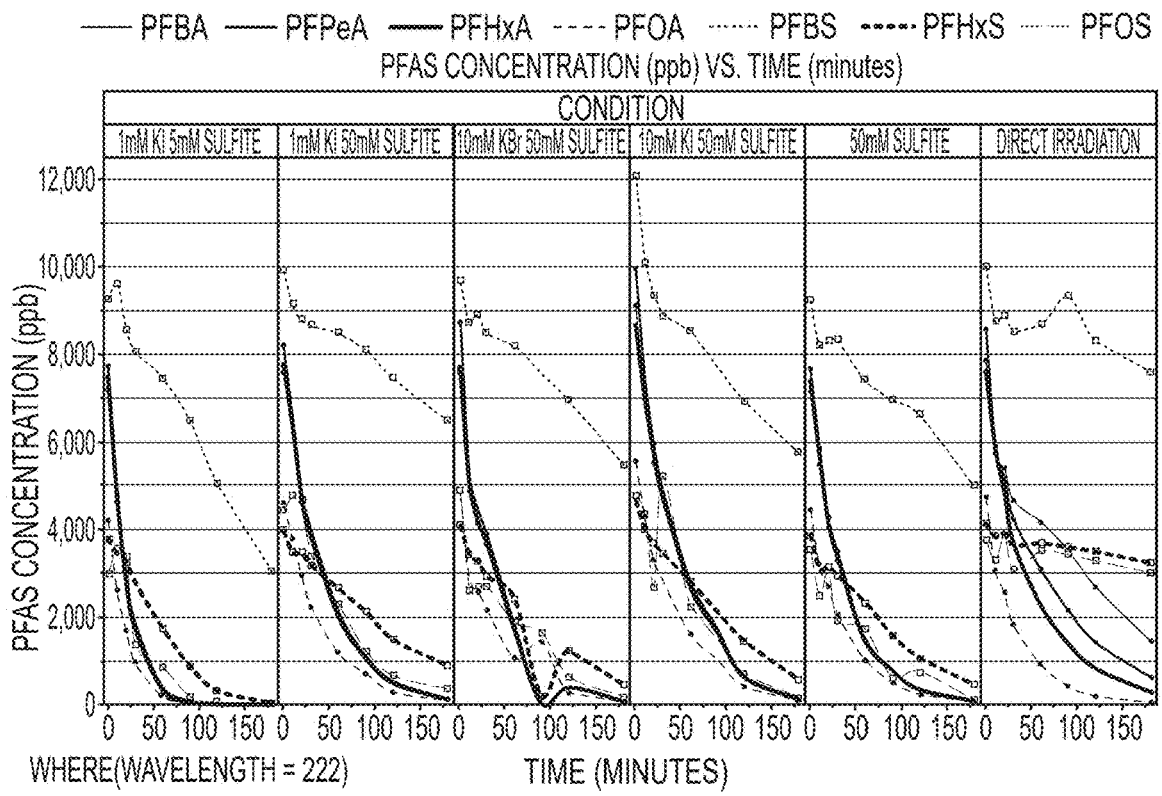
FIG. 41 is graph of concentration as a function of time for the photoreduction of PFAS solutions at 222 nm shown for 6 different solutions.
Figure 42:
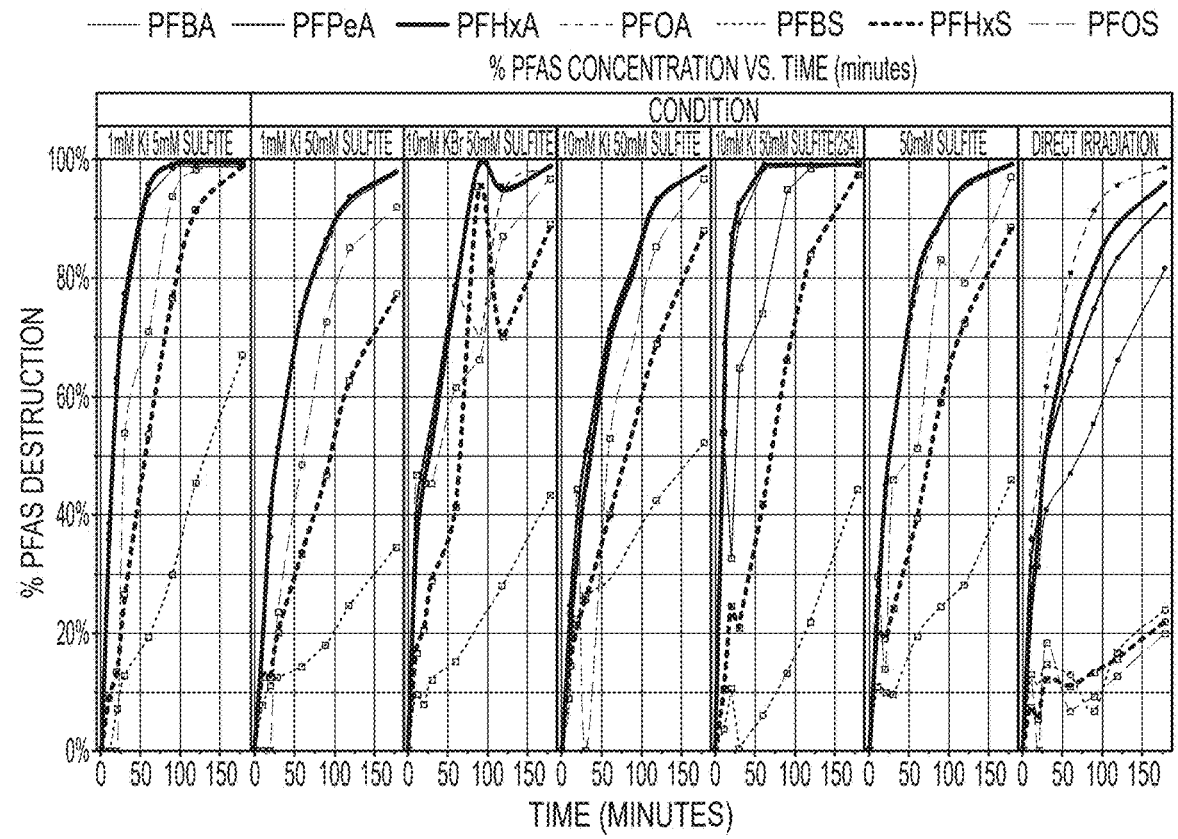
FIG. 42 is a graph of percent PFAS destruction as a function of time for the photoreduction of PFAS solutions at 222 nm shown for 6 different solutions.

The results of the photoreaction treatment for each PFAS in each solution are shown in the graphs presented in FIGS. 41 and 42.

FIG. 41 shows the concentration of the PFAS as a function of time for the photoreduction of PFAS in each reduction solution at 222 nm. Qualitative inspection of FIG. 41 shows that the rates of PFAS destruction are faster in solution containing iodide/sulfite compared to the rate of PFAS destruction under direct irradiation in pure water. It is also evident that the rate of PFAS concentration loss in the model solution, 1 mM KI and 5 mM KI, is faster than any other solution.

FIG. 42 shows the percent PFAS destruction as a function of time for the photoreduction of PFAS in each reduction solution at 222 nm. In both of these figures, the reduction solution which was used is indicated in the header. FIG. 42 demonstrates that there is a quantitative increase in PFAS destruction within a 3-hour period when the model solution is compared to all other solutions and reagent water. Additionally, it is evident that in the model solution, the percentage of both carboxylated and sulfonated PFAS destruction is greater than other solutions, and much greater than that in the case of direct irradiation in reagent water.

FIG. 42 also includes data for the PFAS substances that were prepared as treatment solutions and treated as described in example 1 above, using the 10 mM KI and 50 mM $Na_2SO_3$ reduction solution. However, these solutions were irradiated at 254 nm in a separate photoreactor referred to herein as the 254REACTOR. The 254REACTOR was a LUZCHEM LZC-ORG box reactor equipped with 10 8-watt low pressure mercury lamps. The treatment solution was irradiated in the 254REACTOR for three hours. These results are shown in column 5 of FIG. 42.

Figure 43:
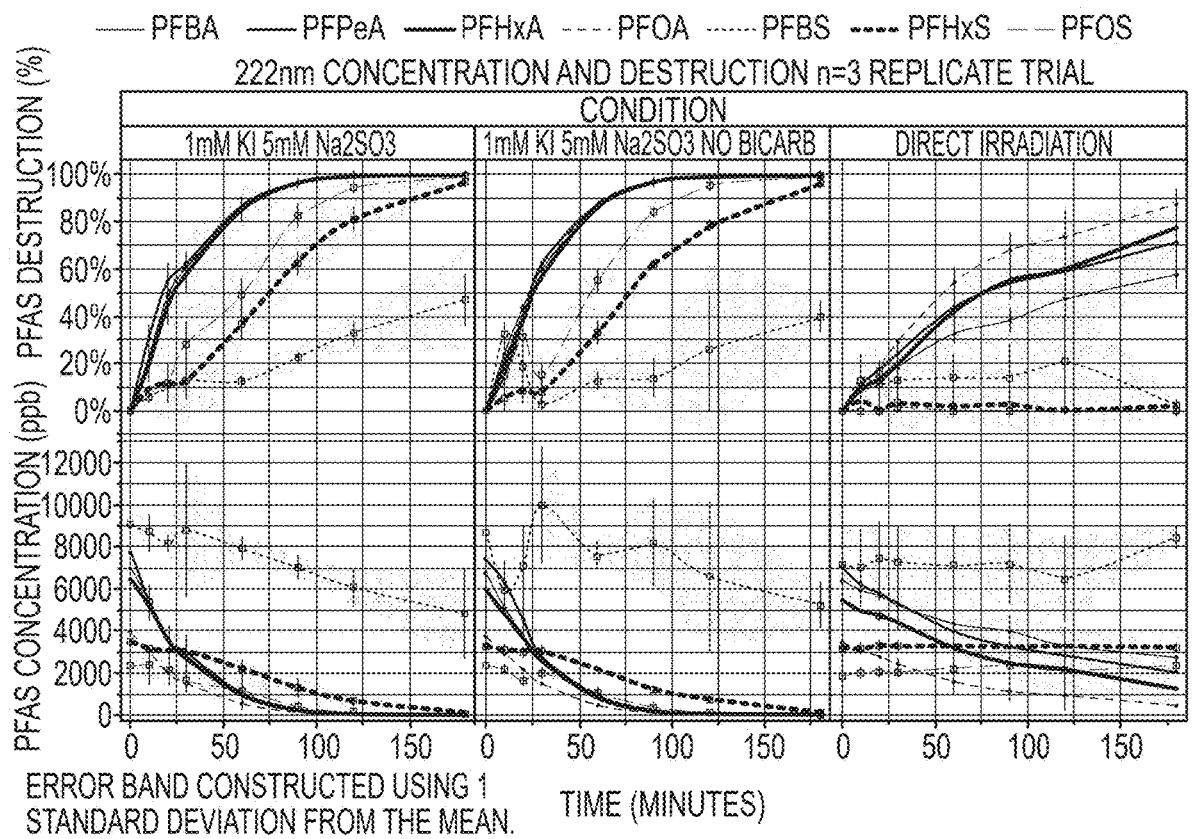
FIG. 43 is a graph of percent PFAS destruction as a function of time using 222 nm photoreduction contrasted with direct irradiation.

Select experiments were repeated three times and their three independent experimental results were averaged and plotted with statistical analysis. The results are shown in FIG. 43. The results are contrasted with those for direct irradiation of the PFAS solution at 222 nm. Inspection of FIG. 43 reveals that in the n=3 replicate trial, the percent destruction and decrease in concentration over time of the individual PFAS compounds are statistically distinguishable in the model solution. For example, the percentage destruction of the carboxylated derivatives over time is, to 68% confidence, greater than that of PFHxS and PFOS, which is greater than PFBS. This difference is more acutely manifested in the case of the solution in which bicarbonate is not present. Within the confidence limits, destruction in the 1 mM KI/5 mM $Na_2SO_3$ solution is also much greater than that which occurs by direct irradiation in reagent water.

Figure 44:
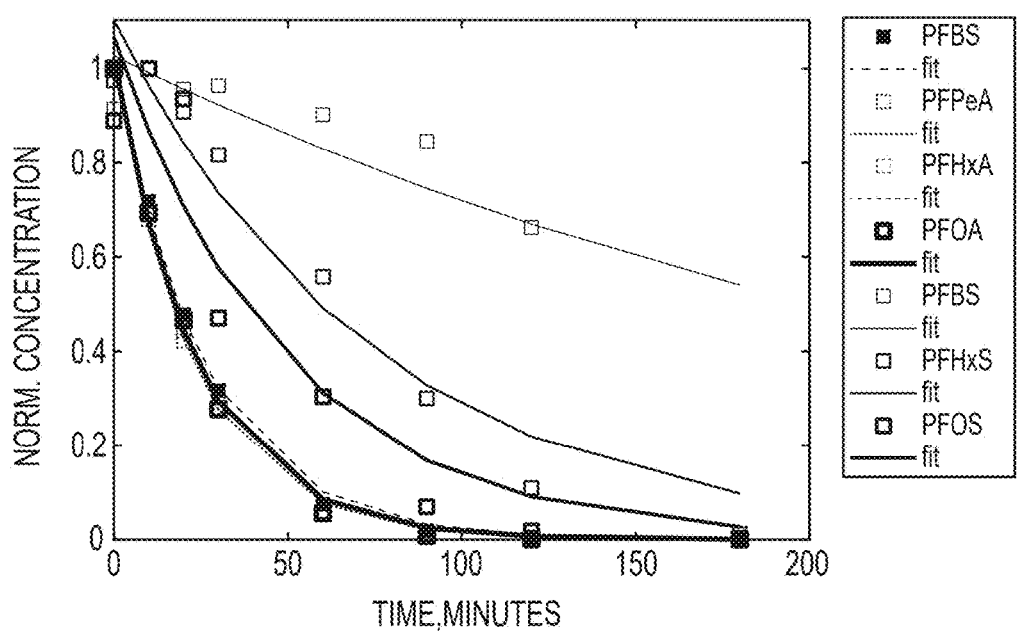
FIG. 44 is a graph of data fit per a single exponential function for time dependent PFAS destruction using 1 mM KI, 5 mM Na2SO3 and bicarbonate solution.

The data from this example was normalized and fit to a single exponential function, equation 2, $$C(t) = C_o e^{\frac{-t}{\tau}} \quad (1)$$

where C(t) is the concentration at time t, $C_0$ is the initial concentration, and t the first order time constant (the inverse of the rate constant). The first order rate constants were translated to half-lives (multiplication by 0.6901). Data plotted from FIG. 42 was fit into Eqn. 2. Exemplary fits are shown in FIG. 44 for time dependent PFAS destruction using a solution of 1 mM KI, 5 mM $Na_2SO_3$, and 25 mM $NaHCO_3$ solution. A smaller time constant indicates less time is required to destroy the PFAS.

Table 7, below, shows Equation 2 fit to data for time dependent PFAS destruction using 1 mM KI, 5 mM $Na_2SO_3$ and bicarbonate solution. The first order time constants, $\tau$, was determined from the data plotted in columns 1, 3, 4, 5 and 6 and were translated into half-lives in Table 7. Table 7 shows the time constants for PFAS destruction versus time using a 222 nm light source for several solutions and reagent water. $t^{1/2}$ is the first order time constant, $\sigma$ is the error in $t^{1/2}$ at a confidence limit of 68%. The dashes for PFBS, PFHxS and PFOS in Reagent Water Column indicate correspond to very high $t^{1/2}$ values.

TABLE 7

PFAS Destruction: λ = 222 nm, n = 1, nominal 5 ppm PFAS

|  | 1mM KI 5 mM $Na_2SO_3$ | | 10 mM KI 50 mM $Na_2SO_3$ | | 10 mM KBr, 50 mM $Na_2SO_3$ | | 50 mM $Na_2SO_3$ | | Reagent Water | |
| --- | --- | --- | --- | --- | --- | --- | --- | --- | --- | --- |
|  | $t^{1/2}$, min | σ, min | $t^{1/2}$, min | σ, min | $t^{1/2}$, min | σ, min | $t^{1/2}$, min | σ, min | $t^{1/2}$, min | σ, min |
| PFBA | 18.0 | 0.62 | 40.5 | 2.1 | 28.8 | 4.0 | 32.8 | 1.6 | 93.5 | 15 |
| PFPeA | 16.0 | 0.41 | 35.5 | 1.8 | 27.5 | 3.4 | 29.6 | 1.1 | 48.5 | 4.7 |
| PFHxA | 16.6 | 0.55 | 41.9 | 3.4 | 29.8 | 3.7 | 31.5 | 1.3 | 40.4 | 1.5 |
| PFOA | 16.7 | 0.76 | 8.0 | 2.3 | 40.9 | 9.0 | 32.2 | 1.0 | 33.2 | 1.5 |
| PFBS | 194 | 43.6 | 364 | 66 | 266 | 327 | 443 | 103 | — | |
| PFHxS | 51.3 | 8.2 | 84.5 | 8.3 | 65.1 | 18.7 | 85.2 | 8.3 | — | |
| PFOS | 33.7 | 9.1 | 60.4 | 22 | 65.1 | 16.6 | 57.5 | 11.0 | — | |

All solutions contained ~5 mM PFAS; σ is the calculated 68.3% confidence interval; — indicates data too noisy to fit (error bars larger τ)

The half-life data plotted in FIG. 43 are shown in Table 8. Table 8 shows a comparison of the time constants for PFAS destruction versus time using a 222 nm light source for the n=1 and n=4 experiments using a solution of 1 mM KI and 5 mM $Na_2SO_3$. The half-live, $t^{1/2}$, is the half-life for PFAS destruction, σ is the error in $t^{1/2}$ at a confidence limit of 68%.

TABLE 8

PFAS Destruction: 1 mM KI, 5 mM Na2SO3, λ = 222 nm, nominal ppm PFAS

|  | n = 1 | | n = 4 | |
| --- | --- | --- | --- | --- |
| Compound | $t^{1/2}$, min | σ, min | $t^{1/2}$, min | σ, min |
| PFBA | 18.0 | 0.62 | 21.2 | 0.82 |
| PFPeA | 16.0 | 0.41 | 19.7 | 0.97 |
| PFHxA | 16.6 | 0.55 | 22.2 | 1.2 |
| PFOA | 16.7 | 0.76 | 20.9 | 0.97 |
| PFBS | 194 | 43.6 | 211 | 23.2 |
| PFHxS | 51.3 | 8.2 | 60.4 | 9.2 |
| PFOS | 33.7 | 9.1 | 41.7 | 7.0 |

All solutions contained ~5 mM PFAS;
σ is the calculated 68.3% confidence interval;
— indicates data too noisy to fit (error bars larger τ)

The results of these exemplary fits shown in FIG. 44, and those for all of the n=1 solutions, are presented in Table 7. FIG. 44 shows Eqn. 2 fit to the data for time dependent PFAS destruction using 1 mM KI, 5 mM $Na_2SO_3$ and bicarbonate solution. Within the confidence limits, the rate of the model solution is distinguishable from the other solutions and reagent water.

Example 11

222 nm photoreduction. A different 222 nm photoreactor design was used in this example. This photoreactor, referred to herein as 222REACTOR2, included a photoreactor vessel, a clamp, a lamp, a transparent sleeve, a pump and various valves and tubing.

The photoreactor vessel was a non-porous cylinder sealed on one end to contain a liquid. The bulb of the lamp was also cylindrical, with a diameter less than that of the photoreactor vessel cylinder. The cylindrical lamp bulb was placed into the cylinder (within the transparent sleeve) and secured such that the long axis of the bulb was parallel to the long axis of the cylinder and centered in the photoreactor vessel cylinder. The photoreactor vessel cylinder included a flow regulated outlet in close proximity to the base of the cylinder through which liquid to be drained. The photoreactor vessel cylinder also included an inlet in proximity to the top of the cylinder through which liquid was added the cylinder. A clamp held photoreactor vessel cylinder with the long axis of the cylinder vertically oriented at a right angle to a horizontal table top.

The photoreactor vessel cylinder was about 75 mm in diameter and 500 mm in length and was made of stainless steel with walls about 3 mm thick. The inlet and outlet of the photoreactor vessel cylinder were machine threaded openings capable of accepting connections to flexible or rigid tubing. In this particular arrangement the machine threaded openings were stainless steel, ½ inch National Pipe Thread fittings, welded, brazed or soldered to the face of the metal cylinder.

The cylindrical lamp bulb was inserted into a transparent sleeve that was centered on the top face of the photoreactor vessel cylinder, and parallel to the long axis of the photoreactor vessel cylinder. A stainless steel cap held and secured the sleeve. The cap included a centered hole through which the sleeve was inserted, and an outer cylindrical ring with interior diameter (I.D) slightly greater than the outer diameter of the stainless steel cylinder. The cap was a welded and machined stainless steel cylinder about 70 mm in length and 100 mm in diameter. The transparent sleeve was about 500 mm in length and about 55 mm (OD) in diameter and was sealed on the bottom end to prevent liquid from contacting the lamp. The transparent sleeve was made of quartz capable of transmitting light at and below wavelengths of about 225 nm.

The lamp was a krypton/chloride excimer that consumed 100 Watts of power and was powered by an external 20 kV power supply. The lamp bulb measured about 54.6 mm in diameter and 460 mm in length and produced radiation of about 222 nm, with a full-width-half-max of about 4 nm.

The 222 REACTOR2 also included a pump that was connected in-line with rigid stainless steel tubing between the outlet and inlet of the photoreactor vessel. A series of valves were located in-line with the tubing on the suction side of the pump to stop the flow of liquid from the base of the reactor vessel and divert the pump suction to a container from which liquid can be drawn into the reactor. A series of valves were also located in line with the pressure side of the pump to stop the flow of liquid from the pump and divert the flow of the pump to an exterior container from which fluid could be collected from the reactor. The pump was a low flow circulating pump of the type often used in passive or active solar heating applications. The tubing was comprised of ¼ inch OD stainless steel tubing that was bent to form a sealed matrix of connections between the valves and pump and the metal cylinder of the photoreactor.

A comparison was made between using $Na_2SO_3$ alone versus $Na_2SO_3$ and KBr. Each treatment solution included 10 ppm PFOA and either 5 mM $Na_2SO_3$ alone or 5 mM $Na_2SO_3$ and 150 mM KBr. No $NaHCO_3$ was included in either treatment solution, though pH 12 was attained through addition of sodium hydroxide.

The reactor solutions were separately placed into the photoreactor vessel and irradiated at 222 nm in the 222REACTOR2 for 24 hours.

The amount of PFOA present in the solutions was measured periodically during the photoreactor treatment by withdrawing samples from the outlet of the photoreactor vessel and preserving them for LC-MS analysis. The results for the first four hours are shown in FIGS. 45 and 6.

Figure 45:
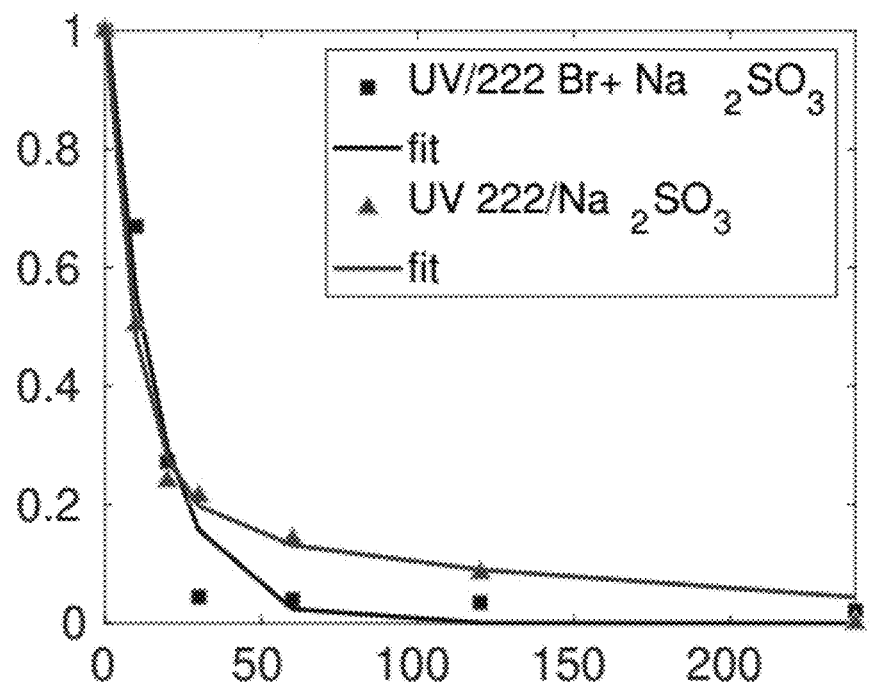
FIG. 45 is a graph of the time dependent destruction of PFOA upon photolysis at 222 nm using 5 mM Na2SO3 and 150 mM KBr or only 5 mM Na2SO3.

FIG. 45 shows the time dependent destruction of PFAS upon photolysis of PFOA using 5 mM $Na_2SO_3$, and 150 mM KBr (blue squares) and data for time dependent defluorination of PFOA using ONLY 5 mM $Na_2SO_3$ (red triangles). The data is represented by the symbols, and best exponential fit is shown by the lines.

Figure 46:
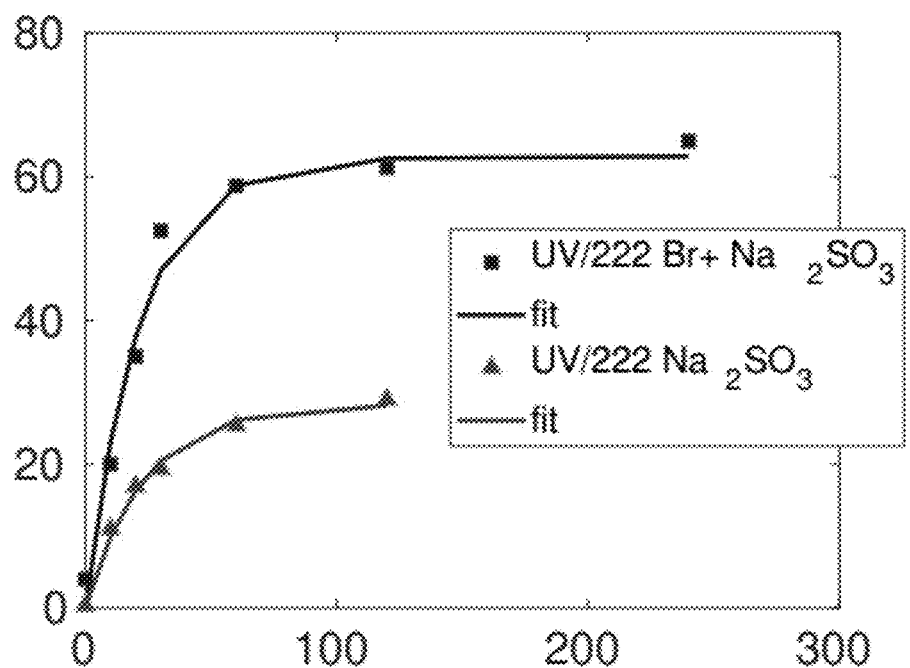
FIG. 46 a graph of time dependent fluoride ion concentration upon photolysis at 222 nm using 5 mM Na2SO3 and 150 mM KBr or only 5 mM Na2SO3.

FIG. 46 shows the time dependence of fluoride ion ($F^-$) concentration resulting from the defluorination of PFOA. The blue squares show the fluoride ion concentration (symbols) versus time using 5 mM $Na_2SO_3$ and 150 mM KBR, with the blue line showing the best exponential fit. The red triangles show the fluoride ion concentration verses time using only 5 mM $Na_2SO_3$, with the red line showing the best exponential fit.

These results show that the reactor solution which included bromide resulted in more rapid and more complete defluorination than the reactor solution which included only $Na_2SO_3$.

It is worth noting that in Example 10, there was basically no statistical difference between the rate of decay in the 10 mM KBr/50 mM $Na_2SO_3$, solution when compared to the solution 50 mM $Na_2SO_3$ solution without KBr. However, in Example 10, which included higher levels of KBr (and lower levels of sulfite), the inclusion of KBr had a definite positive result of PFOA destruction.

Given that the molar absorptivity of sulfite is 70 times greater than that of KBr at 222 nm (5400 $M^{-1}$ $cm^{-1}$ for sulfite [in house experiment], compared to 77.61 $M^{-1}$ $cm^{-1}$ for KBr [Birkmann et al, Water Practice and Technology (2018) 13 (4); 879-892]), it is believed that the sulfite was absorbing most of the light in Example 1. In contrast, when the sulfite was reduced and the bromide increased in Example 2, the KBr was effective at improving PFOA destruction. Though we do not know the relative quantum efficiency for photogenerated electrons at this wavelength, assuming that this yield is comparable in KBr and KI, then increasing the concentration of KBr 147 times ($ε$=11,527 $M^{-1}$ $cm^{-1}$ for KI, compared to 77.61 $M^{-1}$ $cm^{-1}$ for KBr [Birkmann et al, Water Practice and Technology (2018) 13 (4); 879-892]) relative to that of KI may yield comparable effects. $ε$ is the molar extinction coefficient.

Similarly in Example 10, it was not discernible that the rates of PFAS destruction were significantly different when comparing a solution of 10 mM KI/50 mM $Na_2SO_3$ solution to the 50 mM $Na_2SO_3$ solution. In fact, arguably the rates could be slightly less with the addition of KI. Thus, it would make sense to study in more detail the rate of PFAS destruction on the concentration of a solution containing only $Na_2SO_3$. A direct comparison of the rate of destruction between a 5 mM solution of $Na_2SO_3$ and that of the model solution should give clear indication if the 1 mM KI matters at all at this concentration. Additionally, it has been calculated that for light to penetrate at least 1 cm into the reactor cell at 222 nm, concentrations of KI and $Na_2SO_3$ up to three orders of magnitude less than the model solution are necessary. Recognizing the important inverse relationship between light penetration and concentration of detached electrons in solution necessary for PFAS destruction, concentrations of KI, Br and $Na_2SO_3$ in the tens to hundreds of µM regime may have an effect on the effect on the rate of PFAS destruction.

Example 12

222 and 254 UV photoreduction. Further experiments were performed to evaluate the destruction of PFAS foam fractionate using 222 nm and 254 nm UV radiation.

Foam fractionate water was obtained from the Minnesota Pollution Control Agency (MPCA). The primary compounds in the MPCA sample were determined to be PFOA and PFOS. Other compounds (PFHxA, PFHxS, PFHpS) were detected, though at concentrations below the limit of quantitation. Due to a 5-fold dilution of the samples for LC-MS analysis, the limit of quantitation (LOQ) for the analysis was back-calculated as ~10 ppb for each compound in the fractionate sample.

The 222REACTOR1 was used to deliver 222 nm radiation. The reagents used with the 222 nm radiation included 1 mM potassium iodide (KI) and 5 mM sodium sulfite ($Na_2SO_3$). The 5× diluted samples were placed in the 222 Reactor 1 and irradiated for 5 hours under UV irradiation at 222 nm.

The 254REACTOR was used to deliver 254 nm radiation. The reactor solution used with the 254 nm radiation included 40 mM potassium iodide (KI) and 200 mM sodium sulfite ($Na_2SO_3$). The 5× diluted samples were placed in the 254 Reactor and irradiated for 6 hours under UV irradiation at 254 nm.

For each reactor, the amount of PFAS present in the solutions was measured periodically during the photoreactor treatment by stopping the reactor, withdrawing samples from the reactor vessel and pipetting them into vials to preserve them for LC-MS analysis.

Figure 47:
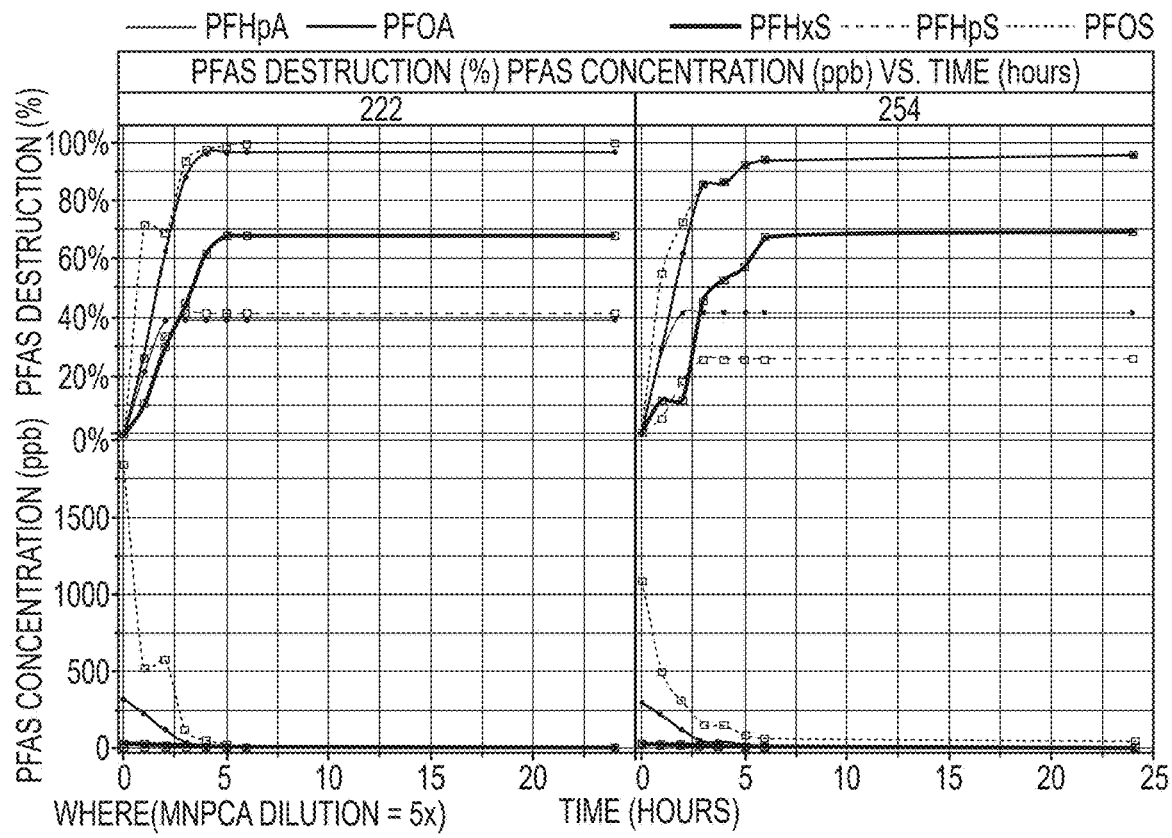
FIG. 47 are graphs of PFAS destruction and PFAS concentration versus time for UV destruction of foam fractionate water sample at 222 nm and 254 nm.

The results are shown in FIG. 47, which shows the percentage of PFAS destruction over time (top row) and the PFAS concentration over time (bottom row) for both the 222 nm (left) and 254 nm (right) treatments. The 5× dilution samples reached a thorough extent of destruction by 5 hours under UV at 222 nm, and by 6 hours under UV 254 nm (~99%). Other compounds (PFHxA, PFHxS, PFHpS) showed concentrations below the limit of quantitation at this timepoint as well.

The results demonstrate that PFAS destruction is similar between the two experiments. However, the treatment at 222 nm achieved these results using a significantly lower iodide and sulfite concentrations (¹⁄₄₀th) than the 254 nm treatment. This is particularly important with regards to iodine due its greatly elevated cost as compared to the rest of the reagents. Equivalent or greater destructive performance in the 222 nm system at conditions with significantly reduced concentrations of iodide—and thus a commensurate decrease in cost—therefore represents a significant advancement towards developing an effective and economical means of PFAS destruction. This cost savings would be particularly important in large-scale processes, in terms of efficiency and operational cost savings.

Example 13

The following photoreactor and experimental design were used in Examples 13 and 14, and 15. The photoreactor included the following: a Pyrex cylindrical beaker (84 mm in diameter, 124 mm in height, 600 ml total capacity); a rubber stopper with tapered sides, diameter at half height of 84 mm; two quartz sleeves that are sealed on one end, 23 mm in diameter, 190 mm in length (Technical Glass, GE 214); and two 15 Watt ultraviolet bulbs. Two distinctly different types of ultraviolet bulbs, interchangeable in the reactor, were used depending upon the experiment: 1) UV 222 nm excimer bulbs, 23 mm in diameter, 190 mm in length; and 2) UV185/254 nm bulbs, 19 mm in diameter, 200 mm in length.

The rubber stopper had two 23 mm diameter holes cut along the diameter with the centers of these holes 16 mm from the center of the rubber stopper, as well as 4 smaller holes (2×6.3 mm and 2×7.6 mm) placed in a 60 mm square pattern with the center of this square coincident with the center of the stopper. When a salt bridge was used, an additional 1 cm hole was present in the stopper to accommodate it. The quartz sleeves fit into the 23 mm holes and protruded through the stopper such that the sealed end of the sleeve protruded 75 mm beyond the lower flat face of the tapered plug. The rubber stopper fit snugly into the beaker such that the quartz sleeves protruded into the beaker. The UV bulbs were placed into the quartz sleeves through the open (top end) of these sleeves that protrude into the beaker. The beaker (with stir bar) was placed onto a stir plate. The smaller diameter holes present in the reactor are ports for probes, electrodes and sparging lines in experiments described below.

Photo-destruction was performed by decanting 450 ml of sample PFAS solution into the 600 ml beaker. The solution was sparged with argon for 15 minutes, stirred and then the lamps turned on (time zero). Samples are drawn at regular time intervals throughout the photo-destruction process. These samples are analyzed with a fluoride sensor to detect free-fluoride ion release from the destruction of the PFOS.

Electrochemical reduction of iodine. In this example, recycling of the iodide was tested using no sulfite by electrochemical reduction of the photochemically produced iodine radical.

A 450 ml solution containing 5 ppm Perfluorooctane Sulfonic Acid (PFOS), 1 mM potassium iodide (KI), 0.1 M sodium sulfate, and 20 mM sodium hydroxide (NaOH) was decanted into the reactor. One end of a (1 M KCl) salt bridge was inserted through the stopper and into the reactor solution. The other end of the salt bridge was placed into a stirred 1 M aqueous KCl solution that contained a 2×2 cm platinum mesh counter electrode that served as an anode throughout the experiment. A 2×2 cm platinum mesh working electrode and a Ag/AgCl reference electrode were suspended in the reactor cell solution. A potential of –0.7 V vs Ag/AgCl was applied to the working electrode using a potentiostat (Bio-Logic). The platinum working electrode served as a cathode and reduced the oxidized iodine radical back to iodide. The solution was sparged with argon prior to and during the PFOS destruction experiment. The working electrode was located approximately 2 cm from the quartz sleeve housing the lamp. Time zero for the PFOS destruction experiment was when the lamps were turned on. In this experiment, UV222 nm bulbs were used. The transmission of the quartz sleeves at 222 nm was 0.8. Samples were drawn through an access port in the rubber stopper at regular time intervals, with a +/–30 second sampling error.

Figure 48:
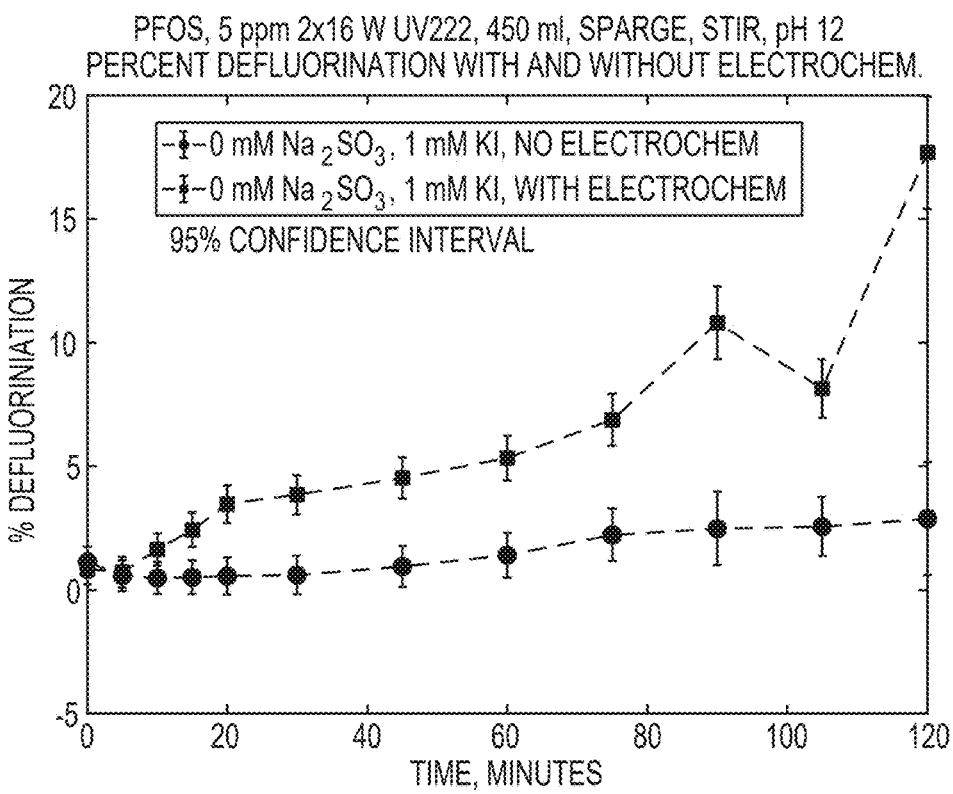
FIG. 48 is a graph of experimental results of recycling of the iodide using no sulfite by electrochemical reduction of photochemically produced iodine radical.

The results are shown in the graph presented in FIG. 48. FIG. 48 is a graph of percent of free-fluoride relative to the theoretical maximum as a function of time for the destruction of 5 ppm PFOS as described above. The percent of free-fluoride is for a solution in which a –0.7 V vs Ag/AgCl potential was applied to the electrodes (black squares). No potential was applied across the electrodes (grey circles) for the control. Error bars are drawn at a confidence level of 95%. After 120 min the control experiment with no potential applied achieved only 3% defluorination, meanwhile, the electrochemical experiment achieved 18% defluorination after 120 min. This demonstrates the ability of an electrochemical system to regenerate iodide during a photoreduction experiment, achieving effective PFAS destruction with no or minimal sulfite.

Example 14

Perfluoro-octane sulfonic acid (PFOS) destruction using electrochemical generation of hydrogen. In this example, a 185 nm light was used to generate hydroxyl radicals. These hydroxyl radicals react with electrochemically generated molecular hydrogen to ultimately form solvated electrons used in the reductive destruction of PFAS. Three experiments are shown here as part of this example: 14 (a) a control destruction experiment in which a reactor solution of PFOS, sodium sulfate, and sodium hydroxide was run with the 185 nm radiation but without voltage applied to the electrodes; 14 (b) a destruction experiment in which a reactor solution of PFOS, sodium sulfate, and sodium hydroxide was run with 185 nm radiation with both anode and cathode present in the reactor cell; and 14 (c) a destruction experiment in which a reactor solution of PFOS, sodium sulfate, and sodium hydroxide was run with 185 nm radiation with the cathode in the reactor cell, and the anode isolated in a separate cell. The anode cell and cathode cell were connected with a salt bridge.

In examples 14 (a)-14 (c), the starting point of the PFOS destruction experiment (time zero) was the time-point at which the lamps were turned on. The reactor solutions were sparged with argon during the experiment. Sparging began 15 minutes prior to the start of the experiments. The reactor solutions were stirred constantly throughout the course of the experiment. In this experiment UV185/254 nm bulbs were used. The transmission of the quartz sleeves at 185 nm was 0.63. Samples were drawn through an access port in the rubber stopper at regular time intervals, with a +/−30 second sampling error.

Example 14 (a): A 450 ml solution containing 0.1 M sodium sulfate, 20 mM sodium hydroxide and 5 ppm PFOS was stirred and decanted into the photoreactor. This experiment served as a control. No voltage was applied to the cell. The UV lights were turned on in the photoreactor during this experiment.

Example 14 (b): A 450 ml solution containing 5 ppm PFOS, 1 mM sodium hydroxide and 5 mM sodium sulfate (electrolyte) was decanted into the photoreactor. A working electrode and counter electrode (both 10×10 cm platinum coated Ti mesh electrodes squares, bent to conform to the diameter of the reactor beaker) and a reference electrode (Ag/AgCl) were suspended in the reactor cell solution. A potential of −1.1 V vs Ag/AgCl was applied to the working electrode, which served as the cathode. This applied potential was above that needed to electrolyze the water into molecular hydrogen at the cathode and molecular oxygen at the anode. The electrodes were located approximately 2 cm from the reactor quartz sleeves housing the lamps.

Example 14 (c): A 450 ml solution containing 5 ppm PFOS, 1 mM sodium hydroxide and 5 mM sodium sulfate was decanted into the photoreactor. A working electrode (10×10 cm platinum coated Ti mesh electrode square, bent to conform to the diameter of the reactor beaker) was suspended in the photoreactor solution. One end of a (1 M sodium sulfate) salt bridge was inserted through the stopper and into the reactor solution. The other end of the salt bridge was placed into a beaker of stirred 1 M aqueous sodium sulfite solution in which a platinum mesh counter electrode, identical to the working electrode, was suspended. This electrode served as an anode throughout the experiment. The counter electrode oxidized sulfite to sulfate at the electrode interface. The salt bridge insured that charge neutrality was maintained between the anode and cathode cell. The working electrode was located approximately 2 cm from the reactor quartz sleeves housing the lamps. During the destruction experiment, a voltage of 58.13 Volts was applied across the electrodes, leading to a current between the electrodes of 49 mA at the beginning of the experiment and 86 mA by the end of the experiment 2 hours later. After 5 minutes of passing the initial current, visible hydrogen bubbles could be seen forming on the platinum mesh electrode.

Figure 49:
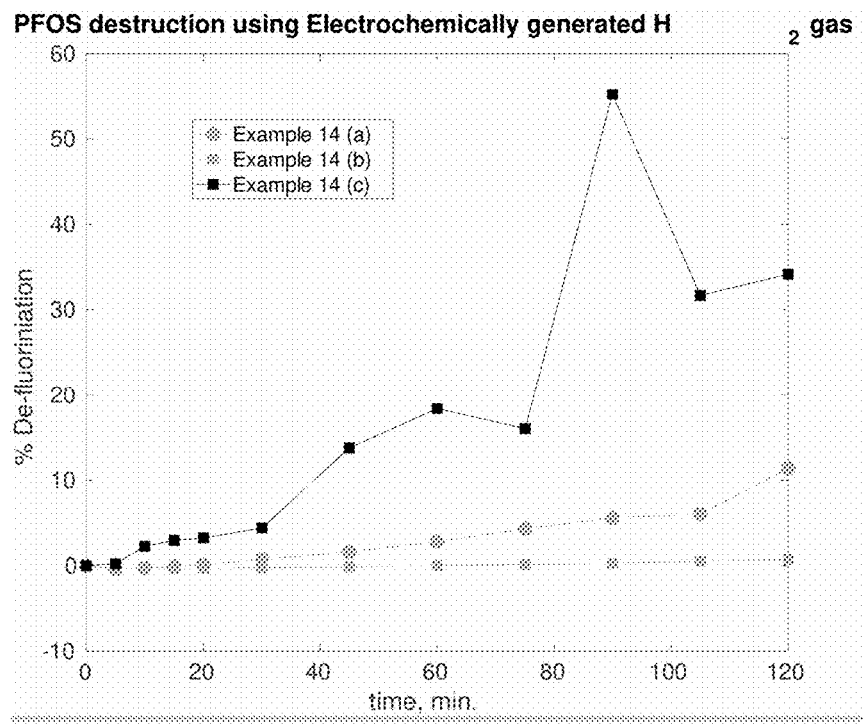
FIG. 49 is a graph of PFOS destruction using electrochemically generated hydrogen gas.

The results of example 14 are shown in the plot presented in FIG. 49. This figure is a plot of the percent of free-fluoride evolved relative to the theoretical maximum as a function of time for the destruction of 5 ppm PFOS as described for examples 14 (a)-14 (c). Error bars are drawn at a confidence level of 95%. The result of example 14 (a), the control experiment, is plotted with gray circles. After 120 min this control experiment achieved only ~10% de-fluorination. The result of example 14 (b) is plotted with gray squares; here both the anode and cathode were present in the photoreactor. In this experiment essentially zero defluorination was achieved after 2 hours. This may have been due to the oxygen that was present in the reactor cell due to water photolysis. Oxygen is a strong quencher of solvated electrons. The result of example 14 (c) is plotted with black squares. In this experiment the anode and cathode were present in different cells connected by a salt bridge. A 35% de-fluorination after 120 min was achieved in this experiment. This experiment demonstrates that effective PFOS destruction can be achieved without the addition of chemical photosensitizers by utilizing in-situ electrochemical hydrogen generation.

Example 15

Iodide recovery electrode synthesis. An iodide recovery electrode was synthesized by mixing 2 g starch and 2 g graphite with a mortar and pestle. The mixed powders are then placed in a ball mill that was run at 1200 rpm for 60 minutes. The resulting powder was then mixed with 5 mL of a 60% PTFE solution with a mortar and pestle. The result was a flexible putty like material that was repeatedly folded over on itself to create homogeneity and structural integrity. The material was then dried in an oven at 80° C. for 6 hours to remove water from the structure. The result was a firm but flexible sheet. A 2×2 cm square was cut out of the sheet and a conductive carbon paint was used to attach the sheet to a conductive carbon paper current collector. The carbon paper was then masked with Teflon tape and lacquer so that only the iodide recovery material was exposed to solution during operation.

Example 16

Figure 50:
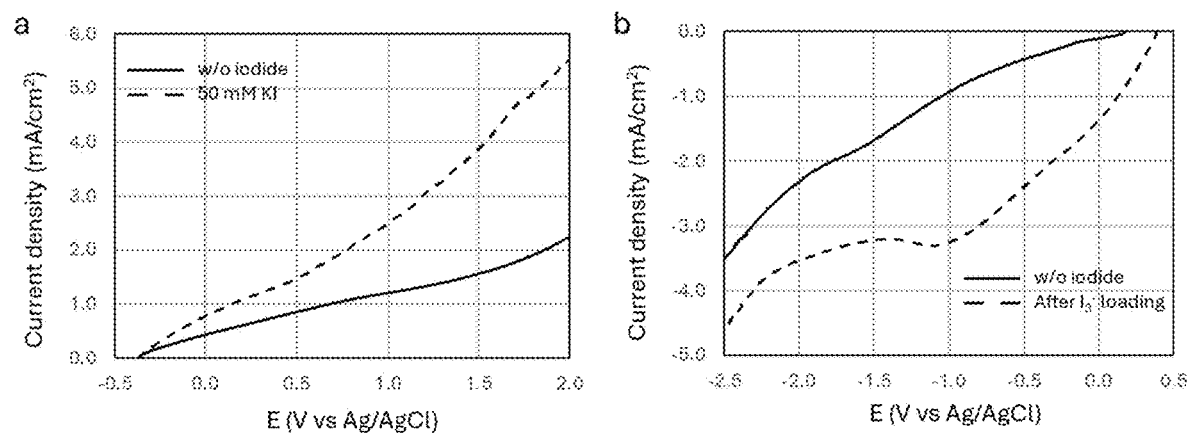
FIG. 50 shows graphs of experimental results of oxidative (left) and reductive (right) linear sweep voltammetry using an iodide recovery electrode.

Iodide recovery using electrode. A 0.1 M $Na_3PO_4$ PH 7 solution was prepared for use in a 3-electrode cell in which the working electrode was the iodide recovery electrode described in example 14, the counter electrode was Pt mesh, and the reference electrode was Ag/AgCl. An oxidative linear sweep voltammetry (LSV) was performed as seen in graph a of FIG. 50, and a reductive LSV was performed as seen in graph b of FIG. 50.

Potassium iodide was then added to the solution to bring it to 50 mM KI. The same oxidative LSV was performed as seen in graph a. The significantly higher current generated in the 50 mM KI solution is indicative of iodide oxidation occurring. A galvanostatic electrolysis was then performed at 0.25 mA/cm$^2$. After 40 minutes a yellow color was observed in the solution near the working electrode, indicating that the electrode was fully saturated with $I_3^-$. A fresh 0.1 M $Na_3PO_4$ pH 7 solution was then prepared and the same reductive LSV was performed as seen in graph b.

In the results shown in graph a, the oxidative LSV of the iodide recovery electrode in 0.1 M $Na_3PO_4$ pH 7 is shown without iodide (solid) and with 50 mM KI (dashed). In graph b, the reductive LSV of the iodide recovery electrode is shown in 0.1 M $Na_3PO_4$ pH 7 (solid) and after loading with $I_3$— (dashed). The much higher current with the peak centered at −1.1 V vs Ag/AgCl can be attributed to reduction of the $I_3^-$ that had been immobilized in the electrode. A galvanostatic electrolysis was then performed at −0.25 mA/cm$^2$ for 40 minutes convert the $I_3^-$ to $I^-$ and release it into solution. The resulting solution contained 0.44 mM iodide.

Example 17

Iodide recovery using electrode. Four cycles of iodide capture and discharge were performed using the iodide recovery electrode described of example 14. The iodide capture media was 100 mL of 0.1 M $Na_3PO_4$ 2 mM KI pH 7 solution. For iodide capture, 3-electrode undivided cell was used in which the working electrode was the iodide recovery electrode described in example 13, the counter electrode was Pt mesh, and the reference electrode was Ag/AgCl. The iodide capture step was performed with a galvanostatic electrolysis at 0.25 mA/cm$^2$ for 30 minutes. After each iodide capture step, the electrodes were thoroughly rinsed with DI water, dried, and set up for the iodide recovery step. The iodide recovery media was 100 mL of 0.1 M $Na_3PO_4$ PH 7 solution. For iodide recovery 3-electrode cell divided with a Nafion 212 cation exchange membrane was used in which the working electrode was the iodide recovery electrode described in example 13, the counter electrode was Pt mesh, and the reference electrode was Ag/AgCl. The iodide recovery step was performed with a galvanostatic electrolysis at −0.25 mA/cm$^2$ for 30 minutes. After each iodide recovery step, the electrodes were thoroughly rinsed with DI water, dried, and set up for the iodide capture step.

Figure 51:
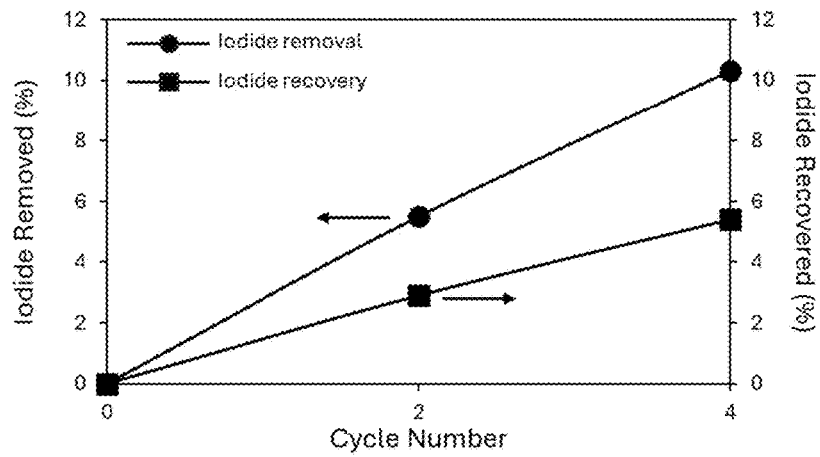
FIG. 51 shows a graph of experimental results of total iodide removal and recovery using an iodide recovery electrode.

The removal and recovery of iodide after the 2$^{nd}$ and 4$^{th}$ cycle are shown in FIG. 51, which shows total iodide removed (circle) and recovered (square) from the 0.1 M $Na_3PO_4$ 2 mM KI pH 7 solution after 2 and 4 cycles of iodide capture and discharge. After 2 cycles 5.5% of the initial iodide had been removed from iodide capture solution and 2.9% of the initial iodide had been recovered into the recovery solution for an efficiency of 53%. After 4 cycles a total of 10.3% of the initial iodide had been removed from the iodide capture solution and 5.4% of the initial iodide had been recovered into the iodide recovery solution for an efficiency of 53%.

Example 18

Iodide recovery using anion exchange resin. A solution of 2 mM KI 10 mM $Na_2SO_4$ was prepared using DI water. 300 mL of solution and 0.5 g of commercially available AmberSep anion exchange resin in the form of beads about 2 mm in diameter were placed in a bottle. 300 mL of solution and 0.5 g of commercially available AmberLite anion exchange resin in the form of beads about 2 mm in diameter were placed in a different bottle. Both bottles were shaken for 24 hours to mix the solutions and resins together. After 24 hours the solution containing AmberSep contained 0.94 mM iodide, meaning 53% of the iodide had been removed. After 24 hours the solution containing AmberLite contained 0.62 mM iodide, meaning 69% of the iodide had been removed.

The iodide loaded resins were filtered from the solutions and rinsed with DI water. They were then each placed in separate bottles with 50 mL of 0.2 M KCl. The two bottles were shaken for 24 hours to mix the solutions and resins together. After 24 hours the solution containing AmberSep contained 2.0 mM iodide, meaning 17% of the initial iodide had been recovered. The solution containing AmberLite contained 1.91 mM iodide, meaning that 16% of the initial iodide had been recovered.

Example 19

Figure 52:
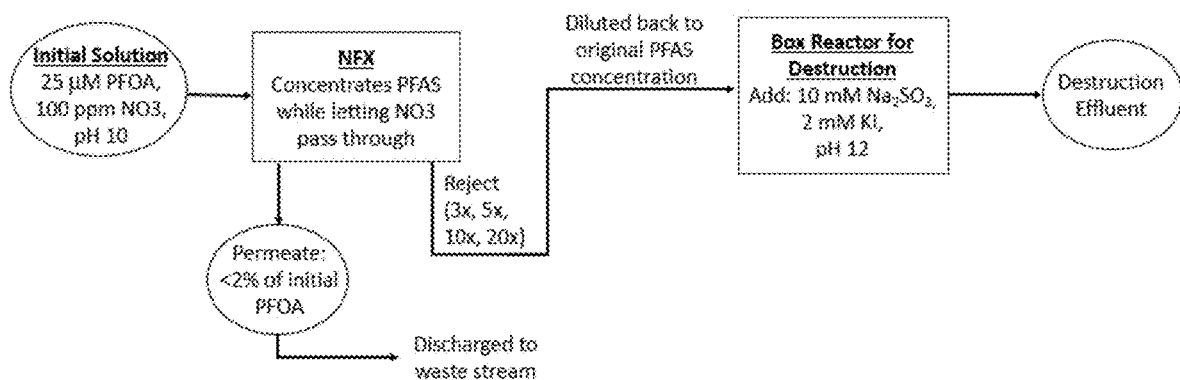
FIG. 52 schematic of an experimental procedure for nitrate filtration, dilution of the membrane reject, and photoreduction.

In this example, nanofiltration (NFX) was used to improve the PFAS destruction performance of nitrate-containing influent water by first concentrating the influent with NFX and then diluting the membrane reject to the original PFAS concentration. Nitrate interferes with the photoreduction of PFAS by competing with the PFAS as a scavenger for hydrated electrons in solution. The NFX membrane allows nitrate to pass through while rejecting nearly all the PFAS present in solution. By diluting the membrane reject by the NFX reject concentration factor, solutions were generated with a decreased concentration of nitrate and a similar concentration of PFAS compared to the original influent. As the NFX concentration factor and dilution factor both increase, the nitrate concentration in the destruction influent decreases and destruction performance improves. The schematic in FIG. 52 demonstrates the experimental design of this example.

In the membrane filtration process, 20 L of a synthetic aqueous solution containing 100 ppm of $NO_3$— and 25 µM of PFOA at pH 10 was transferred into the feed tank of a Benchtop Cross Flow Filtration System (Sterlitech Corporation, Auburn, WA, USA). The benchtop system was equipped with 1812 Element Housing and an NFX (SKU: 1180057, Synder, Vacaville, CA, USA) spiral wound membrane element. The synthetic solution was filtered through the NFX system at a flow rate of approximately 2 gal/min and operation pressure of approximately 250 psi. The membrane permeate was collected in graduated cylinders to determine the evolving concentration factor of the reject. For example, when two thirds (13.33 L) of the original 20 L volume was collected from the permeate, a 100 mL sample was collected from the feed tank for the 3× membrane reject sample. Similarly, the 5× sample was collected after 16 L of permeate were collected. 100 mL samples of the membrane reject were collected at 1× (no NFX concentration), 3×, 5×, 10×, and 20× concentration factors.

To prepare solutions for photoreduction, all membrane reject samples were diluted with deionized water back to the original PFAS concentrations. For example, the 3× concentrated reject solution was diluted by a factor of 3. 100 mL of the undiluted 1× solution and 100 mL of each of the diluted membrane reject solutions were transferred into 100 mL quartz vials (QP062, Aireka Scientific Co., Ltd, HK). 10 mM of $Na_2SO_3$ and 2 mM of KI were mixed into each 100 mL solution. 20 mM NaOH was then added to each solution to reach pH 12. Finally, the solutions were photolyzed in a UV254 nm photoreactor (LZC-ORG type, Luzchem Research Inc. Canada). This photoreactor is equipped with eight 10-watt UV254 nm lamps. During photoreduction, 3 mL samples were taken from quartz vials at several timepoints for analysis of destruction performance.

Zero timepoints for each destruction condition were analyzed by Triple Quadrupole Mass Spectrometry (QQQ MS) analysis to determine the initial PFOA concentrations. The zero timepoint and all other timepoint samples were analyzed with an ion-selective electrode (ISE, Fisher brand accumet solid-state) connected to a Thermo Scientific Orion Versa Star Pro meter to determine the free fluoride concentrations.

Then, the defluorination percentages (DeF %) for each timepoint were calculated from the measured free fluoride and TOF according to Equation 1. Here, $F_t$— and $F_0$— are F— concentration at time t and initial F— concentration, respectively. TOF is the total organic fluorine present. In the solution, the initial F— concentration is 0, and the TOF is calculated based on the initial PFOA concentration and the number of fluorine atoms per molecule. A higher DeF % value indicates superior PFAS degradation performance.

Figure 53:
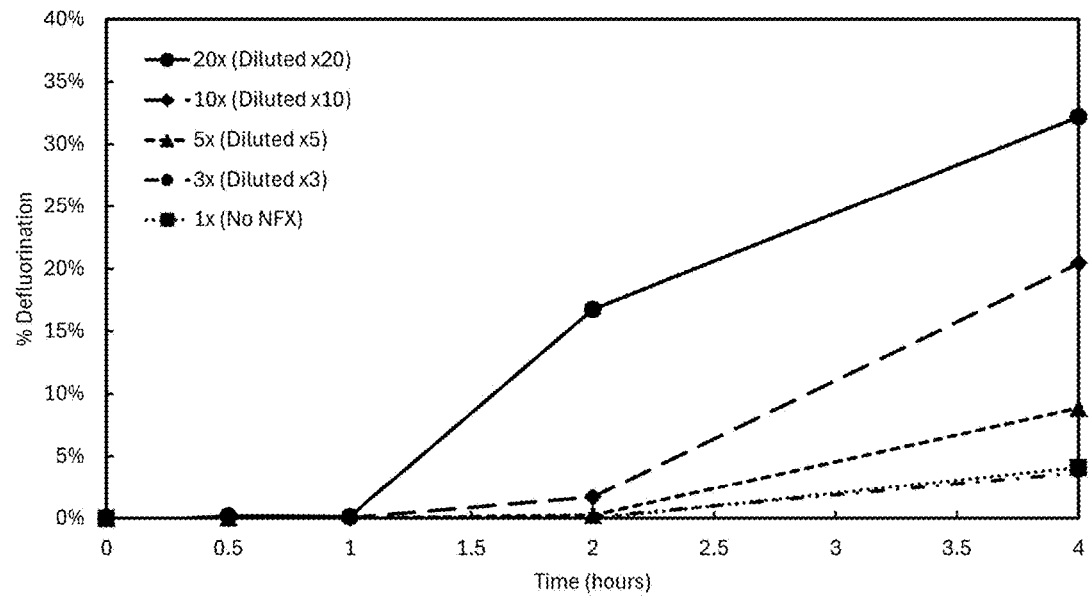
FIG. 53 is a graph of experimental results of defluorination of wastewater following the procedure shown in FIG. 52.

The results are shown in FIG. 53, which shows the percent defluorination of 1×, 3×, 5×, 10×, and 20× samples over 4 hours of UV exposure. From FIG. 53, increasing the NFX concentration factor and equivalent dilution factor of PFAS solutions containing nitrate resulted in improved destruction performance. After 4 hours, the 20× sample demonstrated 32.2% defluorination while the sample untreated by NFX demonstrates only 4.1% defluorination. This demonstrates the success of using NFX to improve PFAS photoreduction in the presence of nitrate by decreasing the nitrate concentration relative to the PFAS concentration and thereby mitigating the competitive electron scavenging of nitrate.

Example 20

Figure 54:
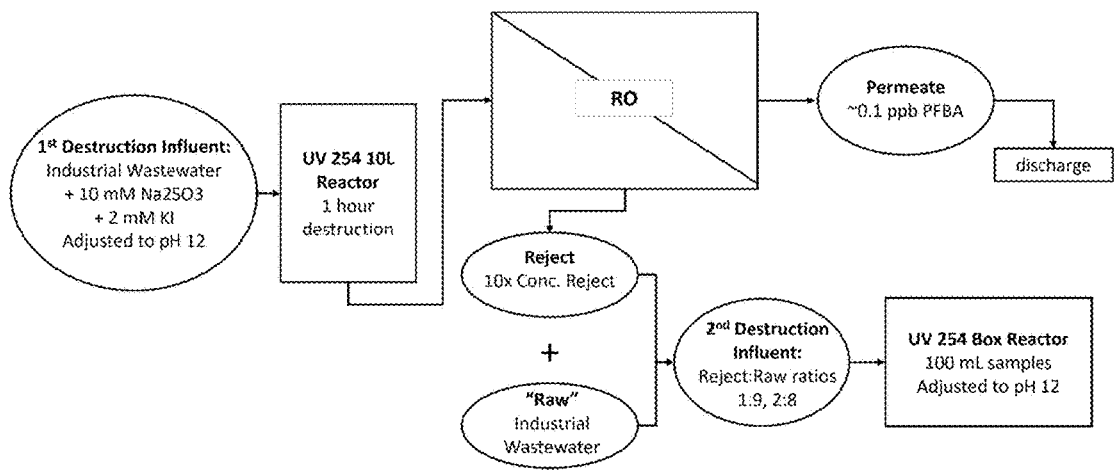
FIG. 54 is a schematic of an experimental procedure for recycling of photosensitizer.

In this example, reverse osmosis (RO) was used to recycle the photosensitizers used in a PFAS destruction process. Two destruction processes with >99.9% PFBA destruction after 1 hour were completed using only one initial photosensitizer dosing of iodide and sulfite. In between destruction runs, the photosensitizers in the destruction effluent were concentrated with RO in the membrane reject. The reject was then mixed with the influent PFAS wastewater to add photosensitizers for the second destruction. The schematic in FIG. 54 demonstrates the experimental design of this example.

For the first destruction, 10 L of wastewater was dosed with 10 mM Na2SO3, 2 mM KI, and 20 mM NaOH to reach pH 12. The influent water throughout this example was an industrial wastewater, which may be referred to as raw, containing approximately 3 ppm total PFAS and 400 ppb PFBA, the target compound. This solution was transferred into a 10 L UV254 nm photoreactor equipped with 3 106 W bulbs for UV photoreduction for 1 hour.

The 10 L of reactor effluent was then transferred into the feed tank of a Benchtop Cross Flow Filtration System (Sterlitech Corporation, Auburn, WA, USA). The benchtop system was equipped with 1812 Element Housing and an RO (SKU: 1180001, TriSep, Vacaville, CA, USA) spiral wound membrane element. The effluent was concentrated by the RO system at a flow rate of approximately 2 gal/min and operation pressure of approximately 250 psi. The membrane permeate was collected in graduated cylinders to determine the evolving concentration factor of the reject. At the point when 9 L of permeate solution was collected, the 10× concentrated reject solution in the feed tank was collected.

The reject solution was combined with the raw influent waste water to recycle the photosensitizers used in the first reaction. An ORION Iodide 9653BNWP Electrode probe (ThermoFisher Scientific) was used to measure the iodide concentrations in the 10× reject solutions. The 10× reject solution was mixed with the raw influent wastewater in 1:10 and 2:8 reject:raw influent ratios. Both solutions were adjusted to pH 12 with NaOH. 100 mL of each of these mixed solutions was transferred into a 100 mL quartz vial (QP062, Aireka Scientific Co., Ltd, HK). For reference, two 100 mL control samples were also prepared. The first control solution was the raw influent wastewater adjusted to pH 12 with 20 mM NaOH for direct photolysis. The second control was the raw influent wastewater with the photosensitizers used in the first destruction: 10 mM Na2SO3, 2 mM KI, and 20 mM NaOH to reach pH 12. These solutions were also transferred into quartz vials. All solutions were photolyzed in a UV254 nm photoreactor (LZC-ORG type, Luzchem Research Inc. Canada). This photoreactor is equipped with eight 10-watt UV254 nm lamps. During photoreduction, 3 mL samples were taken from quartz vials at several timepoints for analysis of destruction performance. All samples collected were analyzed by Triple Quadrupole Mass Spectrometry (QQQ MS).

Figure 55:
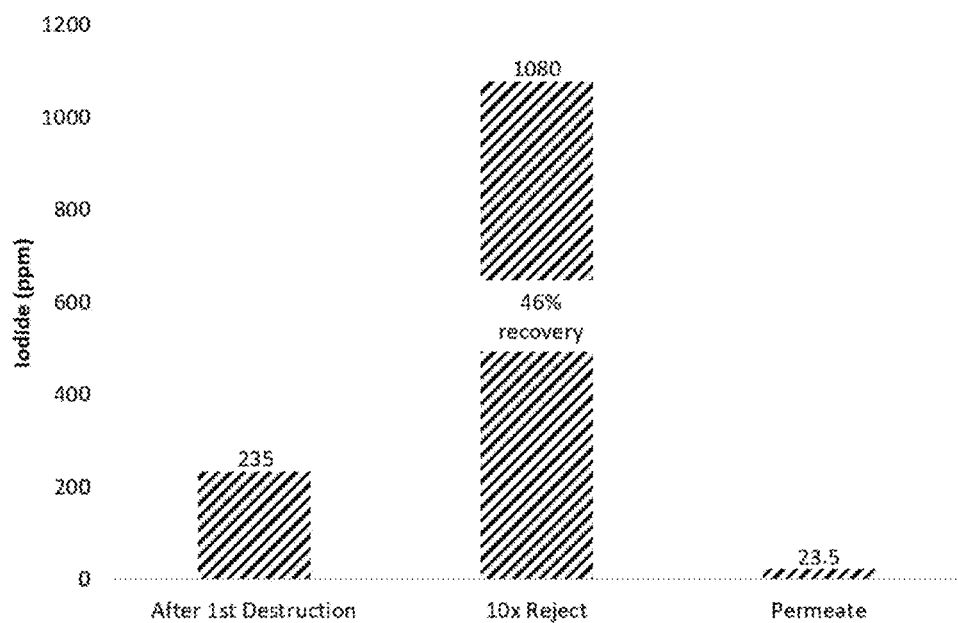
FIG. 55 is a graph of experimental results of iodine levels during a process of recycling photosensitizer.

The Iodide levels are shown in FIG. 55, which presents iodide concentration (ppm) in the first destruction effluent, the 10× membrane reject solution, and the membrane permeate.

As shown in FIG. 55, there was 46% recovery of iodide in the 10× reject solution sample. The percent recovery is the percentage calculated dividing the iodide concentration in the 10× reject by the iodide concentration in first destruction effluent multiplied by the concentration factor 10. With further refinement and experimentation, the RO should completely reject iodide, resulting in a predicted recovery rate near 100%. The 46% recovery combined with the very small concentration of iodide present in the permeate does not sum to the iodide concentration prior to RO treatment. This may indicate that a reaction occurred during the RO process that resulted in a loss of free iodide. With further experimentation and large-scale implementation, the percent recovery of iodide can be improved.

Figure 56:
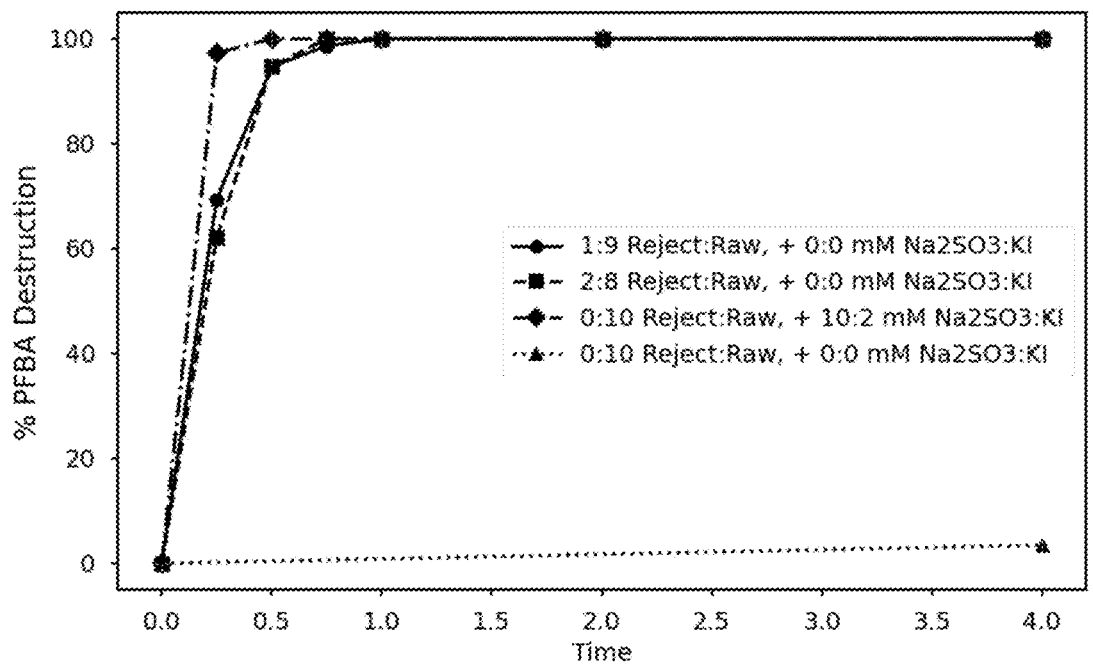
FIG. 56 is a graph of experimental results of PFBA destruction using recycled photosensitizer.

The results of photolysis are shown in FIG. 56, which shows the percent PFBA destruction as a function of run time. The 1:9 and 2:8 reject:raw influent samples demonstrated the performance of recycling the RO reject. The 0:10 samples are two control samples shown for comparison. From FIG. 56, the 1:9 and 2:8 reject:raw influent samples demonstrated destruction performance similar to the control sample of raw influent water dosed with 10 mM $Na_2SO_3$ and 2 mM KI. The direct photolysis control sample (raw influent water with no additional photosensitizers) resulted in essentially no destruction, demonstrating the efficacy of recycling the photosensitizers in the RO reject. After 1 hour, all samples, excluding the direct photolysis sample, demonstrated greater than 99.9% PFBA destruction, resulting in an effluent PFBA concentration below the limit of detection of the QQQ-MS.

Example 21

Figure 57:
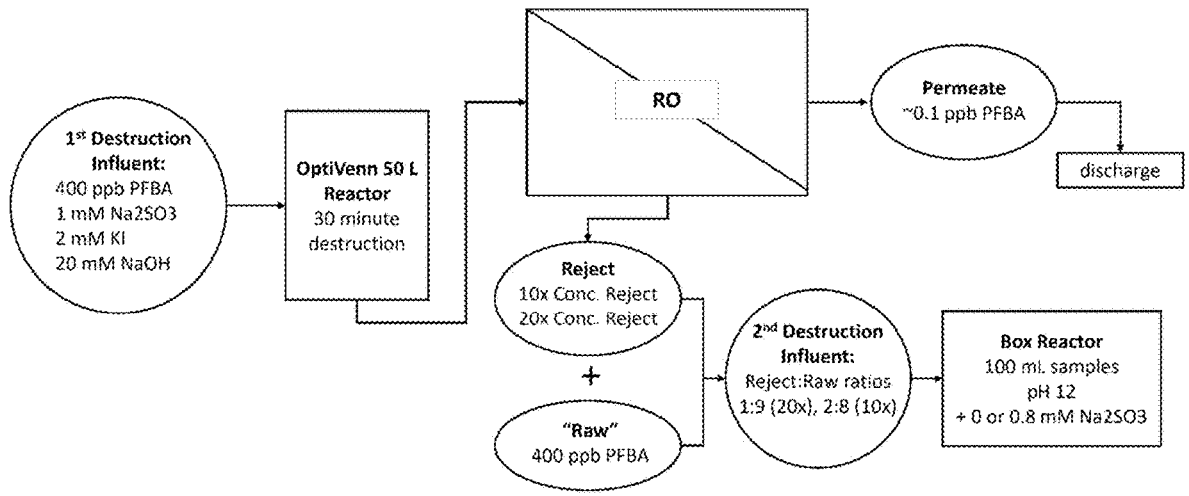
FIG. 57 is a schematic of another experimental procedure for recycling of photosensitizer

In this example, reverse osmosis (RO) was used to recycle the photosensitizers used in a PFAS destruction process. Two destruction processes with greater than 99.9% PFBA destruction after 30 minutes were completed using only one initial dosing of iodide, with an addition of sulfite for the second destruction. In between destruction runs, the photosensitizers in the destruction effluent were concentrated with RO in the membrane reject. The reject was then mixed with the influent PFAS wastewater to add photosensitizers for the second destruction with the goal of achieving the same initial concentration of photosensitizers as in the first destruction. Additional $Na_2SO_3$ was added in the most successful destruction samples to replace the sulfite oxidized to sulfate in the first destruction. The schematic in FIG. 57 demonstrates the experimental design of this example.

For the first destruction, 50 L of 400 ppb PFBA synthetic wastewater was dosed with 1 mM $Na_2SO_3$, 2 mM KI, and 20 mM NaOH to reach pH 12. The influent water throughout this example was a synthetic wastewater, sometimes referred to as raw, containing 400 ppb PFBA in deionized water. This solution was transferred into a 50 L Aquafine OptiVenn UV254 nm photoreactor equipped with 8 150 W UV lamps (Trojan Technologies, London, CA) for 30 minutes of photoreduction.

20 L of the reactor effluent was then transferred into the feed tank of a Benchtop Cross Flow Filtration System (Sterlitech Corporation, Auburn, WA, USA). The benchtop system was equipped with 1812 Element Housing and an RO (SKU: 1180001, TriSep, Vacaville, CA, USA) spiral wound membrane element. The effluent was concentrated by the RO system at a flow rate of approximately 2 gal/min and operation pressure of approximately 250 psi. The membrane permeate was collected in graduated cylinders to determine the evolving concentration factor of the reject. At the points at which 9 and 9.5 L of permeate solution were collected, 100 mL of the 10× and 20× concentrated reject solutions were collected from the feed tank.

The reject solution was combined with new, untreated influent synthetic wastewater to recycle the photosensitizers used in the first reaction. An ORION Iodide 9653BNWP Electrode probe (ThermoFisher Scientific) was used to measure the iodide concentrations in the 10× and 20× reject solutions. The 10× and 20× reject solutions were mixed with the raw influent wastewater in 2:8 and 1:9 reject:raw influent ratios, respectively. These ratios were chosen to approximately achieve 2 mM iodide, the iodide concentration of the first destruction. These solutions were each adjusted to pH 12 with NaOH. Two 100 mL quartz vials (QP062, Aireka Scientific Co., Ltd, HK) were filled with each of these solutions, for a total of four vials. 0.8 mM $Na_2SO_3$ was added to one of the 1:9 reject:raw influent samples and one of the 2:8 reject:raw influent samples. For reference, a 100 mL control sample was also prepared. This solution was the raw synthetic wastewater dosed with 1 mM $Na_2SO_3$ and 2 mM KI and adjusted to pH 12 with 20 mM NaOH. This solution was also transferred into a quartz vial. All solutions were photolyzed in a UV254 nm photoreactor (LZC-ORG type, Luzchem Research Inc. Canada). This photoreactor is equipped with eight 10-watt UV254 nm lamps. During photoreduction, 3 mL samples were taken from quartz vials at several timepoints for analysis of destruction performance. All samples collected were analyzed by Triple Quadrupole Mass Spectrometry (QQQ MS).

Figure 58:
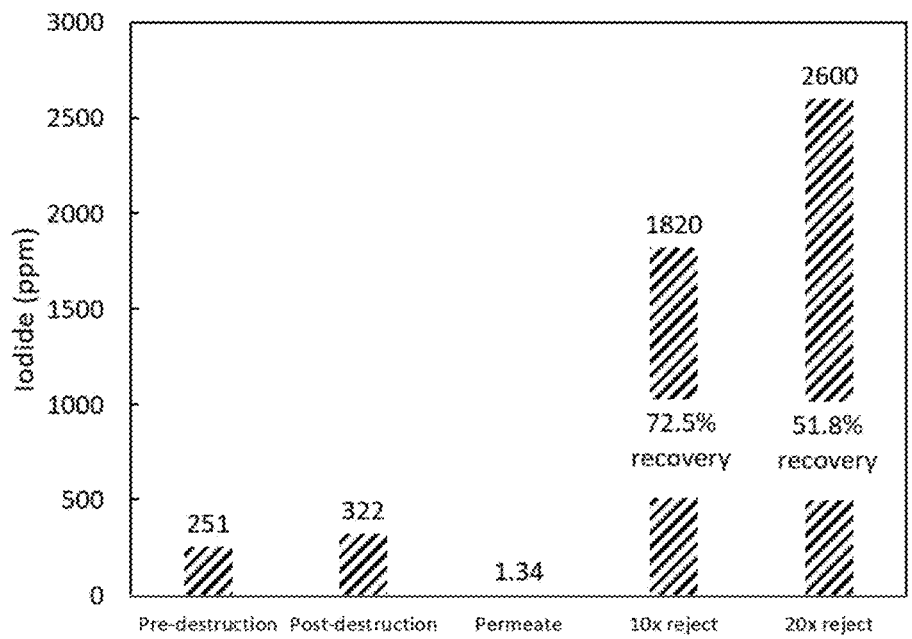
FIG. 58 is a graph of experimental results of iodine levels during a process of recycling photosensitizer.

FIG. 58 shows iodide concentration (ppm) in the first destruction influent and effluent (Pre-destruction and Post-destruction), the 10× and 20× membrane reject solutions, and the membrane permeate. The percent recovery is the percentage calculated dividing the iodide concentration in the reject solution by the iodide concentration in first destruction effluent multiplied by the concentration factor.

FIG. 58 demonstrates the 72.5% and 51.8% recovery of iodide in the 10× and 20× reject solutions as well as the iodide concentrations measured in the pre-destruction and post-destruction solution and the RO permeate. As in Example 20, with further refinement and experimentation, the RO should completely reject iodide, theoretically resulting in a recovery rate near 100%. The 72.5% and 51.8% recoveries combined with the very small concentration of iodide present in the permeate does not sum to the iodide concentration prior to RO treatment. This may indicate that a reaction occurred during the RO process that resulted in a loss of free iodide. With further experimentation and large-scale implementation, the percent recovery of iodide can be improved.

Figure 59:
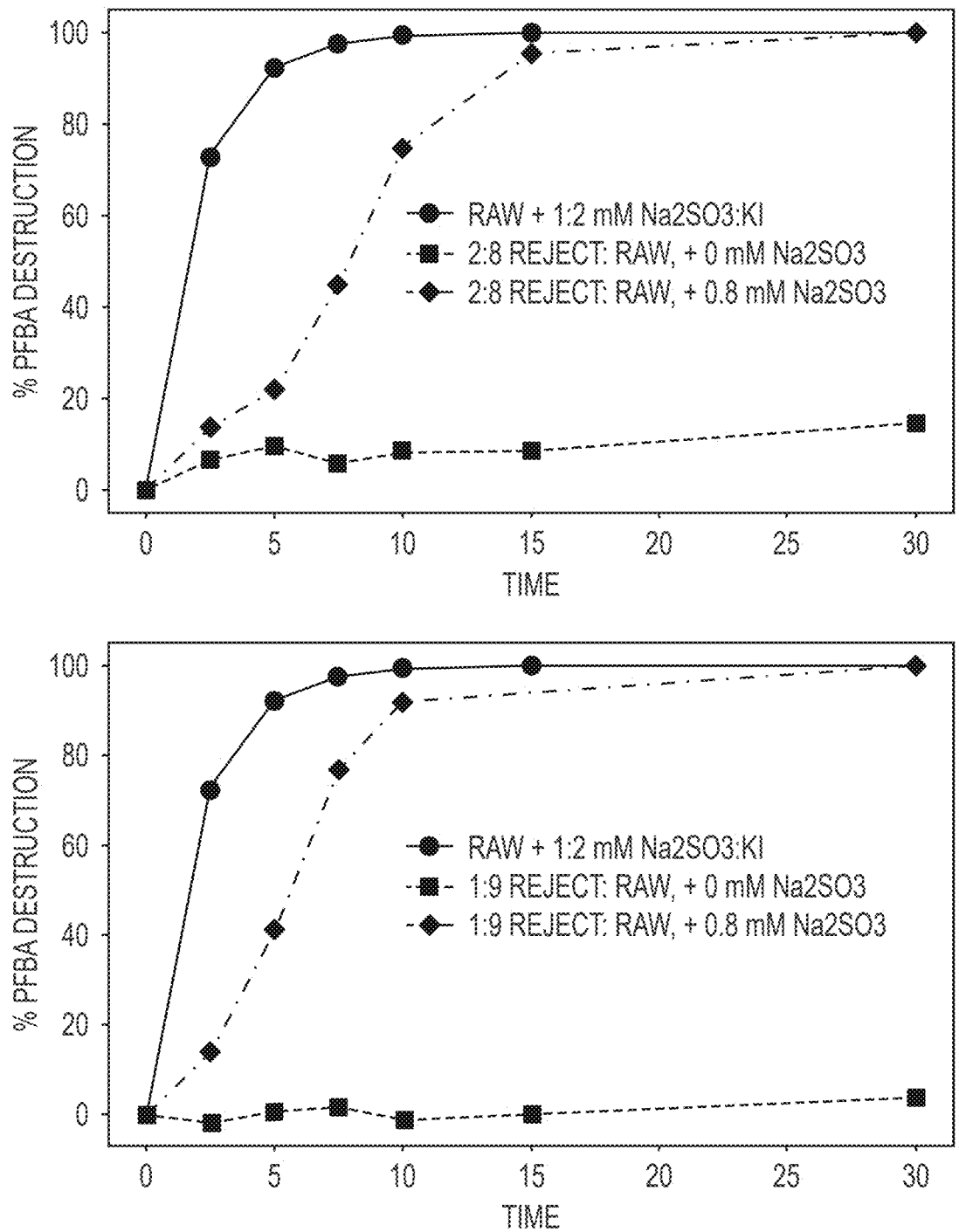
FIG. 59 is a graph of experimental results of PFBA destruction using recycled photosensitizer.

FIG. 59 shows the percent PFBA destruction as a function of run time. The left figure depicts the control sample and the two 2:8 reject:raw influent 10× samples, one with additional sulfite. The right figure depicts the same with the two 1:9 reject:raw influent 20× samples. From FIG. 59, the 1:9 20× and 2:8 10× reject:raw influent samples demonstrated improved destruction performance with the addition of 0.8 mM sulfite as compared to no addition. While these samples demonstrate inferior kinetics as compared to the control sample with no membrane reject solution, the samples with additional sulfite still demonstrate excellent, >99.9% PFBA destruction performance after 30 minutes. The photosensitizer concentration, lamp intensity, and PFAS concentration of the initial destruction may determine whether or not additional sulfite is required for a second successful destruction using the recycled photosensitizer. In Example 20, in which the first destruction influent was dosed with 10:2 mM $Na_2SO_3$:KI, no additional sulfite was required for a successful destruction with recycled photosensitizers from the RO reject. However, at the initial dosage of 1:2 mM $Na_2SO_3$:KI used in this Example, additional sulfite was beneficial due to the depletion of the low dosage of 1 mM sulfite. In a continuously recycling system where the initial photosensitizers may be used for multiple destruction processes, additional sulfite may occasionally need to be introduced into the system and/or occasional discharge of the membrane reject and reintroduction of all photosensitizers may be needed to replenish the photosensitizer concentration to the ideal destruction condition.

As used herein, the terms "substantially" or "generally" refer to the complete or near complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is no significant effect thereof.

In the foregoing description, the inventions have been described with reference to specific embodiments. However, it may be understood that various modifications and changes may be made without departing from the scope of the inventions.

What is claimed is:

1. A method of PFAS destruction comprising:
   filtering water containing PFAS and nitrate through a membrane selective for PFAS to obtain a membrane reject containing PFAS and nitrate and a filtrate containing nitrate;
   forming a treatment solution using the membrane reject comprising:
   diluting the membrane reject, wherein, before dilution, a concentration of PFAS in the membrane reject is between about 3 times and about 20 times greater than in the water containing PFAS and nitrate before the filtering step, and wherein dilution of the membrane reject comprises between about a 3 and about a 20 times dilution, and
   combining the membrane reject with a photosensitizer, a sulfite salt, and a sufficient amount of base such that the treatment solution has a pH of about 10 or more; and
   irradiating the treatment solution with UV light in a photoreactor to destroy a portion of the PFAS.

2. The method of claim 1 wherein the selective membrane comprises a reverse osmosis, forward osmosis, nanofiltration (NF), and/or ultrafiltration (UF) membrane.

3. The method of claim 2 wherein the selective membrane comprises a reverse osmosis membrane.

4. The method of claim 1 wherein the membrane retains greater than 99% of the PFAS in the water.

5. The method of claim 1 wherein the photosensitizer comprises a halide salt.

6. The method of claim 5 wherein the photosensitizer comprises an iodide salt.

7. The method of claim 5 wherein the photosensitizer comprises a bromide salt.

8. The method of claim 1 wherein a concentration of PFAS in the water containing PFAS and nitrate before the filtering step is between about ¼ and about 4 times the concentration of PFAS in the treatment solution.

9. The method of claim 8 wherein the concentration of PFAS in the water containing PFAS and nitrate before the filtering step is between about ½ and 2 times the concentration of PFAS in the treatment solution.

10. The method of claim 1 wherein the treatment solution has a pH of about 12 or more.

* * * * *